United States Patent
Stout et al.

(10) Patent No.: US 12,473,536 B2
(45) Date of Patent: Nov. 18, 2025

(54) CULTURED MEAT PRODUCT WITH GENETICALLY MODIFIED CELLS

(71) Applicant: Trustees of Tufts College, Medford, MA (US)

(72) Inventors: Andrew Stout, Medford, MA (US); David L. Kaplan, Medford, MA (US)

(73) Assignee: Trustees of Tufts College, Medford, MA (US)

( * ) Notice: Subject to any disclaimer, the term of this patent is extended or adjusted under 35 U.S.C. 154(b) by 875 days.

(21) Appl. No.: 17/615,578

(22) PCT Filed: Jun. 1, 2020

(86) PCT No.: PCT/US2020/035526
§ 371 (c)(1),
(2) Date: Nov. 30, 2021

(87) PCT Pub. No.: WO2020/243695
PCT Pub. Date: Dec. 3, 2020

(65) Prior Publication Data
US 2022/0228121 A1   Jul. 21, 2022

Related U.S. Application Data

(60) Provisional application No. 62/861,606, filed on Jun. 14, 2019, provisional application No. 62/855,698, filed on May 31, 2019.

(51) Int. Cl.
*C12N 9/00* (2006.01)
*A23L 13/40* (2023.01)
*C12N 5/077* (2010.01)
*C12N 9/10* (2006.01)
*C07K 16/24* (2006.01)

(52) U.S. Cl.
CPC ............ *C12N 5/0659* (2013.01); *A23L 13/42* (2016.08); *C12N 9/1085* (2013.01); *C07K 16/241* (2013.01); *C07K 2317/569* (2013.01); *C12N 2510/02* (2013.01); *C12Y 205/01032* (2013.01)

(58) Field of Classification Search
CPC .......... C12P 23/00; C12P 7/66; C12N 15/825; C12N 9/0004; C12Y 205/01032; C12Y 113/11063; C12Y 103/9903; C12Y 505/01019
USPC ........................................................ 435/67
See application file for complete search history.

(56) References Cited

U.S. PATENT DOCUMENTS

2005/0260722 A1   11/2005  Porro et al.
2014/0123339 A1*   5/2014  Albertsen et al.
2017/0002069 A1    1/2017  Crowe et al.

FOREIGN PATENT DOCUMENTS

| CN | 1484708 A | 3/2004 |
|---|---|---|
| CN | 1863922 A | 11/2006 |
| CN | 107454905 A | 12/2017 |
| CN | 106544348 A | 3/2020 |
| CN | 111032855 A | 4/2020 |
| WO | 2017139496 A1 | 8/2017 |
| WO | 2018222946 A1 | 12/2018 |

OTHER PUBLICATIONS

Davos et al., (Proteins: Structure, Function and Genetics, 2000, vol. 41: 98-107.*
Wristlock et al., (Quarterly Reviews of Biophysics 2003, vol. 36 (3): 307-340.*
Kisselev L., (Structure, 2002, vol. 10: 8-9.*
Kwiatkowski et al., (Biochemistry 38:11643-11650, 1999.*
Botella-Pavía, Patricia, and Manuel Rodríguez-Concepción. "Carotenoid biotechnology in plants for nutritionally improved foods." Physiologia Plantarum 126.3 (2006): 369-381.
Datar, Isha, and Mirko Betti. "Possibilities for an in vitro meat production system." Innovative Food Science & Emerging Technologies 11.1 (2010): 13-22.
Donaldson, Joshua M., et al. "Design and development of masked therapeutic antibodies to limit off-target effects: application to anti-EGFR antibodies." Cancer biology & therapy 8.22 (2009): 2147-2152.
Drewnowski, Adam, et al. "Energy and nutrient density of foods in relation to their carbon footprint." The American journal of clinical nutrition 101.1 (2015): 184-191.
Engelmann, Nancy J., Steven K. Clinton, and John W. Erdman Jr. "Nutritional aspects of phytoene and phytofluene, carotenoid precursors to lycopene." Advances in Nutrition 2.1 (2011): 51-61.
Fraser, Paul D., et al. "Evaluation of transgenic tomato plants expressing an additional phytoene synthase in a fruit-specific manner." Proceedings of the National Academy of sciences 99.2 (2002): 1092-1097.
Godfray, H. Charles J., et al. "Meat consumption, health, and the environment." Science 361.6399 (2018): eaam5324.
Gorelik, Shlomit, et al. "The stomach as a "bioreactor": when red meat meets red wine." Journal of agricultural and food chemistry 56.13 (2008): 5002-5007.
Kim, Sung-Woo, et al. "Over-production of β-carotene from metabolically engineered *Escherichia coli*." Biotechnology letters 28.12 (2006): 897-904.
Liu, Chun, et al. "β-Cryptoxanthin Supplementation Prevents Cigarette Smoke-Induced Lung Inflammation, Oxidative Damage, and Squamous Metaplasia in Ferretsβ-Cryptoxanthin and Lung Inflammation and Oxidative Damage." Cancer Prevention Research 4.8 (2011): 1255-1266.

(Continued)

Primary Examiner — Tekchand Saidha
Assistant Examiner — Mohammad Y Meah
(74) Attorney, Agent, or Firm — Quarles & Brady LLP

(57) ABSTRACT

Provided herein are genetically engineered mammalian cells that endogenously express one or more phytochemicals, vitamins, or therapeutic agents and suitable for use in a cultured meat product. Methods of making and using the genetically engineered mammalian cells and the cultured meat products are also provided.

15 Claims, 20 Drawing Sheets
Specification includes a Sequence Listing.

(56) References Cited

OTHER PUBLICATIONS

Liu, Chang-Shu, Raymond P. Glahn, and Rui Hai Liu. "Assessment of carotenoid bioavailability of whole foods using a Caco-2 cell culture model coupled with an in vitro digestion." Journal of Agricultural and food chemistry 52.13 (2004): 4330-4337.

Lopez, Alex B., et al. "Effect of the cauliflower Or transgene on carotenoid accumulation and chromoplast formation in transgenic potato tubers." Journal of experimental botany 59.2 (2008): 213-223.

García, M. Luisa, Marta M. Calvo, and M. Dolores Selgas. "Beef hamburgers enriched in lycopene using dry tomato peel as an ingredient." Meat science 83.1 (2009): 45-49.

Lynch, John, and Raymond Pierrehumbert. "Climate impacts of cultured meat and beef cattle." Frontiers in sustainable food systems (2019): 5.

Mattick, Carolyn S., et al. "Anticipatory life cycle analysis of in vitro biomass cultivation for cultured meat production in the United States." Environmental science & technology 49.19 (2015): 11941-11949.

Nogareda, Carmina, et al. "Carotenoid-enriched transgenic corn delivers bioavailable carotenoids to poultry and protects them against coccidiosis." Plant Biotechnology Journal 14.1 (2016): 160-168.

De Gonzalez, MT Nuñez, et al. "Antioxidant properties of plum concentrates and powder in precooked roast beef to reduce lipid oxidation." Meat Science 80.4 (2008): 997-1004.

Oyarce, Paula, et al. "Introducing curcumin biosynthesis in *Arabidopsis* enhances lignocellulosic biomass processing." Nature plants 5.2 (2019): 225-237.

Paine, Jacqueline A., et al. "Improving the nutritional value of Golden Rice through increased pro-vitamin A content." Nature biotechnology 23.4 (2005): 482-487.

Pighin, Dario, et al. "A contribution of beef to human health: A review of the role of the animal production systems." The Scientific World Journal 2016 (2016).

Rubio, Natalie R., et al. "In vitro insect muscle for tissue engineering applications." ACS Biomaterials Science & Engineering 5.2 (2019): 1071-1082.

Stice, Camilla P., Hui Xia, and Xiang-Dong Wang. "Tomato lycopene prevention of alcoholic fatty liver disease and hepatocellular carcinoma development." Chronic diseases and translational medicine 4.4 (2018): 211-224.

Van Hecke, Thomas, John Van Camp, and Stefaan De Smet. "Oxidation during digestion of meat: interactions with the diet and helicobacter pylori gastritis, and implications on human health." Comprehensive Reviews in Food Science and Food Safety 16.2 (2017): 214-233.

Vulcain, Emmanuelle, et al. "Inhibition of the metmyoglobin-induced peroxidation of linoleic acid by dietary antioxidants: action in the aqueous vs. lipid phase." Free radical research 39.5 (2005): 547-563.

Wolk, Alicja. "Potential health hazards of eating red meat." Journal of internal medicine 281.2 (2017): 106-122.

Wyness, Laura. "The role of red meat in the diet: nutrition and health benefits." Proceedings of the Nutrition Society 75.3 (2016): 227-232.

Ye, Xudong, et al. "Engineering the provitamin A (β-carotene) biosynthetic pathway into (carotenoid-free) rice endosperm." Science 287.5451 (2000): 303-305.

PCT International Search Report of PCT/US2020/035526; received on Sep. 14, 2020.

Tuomisto, Hanna L., and M. Joost Teixeira de Mattos. "Environmental impacts of cultured meat production." Environmental science & technology 45.14 (2011): 6117-6123.

Satomi, Yoshiko, et al. "Production of phytoene, an oxidative stress protective carotenoid, in mammalian cells by introduction of phytoene synthase gene crtB isolated from a bacterium Erwinia uredovora." Proceedings of the Japan Academy, Series B 71.7 (1995): 236-240.

Lycopene beta-cyclase CrtY [Pantoea ananatis], NCBI Reference Sequence: WP_014598228.1, 382aa linear. (2019).

First Office Action in CN Application No. 202080054515.3; received on Jul. 1, 2023.

* cited by examiner

FIGS. 5A-5C
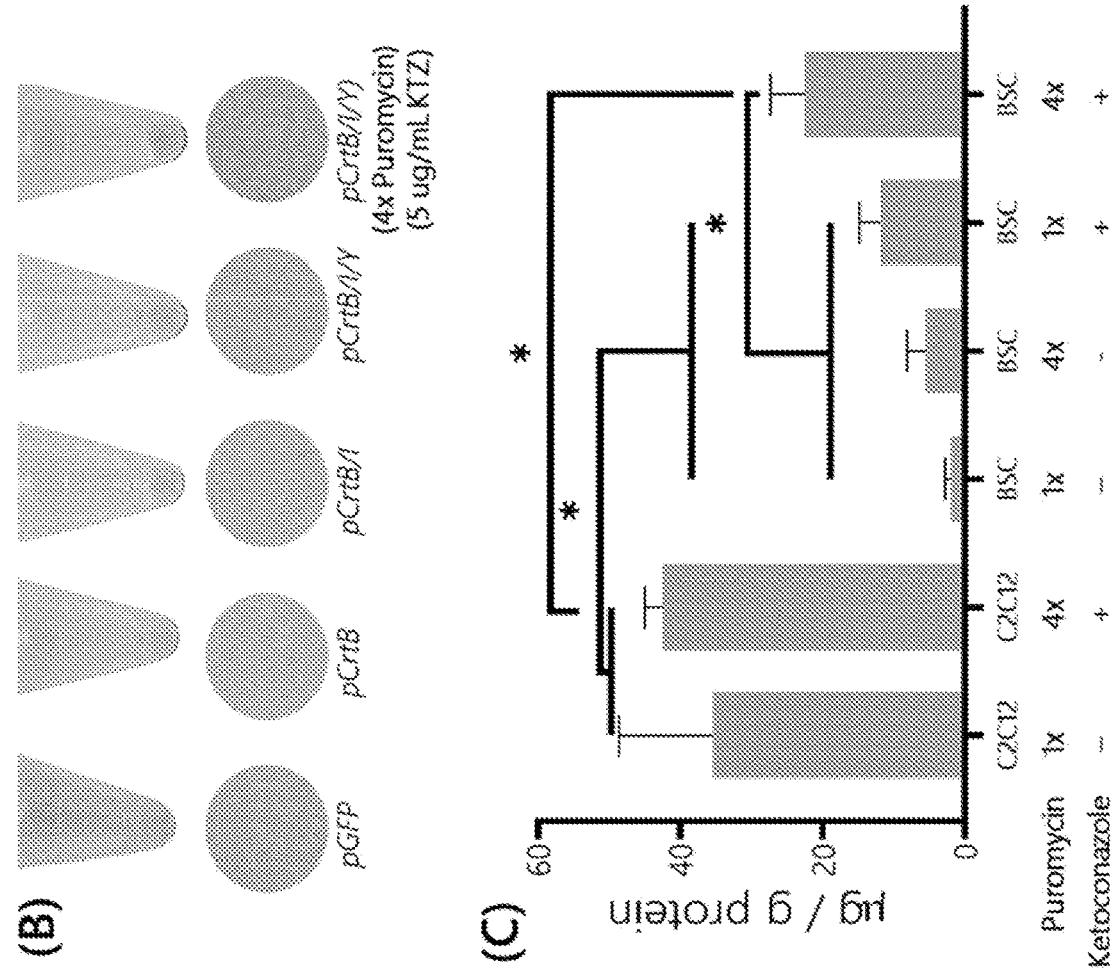
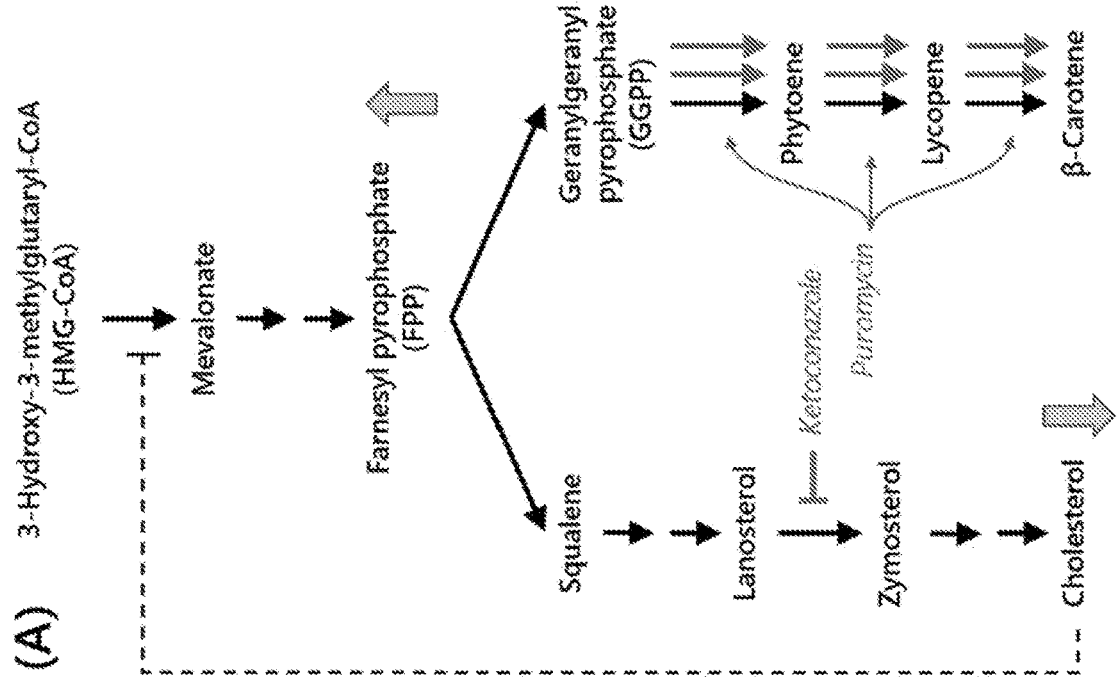

SEQUENCE LISTING

```
<160> NUMBER OF SEQ ID NOS: 40

<210> SEQ ID NO 1
<211> LENGTH: 309
<212> TYPE: PRT
<213> ORGANISM: Pantoea ananatis

<400> SEQUENCE: 1

Met Asn Asn Pro Ser Leu Leu Asn His Ala Val Glu Thr Met Ala Val
1               5                   10                  15

Gly Ser Lys Ser Phe Ala Thr Ala Ser Lys Leu Phe Asp Ala Lys Thr
            20                  25                  30

Arg Arg Ser Val Leu Met Leu Tyr Ala Trp Cys Arg His Cys Asp Asp
        35                  40                  45

Val Ile Asp Asp Gln Thr Leu Gly Phe Gln Ala Arg Gln Pro Ala Leu
    50                  55                  60

Gln Thr Pro Glu Gln Arg Leu Met Gln Leu Glu Met Lys Thr Arg Gln
65                  70                  75                  80

Ala Tyr Ala Gly Ser Gln Met His Glu Pro Ala Phe Ala Ala Phe Gln
                85                  90                  95

Glu Val Ala Met Ala His Asp Ile Ala Pro Ala Tyr Ala Phe Asp His
            100                 105                 110

Leu Glu Gly Phe Ala Met Asp Val Arg Glu Ala Gln Tyr Ser Gln Leu
        115                 120                 125

Asp Asp Thr Leu Arg Tyr Cys Tyr His Val Ala Gly Val Val Gly Leu
    130                 135                 140

Met Met Ala Gln Ile Met Gly Val Arg Asp Lys Ala Thr Leu Asp Arg
145                 150                 155                 160

Ala Cys Asp Leu Gly Leu Ala Phe Gln Leu Thr Asn Ile Ala Arg Asp
                165                 170                 175

Ile Val Asp Asp Ala His Ala Gly Arg Cys Tyr Leu Pro Ala Ser Trp
            180                 185                 190

Leu Glu His Glu Gly Leu Asn Lys Glu Asn Tyr Ala Ala Pro Glu Asn
        195                 200                 205

Arg Gln Ala Leu Ser Arg Ile Ala Arg Arg Leu Val Gln Glu Ala Glu
    210                 215                 220

Pro Tyr Tyr Leu Ser Ala Thr Ala Gly Leu Ala Gly Leu Pro Leu Arg
225                 230                 235                 240

Ser Ala Trp Ala Ile Ala Thr Ala Lys Gln Val Tyr Arg Lys Ile Gly
                245                 250                 255

Val Lys Val Glu Gln Ala Gly Gln Gln Ala Trp Asp Gln Arg Gln Ser
            260                 265                 270

Thr Thr Thr Pro Glu Lys Leu Thr Leu Leu Ala Ala Ser Gly Gln
        275                 280                 285

Ala Leu Thr Ser Arg Met Arg Ala His Pro Pro Arg Pro Ala His Leu
    290                 295                 300
```

Trp Gln Arg Pro Leu
305

<210> SEQ ID NO 2
<211> LENGTH: 930
<212> TYPE: DNA
<213> ORGANISM: Pantoea ananatis

<400> SEQUENCE: 2

```
atgaataatc cgtcgttact caatcatgcg gtcgaaacga tggcagttgg ctcgaaaagt     60
tttgcgacag cctcaaagtt atttgatgca aaaacccggc gcagcgtact gatgctctac    120
gcctggtgcc gccattgtga cgatgttatt gacgatcaga cgctgggctt tcaggcccgg    180
cagcctgcct acaaacgcc cgaacaacgt ctgatgcaac ttgagatgaa aacgcgccag    240
gcctatgcag atcgcagat gcacgaaccg gcgtttgcgg cttttcagga agtggctatg    300
gctcatgata tcgccccggc ttacgcgttt gatcatctgg aaggcttcgc catggatgta    360
cgcgaagcgc aatacagcca actgatgat acgctgcgct attgctatca cgttgcaggc    420
gttgtcggct tgatgatggc gcaaatcatg ggcgtgcggg ataacgccac gctggaccgc    480
gcctgtgacc ttgggctggc atttcagttg accaatattg ctcgcgatat tgtgacgat    540
gcgcatgcgg gccgctgtta tctgccggca gctggctgg agcatgaagg tctgaacaaa    600
gagaattatg cggcacctga aaccgtcag gcgctgagcc gtatcgcccg tcgtttggtg    660
caggaagcag aaccttacta tttgtctgcc acagccggcc tggcagggtt gcccctgcgt    720
tccgcctggg caatcgctac ggcgaagcag gtttaccgga aataggtgt caaagttgaa    780
caggccggtc agcaagcctg ggatcagcgg cagtcaacga ccacgcccga aaaattaacg    840
ctgctgctgg ccgcctctgg tcaggccctt acttcccgga tgcgggctca tcctccccgc    900
cctgcgcatc tctggcagcg cccgctctag                                     930
```

<210> SEQ ID NO 3
<211> LENGTH: 492
<212> TYPE: PRT
<213> ORGANISM: Pantoea ananatis

<400> SEQUENCE: 3

Met Lys Pro Thr Thr Val Ile Gly Ala Gly Phe Gly Gly Leu Ala Leu
1               5                   10                  15

Ala Ile Arg Leu Gln Ala Ala Gly Ile Pro Val Leu Leu Leu Glu Gln
                20                  25                  30

Arg Asp Lys Pro Gly Gly Arg Ala Tyr Val Tyr Glu Asp Gln Gly Phe
            35                  40                  45

Thr Phe Asp Ala Gly Pro Thr Val Ile Thr Asp Pro Ser Ala Ile Glu
        50                  55                  60

Glu Leu Phe Ala Leu Ala Gly Lys Gln Leu Lys Glu Tyr Val Glu Leu
65                  70                  75                  80

Leu Pro Val Thr Pro Phe Tyr Arg Leu Cys Trp Glu Ser Gly Lys Val
                85                  90                  95

Phe Asn Tyr Asp Asn Asp Gln Thr Arg Leu Glu Ala Gln Ile Gln Gln
                100                 105                 110

Phe Asn Pro Arg Asp Val Glu Gly Tyr Arg Gln Phe Leu Asp Tyr Ser
            115                 120                 125

Arg Ala Val Phe Lys Glu Gly Tyr Leu Lys Leu Gly Thr Val Pro Phe
        130                 135                 140

Leu Ser Phe Arg Asp Met Leu Arg Ala Ala Pro Gln Leu Ala Lys Leu

```
            145                 150                 155                 160
        Gln Ala Trp Arg Ser Val Tyr Ser Lys Val Ala Ser Tyr Ile Glu Asp
                        165                 170                 175

Glu His Leu Arg Gln Ala Phe Ser Phe His Ser Leu Leu Val Gly Gly
                        180                 185                 190

Asn Pro Phe Ala Thr Ser Ser Ile Tyr Thr Leu Ile His Ala Leu Glu
                        195                 200                 205

Arg Glu Trp Gly Val Trp Phe Pro Arg Gly Gly Thr Gly Ala Leu Val
                        210                 215                 220

Gln Gly Met Ile Lys Leu Phe Gln Asp Leu Gly Gly Glu Val Val Leu
        225                 230                 235                 240

Asn Ala Arg Val Ser His Met Glu Thr Thr Gly Asn Lys Ile Glu Ala
                        245                 250                 255

Val His Leu Glu Asp Gly Arg Arg Phe Leu Thr Gln Ala Val Ala Ser
                        260                 265                 270

Asn Ala Asp Val Val His Thr Tyr Arg Asp Leu Leu Ser Gln His Pro
                        275                 280                 285

Ala Ala Val Lys Gln Ser Asn Lys Leu Gln Thr Lys Arg Met Ser Asn
        290                 295                 300

Ser Leu Phe Val Leu Tyr Phe Gly Leu Asn His His Asp Gln Leu
        305                 310                 315                 320

Ala His His Thr Val Cys Phe Gly Pro Arg Tyr Arg Glu Leu Ile Asp
                        325                 330                 335

Glu Ile Phe Asn His Asp Gly Leu Ala Glu Asp Phe Ser Leu Tyr Leu
                        340                 345                 350

His Ala Pro Cys Val Thr Asp Ser Ser Leu Ala Pro Glu Gly Cys Gly
                        355                 360                 365

Ser Tyr Tyr Val Leu Ala Pro Val Pro His Leu Gly Thr Ala Asn Leu
                        370                 375                 380

Asp Trp Thr Val Glu Gly Pro Lys Leu Arg Asp Arg Ile Phe Ala Tyr
        385                 390                 395                 400

Leu Glu Gln His Tyr Met Pro Gly Leu Arg Ser Gln Leu Val Thr His
                        405                 410                 415

Arg Met Phe Thr Pro Phe Asp Phe Arg Asp Gln Leu Asn Ala Tyr His
                        420                 425                 430

Gly Ser Ala Phe Ser Val Glu Pro Val Leu Thr Gln Ser Ala Trp Phe
                        435                 440                 445

Arg Pro His Asn Arg Asp Lys Thr Ile Thr Asn Leu Tyr Leu Val Gly
                        450                 455                 460

Ala Gly Thr His Pro Gly Ala Gly Ile Pro Gly Val Ile Gly Ser Ala
        465                 470                 475                 480

Lys Ala Thr Ala Gly Leu Met Leu Glu Asp Leu Ile
                        485                 490

<210> SEQ ID NO 4
<211> LENGTH: 1000
<212> TYPE: DNA
<213> ORGANISM: Pantoea ananatis

<400> SEQUENCE: 4
atgaaaccaa ctacggtaat tggtgcaggc ttcggtggcc tggcactggc aattcgtcta      60
caggctgcgg ggatccccgt cttactgctt gaacaacgtg ataaacccgg cggtcgggct     120
tatgtctacg aggatcaggg gtttaccttt gatgcaggcc gacggttat caccgatccc     180
```

-continued

```
agtgccattg aagaactgtt tgcactggca ggaaaacagt taaaagagta tgtcgaactg      240
ctgccggtta cgccgtttta ccgcctgtgt tgggagtcag ggaaggtctt taattacgat      300
aacgatcagg cccggctcga agcgcagatt cagcagttta atcccgcgca tgtcgaaggt      360
tatcgtcagt ttctggacta ttcacgcgcg gtgtttaaag aagggtatct gaagctcggt      420
actgtccctt ttttatcgtt cagagacatg cttcgcgccg cacctcaact ggcgaaactg      480
caggcatgga gaagcgttta cagtaaggtt gccagttaca tcgaagatga acatctgcgc      540
caggcgtttt ctttccactc gctgttggtg ggcggcaatc ccttcgccac ctcatccatt      600
tatacgttga tacacgcgct ggaacgtgag tggggcgtct ggtttccgcg tggcggcacc      660
ggcgcattag ttcagggat gataaagctg tttcaggatc tgggtggcga agtcgtgtta       720
aacgccagag tcagccatat ggaaacgaca ggaaacaaga ttgaagccgt gcatttagag      780
gacggtcgca ggttcctgac gcaagccgtc gcgtcaaatg cagatgtggt tcataccat      840 cgcgacctgt taagccagca ccctgccgcg gttaagcagt ccaacaaact gcagactaag      900
cgcatgagta actctctgtt tgtgctctat tttggtttga atcaccatca tgatcagctc      960
gcgcatcaca cggtttgttt cggcccgcgt taccgcgagc                           1000
```

<210> SEQ ID NO 5
<211> LENGTH: 382
<212> TYPE: PRT
<213> ORGANISM: Pantoea ananatis

<400> SEQUENCE: 5

```
Met Gln Pro His Tyr Asp Leu Ile Leu Val Gly Ala Gly Leu Ala Asn
1               5                   10                  15

Gly Leu Ile Ala Leu Arg Leu Gln Gln Gln Pro Asp Met Arg Ile
            20                  25                  30

Leu Leu Ile Asp Ala Ala Pro Gln Ala Gly Gly Asn His Thr Trp Ser
        35                  40                  45

Phe His His Asp Asp Leu Thr Glu Ser Gln His Arg Trp Ile Ala Pro
    50                  55                  60

Leu Val Val His His Trp Pro Asp Tyr Gln Val Arg Phe Pro Thr Arg
65                  70                  75                  80

Arg Arg Lys Leu Asn Ser Gly Tyr Phe Cys Ile Thr Ser Gln Arg Phe
                85                  90                  95

Ala Glu Val Leu Leu Arg Gln Phe Gly Pro His Leu Trp Met Asp Thr
            100                 105                 110

Ala Val Ala Glu Val Asn Ala Glu Ser Val Arg Leu Lys Lys Gly Gln
        115                 120                 125

Val Ile Gly Ala Arg Ala Val Ile Asp Gly Arg Gly Tyr Ala Ala Asn
    130                 135                 140

Ser Ala Leu Ser Val Gly Phe Gln Ala Phe Ile Gly Gln Glu Trp Arg
145                 150                 155                 160

Leu Ser Arg Pro His Gly Leu Ser Pro Ile Ile Met Asp Ala Thr
                165                 170                 175

Val Asp Gln Gln Asn Gly Tyr Arg Phe Val Tyr Ser Leu Pro Leu Ser
            180                 185                 190

Pro Thr Arg Leu Leu Ile Glu Asp Thr His Tyr Ile Asp Asn Ala Thr
        195                 200                 205

Leu Asp Pro Glu Arg Ala Arg Gln Asn Ile Cys Asp Tyr Ala Ala Gln
    210                 215                 220

Gln Gly Trp Gln Leu Gln Thr Leu Leu Arg Glu Glu Gln Gly Ala Leu
```

```
               225                 230                 235                 240
Pro Ile Thr Leu Ser Gly Asn Ala Asp Ala Phe Trp Gln Gln Arg Pro
                245                 250                 255
Leu Ala Cys Ser Gly Leu Arg Ala Gly Leu Phe His Pro Thr Thr Gly
                260                 265                 270
Tyr Ser Leu Pro Leu Ala Val Ala Val Ala Asp Arg Leu Ser Ala Leu
                275                 280                 285
Asp Val Phe Thr Ser Ala Ser Ile His Gln Ala Ile Thr His Phe Ala
                290                 295                 300
Arg Glu Arg Trp Gln Gln Arg Phe Phe Arg Met Leu Asn Arg Met
305                 310                 315                 320
Leu Phe Leu Ala Gly Pro Ala Asp Leu Arg Trp Arg Val Met Gln Arg
                325                 330                 335
Phe Tyr Gly Leu Pro Glu Asp Leu Ile Ala Arg Phe Tyr Ala Gly Lys
                340                 345                 350
Leu Thr Leu Thr Asp Arg Leu Arg Ile Leu Ser Gly Lys Pro Pro Val
                355                 360                 365
Pro Val Leu Ala Ala Leu Gln Ala Ile Met Thr Thr His Arg
                370                 375                 380

<210> SEQ ID NO 6
<211> LENGTH: 1000
<212> TYPE: DNA
<213> ORGANISM: Pantoea ananatis

<400> SEQUENCE: 6
atgcaaccgc attatgatct gattctcgtg ggggctggac tcgcgaatgg ccttatcgcc      60
ctgcgtcttc agcagcagca acctgatatg cgtattttgc ttatcgacgc cgcaccccag     120
gcgggcggaa atcatacgtg gtcatttcac cacgatgatt tgactgagag ccaacatcgt     180
tggatagcgc cgctggtggt tcatcactgg cccgactatc aggtgcgctt cccacacgc      240 cgtcgtaagc tgaacagcgg ctacttctgt attacttctc agcgtttcgc tgaggtttta     300
ctgcgacagt ttggccccgca cttgtggatg gataccgcgg tcgcagaggt taatgcggaa     360
tctgttcggt tgaaaaaggg tcaggttatc ggtgcccgcg cggtgattga cgggcgggt      420 tatgcggcaa actcagcact gagcgtgggc ttccaggcgt ttattggcca ggaatggcga     480
ttgagccgcc cgcatggttt atcgtctccc attatcatgg atgccacggt cgatcagcaa     540
aatggttatc gcttcgtgta cagcctgccg ctctcgccga ccagattgtt aattgaagac     600
acgcactata tcgataatgc gacattagat cctgaacgcg cgcggcaaaa tatttgcgac     660
tatgccgcgc aacagggttg gcagcttcag actctgctgc gtgaagaaca gggcgcctta     720
cccattaccc tgtcgggcaa tgccgacgca ttctggcagc agcgcccct ggcctgtagt      780 ggattacgtg ccggtctgtt ccatcctacc accggctatt cactgccgct ggcggttgcc     840
gtggccgacc gcctgagcgc acttgatgtc tttacgtcgg cctcaattca tcaggccatt     900
acgcattttg cccgcgagcg ctggcagcag cagcgctttt ccgcatgct gaatcgcatg     960 ctgttttta g ccgggcccgc cgatttacgc tggcgggtta                         1000

<210> SEQ ID NO 7
<211> LENGTH: 115
<212> TYPE: PRT
<213> ORGANISM: Artificial Sequence
<220> FEATURE:
<223> OTHER INFORMATION: synthetic
```

-continued

```
<400> SEQUENCE: 7

Asp Val Gln Leu Val Glu Ser Gly Gly Gly Leu Val Gln Pro Gly Gly
1               5                   10                  15

Ser Leu Lys Leu Ser Cys Ala Ala Ser Gly Phe Asp Phe Ser Ser His
            20                  25                  30

Trp Met Tyr Trp Val Arg Gln Ala Pro Gly Lys Glu Leu Glu Trp Leu
        35                  40                  45

Ser Glu Ile Asn Thr Asn Gly Leu Ile Thr His Tyr Gly Asp Ser Val
    50                  55                  60

Lys Gly Arg Phe Thr Val Ser Arg Asn Asn Ala Ala Asn Lys Met Tyr
65                  70                  75                  80

Leu Glu Leu Thr Arg Leu Glu Pro Glu Asp Thr Ala Leu Tyr Tyr Cys
                85                  90                  95

Ala Arg Asn Gln His Gly Leu Asn Lys Gly Gln Gly Thr Gln Val Thr
            100                 105                 110

Val Ser Ser
        115

<210> SEQ ID NO 8
<211> LENGTH: 28
<212> TYPE: PRT
<213> ORGANISM: Artificial Sequence
<220> FEATURE:
<223> OTHER INFORMATION: synthetic

<400> SEQUENCE: 8

Ile Arg Pro Ile Ile Arg Pro Ile Ile Arg Pro Ile Ile Arg Pro Ile
1               5                   10                  15

Ile Arg Pro Ile Ile Arg Pro Ile Ile Arg Pro Ile
            20                  25

<210> SEQ ID NO 9
<211> LENGTH: 36
<212> TYPE: PRT
<213> ORGANISM: Artificial Sequence
<220> FEATURE:
<223> OTHER INFORMATION: synthetic

<400> SEQUENCE: 9

Gly Gly Gly Ser Gly Gly Gly Ser Gly Gly Gly Ser Gly Gly Lys Gly
1               5                   10                  15

Gly Lys Gly Gly Lys Gly Gly Lys Gly Gly Gly Ser Gly Gly Gly Ser
            20                  25                  30

Gly Ala Gln Gly
        35

<210> SEQ ID NO 10
<211> LENGTH: 310
<212> TYPE: PRT
<213> ORGANISM: Pantoea ananatis

<400> SEQUENCE: 10

Met Val Asn Asn Pro Ser Leu Leu Asn His Ala Val Glu Thr Met Ala
1               5                   10                  15

Val Gly Ser Lys Ser Phe Ala Thr Ala Ser Lys Leu Phe Asp Ala Lys
            20                  25                  30

Thr Arg Arg Ser Val Leu Met Leu Tyr Ala Trp Cys Arg His Cys Asp
        35                  40                  45

Asp Val Ile Asp Asp Gln Thr Leu Gly Phe Gln Ala Arg Gln Pro Ala
```

```
                   50                  55                  60

Leu Gln Thr Pro Glu Gln Arg Leu Met Gln Leu Glu Met Lys Thr Arg
 65                  70                  75                  80

Gln Ala Tyr Ala Gly Ser Gln Met His Glu Pro Ala Phe Ala Ala Phe
                     85                  90                  95

Gln Glu Val Ala Met Ala His Asp Ile Ala Pro Ala Tyr Ala Phe Asp
                    100                 105                 110

His Leu Glu Gly Phe Ala Met Asp Val Arg Glu Ala Gln Tyr Ser Gln
                    115                 120                 125

Leu Asp Asp Thr Leu Arg Tyr Cys Tyr His Val Ala Gly Val Val Gly
            130                 135                 140

Leu Met Met Ala Gln Ile Met Gly Val Arg Asp Asn Ala Thr Leu Asp
145                 150                 155                 160

Arg Ala Cys Asp Leu Gly Leu Ala Phe Gln Leu Thr Asn Ile Ala Arg
                    165                 170                 175

Asp Ile Val Asp Asp Ala His Ala Gly Arg Cys Tyr Leu Pro Ala Ser
            180                 185                 190

Trp Leu Glu His Glu Gly Leu Asn Lys Glu Asn Tyr Ala Ala Pro Glu
            195                 200                 205

Asn Arg Gln Ala Leu Ser Arg Ile Ala Arg Arg Leu Val Gln Glu Ala
    210                 215                 220

Glu Pro Tyr Tyr Leu Ser Ala Thr Ala Gly Leu Ala Gly Leu Pro Leu
225                 230                 235                 240

Arg Ser Ala Trp Ala Ile Ala Thr Ala Lys Gln Val Tyr Arg Lys Ile
                    245                 250                 255

Gly Val Lys Val Glu Gln Ala Gly Gln Gln Ala Trp Asp Gln Arg Gln
            260                 265                 270

Ser Thr Thr Thr Pro Glu Lys Leu Thr Leu Leu Ala Ala Ser Gly
            275                 280                 285

Gln Ala Leu Thr Ser Arg Met Arg Ala His Pro Pro Arg Pro Ala His
    290                 295                 300

Leu Trp Gln Arg Pro Leu
305                 310

<210> SEQ ID NO 11
<211> LENGTH: 382
<212> TYPE: PRT
<213> ORGANISM: Pantoea ananatis

<400> SEQUENCE: 11

Met Gln Pro His Tyr Asp Leu Ile Leu Val Gly Ala Gly Leu Ala Asn
  1               5                  10                  15

Gly Leu Ile Ala Leu Arg Leu Gln Gln Gln Pro Asp Met Arg Ile
                 20                  25                  30

Leu Leu Ile Asp Ala Ala Pro Gln Ala Gly Gly Asn His Thr Trp Ser
            35                  40                  45

Phe His His Asp Asp Leu Thr Glu Ser Gln His Arg Trp Ile Ala Pro
 50                  55                  60

Leu Val Val His His Trp Pro Asp Tyr Gln Val Arg Phe Pro Thr Arg
 65                  70                  75                  80

Arg Arg Lys Leu Asn Ser Gly Tyr Phe Cys Ile Thr Ser Gln Arg Phe
                 85                  90                  95

Ala Glu Val Leu Gln Arg Gln Phe Gly Pro His Leu Trp Met Asp Thr
                100                 105                 110
```

```
Ala Val Ala Glu Val Asn Ala Glu Ser Val Arg Leu Lys Lys Gly Gln
            115                 120                 125

Val Ile Gly Ala Arg Ala Val Ile Asp Gly Arg Gly Tyr Ala Ala Asn
        130                 135                 140

Ser Ala Leu Ser Val Gly Phe Gln Ala Phe Ile Gly Gln Glu Trp Arg
145                 150                 155                 160

Leu Ser His Pro His Gly Leu Ser Ser Pro Ile Ile Met Asp Ala Thr
                165                 170                 175

Val Asp Gln Gln Asn Gly Tyr Arg Phe Val Tyr Ser Leu Pro Leu Ser
                180                 185                 190

Pro Thr Arg Leu Leu Ile Glu Asp Thr His Tyr Ile Asp Asn Ala Thr
        195                 200                 205

Leu Asp Pro Glu Cys Ala Arg Gln Asn Ile Cys Asp Tyr Ala Ala Gln
    210                 215                 220

Gln Gly Trp Gln Leu Gln Thr Leu Leu Arg Glu Gln Gly Ala Leu
225                 230                 235                 240

Pro Ile Thr Leu Ser Gly Asn Ala Asp Ala Phe Trp Gln Gln Arg Pro
                245                 250                 255

Leu Ala Cys Ser Gly Leu Arg Ala Gly Leu Phe His Pro Thr Thr Gly
                260                 265                 270

Tyr Ser Leu Pro Leu Ala Val Ala Val Ala Asp Arg Leu Ser Ala Leu
            275                 280                 285

Asp Val Phe Thr Ser Ala Ser Ile His His Ala Ile Thr His Phe Ala
        290                 295                 300

Arg Glu Arg Trp Gln Gln Gln Gly Phe Phe Arg Met Leu Asn Arg Met
305                 310                 315                 320

Leu Phe Leu Ala Gly Pro Ala Asp Ser Arg Trp Arg Val Met Gln Arg
                325                 330                 335

Phe Tyr Gly Leu Pro Glu Asp Leu Ile Ala Arg Phe Tyr Ala Gly Lys
            340                 345                 350

Leu Thr Leu Thr Asp Arg Leu Arg Ile Leu Ser Gly Lys Pro Pro Val
        355                 360                 365

Pro Val Leu Ala Ala Leu Gln Ala Ile Met Thr Thr His Arg
370                 375                 380

<210> SEQ ID NO 12
<211> LENGTH: 494
<212> TYPE: PRT
<213> ORGANISM: Bos taurus

<400> SEQUENCE: 12

Met Phe Glu Ile Lys Lys Ile Cys Cys Ile Gly Ala Gly Tyr Val Gly
1               5                   10                  15

Gly Pro Thr Cys Ser Val Ile Ala His Met Cys Pro Glu Ile Arg Val
                20                  25                  30

Thr Val Val Asp Ile Asn Glu Ser Arg Ile Asn Ala Trp Asn Ser Pro
            35                  40                  45

Thr Leu Pro Ile Tyr Glu Pro Gly Leu Lys Glu Val Val Glu Ser Cys
    50                  55                  60

Arg Gly Lys Asn Leu Phe Phe Ser Thr Asn Ile Asp Asp Ala Ile Lys
65                  70                  75                  80

Glu Ala Asp Leu Val Phe Ile Ser Val Asn Thr Pro Thr Lys Thr Tyr
                85                  90                  95

Gly Met Gly Lys Gly Arg Ala Ala Asp Leu Lys Tyr Ile Glu Ala Cys
                100                 105                 110
```

```
Ala Arg Arg Ile Val Gln Asn Ser His Gly Tyr Lys Ile Val Thr Glu
        115                 120                 125

Lys Ser Thr Val Pro Val Arg Ala Ala Glu Ser Ile Arg Arg Ile Phe
        130                 135                 140

Asp Ala Asn Thr Lys Pro Asn Leu Asn Leu Gln Val Leu Ser Asn Pro
145                 150                 155                 160

Glu Phe Leu Ala Glu Gly Thr Ala Ile Lys Asp Leu Lys Asn Pro Asp
                165                 170                 175

Arg Val Leu Ile Gly Gly Asp Glu Thr Pro Glu Gly Gln Arg Ala Val
                180                 185                 190

Gln Ala Leu Cys Ala Val Tyr Glu His Trp Val Pro Arg Glu Lys Ile
                195                 200                 205

Leu Thr Thr Asn Thr Trp Ser Ser Glu Leu Ser Lys Leu Thr Ala Asn
                210                 215                 220

Ala Phe Leu Ala Gln Arg Ile Ser Ser Ile Asn Ser Ile Ser Ala Leu
225                 230                 235                 240

Cys Glu Ala Thr Gly Ala Asp Val Glu Glu Val Ala Thr Ala Ile Gly
                245                 250                 255

Met Asp Gln Arg Ile Gly Asn Lys Phe Leu Lys Ala Ser Val Gly Phe
                260                 265                 270

Gly Gly Ser Cys Phe Gln Lys Asp Val Leu Asn Leu Val Tyr Leu Cys
                275                 280                 285

Glu Ala Leu Asn Leu Pro Glu Val Ala Arg Tyr Trp Gln Gln Val Ile
                290                 295                 300

Asp Met Asn Asp Tyr Gln Arg Arg Arg Phe Ala Ser Arg Ile Ile Asp
305                 310                 315                 320

Ser Leu Phe Asn Thr Val Thr Asp Lys Lys Ile Ala Ile Leu Gly Phe
                325                 330                 335

Ala Phe Lys Lys Asp Thr Gly Asp Thr Arg Glu Ser Ser Ser Ile Tyr
                340                 345                 350

Ile Ser Lys Tyr Leu Met Asp Glu Gly Ala His Leu His Ile Tyr Asp
                355                 360                 365

Pro Lys Val Pro Arg Glu Gln Ile Val Val Asp Leu Ser His Pro Gly
                370                 375                 380

Val Ser Lys Asp Asp Gln Val Ala Arg Leu Val Thr Ile Ser Lys Asp
385                 390                 395                 400

Pro Tyr Glu Ala Cys Asp Gly Ala His Ala Val Val Ile Cys Thr Glu
                405                 410                 415

Trp Asp Met Phe Lys Glu Leu Asp Tyr Glu Arg Ile His Lys Lys Met
                420                 425                 430

Leu Lys Pro Ala Phe Ile Phe Asp Gly Arg Arg Val Leu Asp Gly Leu
                435                 440                 445

His Asn Glu Leu Gln Thr Ile Gly Phe Gln Ile Glu Thr Ile Gly Lys
                450                 455                 460

Lys Val Ser Ser Lys Arg Ile Pro Tyr Ala Pro Ser Gly Glu Ile Pro
465                 470                 475                 480

Lys Phe Ser Leu Gln Asp Met Pro Asn Lys Lys Pro Arg Val
                485                 490
```

<210> SEQ ID NO 13
<211> LENGTH: 531
<212> TYPE: PRT
<213> ORGANISM: Bos taurus

```
<400> SEQUENCE: 13

Met Asn Met Met Ala Val Lys Arg Leu Leu Leu Leu Leu Leu Gln
1               5                   10                  15

Leu Thr Cys Tyr Phe Ser Ser Gly Ser Cys Gly Lys Val Leu Val Trp
            20                  25                  30

Pro Val Glu Tyr Ser His Trp Met Asn Met Lys Ile Ile Leu Asp Glu
        35                  40                  45

Leu Val Met Arg Gly His Glu Val Thr Val Leu Thr Ser Ser Ala Ser
    50                  55                  60

Ile Leu Ile Asp Pro Asn Lys Pro Ser Ala Ile Lys Phe Glu Asn Phe
65                  70                  75                  80

Ser Val Ser Leu Thr Lys Asp Asp Phe Glu Asp Ala Leu Lys Asn Phe
                85                  90                  95

Val Gly Asn Trp Thr Asp Leu Thr Asn Ser Phe Trp Thr Phe Pro Leu
            100                 105                 110

Leu Leu Gln Ser Leu Phe Asp Glu Tyr Ser Asp Leu Thr Leu Lys Ile
        115                 120                 125

Cys Lys Glu Leu Ile Ser Asn Lys Lys Leu Met Thr Lys Leu His Glu
    130                 135                 140

Ser Arg Phe Asp Val Val Leu Ala Asp Thr Val Gly Pro Cys Gly Glu
145                 150                 155                 160

Leu Leu Ala Glu Ile Phe Lys Val Pro Leu Val Tyr Ser Val Arg Phe
                165                 170                 175

Thr Pro Gly Tyr Ser Ile Glu Arg Lys Ser Gly Lys Leu Pro Tyr Ser
            180                 185                 190

Pro Ser Tyr Val Pro Val Ile Leu Ser Glu Leu Ser Asp His Met Thr
        195                 200                 205

Phe Met Glu Arg Val Lys Asn Met Ile Tyr Val Leu Tyr Phe Asp Phe
    210                 215                 220

Tyr Phe Gln Met Leu Asn Glu Lys Lys Trp Asp Gln Phe Tyr Ser Glu
225                 230                 235                 240

Val Leu Gly Arg Pro Thr Thr Leu Leu Glu Thr Met Gly Lys Ala Glu
                245                 250                 255

Phe Trp Leu Phe Arg Ser Tyr Trp Asp Phe Glu Tyr Pro Cys Pro Leu
            260                 265                 270

Leu Pro Asn Val Glu Phe Ile Gly Gly Leu His Cys Lys Pro Ala Lys
        275                 280                 285

Pro Leu Pro Lys Glu Met Glu Glu Phe Val Gln Ser Ser Gly Glu Asn
    290                 295                 300

Gly Ile Val Val Phe Thr Leu Gly Ser Met Val Thr Asn Val Thr Glu
305                 310                 315                 320

Glu Arg Ala Asn Met Ile Ala Ser Ala Leu Ala Gln Ile Pro Gln Lys
                325                 330                 335

Val Leu Trp Arg Tyr Asp Gly Lys Lys Pro Asp Thr Leu Gly Pro Asn
            340                 345                 350

Thr Arg Leu Tyr Lys Trp Val Pro Gln Asn Asp Leu Leu Gly His Pro
        355                 360                 365

Lys Thr Lys Ala Phe Ile Thr His Gly Gly Thr Asn Gly Ile Tyr Glu
    370                 375                 380

Ala Ile Tyr His Gly Val Pro Met Val Gly Leu Pro Leu Phe Ala Glu
385                 390                 395                 400

Gln Pro Asp Asn Ile Asn Arg Val Lys Ala Lys Gly Ala Ala Val Arg
                405                 410                 415
```

```
Leu Asn Leu Glu Thr Met Ser Lys Thr Asp Phe Leu Asn Ala Leu Lys
            420                 425                 430

Gln Val Ile Asn Asn Pro Ser Tyr Lys Arg Asn Ala Met Trp Leu Ser
            435                 440                 445

Thr Ile Gln Arg Asp Gln Pro Met Lys Pro Leu Asp Arg Ala Val Phe
            450                 455                 460

Trp Ile Glu Phe Val Met Arg His Lys Gly Ala Lys Tyr Leu Arg Pro
465                 470                 475                 480

Ala Ala His Lys Leu Thr Trp Phe Gln Tyr His Ser Leu Asp Val Ile
                485                 490                 495

Gly Phe Leu Leu Ala Cys Val Ala Thr Ala Val Phe Val Ile Thr Lys
                500                 505                 510

Cys Phe Leu Phe Cys Cys Arg Lys Phe Ala Glu Thr Gly Lys Lys Arg
            515                 520                 525

Lys Arg Glu
        530

<210> SEQ ID NO 14
<211> LENGTH: 325
<212> TYPE: PRT
<213> ORGANISM: Bos taurus

<400> SEQUENCE: 14

Met Ala Ala Ser Cys Ile Leu Leu His Thr Gly Gln Lys Met Pro Leu
1               5                   10                  15

Ile Gly Leu Gly Thr Trp Lys Ser Asp Pro Gly Gln Val Lys Ala Ala
                20                  25                  30

Ile Lys Tyr Ala Leu Ser Val Gly Tyr Arg His Ile Asp Cys Ala Ala
                35                  40                  45

Ile Tyr Gly Asn Glu Thr Glu Ile Gly Glu Ala Leu Lys Glu Asn Val
            50                  55                  60

Gly Pro Gly Lys Leu Val Pro Arg Glu Glu Leu Phe Val Thr Ser Lys
65                  70                  75                  80

Leu Trp Asn Thr Lys His His Pro Glu Asp Val Glu Pro Ala Leu Arg
                85                  90                  95

Lys Thr Leu Ala Asp Leu Gln Leu Glu Tyr Leu Asp Leu Tyr Leu Met
            100                 105                 110

His Trp Pro Tyr Ala Phe Glu Arg Gly Asp Ser Pro Phe Pro Lys Asn
            115                 120                 125

Ala Asp Gly Thr Ile Arg Tyr Asp Ser Thr His Tyr Lys Glu Thr Trp
        130                 135                 140

Arg Ala Leu Glu Ala Leu Val Ala Lys Gly Leu Val Arg Ala Leu Gly
145                 150                 155                 160

Leu Ser Asn Phe Asn Ser Arg Gln Ile Asp Asp Val Leu Ser Val Ala
                165                 170                 175

Ser Val Arg Pro Ala Val Leu Gln Val Glu Cys His Pro Tyr Leu Ala
            180                 185                 190

Gln Asn Glu Leu Ile Ala His Cys Gln Ala Arg Asn Leu Glu Val Thr
            195                 200                 205

Ala Tyr Ser Pro Leu Gly Ser Ser Asp Arg Ala Trp Arg Asp Pro Glu
        210                 215                 220

Glu Pro Val Leu Leu Lys Glu Pro Val Leu Ala Leu Ala Glu Lys
225                 230                 235                 240

His Gly Arg Ser Pro Ala Gln Ile Leu Leu Arg Trp Gln Val Gln Arg
```

245                 250                 255
Lys Val Ser Cys Ile Pro Lys Ser Val Thr Pro Ser Arg Ile Leu Glu
            260                 265                 270

Asn Ile Gln Val Phe Asp Phe Thr Phe Ser Pro Glu Glu Met Lys Gln
            275                 280                 285

Leu Asp Ala Leu Asn Lys Asn Leu Arg Phe Ile Val Pro Met Leu Thr
            290                 295                 300

Val Asp Gly Lys Arg Val Pro Arg Asp Ala Gly His Pro Leu Tyr Pro
305                 310                 315                 320

Phe Asn Asp Pro Tyr
                325

<210> SEQ ID NO 15
<211> LENGTH: 299
<212> TYPE: PRT
<213> ORGANISM: Bos taurus

<400> SEQUENCE: 15

Met Ser Ser Ile Lys Ile Glu Cys Val Leu Arg Glu Asn Cys His Cys
1               5                   10                  15

Gly Glu Ser Pro Val Trp Glu Ala Ser Asn Ser Leu Leu Phe Val
            20                  25                  30

Asp Ile Pro Ala Lys Lys Val Cys Arg Trp Asp Ser Leu Ser Lys Gln
            35                  40                  45

Val Gln Arg Val Thr Val Asp Ala Pro Val Ser Ser Val Ala Leu Arg
    50                  55                  60

Gln Ser Gly Gly Tyr Val Ala Thr Val Gly Thr Lys Phe Cys Ala Leu
65                  70                  75                  80

Asn Trp Glu Asp Gln Ser Ala Val Val Leu Ala Thr Val Asp Lys Glu
                85                  90                  95

Lys Lys Asn Asn Arg Phe Asn Asp Gly Lys Val Asp Pro Ala Gly Arg
            100                 105                 110

Tyr Phe Ala Gly Thr Met Ala Glu Glu Thr Ala Pro Ala Val Leu Glu
            115                 120                 125

Arg Arg Gln Gly Ser Leu Tyr Ser Leu Phe Pro Asp His His Val Glu
    130                 135                 140

Lys Tyr Phe Asp Gln Val Asp Ile Ser Asn Gly Leu Asp Trp Ser Met
145                 150                 155                 160

Asp His Lys Ile Phe Tyr Tyr Ile Asp Ser Leu Ser Tyr Ser Val Asp
                165                 170                 175

Ala Phe Asp Tyr Asp Leu Gln Thr Gly Lys Ile Ser Asn Arg Arg Ser
            180                 185                 190

Val Tyr Lys Leu Glu Lys Glu Glu Gln Ile Pro Asp Gly Met Cys Ile
    195                 200                 205

Asp Val Glu Gly Lys Leu Trp Val Ala Cys Tyr Asn Gly Gly Arg Val
210                 215                 220

Ile Arg Leu Asp Pro Glu Thr Gly Lys Arg Leu Gln Thr Val Lys Leu
225                 230                 235                 240

Pro Val Asp Lys Thr Thr Ser Cys Cys Phe Gly Gly Lys Asp Tyr Ser
                245                 250                 255

Glu Met Tyr Val Thr Cys Ala Arg Asp Gly Leu Asp Ser Lys Gly Leu
            260                 265                 270

Leu Gln Gln Pro Glu Ala Gly Gly Ile Phe Lys Ile Thr Gly Leu Gly
            275                 280                 285

```
Val Lys Gly Ile Pro Pro Tyr Pro Tyr Thr Gly
    290                 295
```

<210> SEQ ID NO 16
<211> LENGTH: 440
<212> TYPE: PRT
<213> ORGANISM: Bos taurus

<400> SEQUENCE: 16

```
Met Val His Gly Tyr Lys Gly Val Lys Phe Gln Asn Trp Ala Arg Thr
1               5                   10                  15

Tyr Gly Cys Cys Pro Glu Met Tyr Phe Gln Pro Thr Ser Val Glu Glu
            20                  25                  30

Val Arg Glu Val Leu Ala Leu Ala Arg Gln Gln Asn Lys Arg Val Lys
        35                  40                  45

Val Val Gly Gly Gly His Ser Pro Ser Asp Ile Ala Cys Thr Asp Gly
    50                  55                  60

Phe Met Ile His Met Gly Lys Met Asn Arg Val Leu Lys Val Asp Thr
65                  70                  75                  80

Glu Lys Lys Gln Val Thr Val Glu Ala Gly Ile Leu Leu Ala Asp Leu
                85                  90                  95

His Pro Gln Leu Asp Lys His Gly Leu Ala Leu Ser Asn Leu Gly Ala
            100                 105                 110

Val Ser Asp Val Thr Ala Gly Gly Val Ile Gly Ser Gly Thr His Asn
        115                 120                 125

Thr Gly Ile Lys His Gly Ile Leu Ala Thr Gln Val Val Ala Leu Thr
    130                 135                 140

Leu Leu Thr Ala Asn Gly Thr Ile Leu Glu Cys Ser Glu Ser Ser Asn
145                 150                 155                 160

Ala Glu Val Phe Gln Ala Ala Arg Val His Leu Gly Cys Leu Gly Val
                165                 170                 175

Ile Leu Thr Val Thr Leu Gln Cys Val Pro Gln Phe His Leu Gln Glu
            180                 185                 190

Thr Thr Phe Pro Ser Thr Leu Lys Glu Val Leu Asp Asn Leu Asp Ser
        195                 200                 205

His Leu Lys Lys Ser Glu Tyr Phe Arg Phe Leu Trp Phe Pro His Ser
    210                 215                 220

Glu Asn Val Ser Val Ile Tyr Gln Asp His Thr Asn Lys Pro Pro Ser
225                 230                 235                 240

Ser Ser Ala Asn Trp Phe Trp Asp Tyr Ala Ile Gly Phe Tyr Leu Leu
                245                 250                 255

Glu Phe Leu Leu Trp Ile Ser Thr Phe Leu Pro Gly Leu Val Gly Trp
            260                 265                 270

Ile Asn Arg Phe Phe Phe Trp Leu Leu Phe Asn Gly Lys Lys Glu Asn
        275                 280                 285

Cys Asn Leu Ser His Lys Ile Phe Thr Tyr Glu Cys Arg Phe Lys Gln
    290                 295                 300

His Val Gln Asp Trp Ala Ile Pro Arg Glu Lys Thr Lys Glu Ala Leu
305                 310                 315                 320

Leu Glu Leu Lys Ala Met Leu Glu Ala Asn Pro Lys Val Val Ala His
                325                 330                 335

Tyr Pro Val Glu Val Arg Phe Thr Arg Gly Asp Asp Ile Leu Leu Ser
            340                 345                 350

Pro Cys Phe Gln Arg Asp Ser Cys Tyr Met Asn Ile Ile Met Tyr Arg
        355                 360                 365
```

-continued

Pro Tyr Gly Lys Asp Val Pro Arg Leu Asp Tyr Trp Leu Ala Tyr Glu
        370             375             380

Thr Ile Met Lys Lys Val Gly Gly Arg Pro His Trp Ala Lys Ala His
385             390             395             400

Asn Cys Thr Arg Lys Asp Phe Glu Lys Met Tyr Pro Ala Phe Gln Arg
            405             410             415

Phe Cys Ala Ile Arg Glu Lys Leu Asp Pro Thr Gly Met Phe Leu Asn
            420             425             430

Ala Tyr Leu Glu Lys Val Phe Tyr
            435             440

<210> SEQ ID NO 17
<211> LENGTH: 701
<212> TYPE: PRT
<213> ORGANISM: Oryza sativa

<400> SEQUENCE: 17

Met Ala Gly Asn Gly Pro Ile Asn Lys Glu Asp Pro Leu Asn Trp Gly
1               5               10              15

Ala Ala Ala Glu Met Ala Gly Ser His Leu Asp Glu Val Lys Arg
            20              25              30

Met Val Ala Gln Phe Arg Glu Pro Leu Val Lys Ile Gln Gly Ala Thr
            35              40              45

Leu Arg Val Gly Gln Val Ala Val Ala Gln Ala Lys Asp Ala Ala
    50              55              60

Gly Val Ala Val Glu Leu Asp Glu Glu Ala Arg Pro Arg Val Lys Ala
65              70              75              80

Ser Ser Glu Trp Ile Leu Asn Cys Ile Ala His Gly Gly Asp Ile Tyr
            85              90              95

Gly Val Thr Thr Gly Phe Gly Thr Ser His Arg Arg Thr Lys Asp
            100             105             110

Gly Pro Ala Leu Gln Val Glu Leu Leu Arg His Leu Asn Ala Gly Ile
            115             120             125

Phe Gly Thr Gly Ser Asp Gly His Thr Leu Pro Ser Glu Thr Val Arg
    130             135             140

Ala Ala Met Leu Val Arg Ile Asn Thr Leu Leu Gln Gly Tyr Ser Gly
145             150             155             160

Ile Arg Phe Glu Ile Leu Glu Ala Ile Thr Lys Leu Leu Asn Thr Gly
                165             170             175

Val Thr Pro Cys Leu Pro Leu Arg Gly Thr Ile Thr Ala Ser Gly Asp
            180             185             190

Leu Val Pro Leu Ser Tyr Ile Ala Gly Leu Ile Thr Gly Arg Pro Asn
            195             200             205

Ala Gln Ala Ile Ser Pro Asp Gly Arg Lys Val Asp Ala Ala Glu Ala
    210             215             220

Phe Lys Leu Ala Gly Ile Glu Gly Gly Phe Phe Thr Leu Asn Pro Lys
225             230             235             240

Glu Gly Leu Ala Ile Val Asn Gly Thr Ser Val Gly Ser Ala Leu Ala
            245             250             255

Ala Thr Val Met Phe Asp Ala Asn Ile Leu Ala Val Leu Ser Glu Val
            260             265             270

Leu Ser Ala Val Phe Cys Glu Val Met Asn Gly Lys Pro Glu Tyr Thr
    275             280             285

Asp His Leu Thr His Lys Leu Lys His His Pro Gly Ser Ile Glu Ala

```
            290                 295                 300
Ala Ala Ile Met Glu His Ile Leu Ala Gly Ser Ser Phe Met Ser His
305                 310                 315                 320

Ala Lys Lys Val Asn Glu Met Asp Pro Leu Lys Pro Lys Gln Asp
                325                 330                 335

Arg Tyr Ala Leu Arg Thr Ser Pro Gln Trp Leu Gly Pro Gln Ile Glu
                340                 345                 350

Val Ile Arg Ala Ala Thr Lys Ser Ile Glu Arg Glu Val Asn Ser Val
                355                 360                 365

Asn Asp Asn Pro Val Ile Asp Val His Arg Gly Lys Ala Leu His Gly
370                 375                 380

Gly Asn Phe Gln Gly Thr Pro Ile Gly Val Ser Met Asp Asn Ala Arg
385                 390                 395                 400

Leu Ala Ile Ala Asn Ile Gly Lys Leu Met Phe Ala Gln Phe Ser Glu
                405                 410                 415

Leu Val Asn Glu Phe Tyr Asn Asn Gly Leu Thr Ser Asn Leu Ala Gly
                420                 425                 430

Ser Arg Asn Pro Ser Leu Asp Tyr Gly Phe Lys Gly Thr Glu Ile Ala
                435                 440                 445

Met Ala Ser Tyr Cys Ser Glu Leu Gln Tyr Leu Ala Asn Pro Ile Thr
450                 455                 460

Asn His Val Gln Ser Ala Glu Gln His Asn Gln Asp Val Asn Ser Leu
465                 470                 475                 480

Gly Leu Val Ser Ala Arg Lys Thr Leu Glu Ala Val Asp Ile Leu Lys
                485                 490                 495

Leu Met Thr Ser Thr Tyr Ile Val Ala Leu Cys Gln Ala Val Asp Leu
                500                 505                 510

Arg His Leu Glu Glu Asn Ile Lys Ser Ser Val Lys Asn Cys Val Thr
                515                 520                 525

Gln Val Ala Lys Lys Val Leu Thr Met Asn Pro Thr Gly Asp Leu Ser
                530                 535                 540

Ser Ala Arg Phe Ser Glu Lys Asn Leu Leu Thr Ala Ile Asp Arg Glu
545                 550                 555                 560

Ala Val Phe Ser Tyr Ala Asp Asp Pro Cys Ser Ala Asn Tyr Pro Leu
                565                 570                 575

Met Gln Lys Leu Arg Ala Val Leu Val Glu His Ala Leu Thr Ser Gly
                580                 585                 590

Asp Ala Glu Pro Glu Ala Ser Val Phe Ser Lys Ile Thr Lys Phe Glu
                595                 600                 605

Glu Glu Leu Arg Ser Ala Leu Pro Arg Glu Ile Glu Ala Ala Arg Val
                610                 615                 620

Ala Val Ala Asn Gly Thr Ala Pro Val Ala Asn Arg Ile Val Glu Ser
625                 630                 635                 640

Arg Ser Phe Pro Leu Tyr Arg Phe Val Arg Glu Glu Leu Gly Cys Val
                645                 650                 655

Phe Leu Thr Gly Glu Lys Leu Lys Ser Pro Gly Glu Glu Cys Asn Lys
                660                 665                 670

Val Phe Leu Gly Ile Ser Gln Gly Lys Leu Ile Asp Pro Met Leu Asp
                675                 680                 685

Cys Leu Lys Glu Trp Asn Gly Glu Pro Leu Pro Ile Asn
690                 695                 700

<210> SEQ ID NO 18
```

<211> LENGTH: 554
<212> TYPE: PRT
<213> ORGANISM: Oryza sativa

<400> SEQUENCE: 18

```
Met Gly Ser Val Ala Ala Glu Glu Val Val Phe Arg Ser Lys Leu
1               5                   10                  15

Pro Asp Ile Glu Ile Asp Asn Ser Met Thr Leu Gln Glu Tyr Cys Phe
            20                  25                  30

Ala Arg Met Ala Glu Val Gly Ala Arg Pro Cys Leu Ile Asp Gly Gln
            35                  40                  45

Thr Gly Glu Ser Tyr Thr Tyr Ala Glu Val Glu Ser Ala Ser Arg Arg
50                  55                  60

Ala Ala Ala Gly Leu Arg Arg Met Gly Val Gly Lys Gly Asp Val Val
65              70                  75                  80

Met Ser Leu Leu Arg Asn Cys Pro Glu Phe Ala Phe Ser Phe Leu Gly
                85                  90                  95

Ala Ala Arg Leu Gly Ala Ala Thr Thr Thr Ala Asn Pro Phe Tyr Thr
            100                 105                 110

Pro His Glu Val His Arg Gln Ala Glu Ala Ala Gly Ala Arg Val Ile
        115                 120                 125

Val Thr Glu Ala Cys Ala Val Glu Lys Val Arg Glu Phe Ala Ala Glu
130                 135                 140

Arg Gly Val Pro Val Val Thr Val Asp Gly Ala Phe Asp Gly Cys Val
145                 150                 155                 160

Glu Phe Arg Glu Val Leu Ala Ala Glu Leu Asp Ala Asp Ala Asp
                165                 170                 175

Val His Pro Asp Asp Val Val Ala Leu Pro Tyr Ser Ser Gly Thr Thr
            180                 185                 190

Gly Leu Pro Lys Gly Val Met Leu Thr His Arg Ser Leu Ile Thr Ser
        195                 200                 205

Val Ala Gln Gln Val Asp Gly Glu Asn Pro Asn Leu Tyr Phe Ser Lys
210                 215                 220

Asp Asp Val Ile Leu Cys Leu Leu Pro Leu Phe His Ile Tyr Ser Leu
225                 230                 235                 240

Asn Ser Val Leu Leu Ala Gly Leu Arg Ala Gly Ser Thr Ile Val Ile
                245                 250                 255

Met Arg Lys Phe Asp Leu Gly Ala Leu Val Asp Leu Val Arg Lys His
            260                 265                 270

Asn Ile Thr Ile Ala Pro Phe Val Pro Pro Ile Val Val Glu Ile Ala
        275                 280                 285

Lys Ser Pro Arg Val Thr Ala Glu Asp Leu Ala Ser Ile Arg Met Val
290                 295                 300

Met Ser Gly Ala Ala Pro Met Gly Lys Asp Leu Gln Asp Ala Phe Met
305                 310                 315                 320

Ala Lys Ile Pro Asn Ala Val Leu Gly Gln Gly Tyr Gly Met Thr Glu
                325                 330                 335

Ala Gly Pro Val Leu Ala Met Cys Leu Ala Phe Ala Lys Glu Pro Phe
            340                 345                 350

Lys Val Lys Ser Gly Ser Cys Gly Thr Val Val Arg Asn Ala Glu Leu
        355                 360                 365

Lys Ile Val Asp Pro Asp Thr Gly Thr Ser Leu Gly Arg Asn Gln Ser
370                 375                 380

Gly Glu Ile Cys Ile Arg Gly Glu Gln Ile Met Lys Gly Tyr Leu Asn
```

```
        385                 390                 395                 400
Asp Pro Glu Ala Thr Lys Asn Thr Ile Asp Glu Asp Gly Trp Leu His
                    405                 410                 415

Thr Gly Asp Ile Gly Phe Val Asp Asp Asp Glu Ile Phe Ile Val
                420                 425                 430

Asp Arg Leu Lys Glu Ile Ile Lys Tyr Lys Gly Phe Gln Val Pro Pro
                    435                 440                 445

Ala Glu Leu Glu Ala Leu Leu Ile Thr His Pro Glu Ile Lys Asp Ala
450                 455                 460

Ala Val Val Ser Met Lys Asp Leu Ala Gly Glu Val Pro Val Ala
465                 470                 475                 480

Phe Ile Val Arg Thr Glu Gly Ser Glu Ile Thr Glu Asp Glu Ile Lys
                    485                 490                 495

Lys Phe Val Ala Lys Glu Val Val Phe Tyr Lys Arg Ile Asn Lys Val
                500                 505                 510

Phe Phe Thr Asp Ser Ile Pro Lys Asn Pro Ser Gly Lys Ile Leu Arg
                515                 520                 525

Lys Asp Leu Arg Ala Arg Leu Ala Ala Gly Ile Pro Asp Ala Val Ala
530                 535                 540

Ala Ala Ala Ala Asp Ala Pro Lys Ser Ser
545                 550

<210> SEQ ID NO 19
<211> LENGTH: 389
<212> TYPE: PRT
<213> ORGANISM: Curcuma longa

<400> SEQUENCE: 19

Met Glu Ala Asn Gly Tyr Arg Ile Thr His Ser Ala Asp Gly Pro Ala
1               5                   10                  15

Thr Ile Leu Ala Ile Gly Thr Ala Asn Pro Thr Asn Val Val Asp Gln
                20                  25                  30

Asn Ala Tyr Pro Asp Phe Tyr Phe Arg Val Thr Asn Ser Glu Tyr Leu
            35                  40                  45

Gln Glu Leu Lys Ala Lys Phe Arg Arg Ile Cys Glu Lys Ala Ala Ile
        50                  55                  60

Arg Lys Arg His Leu Tyr Leu Thr Glu Glu Ile Leu Arg Glu Asn Pro
65                  70                  75                  80

Ser Leu Leu Ala Pro Met Ala Pro Ser Phe Asp Ala Arg Gln Ala Ile
                85                  90                  95

Val Val Glu Ala Val Pro Lys Leu Ala Lys Glu Ala Ala Glu Lys Ala
                100                 105                 110

Ile Lys Glu Trp Gly Arg Pro Lys Ser Asp Ile Thr His Leu Val Phe
            115                 120                 125

Cys Ser Ala Ser Gly Ile Asp Met Pro Gly Ser Asp Leu Gln Leu Leu
        130                 135                 140

Lys Leu Leu Gly Leu Pro Pro Ser Val Asn Arg Val Met Leu Tyr Asn
145                 150                 155                 160

Val Gly Cys His Ala Gly Gly Thr Ala Leu Arg Val Ala Lys Asp Leu
                165                 170                 175

Ala Glu Asn Asn Arg Gly Ala Arg Val Leu Ala Val Cys Ser Glu Val
                180                 185                 190

Thr Val Leu Ser Tyr Arg Gly Pro His Pro Ala His Ile Glu Ser Leu
            195                 200                 205
```

```
Phe Val Gln Ala Leu Phe Gly Asp Gly Ala Ala Leu Val Val Gly
    210                 215                 220

Ser Asp Pro Val Asp Gly Val Glu Arg Pro Ile Phe Glu Ile Ala Ser
225                 230                 235                 240

Ala Ser Gln Val Met Leu Pro Glu Ser Ala Glu Ala Val Gly Gly His
                245                 250                 255

Leu Arg Glu Ile Gly Leu Thr Phe His Leu Lys Ser Gln Leu Pro Ser
            260                 265                 270

Ile Ile Ala Ser Asn Ile Glu Gln Ser Leu Thr Thr Ala Cys Ser Pro
        275                 280                 285

Leu Gly Leu Ser Asp Trp Asn Gln Leu Phe Trp Ala Val His Pro Gly
    290                 295                 300

Gly Arg Ala Ile Leu Asp Gln Val Glu Ala Arg Leu Gly Leu Glu Lys
305                 310                 315                 320

Asp Arg Leu Ala Ala Thr Arg His Val Leu Ser Glu Tyr Gly Asn Met
                325                 330                 335

Gln Ser Ala Thr Val Leu Phe Ile Leu Asp Glu Met Arg Asn Arg Ser
            340                 345                 350

Ala Ala Glu Gly His Ala Thr Thr Gly Glu Gly Leu Asp Trp Gly Val
        355                 360                 365

Leu Leu Gly Phe Gly Pro Gly Leu Ser Ile Glu Thr Val Val Leu His
    370                 375                 380

Ser Cys Arg Leu Asn
385

<210> SEQ ID NO 20
<211> LENGTH: 390
<212> TYPE: PRT
<213> ORGANISM: Curcuma longa

<400> SEQUENCE: 20

Met Gly Ser Leu Gln Ala Met Arg Arg Ala Gln Arg Ala Gln Gly Pro
1               5                   10                  15

Ala Thr Ile Met Ala Val Gly Thr Ser Asn Pro Pro Asn Leu Tyr Glu
                20                  25                  30

Gln Thr Ser Tyr Pro Asp Phe Tyr Phe Arg Val Thr Asn Ser Asp His
            35                  40                  45

Lys His Ala Leu Lys Asn Lys Phe Arg Val Ile Cys Glu Lys Thr Lys
        50                  55                  60

Val Lys Arg Arg Tyr Leu His Leu Thr Glu Glu Ile Leu Lys Gln Arg
65                  70                  75                  80

Pro Lys Leu Cys Ser Tyr Met Glu Pro Ser Phe Asp Arg Gln Asp
                85                  90                  95

Ile Val Val Glu Glu Ile Pro Lys Leu Ala Lys Glu Ala Ala Glu Lys
                100                 105                 110

Ala Ile Lys Glu Trp Gly Arg Pro Lys Ser Glu Ile Thr His Leu Val
            115                 120                 125

Phe Cys Ser Ile Ser Gly Ile Asp Met Pro Gly Ala Asp Tyr Arg Leu
        130                 135                 140

Ala Thr Leu Leu Gly Leu Pro Leu Ser Val Asn Arg Leu Met Leu Tyr
145                 150                 155                 160

Ser Gln Ala Cys His Met Gly Ala Gln Met Leu Arg Ile Ala Lys Asp
                165                 170                 175

Leu Ala Glu Asn Asn Arg Gly Ala Arg Val Leu Ala Val Ser Cys Glu
            180                 185                 190
```

```
Ile Thr Val Leu Ser Phe Arg Gly Pro Asp Ala Gly Asp Phe Glu Ala
            195                 200                 205

Leu Ala Cys Gln Ala Gly Phe Gly Asp Gly Ala Ala Val Val Val
210                 215                 220

Gly Ala Asp Pro Leu Pro Gly Val Glu Arg Pro Ile Tyr Glu Ile Ala
225                 230                 235                 240

Ala Ala Met Gln Glu Thr Val Pro Ser Glu Arg Ala Val Gly Gly
            245                 250                 255

His Leu Arg Glu Ile Gly Trp Thr Phe His Phe Asn Gln Leu Pro
            260                 265                 270

Lys Leu Ile Ala Glu Asn Ile Gly Ser Leu Ala Arg Ala Phe Lys
            275                 280                 285

Pro Leu Gly Ile Ser Glu Trp Asn Asp Val Phe Trp Val Ala His Pro
            290                 295                 300

Gly Asn Trp Gly Ile Met Asp Ala Ile Glu Thr Lys Leu Gly Leu Glu
305                 310                 315                 320

Gln Gly Lys Leu Ala Thr Ala Arg His Val Phe Ser Glu Tyr Gly Asn
            325                 330                 335

Met Gln Ser Ala Thr Val Tyr Phe Val Met Asp Glu Val Arg Lys Arg
            340                 345                 350

Ser Ala Ala Glu Gly Arg Ala Thr Thr Gly Glu Gly Leu Glu Trp Gly
            355                 360                 365

Val Leu Phe Gly Phe Gly Pro Gly Leu Thr Ile Glu Thr Val Val Leu
370                 375                 380

Arg Ser Val Pro Leu Pro
385                 390

<210> SEQ ID NO 21
<211> LENGTH: 402
<212> TYPE: PRT
<213> ORGANISM: Oryza sativa

<400> SEQUENCE: 21

Met Ala Pro Thr Thr Thr Met Gly Ser Ala Leu Tyr Pro Leu Gly Glu
1               5                   10                  15

Met Arg Arg Ser Gln Arg Ala Asp Gly Leu Ala Ala Val Leu Ala Ile
            20                  25                  30

Gly Thr Ala Asn Pro Pro Asn Cys Val Thr Gln Glu Glu Phe Pro Asp
        35                  40                  45

Phe Tyr Phe Arg Val Thr Asn Ser Asp His Leu Thr Ala Leu Lys Asp
    50                  55                  60

Lys Phe Lys Arg Ile Cys Gln Glu Met Gly Val Gln Arg Arg Tyr Leu
65              70                  75                  80

His His Thr Glu Glu Met Leu Ser Ala His Pro Glu Phe Val Asp Arg
            85                  90                  95

Asp Ala Pro Ser Leu Asp Ala Arg Leu Asp Ile Ala Ala Asp Ala Val
            100                 105                 110

Pro Glu Leu Ala Ala Glu Ala Lys Lys Ala Ile Ala Glu Trp Gly
            115                 120                 125

Arg Pro Ala Ala Asp Ile Thr His Leu Val Val Thr Thr Asn Ser Gly
            130                 135                 140

Ala His Val Pro Gly Val Asp Phe Arg Leu Val Pro Leu Leu Gly Leu
145                 150                 155                 160

Arg Pro Ser Val Arg Arg Thr Met Leu His Leu Asn Gly Cys Phe Ala
```

```
              165                 170                 175
Gly Cys Ala Ala Leu Arg Leu Ala Lys Asp Leu Ala Glu Asn Ser Arg
            180                 185                 190

Gly Ala Arg Val Leu Val Val Ala Ala Glu Leu Thr Leu Met Tyr Phe
            195                 200                 205

Thr Gly Pro Asp Glu Gly Cys Phe Arg Thr Leu Leu Val Gln Gly Leu
            210                 215                 220

Phe Gly Asp Gly Ala Ala Ala Val Ile Val Gly Ala Asp Ala Asp Asp
225                 230                 235                 240

Val Glu Arg Pro Leu Phe Glu Ile Val Ser Ala Ala Gln Thr Ile Ile
                245                 250                 255

Pro Glu Ser Asp His Ala Leu Asn Met Arg Phe Thr Glu Arg Arg Leu
            260                 265                 270

Asp Gly Val Leu Gly Arg Gln Val Pro Gly Leu Ile Gly Asp Asn Val
            275                 280                 285

Glu Arg Cys Leu Leu Asp Met Phe Gly Pro Leu Leu Gly Gly Asp Gly
            290                 295                 300

Gly Gly Gly Trp Asn Asp Leu Phe Trp Ala Val His Pro Gly Ser Ser
305                 310                 315                 320

Thr Ile Met Asp Gln Val Asp Ala Ala Leu Gly Leu Glu Pro Gly Lys
                325                 330                 335

Leu Ala Ala Ser Arg Arg Val Leu Ser Asp Tyr Gly Asn Met Ser Gly
            340                 345                 350

Ala Thr Val Ile Phe Ala Leu Asp Glu Leu Arg Arg Gln Arg Lys Glu
            355                 360                 365

Ala Ala Ala Ala Gly Glu Trp Pro Glu Leu Gly Val Met Met Ala Phe
            370                 375                 380

Gly Pro Gly Met Thr Val Asp Ala Met Leu Leu His Ala Thr Ser His
385                 390                 395                 400

Val Asn

<210> SEQ ID NO 22
<211> LENGTH: 385
<212> TYPE: PRT
<213> ORGANISM: Cannabis sativa

<400> SEQUENCE: 22

Met Asn His Leu Arg Ala Glu Gly Pro Ala Ser Val Leu Ala Ile Gly
1               5                   10                  15

Thr Ala Asn Pro Glu Asn Ile Leu Leu Gln Asp Glu Phe Pro Asp Tyr
            20                  25                  30

Tyr Phe Arg Val Thr Lys Ser Glu His Met Thr Gln Leu Lys Glu Lys
            35                  40                  45

Phe Arg Lys Ile Cys Asp Lys Ser Met Ile Arg Lys Arg Asn Cys Phe
        50                  55                  60

Leu Asn Glu Glu His Leu Lys Gln Asn Pro Arg Leu Val Glu His Glu
65                  70                  75                  80

Met Gln Thr Leu Asp Ala Arg Gln Asp Met Leu Val Val Glu Val Pro
                85                  90                  95

Lys Leu Gly Lys Asp Ala Cys Ala Lys Ala Ile Lys Glu Trp Gly Gln
            100                 105                 110

Pro Lys Ser Lys Ile Thr His Leu Ile Phe Thr Ser Ala Ser Thr Thr
            115                 120                 125

Asp Met Pro Gly Ala Asp Tyr His Cys Ala Lys Leu Leu Gly Leu Ser
```

```
                130                 135                 140
Pro Ser Val Lys Arg Val Met Met Tyr Gln Leu Gly Cys Tyr Gly Gly
145                 150                 155                 160

Gly Thr Val Leu Arg Ile Ala Lys Asp Ile Ala Glu Asn Asn Lys Gly
                165                 170                 175

Ala Arg Val Leu Ala Val Cys Cys Asp Ile Met Ala Cys Leu Phe Arg
                180                 185                 190

Gly Pro Ser Glu Ser Asp Leu Glu Leu Leu Val Gly Gln Ala Ile Phe
                195                 200                 205

Gly Asp Gly Ala Ala Ala Val Ile Val Gly Ala Glu Pro Asp Glu Ser
210                 215                 220

Val Gly Glu Arg Pro Ile Phe Glu Leu Val Ser Thr Gly Gln Thr Ile
225                 230                 235                 240

Leu Pro Asn Ser Glu Gly Thr Ile Gly Gly His Ile Arg Glu Ala Gly
                245                 250                 255

Leu Ile Phe Asp Leu His Lys Asp Val Pro Met Leu Ile Ser Asn Asn
                260                 265                 270

Ile Glu Lys Cys Leu Ile Glu Ala Phe Thr Pro Ile Gly Ile Ser Asp
                275                 280                 285

Trp Asn Ser Ile Phe Trp Ile Thr His Pro Gly Gly Lys Ala Ile Leu
290                 295                 300

Asp Lys Val Glu Glu Lys Leu His Leu Lys Ser Asp Lys Phe Val Asp
305                 310                 315                 320

Ser Arg His Val Leu Ser Glu His Gly Asn Met Ser Ser Ser Thr Val
                325                 330                 335

Leu Phe Val Met Asp Glu Leu Arg Lys Arg Ser Leu Glu Glu Gly Lys
                340                 345                 350

Ser Thr Thr Gly Asp Gly Phe Glu Trp Gly Val Leu Phe Gly Phe Gly
                355                 360                 365

Pro Gly Leu Thr Val Glu Arg Val Val Arg Ser Val Pro Ile Lys
                370                 375                 380

Tyr
385

<210> SEQ ID NO 23
<211> LENGTH: 101
<212> TYPE: PRT
<213> ORGANISM: Cannabis sativa

<400> SEQUENCE: 23

Met Ala Val Lys His Leu Ile Val Leu Lys Phe Lys Asp Glu Ile Thr
1               5                   10                  15

Glu Ala Gln Lys Glu Glu Phe Phe Lys Thr Tyr Val Asn Leu Val Asn
                20                  25                  30

Ile Ile Pro Ala Met Lys Asp Val Tyr Trp Gly Lys Asp Val Thr Gln
                35                  40                  45

Lys Asn Lys Glu Glu Gly Tyr Thr His Ile Val Glu Val Thr Phe Glu
50                  55                  60

Ser Val Glu Thr Ile Gln Asp Tyr Ile Ile His Pro Ala His Val Gly
65                  70                  75                  80

Phe Gly Asp Val Tyr Arg Ser Phe Trp Glu Lys Leu Leu Ile Phe Asp
                85                  90                  95

Tyr Thr Pro Arg Lys
                100
```

```
<210> SEQ ID NO 24
<211> LENGTH: 395
<212> TYPE: PRT
<213> ORGANISM: Cannabis sativa

<400> SEQUENCE: 24

Met Gly Leu Ser Ser Val Cys Thr Phe Ser Phe Gln Thr Asn Tyr His
1               5                   10                  15

Thr Leu Leu Asn Pro His Asn Asn Pro Lys Thr Ser Leu Leu Cys
            20                  25                  30

Tyr Arg His Pro Lys Thr Pro Ile Lys Tyr Ser Tyr Asn Asn Phe Pro
            35                  40                  45

Ser Lys His Cys Ser Thr Lys Ser Phe His Leu Gln Asn Lys Cys Ser
    50                  55                  60

Glu Ser Leu Ser Ile Ala Lys Asn Ser Ile Arg Ala Ala Thr Thr Asn
65                  70                  75                  80

Gln Thr Glu Pro Pro Glu Ser Asp Asn His Ser Val Ala Thr Lys Ile
                85                  90                  95

Leu Asn Phe Gly Lys Ala Cys Trp Lys Leu Gln Arg Pro Tyr Thr Ile
            100                 105                 110

Ile Ala Phe Thr Ser Cys Ala Cys Gly Leu Phe Gly Lys Glu Leu Leu
            115                 120                 125

His Asn Thr Asn Leu Ile Ser Trp Ser Leu Met Phe Lys Ala Phe Phe
            130                 135                 140

Phe Leu Val Ala Ile Leu Cys Ile Ala Ser Phe Thr Thr Thr Ile Asn
145                 150                 155                 160

Gln Ile Tyr Asp Leu His Ile Asp Arg Ile Asn Lys Pro Asp Leu Pro
                165                 170                 175

Leu Ala Ser Gly Glu Ile Ser Val Asn Thr Ala Trp Ile Met Ser Ile
            180                 185                 190

Ile Val Ala Leu Phe Gly Leu Ile Ile Thr Ile Lys Met Lys Gly Gly
            195                 200                 205

Pro Leu Tyr Ile Phe Gly Tyr Cys Phe Gly Ile Phe Gly Gly Ile Val
            210                 215                 220

Tyr Ser Val Pro Pro Phe Arg Trp Lys Gln Asn Pro Ser Thr Ala Phe
225                 230                 235                 240

Leu Leu Asn Phe Leu Ala His Ile Ile Thr Asn Phe Thr Phe Tyr Tyr
                245                 250                 255

Ala Ser Arg Ala Ala Leu Gly Leu Pro Phe Glu Leu Arg Pro Ser Phe
            260                 265                 270

Thr Phe Leu Leu Ala Phe Met Lys Ser Met Gly Ser Ala Leu Ala Leu
            275                 280                 285

Ile Lys Asp Ala Ser Asp Val Glu Gly Asp Thr Lys Phe Gly Ile Ser
            290                 295                 300

Thr Leu Ala Ser Lys Tyr Gly Ser Arg Asn Leu Thr Leu Phe Cys Ser
305                 310                 315                 320

Gly Ile Val Leu Leu Ser Tyr Val Ala Ala Ile Leu Ala Gly Ile Ile
                325                 330                 335

Trp Pro Gln Ala Phe Asn Ser Asn Val Met Leu Leu Ser His Ala Ile
            340                 345                 350

Leu Ala Phe Trp Leu Ile Leu Gln Thr Arg Asp Phe Ala Leu Thr Asn
            355                 360                 365

Tyr Asp Pro Glu Ala Gly Arg Arg Phe Tyr Glu Phe Met Trp Lys Leu
            370                 375                 380
```

```
Tyr Tyr Ala Glu Tyr Leu Val Tyr Val Phe Ile
385             390             395
```

<210> SEQ ID NO 25
<211> LENGTH: 544
<212> TYPE: PRT
<213> ORGANISM: Cannabis sativa

<400> SEQUENCE: 25

```
Met Lys Cys Ser Thr Phe Ser Phe Trp Phe Val Cys Lys Ile Ile Phe
1               5                   10                  15

Phe Phe Phe Ser Phe Asn Ile Gln Thr Ser Ile Ala Asn Pro Arg Glu
            20                  25                  30

Asn Phe Leu Lys Cys Phe Ser Gln Tyr Ile Pro Asn Asn Ala Thr Asn
                35                  40                  45

Leu Lys Leu Val Tyr Thr Gln Asn Asn Pro Leu Tyr Met Ser Val Leu
        50                  55                  60

Asn Ser Thr Ile His Asn Leu Arg Phe Thr Ser Asp Thr Thr Pro Lys
65                  70                  75                  80

Pro Leu Val Ile Val Thr Pro Ser His Val Ser His Ile Gln Gly Thr
                85                  90                  95

Ile Leu Cys Ser Lys Lys Val Gly Leu Gln Ile Arg Thr Arg Ser Gly
                100                 105                 110

Gly His Asp Ser Glu Gly Met Ser Tyr Ile Ser Gln Val Pro Phe Val
            115                 120                 125

Ile Val Asp Leu Arg Asn Met Arg Ser Ile Lys Ile Asp Val His Ser
130                 135                 140

Gln Thr Ala Trp Val Glu Ala Gly Ala Thr Leu Gly Glu Val Tyr Tyr
145                 150                 155                 160

Trp Val Asn Glu Lys Asn Glu Asn Leu Ser Leu Ala Ala Gly Tyr Cys
                165                 170                 175

Pro Thr Val Cys Ala Gly Gly His Phe Gly Gly Gly Tyr Gly Pro
            180                 185                 190

Leu Met Arg Asn Tyr Gly Leu Ala Ala Asp Asn Ile Ile Asp Ala His
        195                 200                 205

Leu Val Asn Val His Gly Lys Val Leu Asp Arg Lys Ser Met Gly Glu
210                 215                 220

Asp Leu Phe Trp Ala Leu Arg Gly Gly Gly Ala Glu Ser Phe Gly Ile
225                 230                 235                 240

Ile Val Ala Trp Lys Ile Arg Leu Val Ala Val Pro Lys Ser Thr Met
                245                 250                 255

Phe Ser Val Lys Lys Ile Met Glu Ile His Glu Leu Val Lys Leu Val
                260                 265                 270

Asn Lys Trp Gln Asn Ile Ala Tyr Lys Tyr Asp Lys Asp Leu Leu Leu
            275                 280                 285

Met Thr His Phe Ile Thr Arg Asn Ile Thr Asp Asn Gln Gly Lys Asn
        290                 295                 300

Lys Thr Ala Ile His Thr Tyr Phe Ser Ser Val Phe Leu Gly Gly Val
305                 310                 315                 320

Asp Ser Leu Val Asp Leu Met Asn Lys Ser Phe Pro Glu Leu Gly Ile
                325                 330                 335

Lys Lys Thr Asp Cys Arg Gln Leu Ser Trp Ile Asp Thr Ile Ile Phe
            340                 345                 350

Tyr Ser Gly Val Val Asn Tyr Asp Thr Asp Asn Phe Asn Lys Glu Ile
```

```
                355                 360                 365
Leu Leu Asp Arg Ser Ala Gly Gln Asn Gly Ala Phe Lys Ile Lys Leu
    370                 375                 380

Asp Tyr Val Lys Lys Pro Ile Pro Glu Ser Val Phe Val Gln Ile Leu
385                 390                 395                 400

Glu Lys Leu Tyr Glu Asp Ile Gly Ala Gly Met Tyr Ala Leu Tyr
                405                 410                 415

Pro Tyr Gly Gly Ile Met Asp Glu Ile Ser Glu Ser Ala Ile Pro Phe
                420                 425                 430

Pro His Arg Ala Gly Ile Leu Tyr Glu Leu Trp Tyr Ile Cys Ser Trp
                435                 440                 445

Glu Lys Gln Glu Asp Asn Gly Lys His Leu Asn Trp Ile Arg Asn Ile
    450                 455                 460

Tyr Asn Phe Met Thr Pro Tyr Val Ser Lys Asn Pro Arg Leu Ala Tyr
465                 470                 475                 480

Leu Asn Tyr Arg Asp Leu Asp Ile Gly Ile Asn Asp Pro Lys Asn Pro
                485                 490                 495

Asn Asn Tyr Thr Gln Ala Arg Ile Trp Gly Glu Lys Tyr Phe Gly Lys
                500                 505                 510

Asn Phe Asp Arg Leu Val Lys Val Lys Thr Leu Val Asp Pro Asn Asn
                515                 520                 525

Phe Phe Arg Asn Glu Gln Ser Ile Pro Pro Leu Pro Arg His Arg His
                530                 535                 540

<210> SEQ ID NO 26
<211> LENGTH: 305
<212> TYPE: PRT
<213> ORGANISM: Streptomyces sp.

<400> SEQUENCE: 26

Met Ser Gly Ala Ala Asp Val Glu Arg Val Tyr Ala Ala Met Glu Glu
1               5                   10                  15

Ala Ala Gly Leu Leu Asp Val Ser Cys Ala Arg Glu Lys Ile Tyr Pro
                20                  25                  30

Leu Leu Thr Val Phe Gln Asp Thr Leu Thr Asp Gly Val Val Val Phe
                35                  40                  45

Ser Met Ala Ser Gly Arg Arg Ser Thr Glu Leu Asp Phe Ser Ile Ser
    50                  55                  60

Val Pro Val Ser Gln Gly Asp Pro Tyr Ala Thr Val Lys Glu Gly
65                  70                  75                  80

Leu Phe Gln Ala Thr Gly Ser Pro Val Asp Glu Leu Leu Ala Asp Thr
                85                  90                  95

Val Ala His Leu Pro Val Ser Met Phe Ala Ile Asp Gly Glu Val Thr
                100                 105                 110

Gly Gly Phe Lys Lys Thr Tyr Ala Phe Phe Pro Thr Asp Asp Met Pro
                115                 120                 125

Gly Val Ala Gln Leu Ala Ala Ile Pro Ser Met Pro Ala Ser Val Ala
                130                 135                 140

Glu Asn Ala Glu Leu Phe Ala Arg Tyr Gly Leu Asp Lys Val Gln Met
145                 150                 155                 160

Thr Ser Met Asp Tyr Lys Lys Arg Gln Val Asn Leu Tyr Phe Ser Asp
                165                 170                 175

Leu Lys Gln Glu Tyr Leu Gln Pro Glu Ser Val Val Ala Leu Ala Arg
                180                 185                 190
```

Glu Leu Gly Leu Arg Val Pro Gly Glu Leu Gly Leu Glu Phe Cys Lys
195                 200                 205

Arg Ser Phe Ala Val Tyr Pro Thr Leu Asn Trp Asp Thr Gly Lys Ile
210                 215                 220

Asp Arg Leu Cys Phe Ala Ala Ile Ser Thr Asp Pro Thr Leu Val Pro
225                 230                 235                 240

Ser Glu Asp Glu Arg Asp Ile Glu Met Phe Arg Asn Tyr Ala Thr Lys
            245                 250                 255

Ala Pro Tyr Ala Tyr Val Gly Glu Lys Arg Thr Leu Val Tyr Gly Leu
            260                 265                 270

Thr Leu Ser Ser Thr Glu Glu Tyr Tyr Lys Leu Gly Ala Tyr Tyr His
        275                 280                 285

Ile Thr Asp Ile Gln Arg Gln Leu Leu Lys Ala Phe Asp Ala Leu Glu
290                 295                 300

Asp
305

<210> SEQ ID NO 27
<211> LENGTH: 1155
<212> TYPE: DNA
<213> ORGANISM: Artificial Sequence
<220> FEATURE:
<223> OTHER INFORMATION: synthetic - codon optimized

<400> SEQUENCE: 27

```
atgaaccacc tgagagccga aggacctgcc tctgtgctgg ccatcggaac cgccaatcct      60
gagaacatcc tgctgcagga cgagttcccc gactactact tcagagtgac caagagcgag     120
cacatgaccc agctgaaaga gaagttccgc aagatctgcg acaagagcat gatccgcaag     180
aggaactgct tcctgaacga ggacacctg aagcagaacc caggctggt ggaacacgag       240
atgcagaccc tggacgccag acaggatatg ctggtggtgg aagtgcccaa gctgggcaaa     300
gatgcctgtg ccaaggccat caaagagtgg ggccagccta gagcaagat cacccacctg      360
atcttcacca gcgccagcac cacagatatg cctggcgccg attaccactg cgccaaactg     420
ctgggactga gcccttctgt gaagcgcgtg atgatgtacc agctgggctg ttacggcgga     480
ggcaccgtgc tgagaatcgc caaggatatc gccgagaaca caagggcgc agagtgctg       540
gccgtgtgct gtgatattat ggcctgcctg ttcaggggcc ccagcgagtc tgatctggaa     600
ctgctcgttg gccaggccat ttttggagat ggcgccgctg ctgtgatcgt gggagctgag     660
cctgatgaga gcgtgggcga aagacccatc ttcgagctgg tgtctaccgg ccagaccatc     720
ctgcctaact ctgagggaac catcggcggc cacatcagag aagccggcct gatctttgac     780
ctgcacaagg acgtgcccat gctgatctcc aacaacatcg agaagtgcct gatcgaggcc     840
ttcacaccca tcggcatcag cgactggaac agcatcttct ggatcacaca ccctggcgga     900
aaggccatcc tggacaaggt ggaagagaag ctgcacctga gtccgacaa gttcgtggac      960
agcagacacg tgctgtccga gcacggcaac atgagcagct ctaccgtgct gttcgtgatg    1020
gacgagctga ggaagcgctc tctggaagag ggcaagtcta ccaccggcga cggatttgaa    1080
tggggcgtgc tgtttggctt cggccctgga ctgacagtgg aaagagtggt cgtcagaagc    1140
gtgcccatca aatac                                                     1155
```

<210> SEQ ID NO 28
<211> LENGTH: 303
<212> TYPE: DNA
<213> ORGANISM: Artificial Sequence

```
<220> FEATURE:
<223> OTHER INFORMATION: synthetic - codon optimized

<400> SEQUENCE: 28
atggcagtta agcacctgat cgtgctgaag ttcaaggacg agatcacaga ggcccagaaa      60
gaagagttct tcaagaccta cgtgaacctg gtcaacatca tccccgccat gaaggacgtg     120
tactggggca agacgtgac ccagaagaac aaagaggaag ctacaccca tcgtggaa         180 gtgaccttcg agtccgtgga aaccatccag gactacatca ttcacccgc tcacgtcgga     240 ttcggcgacg tgtacagatc cttctgggaa aagctgctga tcttcgacta cacacctaga   300
aag                                                                  303

<210> SEQ ID NO 29
<211> LENGTH: 1185
<212> TYPE: DNA
<213> ORGANISM: Artificial Sequence
<220> FEATURE:
<223> OTHER INFORMATION: synthetic - codon optimized

<400> SEQUENCE: 29
atgggattga gtagcgtgtg caccttcagc ttccaaacga actaccacac actgctgaac      60
ccgcacaaca caaccccaa gaccagcctg ctgtgctaca ggcaccctaa gacacccatc     120
aagtacagct acaacaactt ccccagcaag cactgcagca ccaagagctt ccatctgcaa   180
aacaagtgca gcgagagcct gtctatcgcc aagaactcca tcagagccgc caccaccaat   240
cagaccgagc ctccagagtc tgacaaccac agcgtggcca ccaagatcct gaacttcggc   300
aaggcctgct ggaagctgca gaggccctac accatcattg ccttcacctc ttgcgcctgc   360
ggcctgttcg aaaagagct gctgcacaac accaatctga tcagctggtc cctgatgttc    420
aaggccttct tcttcctggt ggccattctg tgtatcgcca gcttcaccac caccatcaac   480
cagatctacg atctgcacat cgaccgcatc aacaagcccg atctgcctct ggcctctggc   540
gagatctctg tgaataccgc ctggatcatg agcatcatcg tggccctgtt cgggctgatc    600
atcaccatca agatgaaggg cggacccctg tacatcttcg ctactgctt cggcatcttc   660 ggaggcatcg tgtactccgt gcctccattc cgctggaagc agaatccctc taccgccttc   720
ctgctgaact ttctggccca catcattacc aacttcacct tctactacgc cagcagggcc   780
gctctgggac tgccttttga actgaggccc tctttcacct ttctgctggc ctttatgaag   840
tccatgggca gcgccctggc tctgatcaag gatgccagtg atgtggaagg cgacaccaag   900
ttcggaatca gcaccctggc ctctaagtac ggcagcagaa atctgaccct gttctgcagc   960
ggcatcgtgc tgctgtctta cgtggccgct atcctggccg gaatcatttg gcctcaggcc  1020
ttcaacagca cgtgatgct gctgagccac gccattctgg ccttttggct gatcctgcag   1080
accagggatt tcgccctgac caactacgat cctgaggccg gcagacgctt ctacgagttc   1140
atgtggaagc tgtactacgc cgagtacctg gtgtacgtct tcatc                   1185

<210> SEQ ID NO 30
<211> LENGTH: 1632
<212> TYPE: DNA
<213> ORGANISM: Artificial Sequence
<220> FEATURE:
<223> OTHER INFORMATION: synthetic - codon optimized

<400> SEQUENCE: 30
atgaagtgca gtaccttctc cttttggttc gtgtgcaaga ttatcttctt ctttttctca      60
```

-continued

```
ttcaatatcc agacctctat cgctaacccg cgcgagaact tcctgaagtg cttcagccag      120
tacatcccca acaatgccac caacctgaag ctggtgtata cgcaaaacaa cccgctgtac      180
atgagcgtgc tgaacagcac catccacaac ctgaggttca cctccgacac cacacctaag      240
cctctggtca tcgtgacccc tagccacgtg tcacacattc agggcaccat cctgtgcagc      300
aagaaagtgg gactgcagat caggaccaga agcggcggac acgatagcga gggcatgagc      360
tacatttctc aggtgccctt cgtgattgtg gacctgagga catgcgcag catcaagatc       420 gacgtgcaca gccagacagc ctgggttgaa gcaggcgcta cactgggcga agtgtactac      480
tgggtcaacg agaagaacga gaacctgagc ctggccgctg gctactgtcc tacagtttgt      540
gctggcggcc actttggcgg cggaggatat ggacctctga tgaggaatta cggcctggct      600
gccgacaata tcatcgacgc ccacctcgtg aacgtgcacg gcaaggtgct ggacagaaag      660
tctatgggcg aagatctgtt ctgggccctg agaggtggcg gagccgagtc ttttggaatt      720
atcgtggcct ggaagatccg cctggtggct gtgcctaagt ccaccatgtt cagcgtgaag      780
aaaatcatgg aaatccacga gctggtcaag ctcgtgaaca agtggcagaa atcgcctac       840 aaatacgaca aggacctcct gctgatgacc cacttcatca ccagaaacat caccgacaac      900
cagggcaaga acaagaccgc catccacacc tacttcagct ccgtgtttct cggcggcgtg      960
gactctctgg tggatctgat gaacaagagc tttcccgagc tgggcatcaa gaaaaccgac     1020
tgcagacagc tgagctggat cgataccatc atcttctaca cgcggcgtgg caactacgac     1080
accgataact tcaacaaaga gatcctgctg gaccgcagcg ccggacagaa tggggccttt     1140
aagatcaagc tggactacgt gaagaagccc attcctgagt ccgtgttcgt gcagatcctg     1200
gaaaaactgt acgaagagga catcggagcc gggatgtacg ctctgtaccc ttacggcggc     1260
atcatggatg agatctccga gagcgccatt ccatttccac acagagccgg catcctgtac     1320
gagctgtggt acatctgcag ctgggagaag caagaggata cgagaagca cctcaactgg      1380 atccgcaaca tctacaactt catgaccct tacgtcagca agaaccctag actgcctac       1440 ctgaactacc gcgacctgga catcgggatc aacgacccaa agaacccaa caactacacc      1500 caggccagga tttgggcga gaagtacttt ggcaagaact tcgaccgcct ggtcaaagtg      1560
aaaaccctgg tggaccctaa caacttcttc agaaacgagc agagcatccc tccactgcct     1620
agacatcggc at                                                         1632
```

<210> SEQ ID NO 31
<211> LENGTH: 264
<212> TYPE: PRT
<213> ORGANISM: Trichinella spiralis

<400> SEQUENCE: 31

```
Met Ala Asn Leu Tyr Asn Ser Met Met Leu Ile Ser Leu Ile Ile Leu
1               5                   10                  15

Cys Pro Leu Asn Glu Ile Trp Asn Ser Cys Gly Ser Ser Cys Glu Glu
                20                  25                  30

Thr Cys Glu Ser Ile Ala Ser Gly Lys Asp Thr Pro Cys Thr Leu Gln
            35                  40                  45

Cys Val Pro Gly Cys Phe Cys Val Asp Gly Phe Val Arg Asp Leu Arg
        50                  55                  60

Gly Arg Cys Ile Pro Met Ser Leu Cys Pro Asn Lys Val Asn Ser Ser
65                  70                  75                  80

Cys Pro Glu Asn Glu Val Phe Gln Glu Cys Gly Ser Ala Cys Pro Glu
                85                  90                  95
```

```
Thr Cys Asp Thr Val Ser Ser Gly Phe Glu Arg Pro Cys Thr Gly Asn
            100                 105                 110

Cys Ile Ala Gly Cys Phe Cys Lys Asn Gly Tyr Val Arg Gly Tyr Asp
        115                 120                 125

Gly Lys Cys Ile Pro Pro Glu Asp Cys Gly Lys Pro Asn Asn Asp Lys
    130                 135                 140

Cys Gly Ser Asn Glu Val Phe Met Lys Cys Gly Ser Ala Cys Pro Ala
145                 150                 155                 160
Thr Cys Asp Ser Ile Arg Ser Glu Asn Ile Ile Pro Cys Thr Lys Glu
                165                 170                 175
Cys Val Ser Gly Cys Phe Cys Lys Ser Gly Tyr Val Arg Ala Ser Thr
            180                 185                 190
Gly Glu Cys Leu Ala Pro Glu Ala Cys Gly Ala His Leu Gly Gly Cys
        195                 200                 205
Gly Pro Arg Glu Glu Tyr Arg Ala Cys Gly Ser Ala Cys Pro Glu Ser
    210                 215                 220

Cys Glu Ser Ile Lys Asp Leu Ala Pro His Ala Cys Pro Ala Met Cys
225                 230                 235                 240
Val Pro Gly Cys Phe Cys Lys Phe Pro Phe Val Arg Gly Tyr Asp Leu
                245                 250                 255
Arg Cys Ile Met Pro Asp Asp Cys
            260
```

<210> SEQ ID NO 32
<211> LENGTH: 795
<212> TYPE: DNA
<213> ORGANISM: Trichinella spiralis

<400> SEQUENCE: 32

```
atggccaatc tctataatag tatgatgtta atatccttga tcattttgtg tccgttaaac      60
gaaatttgga attcttgtgg aagttcatgt gaagaaactt gtgaaagcat tgctagtggc     120
aaagacacac cttgcactct gcagtgcgtt cctggttgct tttgtgtcga cggttttgta     180
cgagatttaa gaggtcgttg cattccaatg tcattatgtc caaataaagt caacagttca     240
tgtcctgaaa atgaagtctt tcaagaatgc ggttccgctt gtccagaaac atgcgataca     300
gtttcctcgg gatttgaaag accttgcacg gggaattgta ttgctggttg tttttgtaag     360
aatgggtatg tacgaggtta cgatggaaaa tgcattccac cagaagattg tggaaaacct     420
aataacgaca aatgtggatc aaatgaagtt ttcatgaagt gtggtagcgc ttgtcccgca     480
acctgcgatt cgatccgaag tgaaaatatt attccatgca ctaaagagtg tgtttcgggt     540
tgcttctgca aatctggcta cgtcagagca tctaccggtg aatgtttagc tccggaagct     600
tgtggtgcgc atttgggcgg ctgtggaccc cgagaagagt acagagcttg tggaagtgct     660
tgtccagaat cttgtgaatc tataaaagat cttgcgccac acgcgtgtcc tgctatgtgt     720
gtacctggat gtttctgcaa gtttccattc gttcgtgggt acgatctgcg ttgcataatg     780
cctgatgatt gctga                                                      795
```

<210> SEQ ID NO 33
<211> LENGTH: 373
<212> TYPE: PRT
<213> ORGANISM: Trichinella spiralis

<400> SEQUENCE: 33

```
Met Glu Thr Glu Ile Ala Lys Pro Leu Ala Asp Phe Ala Tyr Ser Leu
```

```
                1               5                      10                       15
            Tyr Gln Leu Glu Glu Ala Gly Asn Val Phe Phe Ser Pro Val Ser Ile
                           20                     25                     30

Phe Leu Ala Leu Ala Met Val Phe Gly Ser Asn Gly Asn Thr Asn
                           35                     40                     45

Thr Gln Leu Leu Asn Val Met Phe Lys Ala Gly Trp Lys Lys Asn Arg
                           50                     55                     60

Thr Lys Lys Ala Met Arg Ser Phe Val Ser Ser Leu Thr Ile Asp Glu
             65                     70                     75                     80

Tyr Tyr Asp Ala Ser Leu Lys Leu Ala Asn Arg Leu Tyr Ala Asn Asp
                           85                     90                     95

Gln Tyr Pro Ile Leu His Pro Phe Leu Lys Asp Val Lys Arg Tyr Leu
                          100                    105                    110

Ser Ser Asp Leu Val Ser Val Asn Phe Ala Asp Thr Glu Ala Ala Arg
                          115                    120                    125

Leu Gln Ile Asn Lys Trp Val Ser Asp Gln Thr Asn His Lys Ile Asn
                          130                    135                    140

Asp Leu Leu Gln Ser Gly Thr Val Glu Ala Asn Thr Arg Leu Ile Ala
            145                    150                    155                    160

Val Asn Ala Ile Tyr Phe Lys Ala Ser Trp Asp Glu Val Phe Asp Glu
                          165                    170                    175

Ala His Thr Lys Arg Lys Lys Phe Tyr Pro Thr Pro His Ser Ser Ile
                          180                    185                    190

Lys Ile Pro Met Met Thr Gln Thr Asn Gly Tyr Ser Tyr Tyr Glu Thr
                          195                    200                    205

Glu Asp Tyr Gln Phe Leu Gly Met Asp Tyr Tyr Pro Glu Tyr Leu Lys
                          210                    215                    220

Met Phe Ile Leu Leu Pro Lys Ser Gly Lys Thr Leu Ser Glu Leu Gln
            225                    230                    235                    240

Gln Lys Phe Asn Gly Glu Thr Leu Leu Asn Leu Val Ser Lys Val Ser
                          245                    250                    255

Gly Ala Glu Val Lys Val Thr Ile Pro Lys Met Lys Phe Glu Lys Gln
                          260                    265                    270

Met Asn Leu Val Glu Ala Leu Lys Lys Leu Gly Ile Glu Asp Leu Phe
                          275                    280                    285

Ile Pro Gly Lys Ala Asp Leu Ser Gly Ile Cys Val Lys Glu Lys Leu
                          290                    295                    300

Tyr Val Ser Asp Ile Val His Lys Ala Tyr Leu Glu Phe Asn Glu Glu
            305                    310                    315                    320

Gly Thr Glu Ala Ala Ala Ala Thr Ala Asp Arg Ile Val Pro Met Ser
                          325                    330                    335

Gly Val Met Tyr Glu Asp Ser Phe Glu Phe Val Ala Asp His Pro Phe
                          340                    345                    350

Leu Phe Phe Ile Phe Asp Ser Arg Ser Lys Ala Ile Leu Phe Ile Gly
                          355                    360                    365

Arg Phe Ser Gly Asn
                370

<210> SEQ ID NO 34
<211> LENGTH: 1311
<212> TYPE: PRT
<213> ORGANISM: Trichinella spiralis

<400> SEQUENCE: 34
```

```
Ala Gly Ala Thr Thr Ala Thr Thr Gly Gly Ala Gly Ala Ala Ala Ala
1               5                   10                  15

Thr Thr Gly Thr Gly Gly Ala Ala Thr Thr Gly Thr Thr Gly Thr Gly
            20                  25                  30

Ala Ala Cys Gly Ala Ala Ala Thr Gly Gly Ala Ala Ala Cys Ala Gly
        35                  40                  45

Ala Ala Ala Thr Thr Gly Cys Ala Ala Ala Ala Cys Cys Ala Thr Thr
    50                  55                  60

Ala Gly Cys Thr Gly Ala Thr Thr Thr Cys Gly Cys Thr Thr Ala Thr
65                  70                  75                  80

Thr Cys Gly Cys Thr Thr Thr Ala Thr Cys Ala Ala Thr Thr Gly Gly
                85                  90                  95

Ala Ala Gly Ala Ala Gly Cys Ala Gly Gly Ala Ala Ala Thr Gly Thr
            100                 105                 110

Ala Thr Thr Cys Thr Thr Thr Thr Cys Ala Cys Cys Ala Gly Thr Ala
        115                 120                 125

Thr Cys Gly Ala Thr Thr Thr Thr Thr Cys Thr Gly Gly Cys Ala Cys
    130                 135                 140

Thr Thr Gly Cys Ala Ala Thr Gly Gly Thr Ala Thr Thr Thr Thr Thr
145                 150                 155                 160

Thr Gly Gly Ala Thr Cys Cys Ala Ala Cys Gly Gly Thr Ala Ala Thr
                165                 170                 175

Ala Cys Ala Ala Ala Thr Ala Cys Thr Cys Ala Ala Cys Thr Gly Cys
            180                 185                 190

Thr Gly Ala Ala Thr Gly Thr Gly Ala Thr Gly Thr Thr Cys Ala Ala
        195                 200                 205

Ala Gly Cys Thr Gly Gly Cys Thr Gly Gly Ala Ala Gly Ala Ala Ala
    210                 215                 220

Ala Ala Thr Cys Gly Thr Ala Cys Ala Ala Ala Ala Ala Ala Gly Gly
225                 230                 235                 240

Cys Ala Ala Thr Gly Cys Gly Gly Thr Cys Gly Thr Thr Cys Gly Thr
                245                 250                 255

Thr Thr Cys Ala Thr Cys Gly Cys Thr Cys Ala Cys Cys Ala Thr Cys
            260                 265                 270

Gly Ala Thr Gly Ala Ala Thr Ala Cys Thr Ala Thr Gly Ala Thr Gly
        275                 280                 285

Cys Thr Thr Cys Thr Thr Thr Gly Ala Ala Ala Thr Thr Gly Gly Cys
    290                 295                 300

Cys Ala Ala Thr Cys Gly Ala Thr Thr Gly Thr Ala Thr Gly Cys Thr
305                 310                 315                 320

Ala Ala Thr Gly Ala Thr Cys Ala Ala Thr Ala Thr Cys Cys Ala Ala
                325                 330                 335

Thr Ala Thr Thr Gly Cys Ala Thr Cys Cys Ala Thr Thr Thr Cys Thr
            340                 345                 350

Thr Ala Ala Ala Gly Ala Thr Gly Thr Gly Ala Ala Ala Ala Gly Ala
        355                 360                 365

Thr Ala Thr Cys Thr Ala Thr Cys Ala Ala Gly Thr Gly Ala Thr Thr
    370                 375                 380

Thr Gly Gly Thr Thr Ala Gly Thr Gly Thr Ala Ala Ala Thr Thr Thr
385                 390                 395                 400

Thr Gly Cys Cys Gly Ala Cys Ala Cys Thr Gly Ala Ala Gly Cys Ala
                405                 410                 415

Gly Cys Ala Cys Gly Thr Thr Thr Gly Cys Ala Gly Ala Thr Thr Ala
```

```
                420             425              430
Ala Thr Ala Ala Gly Thr Gly Gly Thr Gly Ala Gly Cys Gly Ala
            435             440             445

Thr Cys Ala Gly Ala Cys Gly Ala Ala Thr Cys Ala Thr Ala Ala
        450             455             460

Ala Thr Cys Ala Ala Cys Gly Ala Thr Thr Gly Cys Thr Thr Cys
465             470             475             480

Ala Ala Thr Cys Thr Gly Gly Ala Ala Cys Ala Gly Thr Thr Gly Ala
            485             490             495

Gly Gly Cys Ala Ala Thr Ala Cys Thr Cys Gly Cys Cys Thr Thr
        500             505             510

Ala Thr Cys Gly Cys Cys Gly Thr Cys Ala Ala Cys Gly Cys Ala Ala
        515             520             525

Thr Thr Thr Ala Thr Thr Thr Cys Ala Ala Ala Gly Cys Cys Thr Cys
        530             535             540

Thr Thr Gly Gly Gly Ala Thr Gly Ala Gly Gly Thr Thr Thr Thr Cys
545             550             555             560

Gly Ala Cys Gly Ala Ala Gly Cys Ala Cys Thr Ala Cys Ala Ala
            565             570             575

Ala Gly Cys Gly Gly Ala Ala Ala Ala Ala Thr Thr Thr Thr Ala
            580             585             590

Thr Cys Cys Ala Ala Cys Ala Cys Cys Gly Cys Ala Cys Ala Gly Thr
        595             600             605

Thr Cys Ala Ala Thr Thr Ala Ala Ala Thr Ala Cys Cys Ala Ala
        610             615             620

Thr Gly Ala Thr Gly Ala Cys Ala Cys Ala Gly Ala Cys Ala Ala Ala
625             630             635             640

Thr Gly Gly Ala Thr Ala Thr Thr Cys Gly Thr Ala Thr Ala Thr
            645             650             655

Gly Ala Ala Ala Cys Thr Gly Ala Ala Gly Ala Thr Thr Ala Thr Cys
            660             665             670

Ala Ala Thr Thr Thr Cys Thr Gly Gly Ala Ala Thr Gly Gly Ala
        675             680             685

Thr Thr Ala Thr Thr Ala Thr Cys Cys Ala Gly Ala Ala Thr Ala Thr
        690             695             700

Cys Thr Thr Ala Ala Ala Ala Thr Gly Thr Thr Cys Ala Thr Thr Thr
705             710             715             720

Thr Ala Thr Thr Ala Cys Cys Ala Ala Ala Gly Thr Cys Ala Gly Gly
            725             730             735

Ala Ala Ala Ala Ala Cys Ala Cys Thr Thr Thr Cys Thr Gly Ala Ala
            740             745             750

Thr Thr Ala Cys Ala Ala Cys Ala Ala Ala Ala Gly Thr Thr Thr Ala
        755             760             765

Ala Thr Gly Gly Ala Gly Ala Ala Ala Cys Thr Cys Thr Gly Thr Thr
            770             775             780

Ala Ala Ala Thr Thr Thr Gly Gly Thr Ala Thr Cys Cys Ala Ala Ala
785             790             795             800

Gly Thr Thr Ala Gly Cys Gly Gly Thr Gly Cys Thr Gly Ala Ala Gly
            805             810             815

Thr Gly Ala Ala Ala Gly Thr Gly Ala Cys Ala Thr Thr Cys Cys
            820             825             830

Ala Ala Ala Ala Ala Thr Gly Ala Ala Gly Thr Thr Gly Ala Gly
        835             840             845
```

-continued

Ala Ala Ala Cys Ala Gly Ala Thr Gly Ala Thr Thr Ala Gly
850             855                 860

Thr Thr Gly Ala Ala Gly Cys Ala Thr Thr Gly Ala Ala Gly Ala Ala
865             870                 875                 880

Ala Cys Thr Thr Gly Gly Thr Ala Thr Ala Gly Ala Ala Gly Ala Thr
            885                 890                 895

Cys Thr Thr Thr Thr Cys Ala Thr Thr Cys Cys Thr Gly Gly Ala Ala
                900                 905                 910

Ala Ala Gly Cys Ala Gly Ala Thr Cys Thr Thr Thr Cys Thr Gly Gly
        915                 920                 925

Ala Ala Thr Thr Thr Gly Thr Gly Thr Thr Ala Ala Gly Ala Ala
930                 935                 940

Ala Ala Gly Cys Thr Thr Thr Ala Thr Gly Thr Ala Thr Cys Thr Gly
945                 950                 955                 960

Ala Thr Ala Thr Thr Gly Thr Thr Cys Ala Cys Ala Ala Ala Gly Cys
                965                 970                 975

Gly Thr Ala Thr Cys Thr Ala Gly Ala Gly Thr Thr Cys Ala Ala Thr
            980                 985                 990

Gly Ala Ala Gly Ala Ala Gly Gly Ala Ala Cys Thr Gly Ala Ala Gly
        995                 1000                1005

Cys Ala Gly Cys Ala Gly Cys Ala Gly Cys Gly Ala Cys Cys Gly
    1010                1015                1020

Cys Cys Gly Ala Thr Cys Gly Cys Ala Thr Ala Gly Thr Ala Cys
    1025                1030                1035

Cys Cys Ala Thr Gly Thr Cys Cys Gly Gly Cys Gly Thr Thr Ala
    1040                1045                1050

Thr Gly Thr Ala Thr Gly Ala Ala Gly Ala Cys Ala Gly Thr Thr
    1055                1060                1065

Thr Thr Gly Ala Ala Thr Thr Gly Thr Thr Gly Cys Thr Gly
    1070                1075                1080

Ala Thr Cys Ala Thr Cys Cys Ala Thr Thr Thr Cys Thr Thr Thr
    1085                1090                1095

Thr Cys Thr Thr Cys Ala Thr Cys Thr Thr Thr Gly Ala Cys Ala
    1100                1105                1110

Gly Cys Ala Gly Ala Thr Cys Ala Ala Ala Ala Gly Cys Gly Ala
    1115                1120                1125

Thr Thr Cys Thr Thr Thr Thr Ala Thr Thr Gly Gly Ala Cys
    1130                1135                1140

Gly Thr Thr Thr Thr Thr Cys Thr Gly Gly Thr Ala Ala Thr Thr
    1145                1150                1155

Ala Ala Ala Gly Ala Thr Ala Ala Thr Thr Ala Gly Ala Ala Ala
    1160                1165                1170

Ala Thr Gly Gly Ala Thr Ala Ala Ala Thr Gly Gly Ala Gly Ala
    1175                1180                1185

Ala Ala Ala Ala Thr Gly Ala Thr Thr Thr Thr Gly Cys Thr
    1190                1195                1200

Gly Gly Gly Thr Gly Ala Ala Ala Ala Thr Gly Cys Ala Ala Gly
    1205                1210                1215

Thr Thr Thr Thr Ala Ala Ala Ala Gly Thr Ala Thr Thr Thr Gly
    1220                1225                1230

Ala Ala Ala Ala Thr Ala Thr Thr Thr Thr Thr Ala Ala Thr
    1235                1240                1245

```
Gly Ala Thr Gly Ala Thr Thr Thr Thr Ala Thr Thr Gly Thr
    1250            1255                1260

Ala Thr Gly Gly Gly Ala Ala Ala Thr Ala Gly Thr Ala Ala
    1265            1270                1275

Ala Gly Ala Ala Thr Ala Thr Thr Thr Cys Ala Thr Gly Cys Ala
    1280            1285                1290

Ala Ala Ala Ala Ala Ala Ala Ala Ala Ala Ala Ala Ala Ala
    1295            1300                1305

Ala Ala Ala
    1310

<210> SEQ ID NO 35
<211> LENGTH: 606
<212> TYPE: PRT
<213> ORGANISM: Citrus limon

<400> SEQUENCE: 35

Met Ser Ser Cys Ile Asn Pro Ser Thr Leu Val Thr Ser Val Asn Ala
1               5                   10                  15

Phe Lys Cys Leu Pro Leu Ala Thr Asn Lys Ala Ala Ile Arg Ile Met
            20                  25                  30

Ala Lys Tyr Lys Pro Val Gln Cys Leu Ile Ser Ala Lys Tyr Asp Asn
        35                  40                  45

Leu Thr Val Asp Arg Arg Ser Ala Asn Tyr Gln Pro Ser Ile Trp Asp
    50                  55                  60

His Asp Phe Leu Gln Ser Leu Asn Ser Asn Tyr Thr Asp Glu Ala Tyr
65                  70                  75                  80

Lys Arg Arg Ala Glu Glu Leu Arg Gly Lys Val Lys Ile Ala Ile Lys
                85                  90                  95

Asp Val Ile Glu Pro Leu Asp Gln Leu Glu Leu Ile Asp Asn Leu Gln
            100                 105                 110

Arg Leu Gly Leu Ala His Arg Phe Glu Thr Glu Ile Arg Asn Ile Leu
        115                 120                 125

Asn Asn Ile Tyr Asn Asn Asn Lys Asp Tyr Asn Trp Arg Lys Glu Asn
    130                 135                 140

Leu Tyr Ala Thr Ser Leu Glu Phe Arg Leu Leu Arg Gln His Gly Tyr
145                 150                 155                 160

Pro Val Ser Gln Glu Val Phe Asn Gly Phe Lys Asp Asp Gln Gly Gly
                165                 170                 175

Phe Ile Cys Asp Asp Phe Lys Gly Ile Leu Ser Leu His Glu Ala Ser
            180                 185                 190

Tyr Tyr Ser Leu Glu Gly Glu Ser Ile Met Glu Glu Ala Trp Gln Phe
        195                 200                 205

Thr Ser Lys His Leu Lys Glu Val Met Ile Ser Lys Asn Met Glu Glu
    210                 215                 220

Asp Val Phe Val Ala Glu Gln Ala Lys Arg Ala Leu Glu Leu Pro Leu
225                 230                 235                 240

His Trp Lys Val Pro Met Leu Glu Ala Arg Trp Phe Ile His Ile Tyr
                245                 250                 255

Glu Arg Arg Glu Asp Lys Asn His Leu Leu Glu Leu Ala Lys Met
            260                 265                 270

Glu Phe Asn Thr Leu Gln Ala Ile Tyr Gln Glu Glu Leu Lys Glu Ile
        275                 280                 285

Ser Gly Trp Trp Lys Asp Thr Gly Leu Gly Glu Lys Leu Ser Phe Ala
    290                 295                 300
```

```
Arg Asn Arg Leu Val Ala Ser Phe Leu Trp Ser Met Gly Ile Ala Phe
305                 310                 315                 320

Glu Pro Gln Phe Ala Tyr Cys Arg Arg Val Leu Thr Ile Ser Ile Ala
            325                 330                 335

Leu Ile Thr Val Ile Asp Asp Ile Tyr Asp Val Tyr Gly Thr Leu Asp
        340                 345                 350

Glu Leu Glu Ile Phe Thr Asp Ala Val Glu Arg Trp Asp Ile Asn Tyr
    355                 360                 365

Ala Leu Lys His Leu Pro Gly Tyr Met Lys Met Cys Phe Leu Ala Leu
370                 375                 380

Tyr Asn Phe Val Asn Glu Phe Ala Tyr Tyr Val Leu Lys Gln Gln Asp
385                 390                 395                 400

Phe Asp Leu Leu Leu Ser Ile Lys Asn Ala Trp Leu Gly Leu Ile Gln
            405                 410                 415

Ala Tyr Leu Val Glu Ala Lys Trp Tyr His Ser Lys Tyr Thr Pro Lys
        420                 425                 430

Leu Glu Glu Tyr Leu Glu Asn Gly Leu Val Ser Ile Thr Gly Pro Leu
    435                 440                 445

Ile Ile Thr Ile Ser Tyr Leu Ser Gly Thr Asn Pro Ile Ile Lys Lys
450                 455                 460

Glu Leu Glu Phe Leu Glu Ser Asn Pro Asp Ile Val His Trp Ser Ser
465                 470                 475                 480

Lys Ile Phe Arg Leu Gln Asp Asp Leu Gly Thr Ser Ser Asp Glu Ile
            485                 490                 495

Gln Arg Gly Asp Val Pro Lys Ser Ile Gln Cys Tyr Met His Glu Thr
        500                 505                 510

Gly Ala Ser Glu Glu Val Ala Arg Gln His Ile Lys Asp Met Met Arg
    515                 520                 525

Gln Met Trp Lys Lys Val Asn Ala Tyr Thr Ala Asp Lys Asp Ser Pro
530                 535                 540

Leu Thr Gly Thr Thr Thr Glu Phe Leu Leu Asn Leu Val Arg Met Ser
545                 550                 555                 560

His Phe Met Tyr Leu His Gly Asp Gly His Gly Val Gln Asn Gln Glu
            565                 570                 575

Thr Ile Asp Val Gly Phe Thr Leu Leu Phe Gln Pro Ile Pro Leu Glu
        580                 585                 590

Asp Lys His Met Ala Phe Thr Ala Ser Pro Gly Thr Lys Gly
    595                 600                 605

<210> SEQ ID NO 36
<211> LENGTH: 637
<212> TYPE: PRT
<213> ORGANISM: Abies grandis

<400> SEQUENCE: 36

Met Ala Leu Leu Ser Ile Val Ser Leu Gln Val Pro Lys Ser Cys Gly
1               5                   10                  15

Leu Lys Ser Leu Ile Ser Ser Asn Val Gln Lys Ala Leu Cys Ile
            20                  25                  30

Ser Thr Ala Val Pro Thr Leu Arg Met Arg Arg Gln Lys Ala Leu
        35                  40                  45

Val Ile Asn Met Lys Leu Thr Thr Val Ser His Arg Asp Asp Asn Gly
    50                  55                  60

Gly Gly Val Leu Gln Arg Arg Ile Ala Asp His His Pro Asn Leu Trp
```

```
                65                  70                  75                  80
Glu Asp Asp Phe Ile Gln Ser Leu Ser Ser Pro Tyr Gly Gly Ser Ser
                    85                  90                  95

Tyr Ser Glu Arg Ala Glu Thr Val Val Glu Val Lys Glu Met Phe
                100                 105                 110

Asn Ser Ile Pro Asn Asn Arg Glu Leu Phe Gly Ser Gln Asn Asp Leu
                    115                 120                 125

Leu Thr Arg Leu Trp Met Val Asp Ser Ile Glu Arg Leu Gly Ile Asp
            130                 135                 140

Arg His Phe Gln Asn Glu Ile Arg Val Ala Leu Asp Tyr Val Tyr Ser
145                 150                 155                 160

Tyr Trp Lys Glu Lys Glu Gly Ile Gly Cys Gly Arg Asp Ser Thr Phe
                    165                 170                 175

Pro Asp Leu Asn Ser Thr Ala Leu Ala Leu Arg Thr Leu Arg Leu His
                180                 185                 190

Gly Tyr Asn Val Ser Ser Asp Val Leu Glu Tyr Phe Lys Asp Glu Lys
            195                 200                 205

Gly His Phe Ala Cys Pro Ala Ile Leu Thr Glu Gly Gln Ile Thr Arg
        210                 215                 220

Ser Val Leu Asn Leu Tyr Arg Ala Ser Leu Val Ala Phe Pro Gly Glu
225                 230                 235                 240

Lys Val Met Glu Glu Ala Glu Ile Phe Ser Ala Ser Tyr Leu Lys Lys
                245                 250                 255

Val Leu Gln Lys Ile Pro Val Ser Asn Leu Ser Gly Glu Ile Glu Tyr
                260                 265                 270

Val Leu Glu Tyr Gly Trp His Thr Asn Leu Pro Arg Leu Glu Ala Arg
            275                 280                 285

Asn Tyr Ile Glu Val Tyr Glu Gln Ser Gly Tyr Glu Ser Leu Asn Glu
            290                 295                 300

Met Pro Tyr Met Asn Met Lys Lys Leu Leu Gln Leu Ala Lys Leu Glu
305                 310                 315                 320

Phe Asn Ile Phe His Ser Leu Gln Leu Arg Glu Leu Gln Ser Ile Ser
                325                 330                 335

Arg Trp Trp Lys Glu Ser Gly Ser Ser Gln Leu Thr Phe Thr Arg His
                340                 345                 350

Arg His Val Glu Tyr Tyr Thr Met Ala Ser Cys Ile Ser Met Leu Pro
            355                 360                 365

Lys His Ser Ala Phe Arg Met Glu Phe Val Lys Val Cys His Leu Val
        370                 375                 380

Thr Val Leu Asp Asp Ile Tyr Asp Thr Phe Gly Thr Met Asn Glu Leu
385                 390                 395                 400

Gln Leu Phe Thr Asp Ala Ile Lys Arg Trp Asp Leu Ser Thr Thr Arg
                405                 410                 415

Trp Leu Pro Glu Tyr Met Lys Gly Val Tyr Met Asp Leu Tyr Gln Cys
                420                 425                 430

Ile Asn Glu Met Val Glu Glu Ala Glu Lys Thr Gln Gly Arg Asp Met
            435                 440                 445

Leu Asn Tyr Ile Gln Asn Ala Trp Glu Ala Leu Phe Asp Thr Phe Met
            450                 455                 460

Gln Glu Ala Lys Trp Ile Ser Ser Ser Tyr Leu Pro Thr Phe Glu Glu
465                 470                 475                 480

Tyr Leu Lys Asn Ala Lys Val Ser Ser Gly Ser Arg Ile Ala Thr Leu
                485                 490                 495
```

```
Gln Pro Ile Leu Thr Leu Asp Val Pro Leu Pro Asp Tyr Ile Leu Gln
            500                 505                 510
Glu Ile Asp Tyr Pro Ser Arg Phe Asn Glu Leu Ala Ser Ser Ile Leu
        515                 520                 525
Arg Leu Arg Gly Asp Thr Arg Cys Tyr Lys Ala Asp Arg Ala Arg Gly
    530                 535                 540
Glu Glu Ala Ser Ala Ile Ser Cys Tyr Met Lys Asp His Pro Gly Ser
545                 550                 555                 560
Ile Glu Glu Asp Ala Leu Asn His Ile Asn Ala Met Ile Ser Asp Ala
                565                 570                 575
Ile Arg Glu Leu Asn Trp Glu Leu Leu Arg Pro Asp Ser Lys Ser Pro
            580                 585                 590
Ile Ser Ser Lys Lys His Ala Phe Asp Ile Thr Arg Ala Phe His His
        595                 600                 605
Val Tyr Lys Tyr Arg Asp Gly Tyr Thr Val Ser Asn Asn Glu Thr Lys
    610                 615                 620
Asn Leu Val Met Lys Thr Val Leu Glu Pro Leu Ala Leu
625                 630                 635
```

<210> SEQ ID NO 37
<211> LENGTH: 63
<212> TYPE: DNA
<213> ORGANISM: Artificial Sequence
<220> FEATURE:
<223> OTHER INFORMATION: synthetic - 2A peptide

<400> SEQUENCE: 37

```
ggatctggcg aaggcagagg ctctctgctg acatgtggcg acgtggaaga gaaccctgga    60
cct                                                                  63
```

<210> SEQ ID NO 38
<211> LENGTH: 930
<212> TYPE: DNA
<213> ORGANISM: Artificial Sequence
<220> FEATURE:
<223> OTHER INFORMATION: synthetic - codon optimized

<400> SEQUENCE: 38

```
atggtcaaca ccccagcct gctgaatcac gccgtggaaa caatggccgt gggcagcaag     60
tctttcgcca ccgcctctaa gctgttcgac gccaagacta gacgcagcgt gctgatgctg    120
tacgcctggt gcagacactg cgacgacgtg atcgacgatc agaccctggg attccaggcc    180
agacagcctg ctctgcagac ccctgaacag aggctgatgc agctggaaat gaagaccagg    240
caggcctacg ccggctctca gatgcacgaa cctgctttcg ccgccttcca agaggtggcc    300
atggctcacg atatcgcccc tgcctacgcc ttcgatcacc tggaaggatt cgccatggat    360
gtgcgcgagg cccagtacag ccagctggat gataccctga ggtactgcta tcacgtggcc    420
ggcgttgtgg gactgatgat ggctcagatc atgggcgtgc cgacaacgc cacactggac    480 agagcttgtg atctcggcct ggccttccag ctgaccaata tcgccagaga catcgtggac    540
gatgcccacg ccggcagatg ttatctgcct gcctcttggc tggaacacga gggcctgaac    600
aaagagaact acgccgctcc tgagaacaga caggccctga gcagaatcgc tagaaggctg    660
gtgcaagagg ccgagcctta ctacctgtct gccacagctg gactggcagg actgcctctg    720
agatctgcct gggccattgc cacagccaaa caggtgtaca gaaagatcgg cgtgaaggtg    780
gaacaggccg acagcaggc ttgggaccag agacagtcta ccaccacacc tgagaagctg    840
```

```
accctgctgc tggctgcttc tggacaggct ctgaccagca ggatgagagc ccatcctcct      900
agacctgctc acctctggca aagacctctc                                       930
```

<210> SEQ ID NO 39
<211> LENGTH: 1476
<212> TYPE: DNA
<213> ORGANISM: Artificial Sequence
<220> FEATURE:
<223> OTHER INFORMATION: synthetic - codon optimized

<400> SEQUENCE: 39

```
atgaagccca ccacagtgat cggagccggc tttggaggac tggccctggc tattagactg       60
caggctgctg aatcccccgt gctgctgctc aacagagag ataagcctgg cggcagggcc       120
tacgtgtacg aggatcaggg cttcaccttc gacgccggac ctaccgtgat cacagatcct      180
agcgccatcg aggaactgtt cgccctggct ggcaagcagc tgaaagagta cgtcgagctg      240
ctgcccgtga cacccttcta cagactgtgt gggagagcg caaggtgtt caactacgac       300 aacgaccaga ccaggctgga agcccagatc cagcagttca accctagaga tgtggaaggc      360
tacaggcagt cctggactaa cagcagggcc gtgttcaaag agggctacct gaagctggga      420
accgtgcctt tcctgagctt cagggacatg ctgagagccg ctcctcagct ggccaaactc      480
caggcttgga gaagcgtgta cagcaaggtg gccagctaca tcgaggacga gcacctgaga      540
caggccttca gcttccactc tctgctcgtc ggcggcaacc ctttcgccac ctcttctatc      600
tacaccctga ttcacgccct ggaacgcgag tggggagtgt ggtttcctag aggtggaaca      660
ggcgctctgg tgcagggcat gatcaagctg ttccaggatc tcggcggaga ggtggtgctg      720
aacgctagag tgtcccacat ggaaaccacc ggcaacaaga tcgaggccgt gcatctggaa      780
gatggcagaa gattcctgac acaggccgtg gcctctaacg ccgatgtggt gcacacctac      840
agggacctgc tgtctcagca tcctgccgcc gtgaagcaga gcaacaagct gcagaccaag      900
aggatgagca acagcctgtt cgtgctgtac ttcggcctga ccaccacca cgatcagctg      960 gctcaccaca ccgtgtgttt cggcccaga tacagagagc tgatcgacga gatcttcaac     1020
cacgacggcc tggccgagga cttctctctg tacctgcatg ccccttgcgt gaccgacagt     1080
tctctggccc tgaaggctg cggctcttac tatgtgctgg ctcctgtgcc tcacctgggc     1140
accgctaatc tggattggac cgtggaaggc cccaagctga gggacagaat cttcgcctac     1200
ctcgaacagc actacatgcc cggcctgaga agccagctgg tcacccacag aatgttcacc     1260
cctttcgact ccgcgacca gctgaacgcc tatcacggct ctgccttcag cgtggaacct     1320
gtgctgactc agtccgcctg gttcagaccc acaacaggg acaagaccat caccaacctg     1380
tacctcgttg cgccggaac acatcctggt gctggtattc aggcgtgat cggatctgcc     1440 aaagccaccg ctggactgat gctcgaggat ctgatt                              1476
```

<210> SEQ ID NO 40
<211> LENGTH: 1146
<212> TYPE: DNA
<213> ORGANISM: Artificial Sequence
<220> FEATURE:
<223> OTHER INFORMATION: synthetic - codon optimized

<400> SEQUENCE: 40

```
atgcagcccc actacgatct gattctcgtc ggagccggac tggccaatgg actgattgct       60
ctgagactcc agcagcagca acccgacatg aggatcctgc tgatcgatgc cgctcctcag     120
```

-continued

```
gctggcggaa atcacacctg gtctttccac cacgacgacc tgaccgagag ccagcacaga    180
tggattgctc ctctggtggt gcatcactgg cccgactacc aagtgcgctt tcccaccaga    240
aggcgcaagc tgaacagcgg ctacttctgc atcaccagcc agagattcgc cgaggtgctg    300
cagagacagt tcggacctca cctgtggatg gataccgccg tggccgaagt gaatgccgag    360
tctgtgcgcc tgaagaaagg ccaagtgatc ggagccagag ccgtgatcga tggcagagga    420
tacgccgcca attctgccct gtctgtggga ttccaggcct tcatcggaca agagtggcgc    480
ctgtctcacc ctcacggact gtctagcccc atcatcatgg acgccaccgt ggatcagcag    540
aacggctaca gattcgtgta cagcctgcct ctgagcccca ccaggctgct gattgaggac    600
acccactaca tcgacaacgc cacactggac cctgagtgcg ccagacagaa catctgcgat    660
tacgccgctc agcaaggctg gcagctgcag acactgctga gagaagaaca gggcgctctg    720
cccatcacac tgtctggaaa cgccgatgcc ttctggcagc aaagacctct ggcctgttct    780
ggcctgagag ccggcctgtt tcacccaaca accggatact ctctgcctct ggctgtggcc    840
gtggctgata gactgtctgc cctggacgtg ttcaccagcg cctctatcca ccacgccatc    900
acacacttcg ccagagagag atggcagcag cagggcttct tcaggatgct gaacagaatg    960
ctgttcctgg ccggaccagc cgactctcgt tggagagtca tgcagaggtt ctacggcctg   1020
cctgaggacc tgatcgccag attctacgcc ggaaagctga ccctgaccga caggctgaga   1080
atcctgtctg gcaagcctcc tgtgccagtg ctggctgctc tgcaggccat catgaccaca   1140
cacaga                                                              1146
```

CULTURED MEAT PRODUCT WITH GENETICALLY MODIFIED CELLS

CROSS-REFERENCE TO RELATED APPLICATIONS

This application represents the U.S. national stage entry of International Application No. PCT/US2020/035526, filed Jun. 1, 2020, which claims priority to U.S. Provisional Application No. 62/855,698, filed May 31, 2019, and U.S. Provisional Application No. 62/861,606, filed Jun. 14, 2019, each of which is incorporated herein by reference in its entirety.

STATEMENT REGARDING FEDERALLY SPONSORED RESEARCH

This invention was made with government support under grant EB002520 awarded by the National Institutes of Health. The government has certain rights in the invention.

REFERENCE TO A SEQUENCE LISTING SUBMITTED VIA EFS-WEB

The content of the ASCII text file of the sequence listing named "166118_00970_ST25.txt" which is 114 kb in size was created on Jun. 1, 2020 and electronically submitted via EFS-Web herewith the application is incorporated herein by reference in its entirety.

BACKGROUND

Synthetic biology and metabolic engineering have become major tools across numerous disciplines (Keasling, 2010). However, broad use in mammalian systems has been slow to develop, and progress within these systems has been largely isolated to applications such as therapeutic protein production (e.g., monoclonal antibodies) or the study and treatment of disease (e.g., metabolic reprogramming) (Davy et al., 2017; Schukur and Fussenegger, 2016). In these efforts, apart from genetic tools such as viral or bacterial editing or regulatory systems, little attention has been given to heterologous engineering of mammalian cells using genes from other taxa (i.e., bacteria or plants) (Mojica and Montoliu, 2016; Zhang et al., 2006). In contrast, metabolic engineering efforts in bacteria, yeasts or plants have exploited diverse taxonomic transgenes for applications from medicine and cosmetics to energy and agriculture (Heider and Wendisch, 2015; Nielsen, 2015; Sack et al., 2015). Recent advances in tissue engineering have expanded our perspective about possible applications of animal cell culture to food and nutrition, robotics, and biosensors (Banerjee and Bhunia, 2009; Rubio et al., 2019). This shift provides the opportunity to revisit mammalian metabolic engineering and expand efforts to include cross-taxa engineering for broad applications.

One such application is the production of meat through cell culture (known by various terms—this paper will use "cultured meat"), which has been proposed as a means of addressing the environmental, ethical, and public-health concerns of animal agriculture (Mattick et al., 2015; Post, 2012).

SUMMARY OF THE INVENTION

In a first aspect, provided herein is an engineered cell that endogenously synthesizes phytoene and comprises a heterologous polynucleotide encoding phytoene synthase. In some embodiments, the phytoene synthase has a sequence at least 90% identical to SEQ ID NO:1 or SEQ ID NO:_. In some embodiments, the cell endogenously synthesizes lycopene and comprises a heterologous polynucleotide encoding phytoene desaturase. In some embodiments, the phytoene desaturase has a sequence at least 90% identical to SEQ ID NO:3. In some embodiments, the cell endogenously synthesizes β-carotene and comprises a heterologous polynucleotide encoding lycopene cyclase. In some embodiments, the lycopene cyclase has a sequence at least 90% identical to SEQ ID NO:5 or SEQ ID NO:_. In some embodiments, the cell is a mammalian cell. In some embodiments, cell is a Pax7+ mammalian muscle precursor cell. In some embodiments, the cell is an Actin+ myosin heavy chain (MHC)+ mammalian multinucleated myotube. In some embodiments, total carotenoid production in the engineered cell is at least 5 times greater than total carotenoid production in said cell without the heterologous polynucleotides encoding phytoene synthase, phytoene desaturase, and lycopene cyclase.

In a second aspect, provided herein is a method of making an engineered cell as described herein, comprising introducing in a cell that natively synthesizes geranylgeranyl pyrophosphate (i) a heterologous polynucleotide encoding phytoene synthase; (ii) a heterologous polynucleotide encoding phytoene desaturase; (iii) a heterologous polynucleotide encoding lycopene cyclase; or (iv) a combination thereof. In some embodiments, the cell is a Pax7+ mammalian muscle precursor cell.

In a third aspect, provided herein is an engineered cell that endogenously synthesizes Vitamin C and comprises one or more exogenous polynucleotides encoding UDP-glucose 6-dehydrogenase (UGDH), UDP glucuronosyltransferase 1 (UGT1A1), aldo-keto reductase family 1 (AKR1A1), regucalcin (RGN), and L-gulono-gamma-lactone oxidase (GULO).

In a forth aspect, provided herein is an engineered cell that endogenously synthesizes curcumin and comprises one or more heterologous polynucleotides encoding tyrosine ammonia-lyase (PTAL), 4-coumarate-CoA ligase (4CL), phenylpropanoyl-diketide-CoA synthase (DCS) and curcumin synthase (CURS3).

In a fifth aspect, provided herein is an engineered cell that endogenously synthesizes cannabidiol (CBD) and comprises one or more heterologous polynucleotides encoding 3,5,7-trioxododecanoyl-CoA synthase (OLS), olivetolic acid cyclase (OAC), cannabigerolic acid synthase (CBGAS), and cannabidiolic acid synthase (CBDAS).

In a sixth aspect, provided herein is an engineered cell comprising a heterologous polynucleotide that encodes nanobody V565 having a sequence at least 95% identical to SEQ ID NO:7. In some embodiments, the polynucleotide encodes the V565 nanobody that is covalently linked to tumor necrosis factor α (TNFα) by a cleavable polypeptide linker. In some embodiments, the cleavable polypeptide linker comprises SEQ ID NO:9.

In a seventh aspect, provided herein is an engineered cell comprising a heterologous polynucleotide encoding antimicrobial peptide 16 (AMP16) having a sequence at least 95% identical to SEQ ID NO:8. In some embodiments, the polynucleotide encodes at least 2, at least 3, at least 4, at least 5, at least 6, at least 7, at least 8, at least 9, or at least 10 repeats of AMP16 each separated by a linker polypeptide comprising Asn-Pro-Val repeats.

In an eight aspect, provided herein is a cultured meat product comprising a confluent serum-free culture comprising the an engineered cell as described herein seeded on a food safe substrate. In some embodiments, the substrate is a film. In some embodiments, the substrate is a sponge or three-dimensional matrix. In some embodiments, the substrate is a chitosan substrate. In some embodiments, the cell culture comprises multinucleated myotubes derived from Pax7+ mammalian satellite cells. In some embodiments, the multinucleated myotubes express myosin heavy chain (MHC) and actin.

BRIEF DESCRIPTION OF DRAWINGS

The patent or patent application file contains at least one drawing in color. Copies of this patent or patent application publication with color drawings will be provided by the Office upon request and payment of the necessary fee.

(FIG. 2A) Immunofluorescent staining for Pax7 (green), a transcription factor and satellite cell marker, along with counter-stains for cellular actin (Phalloidin, re(D) and nuclei (DAPI, blue). (FIG. 2B) Immunofluorescent staining for myosin heavy chain (MF20, green), a contractile protein of skeletal muscle, along with counter-stains for cellular actin and nuclei. High-objective staining of differentiated cells reveals striated patterns in both actin and myosin heavy chain, indicating skeletal muscle sarcomere formation. Scale bars are 100 µm.

(FIG. 3A) Fluorescence image of GFP expression in C2C12s and BSCs engineered with all four constructs (carotenoid-producing and control). GFP expression implies successful expression of other enzymes in gene constructs, due to the structure of the constructs. (FIG. 3B) Growth curves C2C12s and BSCs engineered with all four constructs over eight days n=3 distinct samples, * indicates significant difference from pGFP for the corresponding color, p<0.05. (FIG. 3C) Immunofluorescent staining for Pax7 (re(D) and Myosin Heavy Chain (re(D) in pCrtB/I/Y BSCs before (top) and after (bottom) differentiation. Counterstains for DAPI (blue) show nuclei, and endogenous GFP (green) show cell morphology. Scale bars are 100 µm.

(FIG. 4A) Carotenoid production in C2C12s engineered with pCrtB, pCrtB/I, and pCrtB/I/Y. In pCrtB cells, only phytoene is produced. In pCrtB/I cells, most of the phytoene is converted to lycopene. In pCrtB/I/Y cells, carotenoids accumulate in β-carotene, though total carotenoid levels are notably reduced compared to pCrtB and pCrtB/I. n=3 distinct samples; different letters indicate statistical differences between bars, p<0.05 (FIG. 4B) Carotenoid production in BSCs engineered with pCrtB, pCrtB/I, and pCrtB/I/Y. Trends follow those of C2C12s, with a ~10-fold reduction in total carotenoid content in all cases compared with C2C12s. n=3 distinct samples; different letters indicate statistical differences between bars, p<0.05. Carotenoid data is provided as µg/g protein. Individual values and data for comparing carotenoids to protein are given in FIGS. 4C-4D.

(FIG. 4C) C2C12 carotenoid and protein quantification per million cells for all cell types and treatments. Trends are the same as in FIG. 4 and FIG. 5. (FIG. 4D) BSC carotenoid and protein quantification per million cells for all cell types and treatments. Trends are the same as in FIG. 4A-4B and FIGS. 5A-5C. For all, n=3 distinct samples. Within plots, different letters indicate statistical differences between bars, p<0.05).

FIGS. 5A-5C show carotenoid optimization. (FIG. 5A) the carotenoid biosynthesis pathway in its context as a shared pathway for precursors in cholesterol synthesis. The possible mechanisms for optimization are shown. Puromycin (purple) acts by selecting cells that offer higher enzyme expression, and therefore increased flux in carotenoid synthesis. Ketoconazole (re(D) acts by inhibiting the conversion of lanosterol to zymosterol, increasing carotenoid precursor farnesyl pyrophosphate (FPP) levels by either causing the upstream accumulation of lanosterol, squalene, and FPP, or by reducing cholesterol's impact as a feedback inhibitor of upstream FPP synthesis reactions. (FIG. 5B) Cell pellet images of engineered BSCs. The color effect of carotenoids can be seen, with pGFP cells slightly green, pCrtB containing no pigment, and pCrtB/I and pCrtB/Y cells containing some orange pigment. Optimized pCrtB/I/Y cells are notably more orange, indicating an increase in carotenoid levels. (FIG. 5C) Quantitative HPLC of β-carotene in optimized cells. In BSCs, ketoconazole and puromycin conditioning offer an additive increase in β-carotene. In C2C12s, ketoconazole and puromycin together do not significantly increase β-carotene. n=3 distinct samples; * p<0.05. Carotenoid data is provided as µg/g protein. Individual values and data for comparing carotenoids to protein are given in FIGS. 4C-4D.

(FIG. 7A) Flow cytometry measurements for mean fluorescent intensity in C2C12s and BSCs engineered with pCrtB/I/Y (full flow cytometry data in FIGS. 8A_8B). Cells were cultured with 2.5 ug/mL puromycin (1×), 5 ug/mL puromycin (2×) or 10 ug/mL puromycin (4×). Higher fluorescence intensity indicates higher average GFP expression, which corresponds to higher average enzyme expression. Errors given in standard error of the mean. n>1,500 events for each condition. (FIG. 7B) 8-day cell growth for pCrtB/I/Y C2C12s and BSCs cultured in 0, 2.5, 5, 10, or 20 ug/mL ketoconazole. n=3 distinct samples. In both a & b, * indicates p<0.05.

(FIG. 8A) BSC data for cells treated with different levels of puromycin. From left to right: non-engineered cells (GFP negative control), pGFP (GFP positive control), pCrtB/I/Y with 2.5 µg/mL puromycin (1× puro), pCrtB/I/Y with 5 µg/mL puromycin (2× puro), and pCrtB/I/Y with 10 µg/mL puromycin (4×). Top row is forward scattering (FSC) & side scattering (SSC) data, showing gating for live cells (determined using non-engineered controls), where gate value is a percent of total counts (7,500). Bottom row is GFP data, showing gating for GFP-positive cells (determined using non-engineered controls), where gate value is a percent of live cells (gated in top row). (FIG. 8B) C2C12 data for cells treated with different levels of puromycin. From left to right: non-engineered cells (GFP negative control), pGFP (GFP positive control), pCrtB/I/Y with 2.5 µg/mL puromycin (1× puro), pCrtB/I/Y with 5 µg/mL puromycin (2× puro), and pCrtB/I/Y with 10 µg/mL puromycin (4×). Top row is FSC & SSC data, showing gating for live cells (determined using non-engineered controls), where gate value is a percent of total counts (7,500). Bottom row is GFP data, showing gating for GFP-positive cells (determined using non-engineered controls), where gate value is a percent of live cells (gated in top row).

(FIG. 9A) phytoene, lycopene, and β-carotene content of pCrtB/I/Y C2C12s without optimization (top) or with puromycin conditioning and ketoconazole treatment (bottom). n=3 distinct samples. (FIG. 9B) phytoene, lycopene, and β-carotene content of pCrtB/I/Y BSCs without optimization (top left), without puromycin conditioning but with ketoconazole (top right), with puromycin conditioning by without ketoconazole (bottom left), or with puromycin conditioning and ketoconazole treatment (bottom left). n=3 distinct samples. Within plots, different letters indicate statistical differences between bars, $p<0.05$).

(FIG. 13A) Characterization of primary BSCs. Proliferative cells show ubiquitous expression of Pax7, a muscle stem cell marker (scalebar: 100 µm). (FIG. 13B) Differentiated cells show myotube formation and expression of Myosin Heavy Chain (MF20), indicating myogenic differentiation (scale bars are 100 um). (FIG. 13C) Four-day growth of BSCs cultured in dilutions of serum-containing growth media (GM) and serum-free media (B8). Dilutions containing B8 show significantly improved growth over four days compared to GM alone (far left column) in all cases, including B8 alone (i.e., serum-free, far right column). Different letters indicate statistical significance between groups ($p<0.05$). (FIG. 13D) Adipogenic transdifferentiation of BSCs with free fatty acids (FFAs). Oil Red O staining of BSCs treated with 0 to 150 uM of linoleic acid and a combination of linoleic, erucic, and elaidid acid. Sparse lipid accumulation was observed in BSCs treated with 100 uM to 150 uM of linoleic acid. Robust lipid accumulation was observed in BSC treated with 75 uM to 125 uM of the combined FFAs. At 150 uM the FFA cocktail is detrimental to cell health (scalebar: 250 µm). (FIG. 13E) AdipoRed assay results for quantitative analysis of FFA-induced lipid accumulation in the BSCs.

(FIG. 14A) Carotenoid production in BSCs engineered with pCrtB, pCrtB/I, and pCrtB/I/Y. In pCrtB cells, only phytoene is produced. In pCrtB/I cells, most of the phytoene is converted to lycopene. In pCrtB/I/Y cells, carotenoids accumulate in β-carotene, though total carotenoid levels are notably reduced compared to pCrtB and pCrtB/I. Different letters indicate statistical differences between bars, $p<0.05$. (FIG. 14B) In BSCs, ketoconazole and puromycin conditioning offer an additive increase in β-carotene by increasing enzyme. * indicates significance ($p<0.05$). (FIG. 14C) Thiobarbituric acid reactive substances (TBARS) assay for engineered BSCs with or without heating. All heated samples offer a significant increase in Malondialdehyde (MDA) compared with raw samples, indicating significant oxidative challenge from this "cooking" process. In heated samples, pCrtB, pCrtB/I and pCrtB/I/Y cells offer significantly reduced MDA compared with controls. In unheated samples, pCrtB/I and pCrtB/I/Y samples offer a significant reduction in MDA, and pCrtB offers no significant change compared with control pGFP cells. Bars that do share a letter are statistically different ($p<0.05$). (FIG. 14D) Fluorescence and light microscopy images of BSCs engineered to express GFP alone (pGFP) or GFP along with CBD synthesis enzymes (pCBD). Green fluorescence indicates gene expression. Following selection in puromycin, all cells express GFP and enzymes (data not shown) (scalebar: 250 um).

FIGS. 15A-15D show an intestinal scaffold.[57]. (FIGS. 15A-15B) Schematics for generating 3D porous silk-based scaffolds for building patterned and non-patterned model intestines. Scaffolds were prepared by casting silk solutions in PDMS molds and inserting Teflon-coated wires or nylon screws across the cylinder, lyophilization and inducing β-sheet formation (scalebar: 4 mm). (FIG. 15C) Fluorescent staining for intestinal cell markers (ZO-1 and MUC2) in scaffolds and in 2D culture show increased expression in 3D scaffolds (scalebar: 200 µm). FIG. 15D Light microscopy of toluidine blue staining for mucus deposition in scaffolds and in 2D culture show increased mucus thickness in 3D scaffolds compared to 2D, and in patterned scaffolds compared to non-patterned (scalebar: 200 µm). Quantification (data not shown) reveal 2-fold and 3-fold increases in mucus deposition for non-patterned and patterned scaffolds, respectively, compared with 2D cultures. FIGS. 15E-15 H show IBD modeling[55]. FIG. 15E Inflammation was induced by treatment with *E. coli* O111:B4 LPS and IFNγ. Staining for e-cadherin in inflammation models show differences in epithelial coverages between inflamed versus uninflamed groups at day 7 (scalebar: 100 µm). F) MUC2 staining shows positive staining on all groups indicating presence of goblet cells (scalebar: 100 µm). FIG. 15G Transverse sections of models at day 7 show variable epithelial coverages as seen by the e-cadherin (scalebar 1 mm). FIG. 15H A closer look at the epithelia shows monolayers for uninflamed groups and ball like structures in inflamed groups (scalebar: 100 µm).

FIG. 15I Uninfected cells showing organized microvilli (scalebar: 2 µm). FIG. 15J *C. parvum* type I meronts (thick arrows) and empty parasitophorous vacuoles (thin arrows) on day 3 (scalebar: 2 µm). FIG. 15K type I meronts containing eight merozoites on day 3 (enlargement of J; scalebar: 1 µm)). FIG. 15L a type I meront excysting on day 2 (scalebar: 1 µm). Figure adapted from the following references: A-D[57], E-H[55], I-L[56].

(FIG. 16A) Characterization of primary BSCs. Proliferative cells (left image) show ubiquitous expression of Pax7, a muscle stem cell marker. Differentiated cells (right image) show myotube formation and expression of Myosin Heavy Chain (MF20), indicating myogenic differentiation. (FIG. 16B) BSCs cultured in dilutions of serum-containing growth media (GM) and serum-free media (B8) (left plot). Dilutions containing B8 show significantly improved growth over four days compared to GM alone (far left column) in all cases, including B8 alone (i.e., serum-free, far right column). FGF-2 dilutions within B8 media (right plot) reveal that FGF-2 concentrations greater than or equal to 1.25 ng/mL show significantly improved growth over four days compared to B8 media that is free of FGF-2. In the left plot, different letters indicate statistical significance between groups ($p<0.05$). In the right plot, * indicates significant difference ($p<0.05$).

(FIG. 17A) Oil Red O staining of BSCs treated with 0 to 150 uM of linoleic acid and a combination of linoleic, erucic, and elaidid acid. Sparse lipid accumulation was observed in BSCs treated with 100 uM to 150 uM of linoleic acid. Robust lipid accumulation was observed in BSC treated with 75 uM to 125 uM of the combined FFAs. At 150 uM the FFA cocktail is detrimental to cell health. (FIG. 17B) AdipoRed assay results for quantitative analysis of FFA-induced lipid accumulation in the BSCs.

INCORPORATION BY REFERENCE

Figure 1:
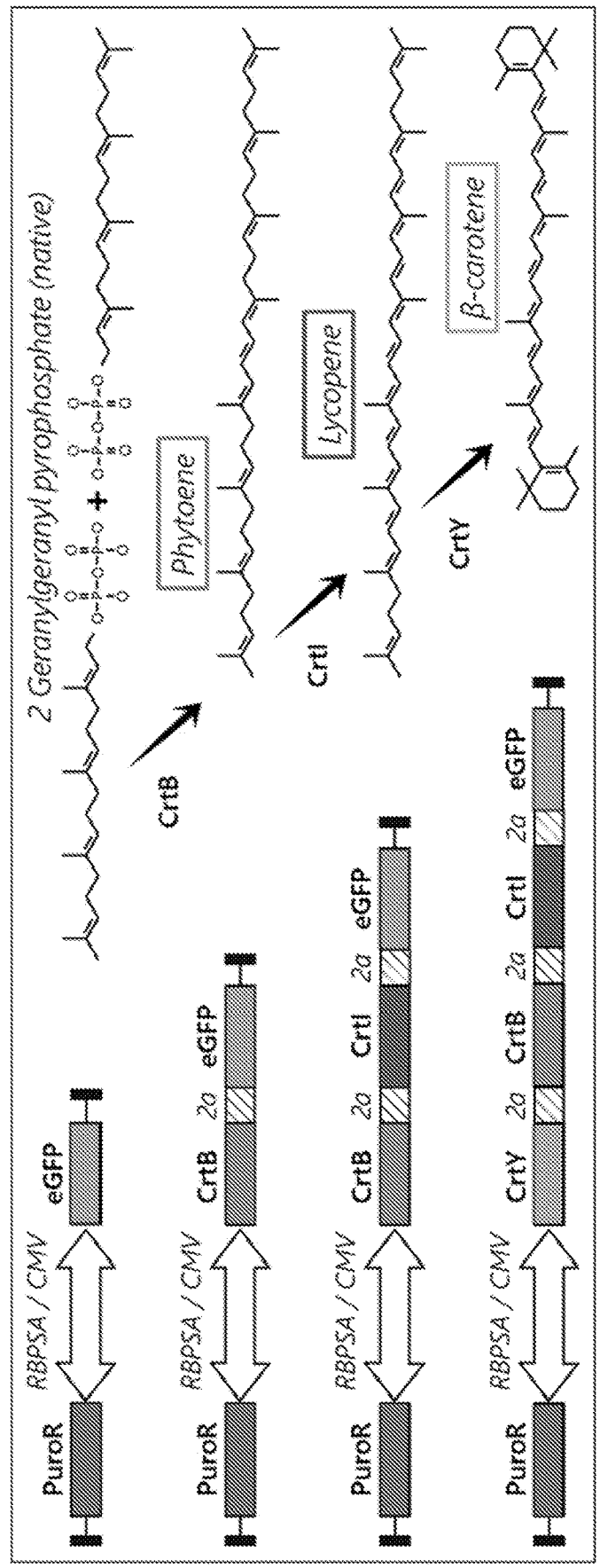
FIG. 1 shows gene constructs and their corresponding terminal product in the carotenoid biosynthesis pathway. All gene constructs contain a puromycin resistance gene and genes of interest simultaneously promoted by a bi-direction synthetic RBPSA/CMV promoter. All gene of interest regions contain a green fluorescent protein (GFP) sequence produced in isolation or as part of a multi-cistronic mRNA transcript. The constructs are designated (from top to bottom) pGFP, pCrtB, pCrtB/I, and pCrtB/I/Y.

All publications, patents, and patent applications mentioned in this specification are herein incorporated by reference to the same extent as if each individual publication, patent, and patent application was specifically and individually indicated to be incorporated by reference.

DETAILED DESCRIPTION OF THE INVENTION

The present disclosure describes engineered cells and the use thereof in a cultured meat product. Cells may be engineered to endogenously produce one or more metabolites by expressing in the cell one or more exogenous biosynthetic pathway enzymes. Cells may also be engineered to increase or decrease one or more endogenously produced metabolites by increasing or decreasing biosynthetic pathway enzymes native to the cell or by introducing non-native biosynthetic pathway enzymes into the cell to increase endogenous production of native metabolites.

As used herein, "metabolite" refers to a chemical compound that is an intermediate or end product of primary or secondary metabolism in a cell through one or more biosynthetic pathways. Cellular metabolites have various functions in fuel, structure, signaling, stimulatory and inhibitory effects on proteins and enzymes, enzymatic co-factors or co-substrates, defense, and interactions with other organisms or cells (e.g., pigments, odorants, pheromones, quorum sensing, etc.). Metabolites may include, but are not limited to, alcohols, amino acids, nucleotides, antioxidants, organic acids, polyols, and vitamins. Cells described herein may be engineered to endogenously produce one or more metabolites including, but not limited to, phytochemicals, phytonutrients, vitamins, and therapeutic molecules.

As used herein, "phytochemical" refers to a biologically active compound found in and produced by plants that generally play a role in plant growth or defense against competitors, pathogens, or predators. Phytochemical biosynthetic pathways may be primary or secondary metabolic pathways. While phytochemicals can be extracted and isolated from the origin plant, biosynthetic pathways for phytochemical production may be genetically engineered into bacterial, fungal, or other eukaryotic cells or the phytochemical maybe produced synthetically.

"Phytonutrient" refers to phytochemicals that are essential nutrients in a mammalian diet or that have specific biological activities that support mammalian health and wellness. Phytonutrients may include, but are not limited to, polyphenols, terpenoids, resveratrol, flavonoids, isoflavonoids, carotenoids, limonoids, glucosinolates, phytoestrogens, phytosterols, anthocyanins, ω-3 fatty acids, and probiotics. Phytonutrients have specific pharmacological effects such as anti-microbial, anti-oxidant, anti-inflammatory, non-tolorigenic, anti-spasmodic, anti-cancer, anti-aging, hepatoprotective, hypolipidemic, neuroprotective, hypotensive, CNS stimulant, analgesic, UVB-induced carcinogenesis protective, immuno-modulary, and carminative properties. Phytonutrients and they functions in mammalian and human health and wellness are described in the art. See, for example, Gupta et al. ("Phytonutrients as therapeutic agents," J. Complement Integr. Med., 2014, 11(3):151-169), which is incorporated herein by reference.

In general, one or more heterologous and/or exogenous polynucleotides, encoding one or more biosynthetic pathway enzymes necessary to produce the metabolite(s) of interest, are introduced into the mammalian cell to produce a genetically engineered cell that endogenously produces the metabolite(s) of interest. The cell may be engineered to transiently express the required biosynthetic pathway enzymes of interest or the cell may be engineered to stably express the required biosynthetic pathways enzymes of interest. The heterologous polynucleotide encoding the biosynthetic pathway enzyme may be introduced into the cell using any transfection or transduction method known in the art.

As used herein, "polypeptide," "protein," and "peptide" are used interchangeably and refer to the collective primary, secondary, tertiary, quaternary amino acid sequence and structure necessary to give the recited macromolecule it function and properties. As used herein, "enzyme" or "biosynthetic pathway enzyme" are used interchangeably and refer to a protein that catalysis a chemical reaction. The recitation of any particular enzyme either independently or as part of a biosynthetic pathway is understood to include the necessary co-factors, co-enzymes, and metals necessary for the enzyme to properly function.

As used herein, the terms "polynucleotide," "polynucleotide sequence," "nucleic acid" and "nucleic acid sequence" refer to a nucleotide, oligonucleotide, polynucleotide (which terms may be used interchangeably), or any fragment thereof. These phrases also refer to DNA or RNA of natural or synthetic origin (which may be single-stranded or double-stranded and may represent the sense or the antisense strand). The polynucleotides may be cDNA or genomic DNA.

Polynucleotides homologous to the polynucleotides described herein are also provided. Those of skill in the art understand the degeneracy of the genetic code and that a variety of polynucleotides can encode the same polypeptide. In some embodiments, the polynucleotides (i.e., polynucleotides encoding the biosynthetic pathway enzymes to synthesize a metabolite of interest) may be codon-optimized for expression in a particular cell including, without limitation, a mammalian cell, a plant cell, bacterial cell, or fungal cell. In some embodiments, the polynucleotide is codon-optimized for genus or species specific expression, for example, expression in a bovine cell. While examples of particular polynucleotide sequences are disclosed herein any polynucleotide sequences may be used which encode a desired form of the polypeptides described herein. Thus non-naturally occurring sequences may be used. These may be desirable, for example, to enhance expression in heterologous expression systems of polypeptides or proteins. Computer programs for generating degenerate coding sequences are available and can be used for this purpose. Pencil, paper, the genetic code, and a human hand can also be used to generate degenerate coding sequences.

In another aspect of the present invention, constructs are provided. As used herein, the term "construct" refers to recombinant polynucleotides including, without limitation, DNA and RNA, which may be single-stranded or double-stranded and may represent the sense or the antisense strand. Recombinant polynucleotides are polynucleotides formed by laboratory methods that include polynucleotide sequences derived from at least two different natural sources or they may be synthetic. Constructs thus may include new modifications to endogenous genes introduced by, for example, genome editing technologies. Constructs may also include recombinant polynucleotides created using, for example, recombinant DNA methodologies.

The constructs provided herein may be prepared by methods available to those of skill in the art. Notably each of the constructs described herein are recombinant molecules and as such do not occur in nature. Generally, the nomenclature used herein and the laboratory procedures utilized in the present invention include molecular, biochemical, and recombinant DNA techniques that are well known and commonly employed in the art. Standard techniques available to those skilled in the art may be used for cloning, DNA and RNA isolation, amplification and purification. Such techniques are thoroughly explained in the literature.

The constructs provided herein may include a promoter operably linked to any one of the polynucleotides described herein. The promoter may be a heterologous promoter or an endogenous promoter associated with the biosynthetic pathways described herein.

As used herein, the terms "heterologous promoter," "promoter," "promoter region," or "promoter sequence" refer generally to transcriptional regulatory regions of a gene, which may be found at the 5' or 3' side of the polynucleotides described herein, or within the coding region of the polynucleotides, or within introns in the polynucleotides. Typically, a promoter is a DNA regulatory region capable of binding RNA polymerase in a cell and initiating transcription of a downstream (3' direction) coding sequence. The typical 5' promoter sequence is bounded at its 3' terminus by the transcription initiation site and extends upstream (5' direction) to include the minimum number of bases or elements necessary to initiate transcription at levels detectable above background. Within the promoter sequence is a transcription initiation site (conveniently defined by mapping with nuclease Si), as well as protein binding domains (consensus sequences) responsible for the binding of RNA polymerase.

In some embodiments, polynucleotides encoding the biosynthetic pathway enzymes described herein are operably connected to the promoter. As used herein, a polynucleotide is "operably connected" or "operably linked" when it is placed into a functional relationship with a second polynucleotide sequence. For instance, a promoter is operably linked to a polynucleotide if the promoter is connected to the polynucleotide such that it may affect transcription of the polynucleotides. In various embodiments, the polynucleotides may be operably linked to at least 1, at least 2, at least 3, at least 4, at least 5, or at least 10 promoters.

Heterologous promoters useful in the practice of the present invention include, but are not limited to, constitutive, inducible, temporally-regulated, developmentally regulated, chemically regulated, tissue-preferred and tissue-specific promoters. The heterologous promoter may be a plant, animal, bacterial, fungal, or synthetic promoter. Suitable promoters for expression in plants include, without limitation, the 35S promoter of the cauliflower mosaic virus, ubiquitin, tCUP cryptic constitutive promoter, the Rsyn7 promoter, pathogen-inducible promoters, the maize In2-2 promoter, the tobacco PR-1a promoter, glucocorticoid-inducible promoters, estrogen-inducible promoters and tetracycline-inducible and tetracycline-repressible promoters. Other promoters include the T3, T7 and SP6 promoter sequences, which are often used for in vitro transcription of RNA. In mammalian cells, typical promoters include, without limitation, promoters for Rous sarcoma virus (RSV), human immunodeficiency virus (HIV-1), cytomegalovirus (CMV), Dox-inducible promoter (e.g., Tet Response Element (TRE)), ubiquitin C (Ubc), CMV early enhancer/chicken beta actin (CAG), human beta actin, phosphoglycerate kinase 1 (PGK1), SV40 virus, and the like as well as the translational elongation factor EF-1a promoter or ubiquitin promoter. In insect cells, typical promoters include, without limitation, upstream activating sequence (UAS), actin 5c (Ac5), and polyhedrin. In fish cells, typical promoter include, without limitation, *Xenopus laevis* elongation factor 1α promoter (XlEef1a1) and ocean pout antifreeze protein promoter (OP5a) Those of skill in the art are familiar with a wide variety of additional promoters for use in various cell types. In some embodiments, the heterologous promoter includes a plant promoter, either endogenous to the plant host or heterologous.

Vectors including any of the constructs or polynucleotides described herein are provided. The term "vector" is intended to refer to a polynucleotide capable of transporting another polynucleotide to which it has been linked. In some embodiments, the vector may be a "plasmid," which refers to a circular double-stranded DNA loop into which additional DNA segments may be ligated. Certain vectors are capable of autonomous replication in a host cell into which they are introduced (e.g., bacterial vectors having a bacterial origin of replication and episomal mammalian vectors). Other vectors can be integrated into the genome of a host cell upon introduction into the host cell, and thereby are replicated along with the host genome, such as some viral vectors or transposons. By way of example, appropriate vectors for the compositions and methods of this disclosure include episomal vectors, viral vectors (e.g., retrovirus, adenovirus, baculovirus), plasmids, RNA vectors, or linear or circular DNA or RNA molecules which may comprise or consist of a chromosomal, non-chromosomal, semi-synthetic, or synthetic nucleic acid. Large numbers of suitable vectors are known to those of skill in the art and commercially available. In some embodiments, vectors are episomal vectors, which are capable of autonomous replication due to the presence of an origin of replication. Plant mini-chromosomes are also included as vectors. In some embodiments, the vector is a multicistrinic vector including one or more internal ribosomal entry sites (IRES) and/or one or more 2A peptide sequences that allow for coexpression of multiple polynucleotides from a single construct or vector. Vectors may carry genetic elements, such as those that confer resistance to certain drugs or chemicals.

In some embodiments, a construct or vector described herein may include a selectable marker. As used herein, "selectable marker" refers to a genetic element that allows identification and selection of a cell that contains the construct or vector with said genetic element by expression of said genetic element in the cell. In some embodiments, the selectable marker is a polynucleotide encoding fluorescent protein such that cells expressing the fluorescent protein can be identified visually or by a suitable cell sorting method (e.g., fluorescent activated cell sorting (FACS)). In some embodiments, the selectable marker is a polynucleotide that confer antibiotic resistance to a cell expressing the selectable marker (e.g., puromycin, penicillin, streptomycin, or hygromycin resistance genes). Cells transduced with the vector incorporating the selectable marker can be exposed to a selection chemical specific to the selectable marker to select for cells containing the vector. The selectable marker confer resistance to the selection chemical such that cell containing the vector and the selectable marker survive whereas cells that do not contain the vector and the selectable marker are killed.

As used herein, "introducing" describes a process by which exogenous polynucleotides (e.g., DNA or RNA) are introduced into a recipient cell. Methods of introducing polynucleotides into a cell are known in the art and may include, without limitation, microinjection, transformation, and transfection methods. Transformation or transfection may occur under natural or artificial conditions according to various methods well known in the art, and may rely on any known method for the insertion of foreign nucleic acid sequences into a host cell. The method for transformation or transfection is selected based on the type of host cell being transformed and may include, but is not limited to In some embodiments, the exogenous polyneucleotides, constructs, or vectors described herein are transfected into a cell using a suitable carrier. Suitable carriers are known and used in the art, including, but not limited to, lipid carriers (e.g., Lipofectamine), polymeric nanocarriers, A cell is "genome edited" or "genetically modified" if the cell includes a modification to its genome compared to a non-genome edited cell of the same type. In some cases, a non-genome edited cell is a wild-type cell. As used herein, the terms "genetically modified" and "genetically engineered" are used interchangeably and refer to a prokaryotic or eukaryotic cell that includes an exogenous polynucleotide, regardless of the method used for insertion. In some cases, a cell has been modified to comprise a non-naturally occurring nucleic acid molecule that has been created or modified by the hand of man (e.g., using recombinant DNA technology) or is derived from such a molecule (e.g., by transcription, translation, etc.). A cell that contains an exogenous, recombinant, synthetic, and/or otherwise modified polynucleotide is considered to be an engineered or "genome edited" cell. Genetically editing or modifying a cell refers to modifying cellular nucleic acid within a cell, including genetic modifications to endogenous and/or exogenous nucleic acids within the cell. Genetic modifications can comprise deletions, insertions, integrations of exogenous DNA, gene correction and/or gene mutation. For example, gene editing can be performed using a nuclease (e.g., a natural-existing nuclease or an artificially engineered nuclease) or a transposase. Other methods of making genetic modifications suitable for use according to the methods provided herein include but are not limited to somatic cell nuclear transfer (SCNT) and introduction of a transgene. Procedures for obtaining recombinant or genetically modified cells are generally known in the art, and are described in Sambrook et al, *Molecular Cloning, A Laboratory Manual*, Cold Spring Harbor Press, Cold Spring Harbor, N.Y. (1989), incorporated herein by reference.

In some embodiments, polynucleotides encoding biosynthetic pathway enzymes required for production of the metabolite of interest are integrated into the genome of the cell using CRISPR/Cas mediated gene editing (e.g., a type II CRISPR/cas system). In some cases, the protein expression of one or more endogenous genes is reduced using a CRISPR/cas system. In some embodiments, a CRISPR/Cas system can be used to perform site specific insertion. For example, a nick on an insertion site in the genome can be made by CRISPR/cas to facilitate the insertion of a transgene at the insertion site. Suitable techniques for CRISPR/Cas mediated gene editing of a host cell are known and described in the art.

In some embodiments, polynucleotides encoding biosynthetic pathway enzymes required for production of the metabolite of interest are integrated into the genome of the cell using a transposon. Suitable transposons are known and described in the art including, but not limited to, *Sleeping Beauty*, PiggyBac, Tol1, Tol2, Minos, Frog Prince, Passport, Hsmar1, and Harbinger3_DR. See, for example, Ivics et al. ("The expanding universe of transposon technologies for gene and cell engineering," Mobile DNA, 1(25), 2010) which describes transposon systems and the use there of in the art.

In some embodiments, polynucleotides encoding biosynthetic pathway enzymes required for production of the metabolite of interest are integrated into the genome of the cell using a transgene. As used herein, the term "transgene" refers to a gene or genetic material that can be transferred into an organism or a cell thereof.

In some embodiments, the cell is engineered to endogenously produce the carotenoid phytoene. Phytoene is synthesized from two geranylgeranyl pyrophosphate molecules by the enzyme phytoene synthase. A polynucleotide encoding the phytoene synthase enzyme is introduced into a cell that natively produces geranylgeranyl pyrophosphate to produce a cell expressing phytoene synthase and endogenously synthesizing phytoene. In some embodiments the phytoene synthase is from the bacteria *Pantoea ananatis* and has the polypeptide sequence of SEQ ID NO:1 or SEQ ID NO:10. In some embodiments, the phytoene synthase has a sequence at least 85%, 90%, 95%, 98%, 99%, or 99.9% identical to SEQ ID NO:1 or SEQ ID NO:10. In *Pantoea ananatis*, phytoene synthase is encoded by the gene crtB having the sequence of SEQ ID NO:2. In some embodiments, the crtB sequence can be codon optimized for expression in a particular cell of interest. In some embodiments, the crtB sequence is codon optimized for expression in a bovine cell (e.g., SEQ ID NO:38).

phytoene synthase (Uniprot P21683):
SEQ ID NO: 1
MNNPSLLNHAVETMAVGSKSFATASKLFDAKTRRSVLMLYAWCRHCDDVI
DDQTLGEQARQPALQTPEQRLMQLEMKTRQAYAGSQMHEPAFAAFQEVAM
AHDIAPAYAFDHLEGEAMDVREAQYSQLDDTLRYCYHVAGVVGLMMAQIM
GVRDKATLDRACDLGLAFQLTNIARDIVDDAHAGRCYLPASWLEHEGLNK
ENYAAPENRQALSRIARRLVQEAEPYYLSATAGLAGLPLRSAWAIATAKQ
VYRKIGVKVEQAGQQAWDQRQSTTTPEKLTLLLAASGQALTSRMRAHPPR
PAHLWQRPL phytoene synthase:
SEQ ID NO: 10
MVNNPSLLNHAVETMAVGSKSFATASKLFDAKTRRSVLMLYAWCRHCDDV
IDDQTLGFQARQPALQTPEQRLMQLEMKTRQAYAGSQMHEPAFAAFQEVA
MAHDIAPAYAFDHLEGFAMDVREAQYSQLDDTLRYCYHVAGVVGLMMAQI
MGVRDNATLDRACDLGLAFQLTNIARDIVDDAHAGRCYLPASWLEHEGLN
KENYAAPENRQALSRIARRLVQEAEPYYLSATAGLAGLPLRSAWAIATAK
QVYRKIGVKVEQAGQQAWDQRQSTTTPEKLTLLLAASGQALTSRMRAHPP
RPAHLWQRPL crtB:
SEQ ID NO: 2
ATGAATAATCCGTCGTTACTCAATCATGCGGTCGAAACGATGGCAGTTGG
CTCGAAAAGTTTTGCGACAGCCTCAAAGTTATTTGATGCAAAAACCCGGC
GCAGCGTACTGATGCTCTACGCCTGGTGCCGCCATTGTGACGATGTTATT
GACGATCAGACGCTGGGCTTTCAGGCCCGGCAGCCTGCCTTACAAACGCC
CGAACAACGTCTGATGCAACTTGAGATGAAAACGCGCCAGGCCTATGCAG
GATCGCAGATGCACGAACCGGCGTTTGCGGCTTTTCAGGAAGTGGCTATG
GCTCATGATATCGCCCCGGCTTACGCGTTTGATCATCTGGAAGGCTTCGC
CATGGATGTACGCGAAGCGCAATACAGCCAACTGGATGATACGCTGCGCT
ATTGCTATCACGTTGCAGGCGTTGTCGGCTTGATGATGGCGCAAATCATG
GGCGTGCGGGATAACGCCACGCTGGACCGCGCCTGTGACCTTGGGCTGGC
ATTTCAGTTGACCAATATTGCTCGCGATATTGTGGACGATGCGCATGCGG
GCCGCTGTTATCTGCCGGCAAGCTGGCTGGAGCATGAAGGTCTGAACAAA
GAGAATTATGCGGCACCTGAAAACCGTCAGGCGCTGAGCCGTATCGCCCG
TCGTTTGGTGCAGGAAGCAGAACCTTACTATTTGTCTGCCACAGCCGGCC
TGGCAGGGTTGCCCCTGCGTTCCGCCTGGGCAATCGCTACGGCGAAGCAG
GTTTACCGGAAAATAGGTGTCAAAGTTGAACAGGCCGGTCAGCAAGCCTG
GGATCAGCGGCAGTCAACGACCACGCCCGAAAAATTAACGCTGCTGCTGG
CCGCCTCTGGTCAGGCCCTTACTTCCCGGATGCGGGCTCATCCTCCCCGC
CCTGCGCATCTCTGGCAGCGCCCGCTCTAG In some embodiments, the cell endogenously produces phytoene at an amount between about 1 μg/g protein and about 800 μg/g protein, between about 5 μg/g protein and about 600 μg/g protein, between about 10 μg/g protein and about 500 μg/g protein, between about 25 μg/g protein an about 300 μg/g protein, between about 30 μg/g protein and about 250 μg/g protein, or between about 30 μg/g protein and 100 μg/g protein. In some embodiments, the cell endogenously produces at least 2, at least 3, at least 4, at least 5, at least 6, at least 7, at least 8, at least 9, at least 10, at least 11, at least 12, at least 13 or at least 14 times more phytoene than the cell that does not contain a polynucleotide encoding phytoene synthase.

In some embodiments, the cell is engineered to endogenously produce the carotenoid lycopene. Lycopene is synthesized from phytoene by the enzyme phytoene desaturase. A polynucleotide encoding the phytoene desaturase enzyme is introduced into a cell that produces phytoene to produce a cell expressing phytoene desaturase and endogenously synthesizing lycopene. In some embodiments, the phytoene desaturase is from the bacteria *Pantoea ananatis* and has the polypeptide sequence of SEQ ID NO:3. In some embodiments, the phytoene desaturase has a sequence at least 85%, 90%, 95%, 98%, 99%, or 99.9% identical to SEQ ID NO:3. In *Pantoea ananatis*, phytoene desaturase is encoded by the gene crtI having the sequence of SEQ ID NO:4. In some embodiments, the crtI sequence can be codon optimized for expression in a particular cell of interest. In some embodiments, the crtI sequence is codon optimized for expression in a bovine cell (e.g., SEQ ID NO:39).

phytoene desaturase (Uniprot P21685):
SEQ ID NO: 3
MKPTTVIGAGFGGLALAIRLQAAGIPVLLLEQRDKPGGRAYVYEDQGFTF
DAGPTVITDPSAIEELFALAGKQLKEYVELLPVTPFYRLCWESGKVFNYD
NDQTRLEAQIQQFNPRDVEGYRQFLDYSRAVFKEGYLKLGTVPFLSFRDM
LRAAPQLAKLQAWRSVYSKVASYIEDEHLRQAFSFHSLLVGGNPFATSSI
YTLIHALEREWGVWFPRGGTGALVQGMIKLFQDLGGEVVLNARVSHMETT
GNKIEAVHLEDGRRFLTQAVASNADVVHTYRDLLSQHPAAVKQSNKLQTK
RMSNSLFVLYFGLNHHHDQLAHHTVCFGPRYRELIDEIFNHDGLAEDFSL
YLHAPCVTDSSLAPEGCGSYYVLAPVPHLGTANLDWTVEGPKLRDRIFAY
LEQHYMPGLRSQLVTHRMFTPFDFRDQLNAYHGSAFSVEPVLTQSAWFRP
HNRDKTITNLYLVGAGTHPGAGIPGVIGSAKATAGLMLEDLI ctrI:
SEQ ID NO: 4
ATGAAACCAACTACGGTAATTGGTGCAGGCTTCGGTGGCCTGGCACTGGC
AATTCGTCTACAGGCTGCGGGGATCCCCGTCTTACTGCTTGAACAACGTG
ATAAACCCGGCGGTCGGGCTTATGTCTACGAGGATCAGGGGTTTACCTTT
GATGCAGGCCCGACGGTTATCACCGATCCCAGTGCCATTGAAGAACTGTT
TGCACTGGCAGGAAAACAGTTAAAAGAGTATGTCGAACTGCTGCCGGTTA
CGCCGTTTTACCGCCTGTGTTGGGAGTCAGGGAAGGTCTTTAATTACGAT
AACGATCAGGCCCGGCTCGAAGCGCAGATTCAGCAGTTTAATCCCCGCGA
TGTCGAAGGTTATCGTCAGTTTCTGGACTATTCACGCGCGGTGTTTAAAG
AAGGGTATCTGAAGCTCGGTACTGTCCCTTTTTTATCGTTCAGAGACATG
CTTCGCGCCGCACCTCAACTGGCGAAACTGCAGGCATGGAGAAGCGTTTA
CAGTAAGGTTGCCAGTTACATCGAAGATGAACATCTGCGCCAGGCGTTTT
CTTTCCACTCGCTGTTGGTGGGCGGCAATCCCTTCGCCACCTCATCCATT
TATACGTTGATACACGCGCTGGAACGTGAGTGGGGCGTCTGGTTTCCGCG
TGGCGGCACCGGCGCATTAGTTCAGGGGATGATAAAGCTGTTTCAGGATC -continued
```
TGGGTGGCGAAGTCGTGTTAAACGCCAGAGTCAGCCATATGGAAACGACA

GGAAACAAGATTGAAGCCGTGCATTTAGAGGACGGTCGCAGGTTCCTGAC

GCAAGCCGTCGCGTCAAATGCAGATGTGGTTCATACCTATCGCGACCTGT

TAAGCCAGCACCCTGCCGCGGTTAAGCAGTCCAACAAACTGCAGACTAAG

CGCATGAGTAACTCTCTGTTTGTGCTCTATTTTGGTTTGAATCACCATCA

TGATCAGCTCGCGCATCACACGGTTTGTTTCGGCCCGCGTTACCGCGAGC
```

In some embodiments, the cell endogenously produces lycopene at an amount between about 1 μg/g protein and about 800 μg/g protein, between about 5 μg/g protein and about 600 μg/g protein, between about 10 μg/g protein and about 500 μg/g protein, between about 25 μg/g protein an about 300 μg/g protein, between about 30 μg/g protein and about 250 μg/g protein, or between about 30 μg/g protein and 100 μg/g protein. In some embodiments, the cell endogenously produces at least 2, at least 3, at least 4, at least 5, at least 6, at least 7, at least 8, at least 9, at least 10, at least 11, at least 12, at least 13 or at least 14 times more lycopene than the cell that does not contain a polynucleotide encoding phytoene synthase and phytoene desaturase.

In some embodiments, the cell is engineered to endogenously produce the carotenoid β-carotene. B-carotene is synthesized from lycopene by the enzyme lycopene cyclase. A polynucleotide encoding the lycopene cyclase enzyme is introduced into a cell that produces lycopene to produce a cell expressing lycopene cyclase and endogenously synthesizing β-carotene. In some embodiments, the lycopene cyclase is from the bacteria *Pantoea ananatis* and has the polypeptide sequence of SEQ ID NO:5 or SEQ ID NO:11. In some embodiments, the lycopene cyclase has a sequence at least 85%, 90%, 95%, 98%, 99%, or 99.9% identical to SEQ ID NO:5 or SEQ ID NO:11. In *Pantoea ananatis*, lycopene cyclase is encoded by the gene crtY having the sequence of SEQ ID NO:6. In some embodiments, the crtY sequence can be codon optimized for expression in a particular cell of interest. In some embodiments, the crtY sequence is codon optimized for expression in a bovine cell (e.g., SEQ ID NO:40). While the sequences listed below are from *Pantoea ananatis*, a skilled artisan would recognize that homologous sequences can be identified from other species for use in the engineered cell and methods described herein.

```
lycopene cyclase (Uniprot P21687):
                                      SEQ ID NO: 5
MQPHYDLILVGAGLANGLIALRLQQQQPDMRILLIDAAPQAGGNHTWSFH

HDDLTESQHRWIAPLVVEIHWPDYQVRFPTRRRKLNSGYFCITSQRFAEV

LLRQFGPHLWMDTAVAEVNAESVRLKKGQVIGARAVIDGRGYAANSALSV

GFQAFIGQEWRLSRPHGLSSPIIMDATVDQQNGYRFVYSLPLSPTRLLIE

DTHYIDNATLDPERARQNICDYAAQQGWQLQTLLREEQGALPITLSGNAD

AFWQQRPLACSGLRAGLFHPTTGYSLPLAVAVADRLSALDVFTSASIHQA

ITHFARERWQQQRFFRMLNRMLFLAGPADLRWRVMQRFYGLPEDLIARFY

AGKLTLTDRLRILSGKPPVPVLAALQAIMTTHR lycopene cyclase:
                                     SEQ ID NO: 11
MQPHYDLILVGAGLANGLIALRLQQQQPDMRILLIDAAPQAGGNHTWSFH

HDDLTESQHRWIAPLVVEIHWPDYQVRFPTRRRKLNSGYFCITSQRFAEV
```

-continued
```
LQRQFGPHLWMDTAVAEVNAESVRLKKGQVIGARAVIDGRGYAANSALSV

GFQAFIGQEWRLSHPHGLSSPIIMDATVDQQNGYRFVYSLPLSPTRLLIE

DTHYIDNATLDPECARQNICDYAAQQGWQLQTLLREEQGALPITLSGNAD

AFWQQRPLACSGLRAGLFHPTTGYSLPLAVAVADRLSALDVFTSASIHHA

ITHFARERWQQQGFFRMLNRMLFLAGPADSRWRVMQRFYGLPEDLIARFY

AGKLTLTDRLRILSGKPPVPVLAALQAIMTTHR ctrY:
                                      SEQ ID NO: 6
ATGCAACCGCATTATGATCTGATTCTCGTGGGGGCTGGACTCGCGAATGG

CCTTATCGCCCTGCGTCTTCAGCAGCAGCAACCTGATATGCGTATTTTGC

TTATCGACGCCGCACCCCAGGCGGGCGGAAATCATACGTGGTCATTTCAC

CACGATGATTTGACTGAGAGCCAACATCGTTGGATAGCGCCGCTGGTGGT

TCATCACTGGCCCGACTATCAGGTGCGCTTTCCCACACGCCGTCGTAAGC

TGAACAGCGGCTACTTCTGTATTACTTCTCAGCGTTTCGCTGAGGTTTTA

CTGCGACAGTTTGGCCCGCACTTGTGGATGGATACCGCGGTCGCAGAGGT

TAATGCGGAATCTGTTCGGTTGAAAAAGGGTCAGGTTATCGGTGCCCGCG

CGGTGATTGACGGGCGGGGTTATGCGGCAAACTCAGCACTGAGCGTGGGC

TTCCAGGCGTTTATTGGCCAGGAATGGCGATTGAGCCGCCCGCATGGTTT

ATCGTCTCCCATTATCATGGATGCCACGGTCGATCAGCAAAATGGTTATC

GCTTCGTGTACAGCCTGCCGCTCTCGCCGACCAGATTGTTAATTGAAGAC

ACGCACTATATCGATAATGCGACATTAGATCCTGAACGCGCGCGGCAAAA

TATTTGCGACTATGCCGCGCAACAGGGTTGGCAGCTTCAGACTCTGCTGC

GTGAAGAACAGGGCGCCTTACCCATTACCCTGTCGGGCAATGCCGACGCA

TTCTGGCAGCAGCGCCCCCTGGCCTGTAGTGGATTACGTGCCGGTCTGTT

CCATCCTACCACCGGCTATTCACTGCCGCTGGCGGTTGCCGTGGCCGACC

GCCTGAGCGCACTTGATGTCTTTACGTCGGCCTCAATTCATCAGGCCATT

ACGCATTTTGCCCGCGAGCGCTGGCAGCAGCAGCGCTTTTTCCGCATGCT

GAATCGCATGCTGTTTTTAGCCGGGCCCGCCGATTTACGCTGGCGGGTTA
```

In some embodiments, the cell endogenously produces β-carotene at an amount between about 1 μg/g protein and about 800 μg/g protein, between about 5 μg/g protein and about 600 μg/g protein, between about 10 μg/g protein and about 500 μg/g protein, between about 25 μg/g protein an about 300 μg/g protein, between about 30 μg/g protein and about 250 μg/g protein, or between about 30 μg/g protein and 100 μg/g protein. In some embodiments, the cell endogenously produces at least 2, at least 3, at least 4, at least 5, at least 6, at least 7, at least 8, at least 9, at least 10, at least 11, at least 12, at least 13 or at least 14 times more β-carotene than the cell that does not contain a polynucleotide encoding phytoene synthase, phytoene desaturase, and lycopene cyclase.

In some embodiments, total carotenoid production in the engineered cell is between about 1 μg/g protein and about 800 μg/g protein, between about 5 μg/g protein and about 600 μg/g protein, between about 10 μg/g protein and about 500 μg/g protein, between about 25 μg/g protein an about 300 μg/g protein, between about 30 μg/g protein and about 250 μg/g protein, or between about 30 μg/g protein and 100 μg/g protein. In some embodiments, total carotenoid production in the engineered cell is at least 2, at least 3, at least 4, at least 5, at least 6, at least 7, at least 8, at least 9, at least 10, at least 11, at least 12, at least 13 or at least 14 times more than total carotenoid production in the cell that does not contain a polynucleotide encoding phytoene synthase, phytoene desaturase, and lycopene cyclase.

Figure 10:
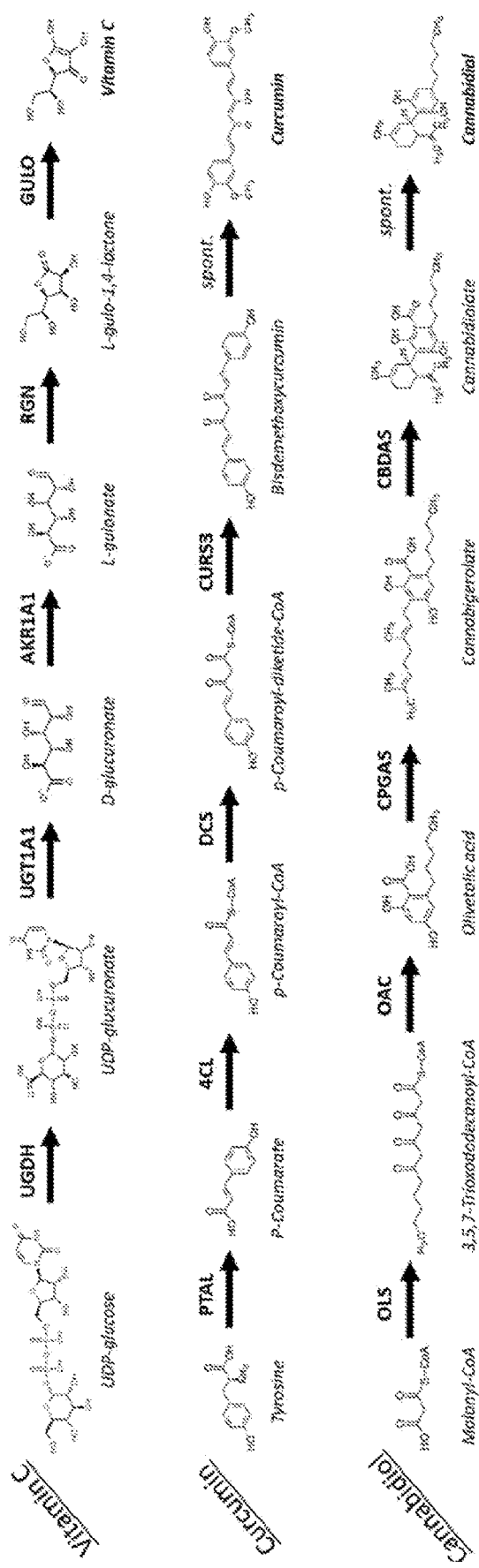
FIG. 10 shows synthesis pathways for vitamin C, curcumin, and cannabidiol from precursors in BSCs.
Figure 11:
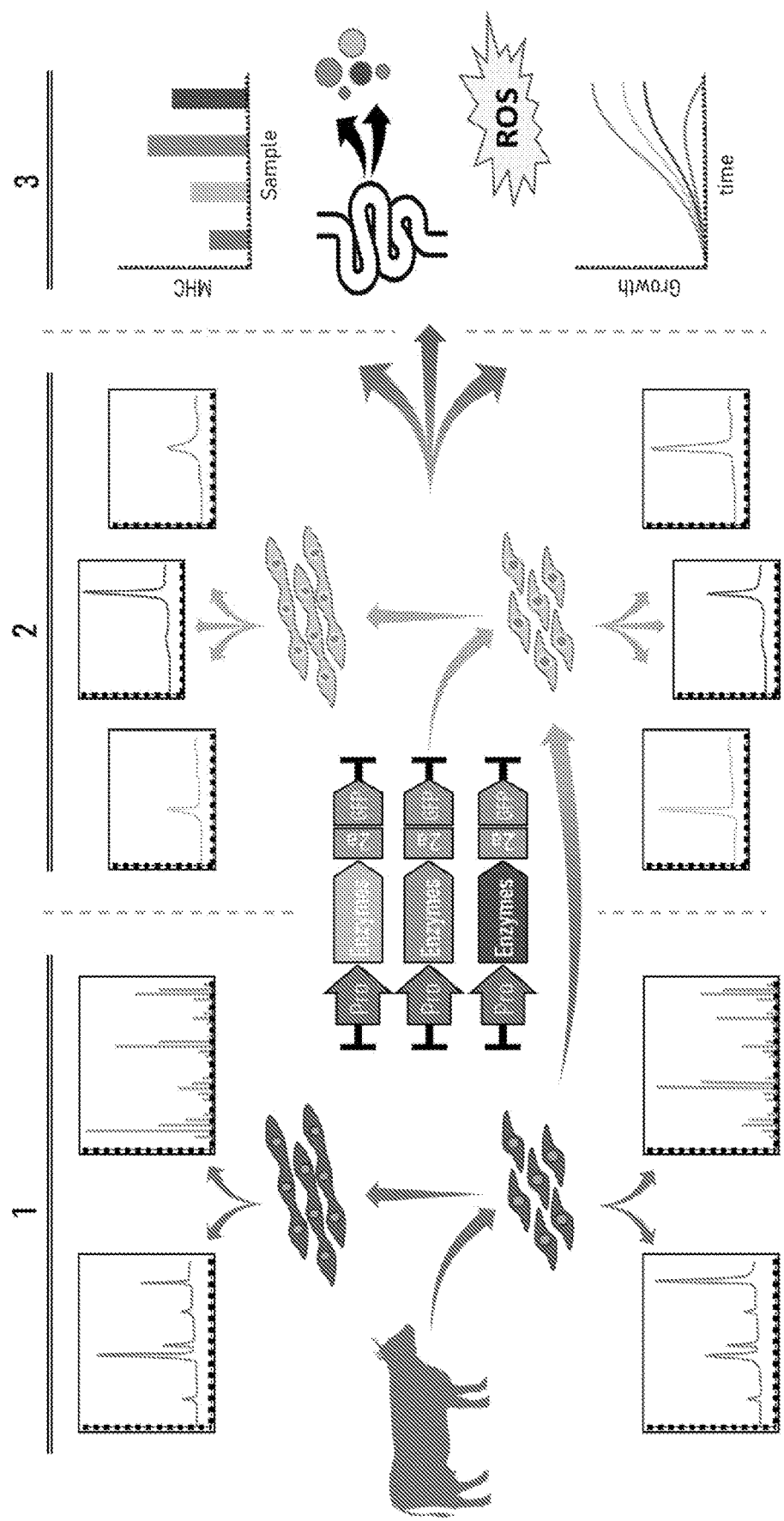
FIG. 11 shows an overview of Example 2. In 1, cell composition will be analyzed pre- and post-differentiation. In 2, cells will be engineered to synthesize various compounds, which will be analyzed pre- and post-differentiation. In 3, cell growth and development, nutrient bioavailability, and nutrient function will be analyzed.
Figure 12:
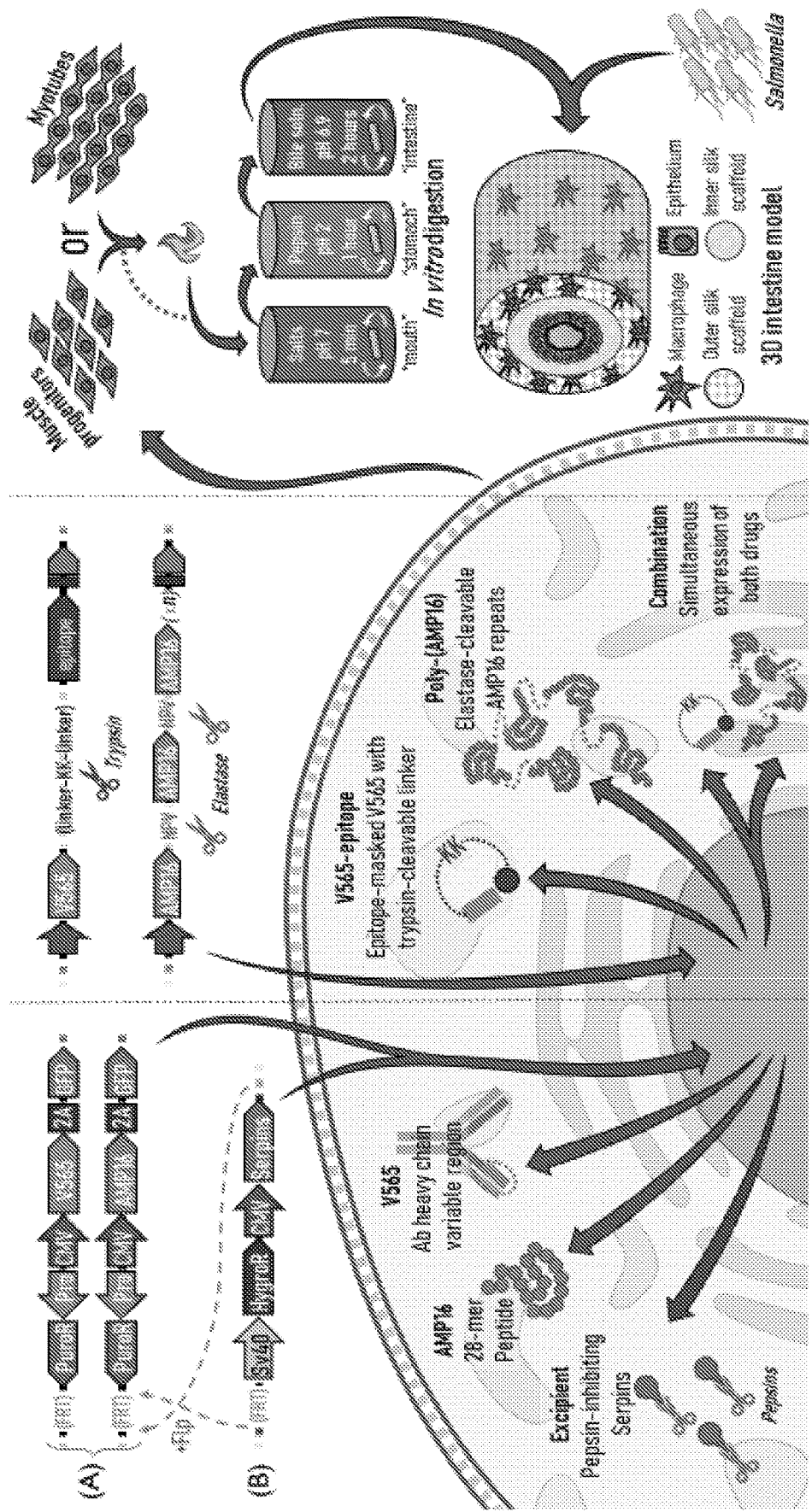
FIG. 12 shows an overview of Example 3. Drug expression vectors (A) and excipients (B) are engineered into bovine muscle and fat cells to explore drug synthesis in vitro. Simultaneous expression of green fluorescent protein (GFP) with therapeutic components serves as a simple marker of gene expression. Drug expression vectors (V565 and AMP16, each with GFP markers included) are further engineered to incorporate various disease-responsive mechanisms for drug activity, including trypsin-cleavable lysine-rich linkers, elastase-cleavable NPV-linkers, or a combination of the two. Disease-responsive edible therapeutics in bovine muscle cells (proliferative or differentiated) are tested in a 3D model of IBD and *Salmonella enterica* infection following in vitro digestion and both with and without heat treatment (i.e., cooking).

In some embodiments, the cell is engineered for endogenous production of Vitamin C. While mammalian cells, for example, natively produce the Vitamin C precursor UDP-glucose and have genes encoding Vitamin C biosynthetic pathway enzymes, the Vitamin C biosynthetic pathway in typically silent in mammalian cells. A schematic of Vitamin C biosynthesis, including intermediates, is shown in FIG. 10. Vitamin C biosynthetic pathway enzymes include UDP-glucose 6-dehydrogenase (UGDH), UDP glucuronosyltransferase 1 (UGT1A1), aldo-keto reductase family 1 (AKR1A1), regucalcin (RGN), and L-gulono-gamma-lactone oxidase (GULO). In some embodiments, a heterologous polynucleotide encoding UGT1A1 is introduced into a cell. In some embodiments, a heterologous polynucleotide encoding UGDH is introduced into a cell. In some embodiments, a heterologous polynucleotide encoding AKR1A1 is introduced into a cell. In some embodiments, a heterologous polynucleotide encoding RGN is introduced into a cell. In some embodiments, a heterologous polynucleotide encoding GULO is introduced into a cell. In some embodiments, one or more heterologous polynucleotides encoding one, two, three, four, or all five of UGT1A1, UGDH, AKR1A1, RGN, and GULO are introduced into a cell. In some embodiments, the amino acid sequence of UGT1A1, UGDH, AKR1A1, RGN, and GULO are endogenous to the cell into which the polynucleotide sequence is introduced. In some embodiments, the amino acid sequence of UGT1A1, UGDH, AKR1A1, RGN, and GULO are exogenous to the cell into which the polynucleotide sequence is introduced. In some embodiments, the UGDH, UGT1A1, AKR1A1, RGN, and GULO enzymes are from *Bos taurus*, and have the polypeptide sequence of SEQ ID NOs:12-16, respectively, and the cell into which the polynucleotide sequences are introduced is a bovine cell. In some embodiments, the UGDH, UGT1A1, AKR1A1, RGN, and GULO enzymes have a sequence at least 85%, 90%, 95%, 98%, 99%, or 99.9% identical to SEQ ID NOs:12-16, respectively. While the sequences listed below are from *Bos taurus*, a skilled artisan would recognize that homologous sequences can be identified from other species for use in the engineered cell and methods described herein.

UGDH (UniProt: P12378):
SEQ ID NO: 12
MFEIKKICCIGAGYVGGPTCSVIAHMCPEIRVTVVDINESRINAWNSPTL
PIYEPGLKEVVESCRGKNLFFSTNIDDAIKEADLVFISVNTPTKTYGMGK
GRAADLKYIEACARRIVQNSHGYKIVTEKSTVPVRAAESIRRIFDANTKP
NLNLQVLSNPEFLAEGTAIKDLKNPDRVLIGGDETPEGQRAVQALCAVYE
HWVPREKILTTNTWSSELSKLTANAFLAQRISSINSISALCEATGADVEE
VATAIGMDQRIGNKFLKASVGFGGSCFQKDVLNLVYLCEALNLPEVARYW
QQVIDMNDYQRRRFASRIIDSLFNTVTDKKIAILGFAFKKDTGDTRESSS
IYISKYLMDEGAHLHIYDPKVPREQIVVDLSHPGVSKDDQVARLVTISKD
PYEACDGAHAVVICTEWDMFKELDYERIHKKMLKPAFIFDGRRVLDGLHN
ELQTIGFQIETIGKKVSSKRIPYAPSGEIPKFSLQDMPNKKPRV UGT1A1 (UniProt: E1BBB3):
SEQ ID NO: 13
MNMMAVKRLLLLLLLQLTCYFSSGSCGKVLVWPVEYSHWMNMKIILDELV
MRGHEVTVLTSSASILIDPNKPSAIKFENFSVSLTKDDFEDALKNFVGNW
TDLTNSFWTFPLLLQSLFDEYSDLTLKICKELISNKKLMTKLHESRFDVV
LADTVGPCGELLAEIFKVPLVYSVRFTPGYSIERKSGKLPYSPSYVPVIL
SELSDHMTFMERVKNMIYVLYFDFYFQMLNEKKWDQFYSEVLGRPTTLLE
TMGKAEFWLFRSYWDFEYPCPLLPNVEFIGGLHCKPAKPLPKEMEEFVQS
SGENGIVVFTLGSMVTNVTEERANMIASALAQIPQKVLWRYDGKKPDTLG
PNTRLYKWVPQNDLLGHPKTKAFITHGGTNGIYEAIYHGVPMVGLPLFAE
QPDNINRVKAKGAAVRLNLETMSKTDFLNALKQVINNPSYKRNAMWLSTI
QRDQPMKPLDRAVFWIEFVMRHKGAKYLRPAAHKLTWFQYHSLDVIGFLL
ACVATAVFVITKCFLFCCRKFAETGKKRKRE AKR1A1 (UniProt: Q3ZCJ2):
SEQ ID NO: 14
MAASCILLHTGQKMPLIGLGTWKSDPGQVKAAIKYALSVGYRHIDCAAIY
GNETEIGEALKENVGPGKLVPREELFVTSKLWNTKHHPEDVEPALRKTLA
DLQLEYLDLYLMHWPYAFERGDSPFPKNADGTIRYDSTHYKETWRALEAL
VAKGLVRALGLSNFNSRQIDDVLSVASVRPAVLQVECHPYLAQNELIAHC
QARNLEVTAYSPLGSSDRAWRDPEEPVLLKEPVVLALAEKHGRSPAQILL
RWQVQRKVSCIPKSVTPSRILENIQVFDFTFSPEEMKQLDALNKNLRFIV
PMLTVDGKRVPRDAGHPLYPFNDPY RGN (UniProt: Q9TTJ5):
SEQ ID NO: 15
MSSIKIECVLRENCHCGESPVWEEASNSLLFVDIPAKKVCRWDSLSKQVQ
RVTVDAPVSSVALRQSGGYVATVGTKFCALNWEDQSAVVLATVDKEKKNN
RFNDGKVDPAGRYFAGTMAEETAPAVLERRQGSLYSLFPDHHVEKYFDQV
DISNGLDWSMDHKIFYYIDSLSYSVDAFDYDLQTGKISNRRSVYKLEKEE
QIPDGMCIDVEGKLWVACYNGGRVIRLDPETGKRLQTVKLPVDKTTSCCF
GGKDYSEMYVTCARDGLDSKGLLQQPEAGGIFKITGLGVKGIPPYPYTG GULO (UniProt: Q3ZC33):
SEQ ID NO: 16
MVHGYKGVKFQNWARTYGCCPEMYFQPTSVEEVREVLALARQQNKRVKVV
GGGHSPSDIACTDGFMIHMGKMNRVLKVDTEKKQVTVEAGILLADLHPQL
DKHGLALSNLGAVSDVTAGGVIGSGTHNTGIKHGILATQVVALTLLTANG
TILECSESSNAEVFQAARVHLGCLGVILTVTLQCVPQFHLQETTFPSTLK
EVLDNLDSHLKKSEYFRFLWFPHSENVSVIYQDHTNKPPSSSANWFWDYA
IGFYLLEFLLWISTFLPGLVGWINRFFFWLLFNGKKENCNLSHKIFTYEC
RFKQHVQDWAIPREKTKEALLELKAMLEANPKVVAHYPVEVRFTRGDDIL
LSPCFQRDSCYMNIIMYRPYGKDVPRLDYWLAYETIMKKVGGRPHWAKAH
NCTRKDFEKMYPAFQRFCAIREKLDPTGMFLNAYLEKVFY In some embodiments, the cell is engineered to endogenously produce curcumin. Tyrosine, which is natively produced in mammalian cells, is the precursor for curcumin biosynthesis using the biosynthetic pathway enzymes tyrosine ammonia-lyase (PTAL), 4-coumarate-CoA ligase (4CL), phenylpropanoyl-diketide-CoA synthase (DCS) and curcumin synthase (CURS3). A schematic of the biosynthetic pathway, including intermediates, is shown in FIG. 10. One or more polynucleotides encoding PTAL, 4CL, DCS, and CURS3 are introduced into a cell that natively produces tyrosine to produce a cell expressing PTAL, 4CL, DCS, and CURS3 and endogenously synthesizing curcumin. In some embodiments, the PTAL, 4CL, DCS, and CURS3 biosynthetic enzymes are from *Oryza sativa* and *Curcuma longa* and have the polypeptide sequence of SEQ ID NOs:17-20, respectively. In some embodiments, PTAL, 4CL, DCS, and CURS3 have a sequence at least 85%, 90%, 95%, 98%, 99%, or 99.9% identical to SEQ ID NOs:17-20 respectively. In some embodiments, only one, two, or three of the biosynthetic pathway enzymes are engineered into the cell such that pathway intermediates are produced. While the sequences listed below are from *Oryza sativa* and *Curcuma longa*, a skilled artisan would recognize that homologous sequences can be identified from other species for use in the engineered cell and methods described herein.

```
PTAL Oryza sativa japonica (Uniprot: P14717):
                                        SEQ ID NO: 17
MAGNGPINKEDPLNWGAAAAEMAGSHLDEVKRMVAQFREPLVKIQGATLR

VGQVAAVAQAKDAAGVAVELDEEARPRVKASSEWILNCIAHGGDIYGVTT

GFGGTSHRRTKDGPALQVELLRHLNAGIFGTGSDGHTLPSETVRAAMLVR

INTLLQGYSGIRFEILEAITKLLNTGVTPCLPLRGTITASGDLVPLSYIA

GLITGRPNAQAISPDGRKVDAAEAFKLAGIEGGFFTLNPKEGLAIVNGTS

VGSALAATVMFDANILAVLSEVLSAVFCEVIVINGKPEYTDHLTHKLKHH

PGSIEAAAIMEHILAGSSFMSHAKKVNEMDPLLKPKQDRYALRTSPQWLG

PQIEVIRAATKSIEREVNSVNDNPVIDVHRGKALHGGNFQGTPIGVSMDN

ARLAIANIGKLMFAQFSELVNEFYNNGLTSNLAGSRNPSLDYGFKGTEIA

MASYCSELQYLANPITNHVQSAEQHNQDVNSLGLVSARKTLEAVDILKLM

TSTYIVALCQAVDLRHLEENIKSSVKNCVTQVAKKVLTMNPTGDLSSARF

SEKNLLTAIDREAVFSYADDPCSANYPLMQKLRAVLVEHALTSGDAEPEA

SVFSKITKFEEELRSALPREIEAARVAVANGTAPVANRIVESRSFPLYRF

VREELGCVFLTGEKLKSPGEECNKVFLGISQGKLIDPMLDCLKEWNGEPL

PIN

4CL Oryza sativa japonica (UniProt: Q6ETN3):
                                        SEQ ID NO: 18
MGSVAAEEVVVFRSKLPDIEIDNSMTLQEYCFARMAEVGARPCLIDGQTG

ESYTYAEVESASRRAAAGLRRMGVGKGDVVMSLLRNCPEFAFSFLGAARL

GAATTTANPFYTPHEVHRQAEAAGARVIVTEACAVEKVREFAAERGVPVV

TVDGAFDGCVEFREVLAAEELDADADVHPDDVVALPYSSGTTGLPKGVML

THRSLITSVAQQVDGENPNLYFSKDDVILCLLPLFHIYSLNSVLLAGLRA

GSTIVIMRKFDLGALVDLVRKHNITIAPFVPPIVVEIAKSPRVTAEDLAS

IRMVMSGAAPMGKDLQDAFMAKIPNAVLGQGYGMTEAGPVLAMCLAFAKE

PFKVKSGSCGTVVRNAELKIVDPDTGTSLGRNQSGEICIRGEQIMKGYLN

DPEATKNTIDEDGWLHTGDIGFVDDDDEIFIVDRLKEIIKYKGFQVPPAE

LEALLITHPEIKDAAVVSMKDDLAGEVPVAFIVRTEGSEITEDEIKKFVA

KEVVFYKRINKVFFTDSIPKNPSGKILRKDLRARLAAGIPDAVAAAAADA

PKSS

DCS Curcuma longa (UniProt: C0SVZ5):
                                        SEQ ID NO: 19
MEANGYRITHSADGPATILAIGTANPTNVVDQNAYPDFYFRVTNSEYLQE

LKAKFRRICEKAAIRKRHLYLTEEILRENPSLLAPMAPSFDARQAIVVEA

VPKLAKEAAEKAIKEWGRPKSDITHLVFCSASGIDMPGSDLQLLKLLGLP

PSVNRVMLYNVGCHAGGTALRVAKDLAENNRGARVLAVCSEVTVLSYRGP

HPAHIESLFVQALFGDGAAALVVGSDPVDGVERPIFEIASASQVMLPESA

EAVGGHLREIGLTFHLKSQLPSIIASNIEQSLTTACSPLGLSDWNQLFWA

VHPGGRAILDQVEARLGLEKDRLAATRHVLSEYGNMQSATVLFILDEMRN

RSAAEGHATTGEGLDWGVLLGFGPGLSIETVVLHSCRLN

CURS3 Curcuma longa (UniProt: C6L7V9):
                                        SEQ ID NO: 20
MGSLQAMRRAQRAQGPATIMAVGTSNPPNLYEQTSYPDFYFRVTNSDHKH

ALKNKFRVICEKTKVKRRYLHLTEEILKQRPKLCSYMEPSFDDRQDIVVE

EIPKLAKEAAEKAIKEWGRPKSEITHLVFCSISGIDMPGADYRLATLLGL

PLSVNRLMLYSQACHMGAQMLRIAKDLAENNRGARVLAVSCEITVLSFRG

PDAGDFEALACQAGFGDGAAAVVVGADPLPGVERPIYEIAAAMQETVPES

ERAVGGHLREIGWTFHFFNQLPKLIAENIEGSLARAFKPLGISEWNDVFW

VAHPGNWGIMDAIETKLGLEQGKLATARHVFSEYGNMQSATVYFVMDEVR

KRSAAEGRATTGEGLEWGVLFGFGPGLTIETVVLRSVPLP
```

In some embodiments, the cell is engineered to endogenously produce curcumin using the biosynthetic pathway enzymes PTAL, 4CL, and bisdemethoxycurcumin synthase. One or more polynucleotides encoding PTAL, 4CL and bisdemethoxycurcumin synthase are introduced into a cell that natively produces tyrosine to produce a cell expressing PTAL, 4CL and bisdemethoxycurcumin synthase and endogenously synthesizing curcumin. In some embodiments, the PTAL, 4CL and bisdemethoxycurcumin synthase have the amino acid sequences of SEQ ID NOs:17, 18, and 21, respectively. In some embodiments, the PTAL, 4CL and bisdemethoxycurcumin synthase have an amino acid sequence at least 85%, 90%, 95%, 98%, 99%, or 99.9% identical to SEQ ID NOs:17, 18, and 21, respectively. While the sequence listed below are from *Oryza sativa*, a skilled artisan would recognize that homologous sequences can be identified from other species for use in the engineered cell and methods described herein.

```
bisdemethoxycurcumin synthase
Oryza sativa japonica (UniProt: Q8LIL0):
                                        SEQ ID NO: 21
MAPTTTMGSALYPLGEMRRSQRADGLAAVLAIGTANPPNCVTQEEFPDFY

FRVTNSDHLTALKDKFKRICQEMGVQRRYLHHTEEMLSAHPEFVDRDAPS

LDARLDIAADAVPELAAEAAKKAIAEWGRPAADITHLVVTTNSGAHVPGV

DFRLVPLLGLRPSVRRTMLHLNGCFAGCAALRLAKDLAENSRGARVLVVA

AELTLMYFTGPDEGCFRTLLVQGLFGDGAAAVIVGADADDVERPLFEIVS
```

```
AAQTIIPESDHALNMRFTERRLDGVLGRQVPGLIGDNVERCLLDMFGPLL

GGDGGGGWNDLFWAVHPGSSTIMDQVDAALGLEPGKLAASRRVLSDYGNM

SGATVIFALDELRRQRKEAAAAGEWPELGVMMAFGPGMTVDAMLLHATSH

VN
```

In some embodiments, the cell is engineered to endogenously produce cannabidiol. Malonyl-CoA, which is natively produced in mammalian cells, is the precursor for cannabidiol (CBD) biosynthesis using the biosynthetic pathway enzymes 3,5,7-trioxododecanoyl-CoA synthase (OLS), olivetolic acid cyclase (OAC), cannabigerolic acid synthase (CBGAS, also known as prenyltransferase 1 or PT1), and cannabidiolic acid synthase (CBDAS). A schematic of the biosynthetic pathway, including intermediates, is shown in FIG. 10. One or more polynucleotides encoding OLS, OAC, CPGAS, and CBDAS are introduced into a cell that natively produces malonyl-CoA to produce a cell expressing OLS, OAC, CPGAS, and CBDAS and endogenously synthesizing CBD. In some embodiments, prenyltransferase NphB can be used in place of CPGAS in the CBD biosynthetic pathway. In some embodiments, the OLS, OAC, CPGAS, CBDAS, and NphB biosynthetic enzymes are from *Cannabis sativa* and have the polypeptide sequence of SEQ ID NOs:22-26, respectively. In some embodiments, OLS, OAC, CPGAS, CBDAS, and NphB have a sequence at least 85%, 90%, 95%, 98%, 99%, or 99.9% identical to SEQ ID NOs:22-26 respectively. In some embodiments, only one, two, or three of the biosynthetic pathway enzymes are engineered into the cell such that pathway intermediates are produced. While the sequences listed below are from *Cannabis sativa*, a skilled artisan would recognize that homologous sequences can be identified from other species for use in the engineered cell and methods described herein.

```
OLS (UniProt: B1Q2B6):
                                          SEQ ID NO: 22
MNHLRAEGPASVLAIGTANPENILLQDEFPDYYFRVTKSEHMTQLKEKFR

KICDKSMIRKRNCFLNEEHLKQNPRLVEHEMQTLDARQDMLVVEVPKLGK

DACAKAIKEWGQPKSKITHLIFTSASTTDMPGADYHCAKLLGLSPSVKRV

MMYQLGCYGGGTVLRIAKDIAENNKGARVLAVCCDIMACLFRGPSESDLE

LLVGQAIFGDGAAAVIVGAEPDESVGERPIFELVSTGQTILPNSEGTIGG

HIREAGLIFDLHKDVPMLISNNIEKCLIEAFTPIGISDWNSIFWITHPGG

KAILDKVEEKLHLKSDKFVDSRHVLSEHGNMSSSTVLFVMDELRKRSLEE

GKSTTGDGFEWGVLFGFGPGLTVERVVVRSVPIKY

OAC (UniProt: I6WU39):
                                          SEQ ID NO: 23
MAVKHLIVLKFKDEITEAQKEEFFKTYVNLVNIIPAMKDVYWGKDVTQKN
```

```
KEEGYTHIVEVTFESVETIQDYIIHPAHVGFGDVYRSFWEKLLIFDYTPR

K

CBGAS or PT1 (UniProt: A0A455ZIK6):
                                          SEQ ID NO: 24
MGLSSVCTFSFQTNYHTLLNPHNNNPKTSLLCYRHPKTPIKYSYNNFPSK

HCSTKSFHLQNKCSESLSIAKNSIRAATTNQTEPPESDNHSVATKILNFG

KACWKLQRPYTIIAFTSCACGLFGKELLHNTNLISWSLMFKAFFFLVAIL

CIASFTTTINQIYDLHIDRINKPDLPLASGEISVNTAWIMSIIVALFGLI

ITIKMKGGPLYIFGYCFGIFGGIVYSVPPFRWKQNPSTAFLLNFLAHIIT

NFTFYYASRAALGLPFELRPSFTFLLAFMKSMGSALALIKDASDVEGDTK

FGISTLASKYGSRNLTLFCSGIVLLSYVAAILAGIIWPQAFNSNVMLLSH

AILAFWLILQTRDFALTNYDPEAGRRFYEFMWKLYYAEYLVYVFI

CBDAS (UniProt: A6P6V9):
                                          SEQ ID NO: 25
MKCSTFSFWFVCKIIFFFFSFNIQTSIANPRENFLKCFSQYIPNNATNLK

LVYTQNNPLYMSVLNSTIHNLRFTSDTTPKPLVIVTPSHVSHIQGTILCS

KKVGLQIRTRSGGHDSEGMSYISQVPFVIVDLRNMRSIKIDVHSQTAWVE

AGATLGEVYYWVNEKNENLSLAAGYCPTVCAGGHFGGGGYGPLMRNYGLA

ADNIIDAHLVNVHGKVLDRKSMGEDLFWALRGGGAESFGIIVAWKIRLVA

VPKSTMFSVKKIMEIHELVKLVNKWQNIAYKYDKDLLLMTHFITRNITDN

QGKNKTAIHTYFSSVFLGGVDSLVDLMNKSFPELGIKKTDCRQLSWIDTI

IFYSGVVNYDTDNFNKEILLDRSAGQNGAFKIKLDYVKKPIPESVFVQIL

EKLYEEDIGAGMYALYPYGGIMDEISESAIPFPHRAGILYELWYICSWEK

QEDNEKHLNWIRNIYNFMTPYVSKNPRLAYLNYRDLDIGINDPKNPNNYT

QARIWGEKYFGKNFDRLVKVKTLVDPNNFFRNEQSIPPLPRHRH

NphB (UniProt: A0A2Z4JFA9):
                                          SEQ ID NO: 26
MSGAADVERVYAAMEEAAGLLDVSCAREKIYPLLTVFQDTLTDGVVVFSM

ASGRRSTELDFSISVPVSQGDPYATVVKEGLFQATGSPVDELLADTVAHL

PVSMFAIDGEVTGGFKKTYAFFPTDDMPGVAQLAAIPSMPASVAENAELF

ARYGLDKVQMTSMDYKKRQVNLYFSDLKQEYLQPESVVALARELGLRVPG

ELGLEFCKRSFAVYPTLNWDTGKIDRLCFAAISTDPTLVPSEDERDIEMF

RNYATKAPYAYVGEKRTLVYGLTLSSTEEYYKLGAYYHITDIQRQLLKAF

DALED
```

The following gene sequences are codon optimized for expression in a bovine cell. One of skill in the art will recognize that the gene sequence may be optimized for expression in a cell from anther species or the wild-type sequence from *Cannabis sativa* may be used.

```
OLS:
                                          SEQ ID NO: 27
ATGAACCACCTGAGAGCCGAAGGACCTGCCTCTGTGCTGGCCATCGGAACCGCCAA

TCCTGAGAACATCCTGCTGCAGGACGAGTTCCCCGACTACTACTTCAGAGTGACCAA

GAGCGAGCACATGACCCAGCTGAAAGAGAAGTTCCGCAAGATCTGCGACAAGAGC

ATGATCCGCAAGAGGAACTGCTTCCTGAACGAGGAACACCTGAAGCAGAACCCCAG
```

-continued

```
GCTGGTGGAACACGAGATGCAGACCCTGGACGCCAGACAGGATATGCTGGTGGTGG

AAGTGCCCAAGCTGGGCAAAGATGCCTGTGCCAAGGCCATCAAAGAGTGGGGCCAG

CCTAAGAGCAAGATCACCCACCTGATCTTCACCAGCGCCAGCACCACAGATATGCCT

GGCGCCGATTACCACTGCGCCAAACTGCTGGGACTGAGCCCTTCTGTGAAGCGCGTG

ATGATGTACCAGCTGGGCTGTTACGGCGGAGGCACCGTGCTGAGAATCGCCAAGGA

TATCGCCGAGAACAACAAGGGCGCCAGAGTGCTGGCCGTGTGCTGTGATATTATGG

CCTGCCTGTTCAGGGGCCCCAGCGAGTCTGATCTGGAACTGCTCGTTGGCCAGGCCA

TTTTTGGAGATGGCGCCGCTGCTGTGATCGTGGGAGCTGAGCCTGATGAGAGCGTGG

GCGAAAGACCCATCTTCGAGCTGGTGTCTACCGGCCAGACCATCCTGCCTAACTCTG

AGGGAACCATCGGCGGCCACATCAGAGAAGCCGGCCTGATCTTTGACCTGCACAAG

GACGTGCCCATGCTGATCTCCAACAACATCGAGAAGTGCCTGATCGAGGCCTTCACA

CCCATCGGCATCAGCGACTGGAACAGCATCTTCTGGATCACACACCCTGGCGGAAA

GGCCATCCTGGACAAGGTGGAAGAGAAGCTGCACCTGAAGTCCGACAAGTTCGTGG

ACAGCAGACACGTGCTGTCCGAGCACGGCAACATGAGCAGCTCTACCGTGCTGTTC

GTGATGGACGAGCTGAGGAAGCGCTCTCTGGAAGAGGGCAAGTCTACCACCGGCGA

CGGATTTGAATGGGCGTGCTGTTTGGCTTCGGCCCTGGACTGACAGTGGAAAGAGT

GGTCGTCAGAAGCGTGCCCATCAAATAC
```

OAC

SEQ ID NO: 28

```
ATGGCAGTTAAGCACCTGATCGTGCTGAAGTTCAAGGACGAGATCACAGAGGCCCA

GAAAGAAGAGTTCTTCAAGACCTACGTGAACCTGGTCAACATCATCCCCGCCATGA

AGGACGTGTACTGGGGCAAAGACGTGACCCAGAAGAACAAAGAGGAAGGCTACAC

CCACATCGTGGAAGTGACCTTCGAGTCCGTGGAAACCATCCAGGACTACATCATTCA

CCCCGCTCACGTCGGATTCGGCGACGTGTACAGATCCTTCTGGGAAAAGCTGCTGAT

CTTCGACTACACACCTAGAAAG
```

CBGAS or PT1

SEQ ID NO: 29

```
ATGGGATTGAGTAGCGTGTGCACCTTCAGCTTCCAAACGAACTACCACACACTGCTG

AACCCGCACAACAACAACCCCAAGACCAGCCTGCTGTGCTACAGGCACCCTAAGAC

ACCCATCAAGTACAGCTACAACAACTTCCCCAGCAAGCACTGCAGCACCAAGAGCT

TCCATCTGCAAAACAAGTGCAGCGAGAGCCTGTCTATCGCCAAGAACTCCATCAGA

GCCGCCACCACCAATCAGACCGAGCCTCCAGAGTCTGACAACCACAGCGTGGCCAC

CAAGATCCTGAACTTCGGCAAGGCCTGCTGGAAGCTGCAGAGGCCCTACACCATCA

TTGCCTTCACCTCTTGCGCCTGCGGCCTGTTCGGAAAAGAGCTGCTGCACAACACCA

ATCTGATCAGCTGGTCCCTGATGTTCAAGGCCTTCTTCTTCCTGGTGGCCATTCTGTG

TATCGCCAGCTTCACCACCACCATCAACCAGATCTACGATCTGCACATCGACCGCAT

CAACAAGCCCGATCTGCCTCTGGCCTCTGGCGAGATCTCTGTGAATACCGCCTGGAT

CATGAGCATCATCGTGGCCCTGTTCGGGCTGATCATCACCATCAAGATGAAGGGCGG

ACCCCTGTACATCTTCGGCTACTGCTTCGGCATCTTCGGAGGCATCGTGTACTCCGTG

CCTCCATTCCGCTGGAAGCAGAATCCCTCTACCGCCTTCCTGCTGAACTTTCTGGCCC

ACATCATTACCAACTTCACCTTCTACTACGCCAGCAGGGCCGCTCTGGGACTGCCTT

TTGAACTGAGGCCCTCTTTCACCTTTCTGCTGGCCTTTATGAAGTCCATGGGCAGCGC

CCTGGCTCTGATCAAGGATGCCAGTGATGTGGAAGGCGACACCAAGTTCGGAATCA
```

-continued

```
GCACCCTGGCCTCTAAGTACGGCAGCAGAAATCTGACCCTGTTCTGCAGCGGCATCG
TGCTGCTGTCTTACGTGGCCGCTATCCTGGCCGGAATCATTTGGCCTCAGGCCTTCAA
CAGCAACGTGATGCTGCTGAGCCACGCCATTCTGGCCTTTTGGCTGATCCTGCAGAC
CAGGGATTTCGCCCTGACCAACTACGATCCTGAGGCCGGCAGACGCTTCTACGAGTT
CATGTGGAAGCTGTACTACGCCGAGTACCTGGTGTACGTCTTCATC
```

CBDAS

SEQ ID NO: 30
```
ATGAAGTGCAGTACCTTCTCCTTTTGGTTCGTGTGCAAGATTATCTTCTTCTTTTTCTC
ATTCAATATCCAGACCTCTATCGCTAACCCGCGCGAGAACTTCCTGAAGTGCTTCAG
CCAGTACATCCCCAACAATGCCACCAACCTGAAGCTGGTGTATACGCAAAACAACC
CGCTGTACATGAGCGTGCTGAACAGCACCATCCACAACCTGAGGTTCACCTCCGACA
CCACACCTAAGCCTCTGGTCATCGTGACCCCTAGCCACGTGTCACACATTCAGGGCA
CCATCCTGTGCAGCAAGAAAGTGGGACTGCAGATCAGGACCAGAAGCGGCGGACAC
GATAGCGAGGGCATGAGCTACATTTCTCAGGTGCCCTTCGTGATTGTGGACCTGAGG
AACATGCGCAGCATCAAGATCGACGTGCACAGCCAGACAGCCTGGGTTGAAGCAGG
CGCTACACTGGGCGAAGTGTACTACTGGGTCAACGAGAAGAACGAGAACCTGAGCC
TGGCCGCTGGCTACTGTCCTACAGTTTGTGCTGGCGGCCACTTTGGCGGCGGAGGAT
ATGGACCTCTGATGAGGAATTACGGCCTGGCTGCCGACAATATCATCGACGCCCACC
TCGTGAACGTGCACGGCAAGGTGCTGGACAGAAAGTCTATGGGCGAAGATCTGTTC
TGGGCCCTGAGAGGTGGCGGAGCCGAGTCTTTTGGAATTATCGTGGCCTGGAAGATC
CGCCTGGTGGCTGTGCCTAAGTCCACCATGTTCAGCGTGAAGAAAATCATGGAAATC
CACGAGCTGGTCAAGCTCGTGAACAAGTGGCAGAATATCGCCTACAAATACGACAA
GGACCTCCTGCTGATGACCCACTTCATCACCAGAAACATCACCGACAACCAGGGCA
AGAACAAGACCGCCATCCACACCTACTTCAGCTCCGTGTTTCTCGGCGGCGTGGACT
CTCTGGTGGATCTGATGAACAAGAGCTTTCCCGAGCTGGGCATCAAGAAAACCGAC
TGCAGACAGCTGAGCTGGATCGATACCATCATCTTCTACAGCGGCGTGGTCAACTAC
GACACCGATAACTTCAACAAAGAGATCCTGCTGGACCGCAGCGCCGGACAGAATGG
GGCCTTTAAGATCAAGCTGGACTACGTGAAGAAGCCCATTCCTGAGTCCGTGTTCGT
GCAGATCCTGGAAAAACTGTACGAAGAGGACATCGGAGCCGGGATGTACGCTCTGT
ACCCTTACGGCGGCATCATGGATGAGATCTCCGAGAGCGCCATTCCATTTCCACACA
GAGCCGGCATCCTGTACGAGCTGTGGTACATCTGCAGCTGGGAGAAGCAAGAGGAT
AACGAGAAGCACCTCAACTGGATCCGCAACATCTACAACTTCATGACCCCCTTACGTC
AGCAAGAACCCTAGACTGGCCTACCTGAACTACCGCGACCTGGACATCGGGATCAA
CGACCCAAAGAACCCCAACAACTACACCCAGGCCAGGATTTGGGGCGAGAAGTACT
TTGGCAAGAACTTCGACCGCCTGGTCAAAGTGAAAACCCTGGTGGACCCTAACAAC
TTCTTCAGAAACGAGCAGAGCATCCCTCCACTGCCTAGACATCGGCAT
```

In some embodiments, the cell is engineered to express anti-TNFα nanobody V565 (SEQ ID NO:7). The cell is transfected with a heterologous polynucleotide encoding nanobody V565 to produce a cell expressing nanobody V565. In some embodiments, the polynucleotide encodes a polypeptide at least 85%, 90%, 95%, 98%, 99%, or 99.9% identical to SEQ ID NO:7. In some embodiments, the polynucleotide encoding V565 is codon optimized for expression in a particular cell of interest. In some embodiments, the polynucleotide encoding V565 is codon optimized for expression in a bovine cell.

nanobody V565:

SEQ ID NO: 7
DVQLVESGGGLVQPGGSLKLSCAASGFDFSSHWMYWVRQAPGKELEWLSE

-continued

INTNGLITHYGDSVKGRFTVSRNNAANKMYLELTRLEPEDTALYYCARNQ

HGLNKGQGTQVTVSS

In some embodiments, V565 is linked to human TNFα by a flexible, cleavable linker and a polynucleotide expressing the V565 linked to human TNFα by a flexible, cleavable linker is introduced into a cell. Without wishing to be bound by any particular theory or mechanism, linking the V565 nanobody to TNFα will inhibit V565 from binding to target TNFα in the subject, and cleavage of the flexible, cleavable linker under specific conditions will release the V565 to bind target TNFα in the subject. In some embodiments, the flexible cleavage linker is a trypsin cleavable linker with at least one, two, three, four, or five lysine residues. In some embodiments, the linker is between about 10 and about 50 amino acids in length. In some embodiments, the linker is between about 15 and about 40 amino acids in length. In some embodiments, the linker have the sequence of SEQ ID NO:9 (GGG SGG GSG GGS GGK GGK GGK GGK GGG SGG GSG AQG).

In some embodiments, the cell is engineered to express antimicrobial peptide 16 (AMP16; SEQ ID NO:8). The cell is transfected with a heterologous polynucleotide encoding AMP16 to produce a cell expressing AMP16. In some embodiments, the polynucleotide encodes a polypeptide at least 85%, 90%, 95%, 98%, 99%, or 99.9% identical to SEQ ID NO:8. In some embodiments, the polynucleotide encoding AMP16 is codon optimized for expression in a particular cell of interest. In some embodiments, the polynucleotide encoding AMP16 is codon optimized for expression in a bovine cell.

AMP16:
SEQ ID NO: 8
IRPI IRPI IRPI IRPI IRPI IRPI IRPI

In some embodiments, the AMP16 is attached to an elastase cleavable linker including Asn-Pro-Val (NPV) repeats. In some embodiments, at least 2, at least 3, at least 4, at least 5, at least 6, at least 7, at least 8, at least 9, or at least 10 repeats of AMP16 will be assembled in a construct, each repeat separated by a NPV linker.

In some embodiments, the cell is engineered to express serine protease inhibitor (SPI) to inhibit pepsin digestion of V565 or AMP16. In some embodiments, the SPI is Tsp03044 having the amino acid sequence of SEQ ID NO:31 or a sequence at least 85%, 90%, 95%, 98%, 99%, or 99.9% identical thereto. In some embodiments, the SPI is TspAd5 having the amino acid sequence of SEQ ID NO:33 or a sequence at least 85%, 90%, 95%, 98%, 99%, or 99.9% identical thereto.

Tsp03044 (NCBI Reference Sequence XM_003379333)
SEQ ID NO: 31
MANLYNSMMLISLIILCPLNEIWNSCGSSCEETCESIASGKDTPCTLQCVPGCFCVDGFVR

DLRGRCIPMSLCPNKVNSSCPENEVFQECGSACPETCDTVSSGFERPCTGNCIAGCFCKN

GYVRGYDGKCIPPEDCGKPNNDKCGSNEVFMKCGSACPATCDSIRSENIIPCTKECVSGC

FCKSGYVRASTGECLAPEACGAHLGGCGPREEYRACGSACPESCESIKDLAPHACPAMC

VPGCFCKFPFVRGYDLRCIMPDDC

Tsp03044
SEQ ID NO: 32
atggccaatc tctataatag tatgatgtta atatccttga tcattttgtg tccgttaaac gaaatttgga attcttgtgg aagttcatgt gaagaaactt gtgaaagcat tgctagtggc aaagacacac cttgcactct gcagtgcgtt cctggttgct tttgtgtcga cggttttgta cgagatttaa gaggtcgttg cattccaatg tcattatgtc caaataaagt caacagttca tgtcctgaaa atgaagtctt tcaagaatgc ggttccgctt gtccagaaac atgcgataca gtttcctcgg gatttgaaag accttgcacg gggaattgta ttgctggttg tttttgtaag aatgggtatg tacgaggtta cgatggaaaa tgcattccac cagaagattg tggaaaacct aataacgaca aatgtggatc aaatgaagtt ttcatgaagt gtggtagcgc ttgtcccgca acctgcgatt cgatccgaag tgaaaatatt attccatgca ctaaagagtg tgtttcgggt tgcttctgca aatctggcta cgtcagagca tctaccggtg aatgtttagc tccggaagct tgtggtgcgc atttgggcgg ctgtggaccc cgagaagagt acagagcttg tggaagtgct tgtccagaat cttgtgaatc tataaaagat cttgcgccac acgcgtgtcc tgctatgtgt gtacctggat gtttctgcaa gtttccattc gttcgtgggt acgatctgcg ttgcataatg cctgatgatt gctga TspAd5 (GenBank: EU263307.1)
SEQ ID NO: 33
METEIAKPLADFAYSLYQLEEAGNVFFSPVSIFLALAMVFFGSNGNTNTQLLNVMFKAG -continued

WKKNRTKKAMRSFVSSLTIDEYYDASLKLANRLYANDQYPILHPFLKDVKRYLSSDLVS

VNFADTEAARLQINKWVSDQTNHKINDLLQSGTVEANTRLIAVNAIYFKASWDEVEDE

AHTKRKKFYPTPHSSIKIPMMTQTNGYSYYETEDYQFLGMDYYPEYLKMFILLPKSGKT

LSELQQKENGETLLNLVSKVSGAEVKVTIPKMKFEKQMNLVEALKKLGIEDLFIPGKAD

LSGICVKEKLYVSDIVHKAYLEFNEEGTEAAAATADRIVPMSGVMYEDSFEFVADHPFL

FFIFDSRSKAILFIGRFSGN

SEQ ID NO: 34

```
agattattgg agaaaattgt ggaattgttg tgaacgaaat ggaaacagaa attgcaaaac
cattagctga tttcgcttat tcgctttatc aattggaaga agcaggaaat gtattctttt
caccagtatc gatttttctg gcacttgcaa tggtattttt tggatccaac ggtaatacaa
atactcaact gctgaatgtg atgttcaaag ctggctggaa gaaaaatcgt acaaaaaagg
caatgcggtc gttcgtttca tcgctcacca tcgatgaata ctatgatgct tctttgaaat
tggccaatcg attgtatgct aatgatcaat atccaatatt gcatccattt cttaaagatg
tgaaaagata tctatcaagt gatttggtta gtgtaaattt tgccgacact gaagcagcac
gtttgcagat taataagtgg gtgagcgatc agacgaatca taaaatcaac gatttgcttc
aatctggaac agttgaggca aatactcgcc ttatcgccgt caacgcaatt tatttcaaag
cctcttggga tgaggttttc gacgaagcac atacaaagcg gaaaaaattt tatccaacac
cgcacagttc aattaaaata ccaatgatga cacagacaaa tggatattcg tattatgaaa
ctgaagatta tcaatttctt ggaatggatt attatccaga atatcttaaa atgttcattt
tattaccaaa gtcaggaaaa acactttctg aattacaaca aaagtttaat ggagaaactc
tgttaaattt ggtatccaaa gttagcggtg ctgaagtgaa agtgacaatt ccaaaaatga
agtttgagaa acagatgaat ttagttgaag cattgaagaa acttggtata gaagatcttt
tcattcctgg aaaagcagat ctttctggaa tttgtgttaa agaaaagctt tatgtatctg
atattgttca caaagcgtat ctagagttca atgaagaagg aactgaagca gcagcagcga
ccgccgatcg catagtaccc atgtccggcg ttatgtatga agacagttt gaatttgttg
ctgatcatcc atttctttc ttcatctttg acagcagatc aaaagcgatt cttttattg
gacgttttc tggtaattaa agataattag aaaatggata aatggagaaa aatgattttt
gctgggtgaa aatgcaagtt ttaaaagtat ttgaaaatat tttttaatga tgattttat
tgtatgggaa aatagtaaag aatatttcat gcaaaaaaaa aaaaaaaaa a
```

In some embodiments, the cell is engineered for increased expression of one or more growth factors selected from FGF-2, TGFβ-3, NRG-1 and IGF-1. In some embodiments, the cell is engineered for increased expression of insulin and transferrin.

In some embodiments the cell is engineered to endogenously produce cinnamaldehyde from the precursor phenylalanine by the introduction of one or more polynucleotides encoding phenylalanine ammonia-lyase, 4-coumarate-CoA ligase, and cinnamoyl-CoA reductase into the cell.

In some embodiments, the cell is engineered to endogenously produce (R)-limonene from the precursor geranyl pyrophosphate by introduction of a polynucleotide encoding (R)-limonene synthase into the cell. In some embodiments, (R)-limonene synthase has the amino acid sequence of SEQ ID NO:35 or a sequence at least 85%, 90%, 95%, 98%, 99%, or 99.9% identical thereto. In some embodiments, the cell is engineered to endogenously produce (S)-limonene from the precursor geranyl pyrophosphate by introduction of a polynucleotide encoding (S)-limonene synthase. In some embodiments, (S)-limonene synthase has the amino acid sequence of SEQ ID NO:36 or a sequence at least 85%, 90%, 95%, 98%, 99%, or 99.9% identical thereto.

*Citrus limon* (UniProt: Q8L5K3):

SEQ ID NO: 35

MSSCINPSTLVTSVNAFKCLPLATNKAAIRIMAKYKPVQCLISAKYDNLT

VDRRSANYQPSIWDHDFLQSLNSNYTDEAYKRRAEELRGKVKIAIKDVIE

PLDQLELIDNLQRLGLAHRFETEIRNILNNIYNNNKDYNWRKENLYATSL

EFRLLRQHGYPVSQEVFNGFKDDQGGFICDDFKGILSLHEASYYSLEGES

IMEEAWQFTSKHLKEVMISKNMEEDVFVAEQAKRALELPLHWKVPMLEAR

WFIHIYERREDKNHLLLELAKMEFNTLQAIYQEELKEISGWWKDTGLGEK

-continued

LSFARNRLVASFLWSMGIAFEPQFAYCRRVLTISIALITVIDDIYDVYGT

LDELEIFTDAVERWDINYALKHLPGYMKMCFLALYNFVNEFAYYVLKQQD

FDLLLSIKNAWLGLIQAYLVEAKWYHSKYTPKLEEYLENGLVSITGPLII

TISYLSGTNPIIKKELEFLESNPDIVHWSSKIFRLQDDLGTSSDEIQRGD

VPKSIQCYMHETGASEEVARQHIKDMMRQMWKKVNAYTADKDSPLTGTTT

EFLLNLVRMSHFMYLHGDGHGVQNQETIDVGFTLLFQPIPLEDKHMAFTA

SPGTKG

*Abies grandis* (UniProt: O22340)

SEQ ID NO: 36

MALLSIVSLQVPKSCGLKSLISSSNVQKALCISTAVPTLRMRRRQKALVI

NMKLTTVSHRDDNGGGVLQRRIADHHPNLWEDDFIQSLSSPYGGSSYSER

AETVVEEVKEMFNSIPNNRELFGSQNDLLTRLWMVDSIERLGIDRHFQNE

IRVALDYVYSYWKEKEGIGCGRDSTFPDLNSTALALRTLRLHGYNVSSDV

LEYFKDEKGHFACPAILTEGQITRSVLNLYRASLVAFPGEKVMEEAEIFS

ASYLKKVLQKIPVSNLSGEIEYVLEYGWHTNLPRLEARNYIEVYEQSGYE

SLNEMPYMNMKKLLQLAKLEFNIFHSLQLRELQSISRWWKESGSSQLTFT

RHRHVEYYTMASCISMLPKHSAFRMEFVKVCHLVTVLDDIYDTFGTMNEL

QLFTDAIKRWDLSTTRWLPEYMKGVYMDLYQCINEMVEEAEKTQGRDMLN

YIQNAWEALFDTFMQEAKWISSSYLPTFEEYLKNAKVSSGSRIATLQPIL

TLDVPLPDYILQEIDYPSRFNELASSILRLRGDTRCYKADRARGEEASAI

SCYMKDHPGSTEEDALNHINAMISDAIRELNWELLRPDSKSPISSKKHAF

DITRAFHHVYKYRDGYTVSNNETKNLVMKTVLEPLAL

Regarding the enzymes and polypeptides described herein, the phrases "% sequence identity," "percent identity," or "% identity," are used interchangeably and refer to the percentage of residue matches between at least two amino acid sequences aligned using a standardized algorithm. Methods of amino acid sequence alignment are well-known. Some alignment methods take into account conservative amino acid substitutions. Such conservative substitutions, explained in more detail below, generally preserve the charge and hydrophobicity at the site of substitution, thus preserving the structure (and therefore function) of the polypeptide. Percent identity for amino acid sequences may be determined as understood in the art. (See, e.g., U.S. Pat. No. 7,396,664, which is incorporated herein by reference in its entirety). A suite of commonly used and freely available sequence comparison algorithms is provided by the National Center for Biotechnology Information (NCBI) Basic Local Alignment Search Tool (BLAST), which is available from several sources, including the NCBI, Bethesda, Md., at its website. The BLAST software suite includes various sequence analysis programs including "blastp," that is used to align a known amino acid sequence with other amino acids sequences from a variety of databases.

Polypeptide sequence identity may be measured over the length of an entire defined polypeptide sequence, for example, as defined by a particular SEQ ID number, or may be measured over a shorter length, for example, over the length of a fragment taken from a larger, defined polypeptide sequence, for instance, a fragment of at least 15, at least 20, at least 30, at least 40, at least 50, at least 70 or at least 150 contiguous residues. Such lengths are exemplary only, and it is understood that any fragment length supported by the sequences shown herein, in the tables, figures or Sequence Listing, may be used to describe a length over which percentage identity may be measured.

A cell suitable for use in the methods described herein may include, but is not limited to, a primary cell, an immortalized cell, a pluripotent cell, or an embryonic cell. The genetically modified or engineered cell may be a plant cell or an animal cell that can be stably maintained, grown, and expanded in in vitro culture. An animal cell suitable for use in the composition and methods described herein may be a mammalian call, an insect cell, a fish cell, or an avian cell. Methods for the use of insect cells in a cultured meat product are described, for example, in publication No. WO2020131661A1 of International Application No. PCT/US2019/066452, which is incorporated herein by reference in its entirety.

The mammalian cell may be any mammalian cell that can be stably maintained, grown, and expanded in in vitro culture. The mammalian cell may be a porcine, bovine, cervine, hircine, leporine, or murine cell. The mammalian cell may be from a ruminant mammal (e.g., cattle, sheep, goats, buffalo, deer, elk, etc.). For use in a cultured meat product as outlined below, the mammalian cell is a non-human mammalian cell.

The mammalian cell may be a primary mammalian cell, an immortalized mammalian cell, or a mammalian cell differentiated from a pluripotent cell (e.g., embryonic stem cell, induced pluripotent cell, etc.). Primary mammalian cell may be grown and proliferated in culture for 1, 2, 3, 4, 5, 6, or more passages prior to transduction. In some embodiments, the mammalian cell is an immortalized cell that expresses TERT and CDK4.

In some embodiments, the animal cell is a muscle cell. The muscle cell is characterized by Actin, myogenin, and myosin heavy chain (MHC) and formation of multinucleated myotubes.

In some embodiments, the mammalian cell is a muscle cell. Mammalian muscle cells are characterized by expression of Actin, myogenin, and myosin heavy chain (MHC) and formation of multinucleated myotubes. In some embodiments, the mammalian cells are MHC$^+$ Actin$^+$ bovine muscle cells.

In some embodiments, the animal cell are muscle precursor cells that express paired box protein 7 (Pax7). In some embodiments, the mammalian cells are muscle precursor satellite cells that express paired box protein 7 (Pax7). In some embodiments, the mammalian cells are Pax7+ bovine satellite cells. In some embodiments, the mammalian cells are Pax7+ primary bovine satellite cells (BSCs). In some embodiments, the mammalian cells are from a cow of the species *Bos taurus*.

In some embodiments, mammalian myotube cells are produced by myogenic differentiation of mammalian satellite cells. Mammalian satellite cells may be cultured to confluency in any culture medium that supports growth and expansion of the mammalian satellite cells. In some embodiments, the mammalian satellite cells are cultured to confluency in B8 medium, serum-contained growth medium (e.g., DMEM+20% fetal bovine serum), or other serum-free medium. Confluent mammalian satellite cells are then cultured in culture medium including a Neurobasal/L15 (1:1) basal media supplemented with epidermal growth factor (EGF; 0.01-5 ng/ml; preferably 0.5 ng/mL), insulin-like growth factor 1 (IGF-1; 0.01-5 ng/ml; preferably 0.05 ng/mL), and 1% Antibiotic-Antimycotic[61]. In some embodiments, the confluent mammalian satellite cells are cultured in DMEM supplemented with about 2% fetal bovine serum. Cells will be differentiated for about 1-2 weeks.

B8 medium includes DMEM:F12 (1:1) basal medium supplemented with L-ascorbic acid 2-phosphate (0.1 ug/ml to 500 ug/ml; preferably about 200 ug/mL), insulin (0.1 ug/ml to 100 up/ml; preferably about 20 ug/mL), transferrin (0.1 ug/ml to 100 ug/ml; preferably about 20 ug/mL), sodium selenite (0.1 ug/ml to 100 ug/ml; preferably 20 ng/mL), FGF-2 (0.01 ug/ml to 100 ug/ml; preferably 10 ng/mL), neuregulin 1 (NRG-1; 0.001 ng/ml to 50 ng/ml; preferably 0.1 ng/mL), and TGFβ-3 (0.001 ng/ml to 50 ng/ml; preferably 0.1 ng/uL). In some embodiments, B8 medium additionally includes insulin-like growth factor 1 (IGF-1; about 10 ng/mL).

In some embodiments, the culture medium includes, cinnamon, monolaurin (a derivative of coconut lauric acid), honey, or combinations thereof in addition to or instead of an antibiotic component.

In some embodiments, the culture medium may include a plant based or yeast based extract in place of serum. For example, yeast and plant based alternatives to serum include hydrolyzed proteins from soy, yeast, wheat gluten, cottonseed, or corn, as well as rapeseed peptide fractions, maitake mushroom extract, and silk derived sericin protein.

In some embodiments, the mammalian cell is an adipocyte. Mammalian adipose cells are characterized by expression of peroxisome proliferator-activated receptor gamma (PPARγ) and increase lipid production.

In some embodiments, the mammalian cells are produced by adipogenic differentiation from mammalian satellite cells. Lipid accumulation in mammalian satellite cells can be initiated using a differentiation media containing a combination of free fatty acids (FFAs). Specifically, a 3-FFA cocktail of linoleic acid, erucic acid, and elaidic acid at equal concentrations of 125 uM induces accumulation of intracellular lipids over about six days in culture. Additional details on adipogenic differentiation from mammalian satellite cell is described in Fish et al. ("Prospects and challenges for cell-cultured fat as a novel food ingredient," Trends Food Sci Technol., 2020, 98:53-67) which is incorporated herein by reference.

In some embodiments, production of the metabolite of interest can be increased or decreased by altering enzyme expression levels or by altering availability of intermediate or precursor metabolites in the cell.

In some embodiments, the metabolite of interest is phytoene, lycopene, or β-carotene and production of these metabolites is increased by treatment of the cells with ketoconazole. Ketoconazole inhibits cellular cholesterol synthesis which competes for carotenoid precursor compounds. To increase carotenoid production, cells may be cultured with between about 0.5 µg/ml and about 50 µg/ml ketoconazole. In some embodiments, cells are cultured with between about 1 µg/ml and about 20 µg/ml ketoconazole. In some embodiments, cells are cultured with about 5 µg/ml ketoconazole.

In some embodiments, biosynthetic pathway enzyme expression is increased by increasing the selective pressure on the cells transduced with a vector comprising polynucleotides encoding the biosynthetic pathway enzyme and a selectable marker. For example, when the selectable marker is an antibiotic resistance gene, increasing the concentration of the antibiotic in the selection medium can place selective pressure on the cells to increase expression of the introduced vector whereby biosynthetic pathway enzyme expression is also increased. Likewise, biosynthetic pathway enzyme expression can be reduced by reducing the selective pressure on the cells, for example, by reducing the concentration of the selection chemical in culture.

As used herein, "cultured meat product" refers to an edible meat product produced from cell cultures, rather than whole organisms. In generally, the cultured meat product is visually identical to farmed meat, palatable to consumers and provides nutritional benefit. Cultured meat products described herein include mammalian satellite, muscle, and/or adipose cell cultures seeded on an edible, food safe substrate and cultured to confluence. The mammalian satellite, muscle, and/or adipose cell culture are seeded on the food safe substrate at a density between about 20,000 cell/cm$^2$ and about 400,000 cell/cm$^2$, between about 30,000 cells/cm$^2$ and about 350,000 cells/cm$^2$, or between about 35,000 cells/cm$^2$ and about 300,000 cells/cm$^2$. In some embodiments, the cells are seeded at a density of about 50,000 cells/cm$^2$. In some embodiments, the cells are seeded at a density of about 40,000 cells/cm$^2$, about 50,000 cells/cm$^2$, about 60,000 cells/cm$^2$, about 70,000 cells/cm$^2$, about 80,000 cells/cm$^2$, about 100,000 cells/cm$^2$, about 150,000 cells/cm$^2$, about 200,000 cells/cm$^2$, about 250,000 cells/cm$^2$, about 300,000 cells/cm$^2$ or about 350,000 cells/cm$^2$. In some embodiments, the cells become non-adherent on the food safe substrate once they reach confluence and lift off the food safe substrate without enzymatic dissociation. In some embodiments, the edible, food safe substrate is in the form of a two-dimensional film. In some embodiments, the edible, food safe substrate is in the form of a three-dimensional matrix or sponge, and the mammalian muscle cells form continuous muscle fibers when cultured in the matrix or sponge substrate. Suitable edible, food safe substrates are known in the art and include, but are not limited to, chitosan substrates, cellulosic substrates, silk substrates, alginate substrates, starch substrates, textured vegetable protein substrate, mycelium substrates, and whey substrates.

Additional methods for the production of cultured meat production are known and described in the art. See for example, Post ("Cultured meat from stem cells: Challenges and prospects," Meat Science, 2012, 92, 297-301), Warner ("Review: analysis of the process and drivers for cellular meat production," Animal, 2019, 13(12):3041-3058), U.S. Pat. Nos. 6,835,390, and 7,270,829.

In some embodiments, the cultured meat product is produced using a chitosan substrate. The chitosan substrate can be tuned to change the adherence and growth of the mammalian muscle cell culture. Generally, increasing chitosan concentration in the substrate decreased adhesion of the mammalian muscle cells. The concentration of chitosan in the food safe substrate of the cultured meat product can be 1%, 2%, 3%, 4%, 5%, 6%, 7%, 8%, 9%, 10%, 12%, or 14%. In some embodiments, the concentration of chitosan is between about 1% and about 8%. In some embodiments, the concentration of chitosan is between about 2% and about 6%. In some embodiments, the concentration of chitosan is at least about 1%, at least about 2%, at least about 3%, at least about 4%, at least about 5%, at least about 6%, at least about 7%, or at least about 8%. Chitosan may be derived from any suitable source. Sources of chitosan include, but are not limited to, mushrooms, crustaceans, insects, green algae, and yeast. In some embodiments, the chitosan is mushroom derived chitosan.

Three-dimensional chitosan substrates or sponges suitable for use in the formation of muscle fibers and cultured meat products described herein can be formed using methods known in the art. In some embodiments, chitosan sponges are formed using directional freezing of chitosan. To form chitosan sponges by directional freezing, a chitosan is dissolved in a solvent, such as, but not limited to, acetic acid, and the chitosan solution is poured into tubes. One end of the tubes is exposed to liquid nitrogen or another suitable freezing agent, such as slurry of dry ice and ethanol, until the entire solution is frozen. The frozen chitosan is then lyophilized to form the chitosan sponge. The mechanical properties of the chitosan sponge can be tuned by altering the chitosan concentration. Sponges formed using low concentration chitosan (e.g., 1%, 2%, 3% chitosan solution) have a lower elastic moduli, while sponges formed using high concentration chitosan (e.g., 6%, 7%, 8% chitosan solution) have higher elastic moduli. Chitosan may be derived from any suitable source. Sources of chitosan include, but are not limited to, mushrooms, crustaceans, insects, green algae, and yeast. In some embodiments, the chitosan is mushroom derived chitosan.

As used herein, "food safe substrate" refers to substrates that are edible or are safe for human consumption if at least a portion of the substrate remains affixed or associated with the cultured meat product. In some embodiments, the food safe substrate is a chitosan substrate. Chitosan for use as a food safe substrate may be derived from the chitin of organisms including, but not limited to, mushrooms, crustaceans, insects, green algae, and yeast. In some embodiments, the food safe substrate is a mushroom-chitosan substrate. In some embodiments, the food safe substrate is a cellulose-based substrate such as a substrate formed from decellularized plants (e.g., decellularized spinach or apples).

In some embodiments, the cultured meat product includes the engineered cells described herein, plant based proteins, unmodified (i.e., wild-type) plant or animal cells, or combinations thereof. In some embodiments, the cultured meat product includes between about 1% to about 100% engineered cells described herein based on weight or based on cell count.

As used herein, "high density" refers to cells seeded at a density over 160,000 cells/mL to about 480,000 cells/ml for suspension culture or over 100,000 cells/cm$^2$ to about 300,000 cells/cm$^2$ for adherent culture.

As used herein, "medium density" refers to cells seeded at a density of over 64,000 cells/ml to about 160,000 cells/ml for suspension culture or over 40,000 cells/cm$^2$ to about 100,000 cells/cm$^2$ for adherent culture.

As used herein, "low density" refers to cells seeded at a density of about 16,000 cells/ml to about 64,000 cells/ml for suspension culture or between about 10,000 cells/cm$^2$ to about 40,000 cells/cm$^2$ for adherent culture.

As used herein, "serum-free" refers to culture conditions and culture medium that does not contain serum or serum replacement, or that it contains essentially no serum or serum replacement. For example, an essentially serum-free medium can contain less than about 1%, 0.9%, 0.8%, 0.7%, 0.6%, 0.5%, 0.4%, 0.3%, 0.2% or 0.1% serum. As used herein, "serum-replacement," refers to animal serum and animal cell product based replacements for serum traditionally used in culture medium. Any plant based or yeast based serum alternatives described herein do not fall under the definition of "serum-replacement" in a determination of a culture medium being serum free. In other words, a culture medium can be serum-free and include a plant based or yeast based serum alternative described herein.

The terms "defined culture medium," "defined medium," and the like, as used herein, indicate that the identity and quantity of each medium ingredient is known. The term "defined," when used in relation to a culture medium or a culture condition, refers to a culture medium or a culture condition in which the nature and amounts of approximately all the components are known. A culture, composition, or culture medium is "essentially free" of certain reagents, such as signaling inhibitors, animal components or feeder cells, when the culture, composition, and medium, respectively, have a level of these reagents lower than a detectable level using conventional detection methods known to a person of ordinary skill in the art or that these agents have not been extrinsically added to the culture, composition, or medium.

As used herein, "effective amount" means an amount of an agent sufficient to evoke a specified cellular effect according to the present invention.

Unless defined otherwise, all technical and scientific terms used herein have the same meaning as commonly understood by one of ordinary skill in the art to which the invention pertains. All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein, the terms "approximately" or "about" in reference to a number are generally taken to include numbers that fall within a range of 5% in either direction (greater than or less than) the number unless otherwise stated or otherwise evident from the context (except where such number would exceed 100% of a possible value). Where ranges are stated, the endpoints are included within the range unless otherwise stated or otherwise evident from the context.

EXAMPLES

Example 1

Metabolic engineering efforts in plants, yeast and bacteria have exploited numerous pathways from across taxonomies towards diverse applications (Heider and Wendisch, 2015; Nielsen, 2015; Sack et al., 2015). That same breadth has not yet been realized in mammalian systems, where the majority of efforts have focused on biopharmaceuticals (Ceroni and Ellis, 2018; Davy et al., 2017). While these efforts are by no means inferior to those in other systems, the difference in scope is stark. To date, this discrepancy is likely due at least in part to the lack of a compelling case for engineering animal cells with metabolic pathways from other taxonomies; from a bioprocess standpoint, the production of recombinant proteins, small molecules and biofuels is cheaper in bacteria, yeast or plant systems, and only the need for species-specific post-translational modifications makes mammalian bioprocesses preferable (Davy et al., 2017; Giddings, 2001). The possibility of cultured meat offers a new framework for mammalian metabolic engineering. In cultured meat production, the product is the cells themselves, and so endogenously synthesizing additional compounds becomes a purely additive endeavor, at least insofar as those efforts are biologically possible and do not hinder the bioprocess parameters or product value. Here, the fact that cultured meat is dependent only on cell growth rather than whole-animal viability—which is inherently limiting for animal transgenics—allows the consideration of an even wider range of metabolites which might be untenable in animals but harmless or even beneficial in cell culture.

In this example, we demonstrate the possibility of generating nutritionally enhanced meat products through cell culture by engineering the endogenous production of non-native dietary carotenoids into primary bovine and immortalized murine skeletal muscle cells. While past speculation has suggested the nutritional enhancement of cultured meat through exogenous nutrient addition, the endogenous production of nutrients is advantageous from a bioprocess-cost perspective at scale, and from the positive implications that endogenous nutrients could have for nutrient bioavailability or growth kinetics (Desmarchelier and Borel, 2017; Le Moal et al., 2017). We show that carotenoids are produced at levels capable of significantly reducing lipid oxidation, are optimizable through a range of strategies, and that optimized levels are substantially higher than those found to accumulate in beef. These compounds, along with their general nutritive value and specific relevance to meat-associated disease, offer functionality in their ability to combat lipid oxidation's role in impairing shelf-life, color stability, and flavor. They are therefore compelling candidates for a proof-of-principle of how metabolic engineering can affect numerous meat quality metrics.

Additionally, the positive impact that carotenoid synthesis showed on C2C12 growth suggests an exciting commensurate benefit to this approach. Namely, the improvement of cell growth could help to substantially lower the cost of production for cultured meat while simultaneously generating a more nutritious product. A limitation of this study was the dependence on primary bovine satellite cells, as immortalized bovine cells would have enabled the exploration of this possibility in a more meat-relevant cell line uncoupled from the confounding impacts of primary cell senescence and antibiotic selection pressure. Further, an immortalized cell line would have allowed for the use of less-efficient targeted gene insertion techniques (such as CRISPR/Cas9), which would have enabled the production of a homologous cell population that could more clearly elucidate achievable carotenoid yields before and after optimization. An industrial cultured meat production scheme would likely use targeted engineering of immortalized cells and avoid antibiotic selection, so follow-up exploration of carotenoid synthesis in one-such cell population would be valuable future work.

The embodiment described here demonstrates incorporation of a biosynthetic pathway for antioxidant phytonutrients (carotenoids), which are native to plants and some prokaryotes but not animals, into a mammalian cell and production of a cultured meat therefrom. These nutrients confer multiple benefits through their status as antioxidants, provitamins, and free radical scavengers (Botella-Pavia and Rodriguez-Concepcion, 2006). Using non-viral Sleeping Beauty transposon-mediated transgenesis of phytoene synthase (CrtB), phytoene desaturase (CrtI), and lycopene cyclase (CrtY) from the bacterium *Pantoea ananatis*, we convert native geranylgeranyl pyrophosphate (GGPP) into phytoene, lycopene, and β-carotene in immortalized mouse myoblasts and primary bovine muscle stem cells (Botella-*Pavia* and Rodriguez-Concepcion, 2006; Izsvák et al., 2000). This work builds on previous crop engineering efforts and evidence for CrtB efficacy in mammalian cells (Satomi et al., 1995; Ye et al., 2000). We confirm the endogenous production of all three carotenoids and show that cellular myogenicity is maintained following modification. We then quantify and optimize carotenoid production through increased enzyme expression and induced precursor accumulation, obtaining yields substantially higher than reported levels for beef (Simonne et al., 1996). Finally, we validate the antioxidant capacity of endogenous carotenoids in vitro, which points towards nutritional and food-quality functionality. This work represents the first case of nutritional engineering for cultured meat and demonstrates how cross-taxa transgenesis can broaden the scope of metabolic engineering in mammalian cells to applications beyond the clinic.

Materials and Methods

C2C12 cell culture—C2C12 mouse skeletal myoblasts (ATCC #CRL-1772, Manassas, VA, USA) were grown on tissue-culture plastic in DMEM Glutamax (ThermoFisher #10566024, Waltham, MA, USA) supplemented with 10% FBS (ThermoFisher #26140079) and 1% antibiotic-antimycotic (ThermoFisher #15240062) (Yaffe and Saxel, 1977). For regular cell maintenance, cells were cultured to a maximum of 70% confluence, and then either passaged using 0.25% trypsin-EDTA (ThermoFisher #25200056) or frozen in FBS with 10% Dimethyl sulfoxide (DMSO, Sigma #D2650, St. Louis, MO, USA). Cells were incubated at 37° C. in 5% $CO_2$.

Primary bovine satellite cell isolation and culture—Primary bovine satellite cells (BSCs) were isolated using previously described methods (Simsa et al., 2019). Briefly, a small muscle excision (~0.5 $cm^3$) was taken from the semitendinosus of a <60-day-old Simmental bull raised at the Tufts Cummings School of Veterinary Medicine according to methods approved by the Tufts University IACUC (Protocol #G2018-36). Muscle tissue was dissected from fat and connective tissue, minced into a paste, and digested in 0.2% collagenase II (Worthington Biochemical #LS004176, Lakewood, NJ, USA; 275 U/mg) for one hour with regular trituration. Digestion was halted with growth media comprised of DMEM Glutamax supplemented with 20% FBS, 1 ng/mL human FGF-basic (ThermoFisher #68-8785-63), and 1% Primocin (Invivogen #ant-pm-1, San Diego, CA, USA), and cells were filtered and plated at a density of 100,000 cells/cm² onto uncoated tissue-culture flasks. After 24 hours of incubation at 37° C. with 5% $CO_2$, the plated suspensions (containing slowly-adherent satellite cells) were transferred to new flasks coated with 1 μg/cm² mouse laminin (Sigma #CC095). These flasks were left untouched for three days, at which point growth media was changed, and cells were cultured using standard practices on tissue-culture plastic coated with iMatrix recombinant laminin-511 (Iwai North America #N892021, San Carlos, CA, USA). After two weeks of culture, Primocin in growth media was replaced with 1% antibiotic-antimycotic. Cell passaging and cryopreservation was performed as with C2C12s. To induce myogenic differentiation, cells were cultured to confluency, and then incubated for one week without changing medium.

Immunofluorescence and cell characterization—To confirm the identity of isolated primary BSCs, cells were stained for Pax7 and Myosin Heavy Chain (MHC) before and after differentiation, respectively. These markers confirm the primary and terminal states of satellite cell myogenesis and therefore act to verify the nature and myogenicity of isolated cells. Proliferative cells and cells after one week of differentiation were fixed with 4% paraformaldehyde (ThermoFisher #AAJ61899AK) for 30 minutes, washed in PBS, permeabilized for 15 minutes using 0.5% Triton X (Sigma #T8787) in PBS, blocked for 45 minutes using 5% goat serum (ThermoFisher #16210064) in PBS with 0.05% sodium azide (Sigma #S2002), and washed with PBS containing 0.1% Tween-20 (Sigma #P1379). Primary Pax7 antibodies (ThermoFisher #PA5-68506) were diluted 1:100 in blocking solution and added to proliferative cells. Primary MHC antibodies (Developmental studies hybridoma bank #MF-20, Iowa City, IA, USA) were diluted to 4 μg/mL in blocking buffer containing 1:100 Phalloidin 594 (ThermoFisher #A12381) and added to differentiated cells. Primary antibodies were incubated overnight at 4° C. The following day, cells were washed with PBS+ Tween-20, incubated with secondary antibodies for Pax7 (ThermoFisher #A-11008, 1:500) and MHC (ThermoFisher #A-11001, 1:1000) for 1 hour at room temperature, washed with PBS+tween-20, and mounted with Fluoroshield mounting medium with DAPI (Abcam #ab104139, Cambridge, UK) before imaging.

Molecular cloning and Sleeping Beauty construct design—Amino acid sequences for CrtB, CrtI, and CrtY from *Pantoea ananatis* were obtained from UniProt (accession numbers P21683, P21685 and P21687, respectively). Gene sequences for these proteins were optimized for expression in *Bos taurus* using codon optimization software (IDT, Coralville, IA). Self-cleaving 2A peptides were added to the ends of each gene to facilitate multi-cistronic expression, and all genes were flanked with multiple cloning sites (Szymczak et al., 2004). Final gene constructs were ordered through ThermoFisher's GeneArt gene synthesis service (Table 1). Next, three Sleeping Beauty transposon vectors were constructed using synthesized genes and based on plasmids available through Addgene: pCMV-GFP was a gift from Connie Cepko (Addgene #11153, Watertown, MA, USA), pSBbi-GP and pSBbi-Pur were gifts from Eric Kowarz (Addgene #60511 & #60523), and pCMV(CAT)T7-SB100 was a gift from Zsuzsanna Izsvak (Addgene #34879) (Kowarz et al., 2015; Mátés et al., 2009; Matsuda and Cepko, 2004). Transposon construction was performed using standard cloning techniques. Briefly, CrtB was cloned into pCMV-GFP using EcoRI-HF and XmaI restriction (NEB #R3101S & #R0180S, Ipswich, MA, USA) followed by T4 DNA ligation (NEB #M0202S) to generate pCMV-CrtB-P2A-eGFP, a plasmid for the transient bi-cistronic expression of CrtB and green fluorescent protein (GFP) under the cytomegalovirus (CMV) promoter.

TABLE 1

Carotenoid synthesis genes. Gene sequences used in constructs (upper case), followed by 2A linker sequences (SEQ ID NO:37) used after each gene (lower case).

| | |
|---|---|
| CrtB + 2A (SEQ ID NO: 38 + 37) | ATGGTCAACAACCCCAGCCTGCTGA ATCACGCCGTGGAAACAATGGCCGT GGGCAGCAAGTCTTTCGCCACCGCC TCTAAGCTGTTCGACGCCAAGACTA GACGCAGCGTGCTGATGCTGTACGC CTGGTGCAGACACTGCGACGACGTG ATCGACGATCAGACCCTGGGATTCC AGGCCAGACAGCCTGCTCTGCAGAC CCCTGAACAGAGGCTGATGCAGCTG GAAATGAAGACCAGGCAGGCCTACG CCGGCTCTCAGATGCACGAACCTGC TTTCGCCGCCTTCCAAGAGGTGGCC ATGGCTCACGATATCGCCCCTGCCT ACGCCTTCGATCACCTGGAAGGATT CGCCATGGATGTGCGCGAGGCCCAG TACAGCCAGCTGGATGATACCCTGA GGTACTGCTATCACGTGGCCGGCGT TGTGGGACTGATGATGGCTCAGATC ATGGGCGTGCGCGACAACGCCACAC TGGACAGAGCTTGTGATCTCGGCCT GGCCTTCCAGCTGACCAATATCGCC AGAGACATCGTGGACGATGCCCACG CCGGCAGATGTTATCTGCCTGCCTC TTGGCTGGAACACGAGGGCCTGAAC AAAGAGAACTACGCCGCTCCTGAGA ACAGACAGGCCCTGAGCAGAATCGC TAGAAGGCTGGTGCAAGAGGCCGAG CCTTACTACCTGTCTGCCACAGCTG GACTGGCAGGACTGCCTCTGAGATC TGCCTGGGCCATTGCCACAGCCAAA CAGGTGTACAGAAAGATCGGCGTGA AGGTGGAACAGGCCGGACAGCAGGC TTGGGACCAGAGACAGTCTACCACC ACACCTGAGAAGCTGACCCTGCTGC TGGCTGCTTCTGGACAGGCTCTGAC CAGCAGGATGAGAGCCCATCCTCCT AGACCTGCTCACCTCTGGCAAAGAC CTCTCggatctggcgaaggcagagg ctctctgctgacatgtggcgacgtg gaagagaacccctggacct |
| CrtI + 2A (SEQ ID NO: 39 + 37) | ATGAAGCCCACCACAGTGATCGGAG CCGGCTTTGGAGGACTGGCCCTGGC TATTAGACTGCAGGCTGCTGGAATC CCCGTGCTGCTGCTCGAACAGAGAG ATAAGCCTGGCGGCAGGGCCTACGT GTACGAGGATCAGGGCTTCACCTTC GACGCCGGACCTACCGTGATCACAG ATCCTAGCGCCATCGAGGAACTGTT CGCCCTGGCTGGCAAGCAGCTGAAA GAGTACGTCGAGCTGCTGCCCGTGA CACCCTTCTACAGACTGTGTTGGGA GAGCGGCAAGGTGTTCAACTACGAC AACGACCAGACCAGGCTGGAAGCCC AGATCCAGCAGTTCAACCCTAGAGA TGTGGAAGGCTACAGGCAGTTCCTG GACTACAGCAGGGCCGTGTTCAAAG AGGGCTACCTGAAGCTGGGAACCGT GCCTTTCCTGAGCTTCAGGGACATG CTGAGAGCCGCTCCTCAGCTGGCCA AACTCCAGGCTTGGAGAAGCGTGTA CAGCAAGGTGGCCAGCTACATCGAG GACGAGCACCTGAGACAGGCCTTCA GCTTCCACTCTCTGCTCGTCGGCGG CAACCCTTTCGCCACCTCTTCTATC TACACCCTGATTCACGCCCTGGAAC GCGAGTGGGGAGTGTGGTTTCCTAG AGGTGGAACAGGCGCTCTGGTGCAG GGCATGATCAAGCTGTTCCAGGATC |

TABLE 1-continued

Carotenoid synthesis genes. Gene sequences used in constructs (upper case), followed by 2A linker sequences (SEQ ID NO:37) used after each gene (lower case).

| | |
|---|---|
| | TCGGCGGAGAGGTGGTGCTGAACGC |
| | TAGAGTGTCCCACATGGAAACCACC |
| | GGCAACAAGATCGAGGCCGTGCATC |
| | TGGAAGATGGCAGAAGATTCCTGAC |
| | ACAGGCCGTGGCCTCTAACGCCGAT |
| | GTGGTGCACACCTACAGGGACCTGC |
| | TGTCTCAGCATCCTGCCGCCGTGAA |
| | GCAGAGCAACAAGCTGCAGACCAAG |
| | AGGATGAGCAACAGCCTGTTCGTGC |
| | TGTACTTCGGCCTGAACCACCACCA |
| | CGATCAGCTGGCTCACCACACCGTG |
| | TGTTTCGGCCCCAGATACAGAGAGC |
| | TGATCGACGAGATCTTCAACCACGA |
| | CGGCCTGGCCGAGGACTTCTCTCTG |
| | TACCTGCATGCCCCTTGCGTGACCG |
| | ACAGTTCTCTGGCCCCTGAAGGCTG |
| | CGGCTCTTACTATGTGCTGGCTCCT |
| | GTGCCTCACCTGGGCACCGCTAATC |
| | TGGATTGGACCGTGGAAGGCCCCAA |
| | GCTGAGGGACAGAATCTTCGCCTAC |
| | CTCGAACAGCACTACATGCCCGGCC |
| | TGAGAAGCCAGCTGGTCACCCACAG |
| | AATGTTCACCCCTTTCGACTTCCGC |
| | GACCAGCTGAACGCCTATCACGGCT |
| | CTGCCTTCAGCGTGGAACCTGTGCT |
| | GACTCAGTCCGCCTGGTTCAGACCC |
| | CACAACAGGGACAAGACCATCACCA |
| | ACCTGTACCTCGTTGGCGCCGGAAC |
| | ACATCCTGGTGCTGGTATTCCAGGC |
| | GTGATCGGATCTGCCAAAGCCACCG |
| | CTGGACTGATGCTCGAGGATCTGAT |
| | Tggaagcggcgccaccaacttcagc |
| | ctgctgaaacaggctggcgacgtgg |
| | aagagaaccctggacct |
| CrtY + 2A (SEQ ID NO: 40 + 37) | ATGCAGCCCCACTACGATCTGATTC TCGTCGGAGCCGGACTGGCCAATGG ACTGATTGCTCTGAGACTCCAGCAG CAGCAACCCGACATGAGGATCCTGC TGATCGATGCCGCTCCTCAGGCTGG CGGAAATCACACCTGGTCTTTCCAC CACGACGACCTGACCGAGAGCCAGC ACAGATGGATTGCTCCTCTGGTGGT GCATCACTGGCCCGACTACCAAGTG CGCTTTCCCACCAGAAGGCGCAAGC TGAACAGCGGCTACTTCTGCATCAC CAGCCAGAGATTCGCCGAGGTGCTG CAGAGACAGTTCGGACCTCACCTGT GGATGGATACCGCCGTGGCCGAAGT GAATGCCGAGTCTGTGCGCCTGAAG AAAGGCCAAGTGATCGGAGCCAGAG CCGTGATCGATGGCAGAGGATACGC CGCCAATTCTGCCCTGTCTGTGGGA TTCCAGGCCTTCATCGGACAAGAGT GGCGCCTGTCTCACCCTCACGGACT GTCTAGCCCCATCATCATGGACGCC ACCGTGGATCAGCAGAACGGCTACA GATTCGTGTACAGCCTGCCTCTGAG CCCCACCAGGCTGCTGATTGAGGAC ACCCACTACATCGACAACGCCACAC TGGACCCTGAGTGCGCCAGACAGAA CATCTGCGATTACGCCGCTCAGCAA GGCTGGCAGCTGCAGACACTGCTGA GAGAAGAACAGGGCGCTCTGCCCAT CACACTGTCTGGAAACGCCGATGCC TTCTGGCAGCAAAGACCTCTGGCCT GTTCTGGCCTGAGAGCCGGCCTGTT TCACCCAACAACCGGATACTCTCTG CCTCTGGCTGTGGCCGTGGCTGATA GACTGTCTGCCCTGGACGTGTTCAC CAGCGCCTCTATCCACCACGCCATC ACACACTTCGCCAGAGAGAGATGGC AGCAGCAGGGCTTCTTCAGGATGCT GAACAGAATGCTGTTCCTGGCCGGA CCAGCCGACTCTCGTTGGAGAGTCA |

TABLE 1-continued

Carotenoid synthesis genes. Gene sequences used in constructs (upper case), followed by 2A linker sequences (SEQ ID NO:37) used after each gene (lower case).

| | |
|---|---|
| | TGCAGAGGTTCTACGGCCTGCCTGA |
| | GGACCTGATCGCCAGATTCTACGCC |
| | GGAAAGCTGACCCTGACCGACAGGC |
| | TGAGAATCCTGTCTGGCAAGCCTCC |
| | TGTGCCAGTGCTGGCTGCTCTGCAG |
| | GCCATCATGACCACACACAGAggat |
| | ctggcgaaggcagaggctctctgct |
| | gacatgtggcgacgtggaagagaac |
| | cctggacct |

Next, the CMV-CrtB-P2A-GFP portion of this plasmid was cloned into pSBbi-Pur via Gibson assembly (SGI-DNA #GA1100, San Diego, CA, USA) while excising the backbone's EF1α promoter in preference for the insert's CMV promoter. This produced pSBbi-(CMV-CrtB-T2A-GFP)-pur, a Sleeping Beauty transposon vector carrying the same bi-cistronic CrtB and GFP expression cassette under the CMV promoter, as well as a puromycin resistance gene under a synthetic promoter oriented counter to CMV (Kowarz et al., 2015). Subsequent Gibson assemblies inserted CrtI and CrtY into this vector to create three final Sleeping Beauty transposon carotenoid-producing vectors: pSBbi-(CMV-CrtB-T2A-)-pur (pCrtB), pSBbi-(CMV-CrtB-T2A-CrtI-P2A-GFP)-pur (pCrtB/I), and pSBbi-(CMV-CrtY-T2A-CrtB-T2A-CrtI-P2A-GFP)-pur (pCrtB/I/Y) (FIG. 1). A control Sleeping Beauty transposon vector containing only GFP (pGFP) was generated by removing the carotenoid synthesis enzymes and 2A sequences from pCrtB/I/Y, leaving only the GFP under CMV promotion (FIG. 1). All constructs were maintained in 5-alpha high-efficiency chemically competent E. coli (NEB #C2988J), verified with Sanger sequencing (Genewiz, Cambridge, MA, USA), and purified via GeneJet miniprep (ThermoFisher #K0503). For Gibson assembly, polymerase chain reactions were performed using Q5 high-fidelity polymerase (NEB #M0492S), run through 1% agarose gel-electrophoresis, and purified via GeneJet gel extraction (ThermoFisher #K0692).

Transfection and selection—C2C12s and BSCs were cultured to 80-90% confluency in 6-well plates and transfected with Lipofectamine 3000 (ThermoFisher #L3000015) according to the manufacturer's protocol adapted for simultaneous transfection of two plasmids. Briefly, 2.5 µg of the carotenoid producing vectors or the pGFP control vector were combined with 0.25 µg of pCMV(CAT)T7-SB100 in a solution of 250 uL Opti-MEM medium (ThermoFisher #31985088), 7.5 uL of Lipofectamine 3000 reagent, and 5 uL of p3000 reagent. This mixture was incubated at room temperature for 15 minutes. During incubation, cells were rinsed once with PBS and covered with 2 mL of Opti-MEM before adding lipofectamine mixtures. After 4 hours at 37° C., 2 mL of growth media was added to wells, and cells were incubated at 37° C. overnight. The next morning, media was replaced with appropriate growth media, and cells were cultured for two days before observing GFP expression with a fluorescent microscope. After two days, media was changed to growth media with 2.5 µg/mL puromycin to begin selection. Over one week, cells were passaged, and media was replaced as necessary due to cell death from selection. Once all cells were observed to express GFP, cultures were expanded and cryopreserved for later use.

Growth and development of engineered cells—Growth of engineered BSCs and C2C12s was analyzed using a dsDNA quantitation kit (ThermoFisher #F2962) on days 1, 2, 4, 6, and 8 of culture. Cells were plated in 96-well plates for each time-point at a density of 1000 cells/well. At each time-point, media was removed from wells and plates were frozen at −80° C. After all time-points were frozen, plates were thawed to room temperature, and 100 uL of UltraPure water (ThermoFisher #10977023) was added to wells. Plates were incubated at 37° C. for one hour, re-frozen to −80° C., and re-thawed to room temperature. Wells were stained with 100 uL of Hoechst 33258 working solution. Fluorescence was measured with a Synergy H1 microplate reader (BioTek Instruments, Winooski, VT, USA) using excitation and emission filters centered at 360 and 460 nm, respectively. In parallel, a 96-well plate was seeded with a range of known cell densities, incubated for 12 hours, and measured using the same protocol to obtain a standard curve and convert fluorescence values to cell number. To analyze the effect of transfection on cellular phenotype, BSCs transfected with pCrtB/I/Y were differentiated and stained for Pax7 and MHC as previously described, with the exception that red (594 nm) fluorophore-conjugated antibodies were used to detect both Pax7 (ThermoFisher #A-11072) and MF20 (Abcam #ab150116), and no cytoskeletal counterstain was performed.

Carotenoid extraction—Cells were cultured to confluency in 175 cm² flasks, harvested, and counted using a hemocytometer. Collected cells (~3-10 million for BSCs, ~10-20 million for C2C12s) were washed 1× with PBS, resuspended in 1 mL of a 50:25:25 solution of hexane (Sigma #270504), acetone (ThermoFisher #A18-500), and ethanol (Sigma #459836), vortexed for one minute, and incubated on a shaker plate at room temperature for 30 minutes. After 30 minutes, 150 μL of deionized water was added, and suspensions were again vortexed for one minute. Solutions were centrifuged at 3,000 g for 5 minutes at 4° C., and the carotenoid-containing upper layer was collected in a Pyrex tube. Another 1 mL of hexane:acetone:ethanol solution was added to the remaining pellet, and the extraction was repeated, pooling the two carotenoid solutions in one tube. Extracts were dried at room temperature under flow of nitrogen gas, capped, and stored at −80° C. before analysis with HPLC.

Quantitative HPLC—Carotenoids were analyzed via HPLC following published techniques on an Agilent 1200 system (Agilent Technologies, Santa Clara, CA, USA) with a C30 stationary phase (YMC #CT99S03-1546WT, 3 μm, 4.6×150 mm, Allentown, PA, USA) and mobile phase solvents A—methanol (ThermoFisher #A454-1) containing 1% ammonium acetate (ThermoFisher), and B—methyl-tert-butyl ether (MTBA, ThermoFisher #AC378720010) (Melendez-Martinez et al., 2013). Briefly, carotenoid extracts were suspended in 150 μL of ethanol, vortexed, and injected (50 μL) into the HPLC system. Mobile phase solvents were pumped through the system at 1 mL/min with the following time-dependent gradients: t=0 min, 95% A, 5% B; t=15 min, 85% A, 15% B; t=30-37 min, 40% A, 60% B; t=40-55 min, 30% A, 70% B; t=59-64 min, 90% A, 10% B; t=70 min, 95% A, 5% B. Carotenoid standard curves were generated by dissolving (E/Z)-phytoene (Sigma #78903), lycopene (Sigma #SMB00706), and β-carotene (ThermoFisher #AAH6010603) standards in hexane at a concentration of ~0.5 mg/mL. Exact concentrations were determined spectrophotometrically (SpectraMax M2, Molecular Devices, San Jose, CA, USA) by measuring absorbances in 1 cm path-length quartz cuvettes at 286, 472, and 453 nm for phytoene, lycopene, and β-carotene, respectively, and calculating exact concentration using $A^{1\%}$=915, 3450, and 2592 for phytoene, lycopene, and β-carotene, respectively. Standards were dried under nitrogen and stored at −80° C. until analyzed with samples following serial dilution. As FBS can contain trace carotenoids (from animal feed), endogenously-produced carotenoid content was captured by subtracting the area under any peaks found in extractions from pGFP cells (which have no mechanism for producing carotenoids endogenously) (Chitchumroonchokchai et al., 2017). If calculations returned negative values, or no peak was detected, endogenous carotenoid content was set to zero. Final values were converted to ng/cells*$10^6$ before normalizing to cellular protein.

Figures 4A, 4B:
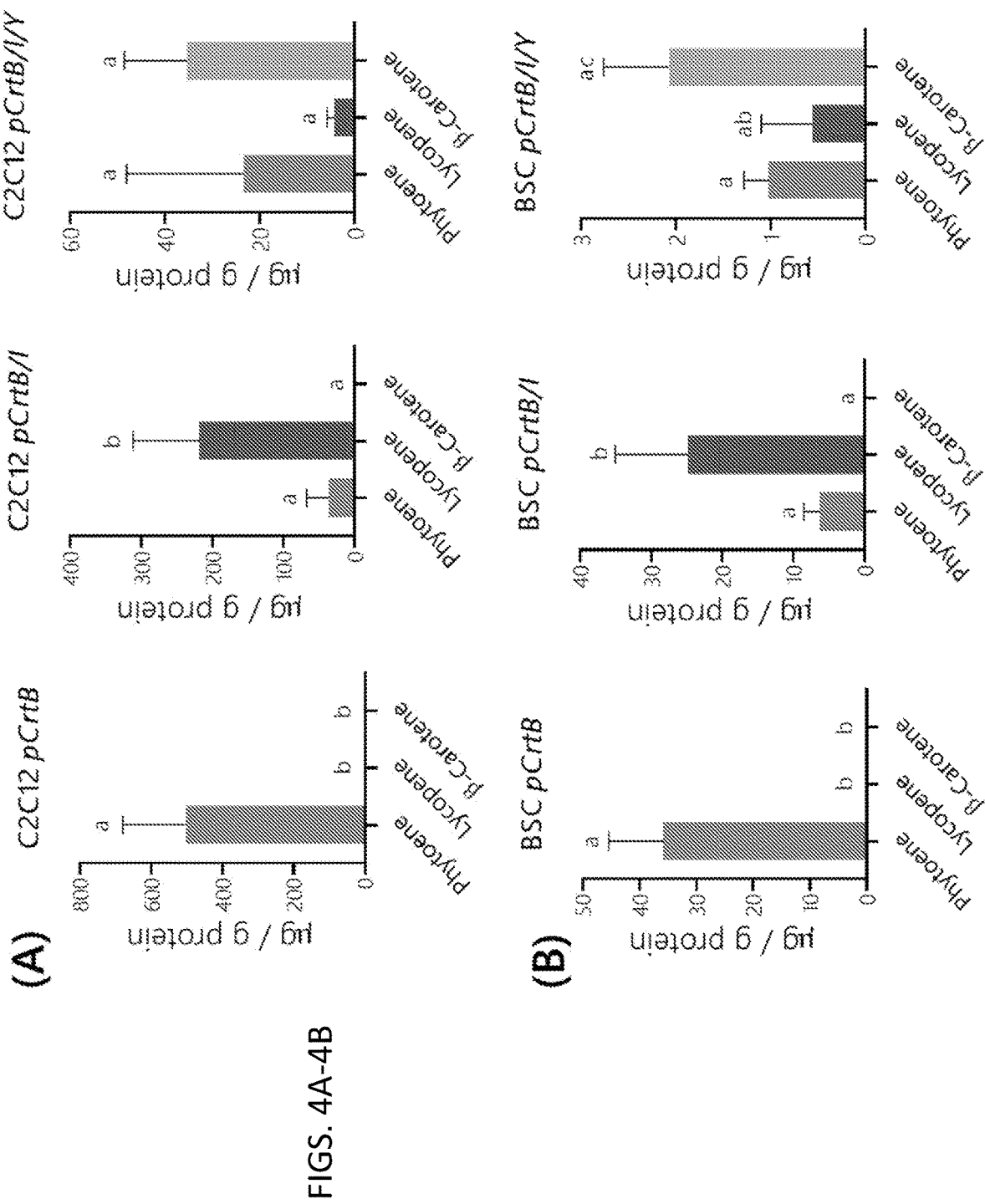
FIGS. 4A-4B show carotenoid production in engineered cells. Carotenoid production in engineered cells.
Figures 4C, 4D:
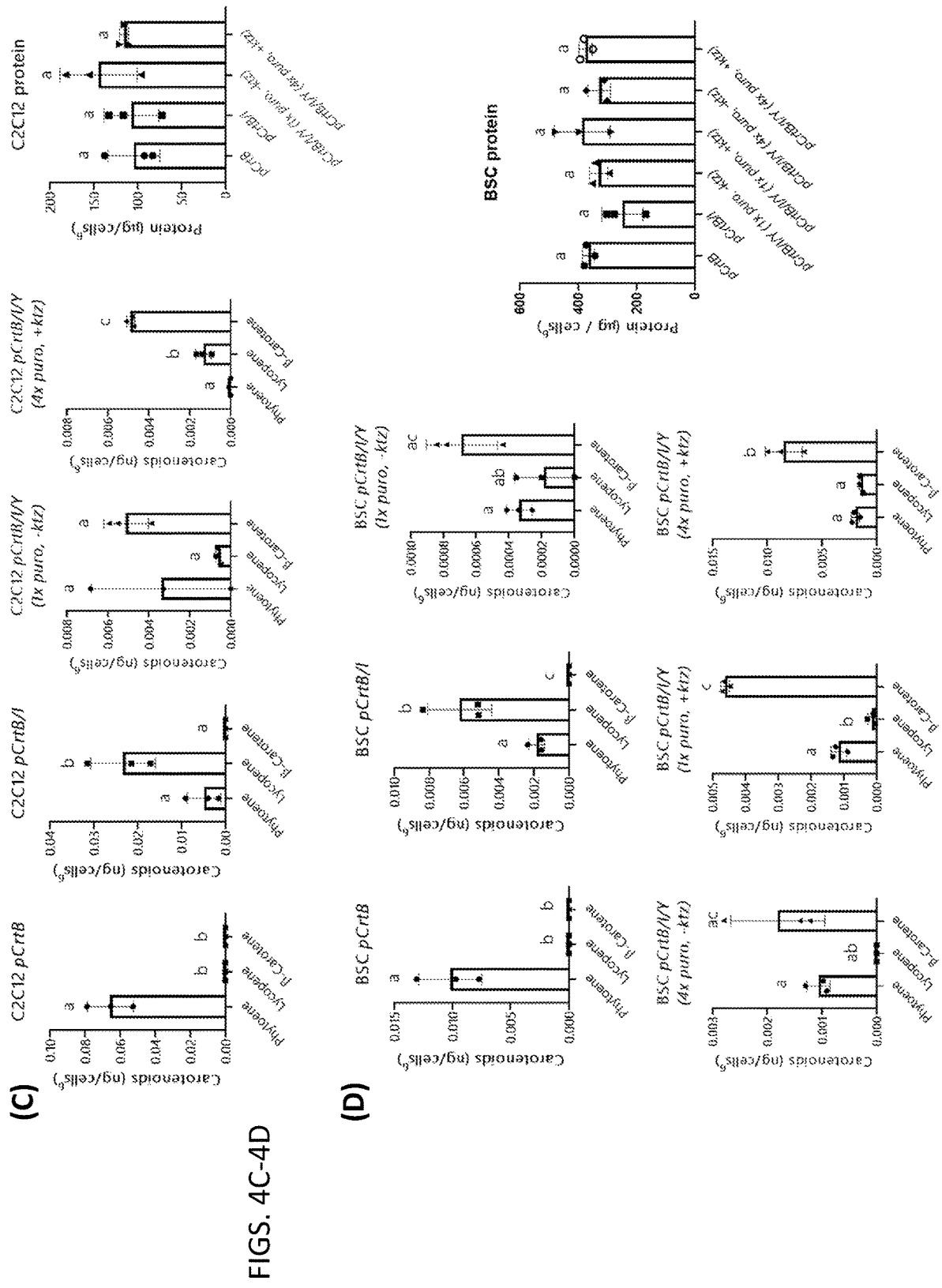
FIGS. 4C-4D show carotenoid and protein quantification data. Individual carotenoid and protein data points used for generating µg/g data.

Protein quantification—To normalize cellular carotenoid content under more food-relevant metrics than cell number, cellular protein content was measured. Briefly, engineered cells were cultured as previously described, harvested, and counted. One million cells were pelleted, washed 1× in PBS, and treated with 100 uL of RIPA buffer (Thermo Fisher #89900) containing 1% Halt Protease Inhibitor Cocktail EDTA-Free (ThermoFisher #78425) according to the manufacturer's instructions. Resulting cell lysates were analyzed via Pierce BCA protein assay (ThermoFisher #23225) according to the manufacturer's instruction. Absorbance at 562 nm was compared to a standard curve of known bovine serum albumin (BSA) concentrations and used to determine cellular protein per million cells (Supplementary FIG. 1). These values were then used alongside carotenoid quantification per million cells (FIGS. 4C-4D) to obtain carotenoid content per protein mass.

Carotenoid optimization—Two methods were explored for optimizing carotenoid production in pCrtB/I/Y cells. The first focused on increasing gene expression by increasing puromycin selective pressure. The second focused on increasing levels of the carotenoid pathway precursor farnesyl pyrophosphate (FPP) by inhibiting downstream reactions in one of FPP's alternative metabolic pathways—cholesterol synthesis—using the small molecule ketoconazole (Sun et al., 2007). By exploring these two approaches, the possibility for a single approach to fail to address a rate-limiting step in carotenoid production was reduced. Specifically, if FPP levels were completely limiting (i.e., there was enough enzyme to fully exhaust FPP levels), then increasing enzyme expression would fail to increase carotenoid levels. Similarly, if enzyme levels were completely limiting, then ketoconazole treatment would offer no increase in carotenoid production. To determine an appropriate puromycin concentration for increasing enzyme expression, engineered cells were cultured in media containing 2.5 μg/mL puromycin (1× puro), 5 μg/mL puromycin (2× puro) or 10 μg/mL puromycin (4× puro), and relative GFP expression was determined via flow cytometry as a proximate measure of enzyme expression. Briefly, cells were cultured, harvested, and GFP was analyzed using a BD FACSCalibur (BD Sciences) or Attune NxT (ThermoFisher) flow cytometer. Appropriate gating was performed using pGFP and unmodified cells as positive and negative controls, and mean fluorescent intensity was determined. Data were analyzed with the FlowJo software (v10). To determine an appropriate ketoconazole concentration for metabolic flux modulation, a growth curve was performed as previously described using a dsDNA quantitation kit and media treated starting on day 1 with 0, 2.5, 5, 10, or 20 μg/mL ketoconazole (KTZ, ThermoFisher #455470010) dissolved in DMSO. Final DMSO concentration was held constant (0.3%) in all conditions. Following the determination of appropriate concentrations of puromycin and ketoconazole for carotenoid optimization, pCrtB/I/Y cells were cultured in media containing 1× puro plus 5

µg/mL ketoconazole, 4× puro without ketoconazole, or 4× puro plus 5 µg/mL ketoconazole, and carotenoid analysis was performed as previously described.

Lipid oxidation—To analyze the antioxidant functionality of carotenoids in cells, a thiobarbituric acid reactive substances (TBARS) assay was performed. This assay measures malondialdehyde (MDA), a byproduct of unsaturated fatty acid oxidation, and so serves as a measure of lipid oxidation in cells. As lipid oxidation is often catalyzed by the processes that generate oxidative pressure, such as cooking of meat, the TBARS assay was performed on both "raw" cells, and cells that had been heated to mimic cooking. Briefly, engineered BSCs were cultured as previously described, harvested, and counted. 1.5 million cells were aliquoted to tubes for heated or unheated analysis, washed 1× in PBS, pelleted, and the supernatant PBS was removed. Collected cell pellets were stored overnight at 4° C. The next day, samples designated for heating were incubated for 10 minutes in a 100° C. heat block, cooled to room temperature, and placed on ice. All cells (heated and unheated) were suspended in 500 µL of PBS, incubated for 2 hours on ice, and sonicated on ice using a probe sonicator (Branson, St. Louis, MO, USA) at 15% intensity for 5×15 second pulses, with 20 second intervals between pulses. Next, the TBARS assay (Cayman Chemical #700870, Ann Arbor, MI, USA) was performed with 100 µL of sonicated cell lysates, following the manufacturers protocol and determining MDA by measuring absorbance at 535 nm compared to a standard curve of known MDA concentrations. The remainders of the cell lysates were frozen at −80° C. until protein quantification was performed via Bradford assay (ThermoFisher #23200) following the manufacturers protocol. Briefly, 5 µL of cell lysates were incubated for 10 minutes with 250 uL of Coomassie reagent, and the absorbance was measured at 595 nm and compared to a BSA standard curve. TBARS measurements were normalized with protein content for each sample in order to obtain corrected cellular MDA (mg/g protein).

Statistical analysis—Statistical analysis was performed with GraphPad Prism 8.0 software (San Diego, CA, USA). Carotenoid content, flow cytometry, and ketoconazole growth were analyzed via one-way ANOVA. Growth curves and TBARS assays were analyzed via two-way ANOVA. Multiple comparisons of all analyses were performed with Tukey's HSD post-hoc test. In converting carotenoid and MDA quantification to per-protein values, propagation of error was considered using $\sigma\_(A/B)=(A/B)\sqrt{((\sigma\_(A/A)^2+(\sigma\_(B/B)^2)}$, where $\sigma\_A$ is the standard deviation of the data A. P values <0.05 were treated as significant. Unless otherwise stated, errors are given as ±standard deviation.

Results and Discussion

Figures 2A, 2B:
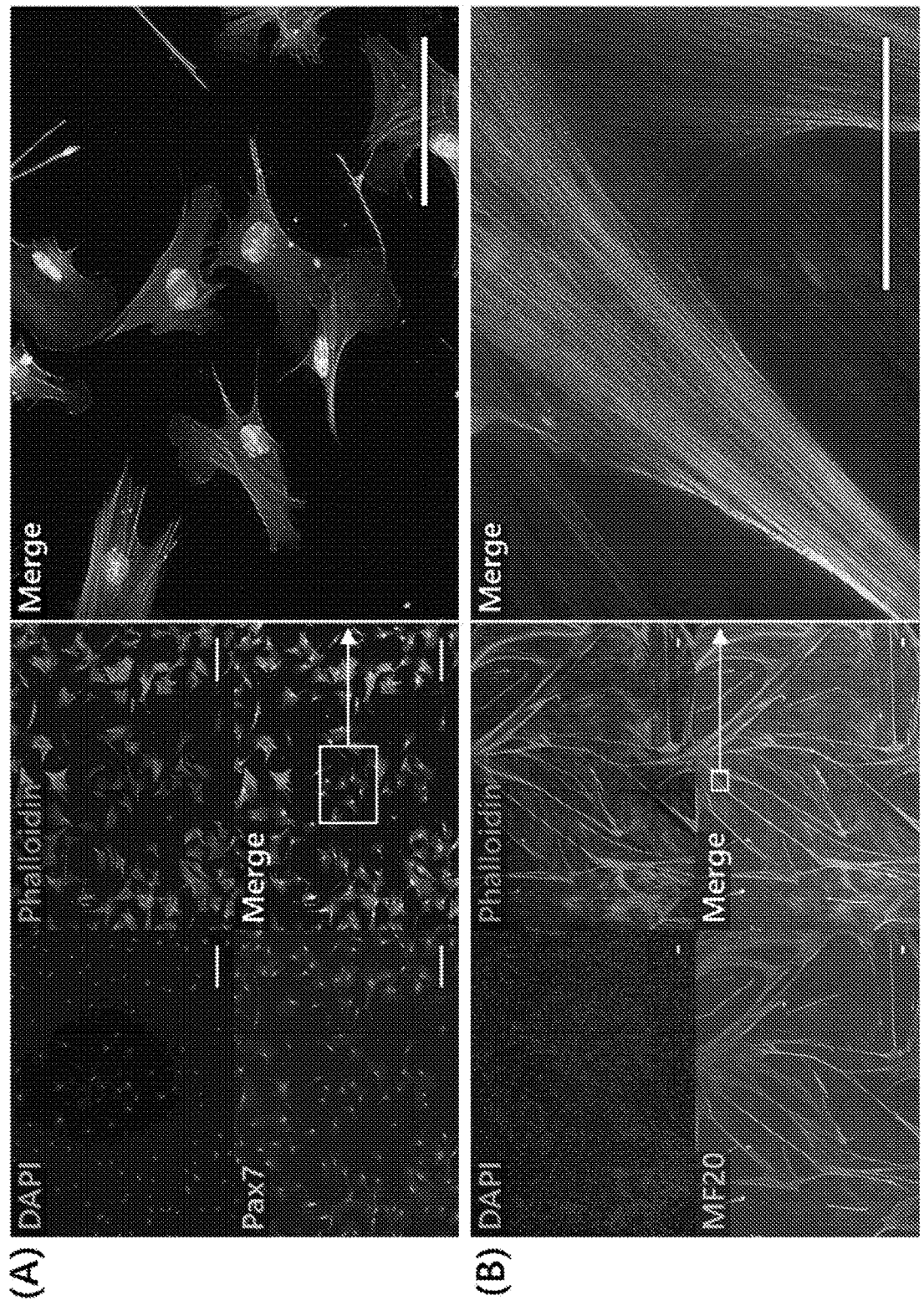
FIGS. 2A-2B show bovine satellite cell characterization.

Primary bovine skeletal muscle stem cells—Immunofluorescent staining for early markers of satellite cell identity and terminal markers of myogenic differentiation were used to characterize primary bovine satellite cells (BSCs). Proliferative cells showed ubiquitous staining for Pax7, a marker of satellite cell phenotype (FIG. 2A), indicating that the cell isolation protocol was successful in generating a highly consistent population of myogenic stem cells. Following one week of differentiation, cells stained for myosin heavy chain (MHC) showed long, multinucleated myotubes (FIG. 2B). Actin and MHC staining of these myotubes revealed striated architecture indicative of sarcomere formation, and the presence of a contractile apparatus was further supported by the observation of spontaneous contractions in differentiated cultures. Together, these data indicate the isolation of a highly myogenic population of bovine skeletal muscle precursors, and the ability of these cells to undergo robust differentiation in vitro.

Figures 3A, 3B, 3C:
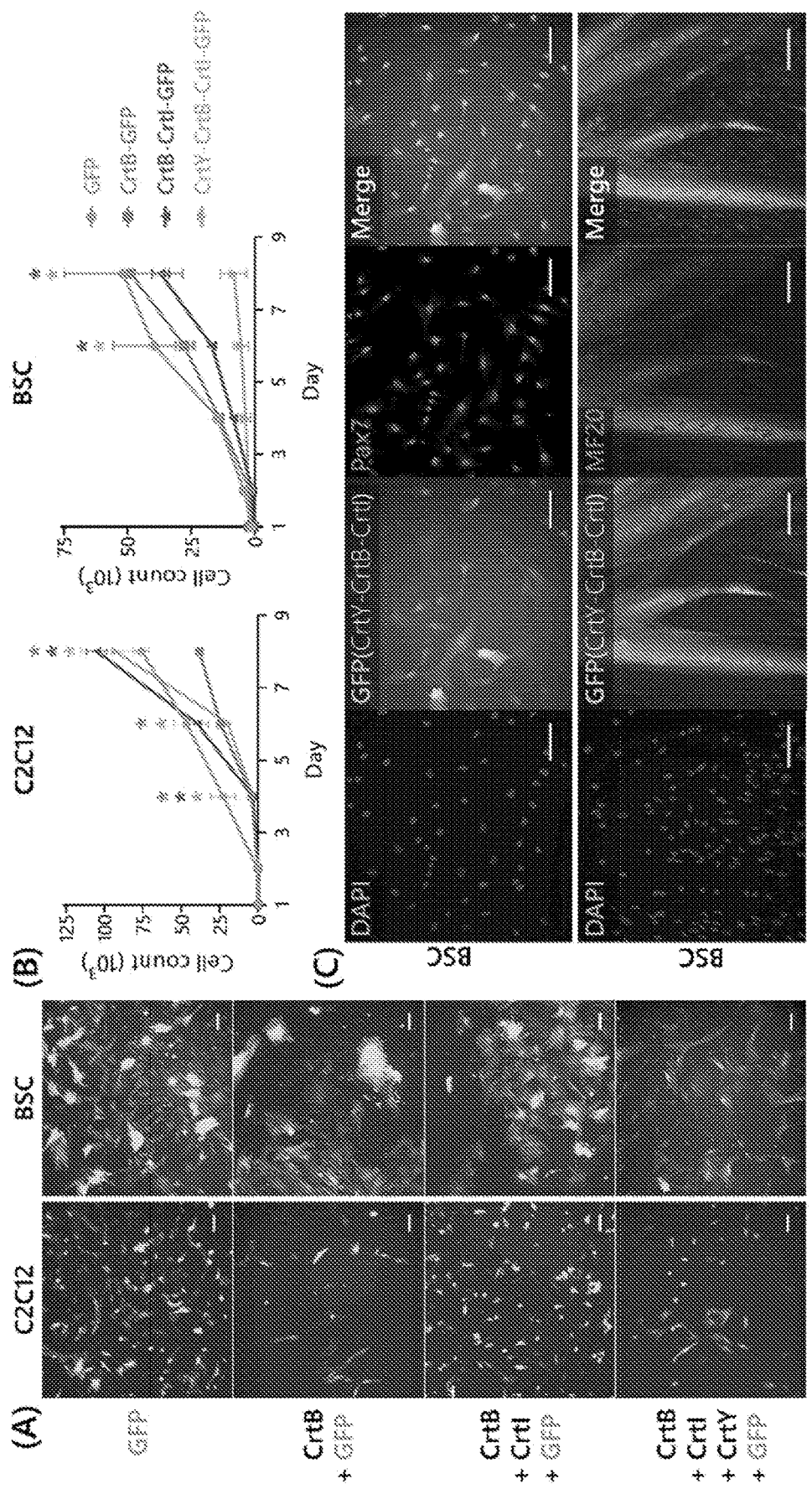
FIGS. 3A-3C show engineered cell growth and development.

Stable transgene expression in cells—BSCs and C2C12 immortalized mouse precursor cells were engineered with multicistronic vectors for producing a range of protein conversations. These were green fluorescent protein (GFP) alone (pGFP) which did not produce any carotenoids, CrtB and GFP (pCrtB) which could produce phytoene, CrtB, CHI and GFP (pCrtB/I) which could produce phytoene and lycopene, or CrtB, CrtI, CrtY and GFP (pCrtB/I/Y) which could produce phytoene, lycopene and β-carotene (FIGS. 2A-2B). The multi-cistronic nature of these vectors allowed the use of GFP expression as an indicator of vector integration and gene expression. Specifically, 2A sequences between genes allowed for near stoichiometric expression of enzymes and GFP (Szymczak et al., 2004). After transfection followed by one week of selection in puromycin-containing media, all cells stably their respective gene cassettes, as was visible through GFP fluorescence (FIG. 3A). Fluorescence intensity was heterogenous, which was likely due to the randomness of transposition. No obvious morphological differences were seen between control pGFP cells and cells expressing carotenoid-synthesis enzymes.

Growth and development of engineered cells—As antioxidants are known to affect muscle progenitor proliferation, cells producing all three carotenoids were analyzed for growth-rate over eight days (Le Moal et al., 2017). For BSCs, the size of the inserted gene construct was negatively associated with growth rate (FIG. 3B). In contrast, C2C12s engineered with the two largest compounds (pCrtB/I and pCrtB/I/Y) showed higher growth over eight days than cells engineered with pGFP or pCrtB. This discrepancy could be due to the impact that insertion efficiency and subsequent selection has on primary cells, but not immortalized cells. Namely, cells transfected with larger constructs have a lower insertion efficiency, and so require more doublings to generate an equally large population of engineered cells (Izsvák et al., 2000). In primary cells, growth is reduced with increased doublings, and eventually cellular senescence is reached (Ding et al., 2018). In immortalized cells, however, doublings do not hinder growth. Rather, antioxidant capacity has been shown to increase cellular proliferation (Le Moal et al., 2017), and immortalized cells with increased antioxidant capacity—pCrtB/I and pCrtB/I/Y cells—showed improved growth compared to controls. It is possible that immortalized bovine cells would show similar relative kinetics.

To determine whether genetic modification affected myogenic potential, Pax7 and MHC staining was performed on pCrtB/I/Y BSCs (FIG. 3C). Staining showed maintenance of Pax7 expression and MHC-positive myotube formation. No striations were observed in differentiated cells, which could indicate less robust differentiation compared to non-engineered cells. This could be due to an antioxidant effect reducing the degree of myofiber maturation, though the ability of cells to form myotubes suggests the potential for these cells to generate differentiated cultured meat products. Together, these data point to the ability of cells to maintain their capacity for proliferation and differentiation following modification with carotenoid-synthesizing enzymes; however, this capacity may be reduced in primary cells.

Carotenoid production by engineered cells—Quantitative HPLC confirmed the production of phytoene in pCrtB cells, phytoene and lycopene in pCrtB/I cells, and phytoene, lycopene and β-carotene in pCrtB/I/Y cells. In all cells, carotenoids accumulated in the terminal compound though precursors (i.e., phytoene and lycopene in pCrtB/I/Y cells)

were present, indicating high but non-exhaustive conversion efficiency throughout the pathway (FIGS. 4A-4D). In pCrtB/I cells, most of the phytoene was converted to lycopene, with high conservation of total carotenoid content compared with cells only producing phytoene. In pCrtB/I/Y cells, carotenoids accumulated in the terminal compound (β-carotene), though yields were significantly reduced compared to pCrtB or pCrtB/I cells. C2C12s produced more carotenoids for all three constructs than BSCs. Total carotenoids for C2C12 pCrtB, pCrtB/I, and pCrtB/I/Y were 505.3, 254.8, and 63.19 µg/g protein, respectively. For BSCs, these were 35.8, 31.2, and 3.7 µg/g protein, respectively. The significant reduction in total carotenoid content in BSCs compared to C2C12s and pCrtB/I/Y cells compared to pCrtB or pCrtB/I cells could be due to increased cellular burdens of selection and protein production and/or the degradation of β-carotene with endogenous enzymes (Geurts et al., 2003; Lindqvist et al., 2005).

Figures 7A, 7B:
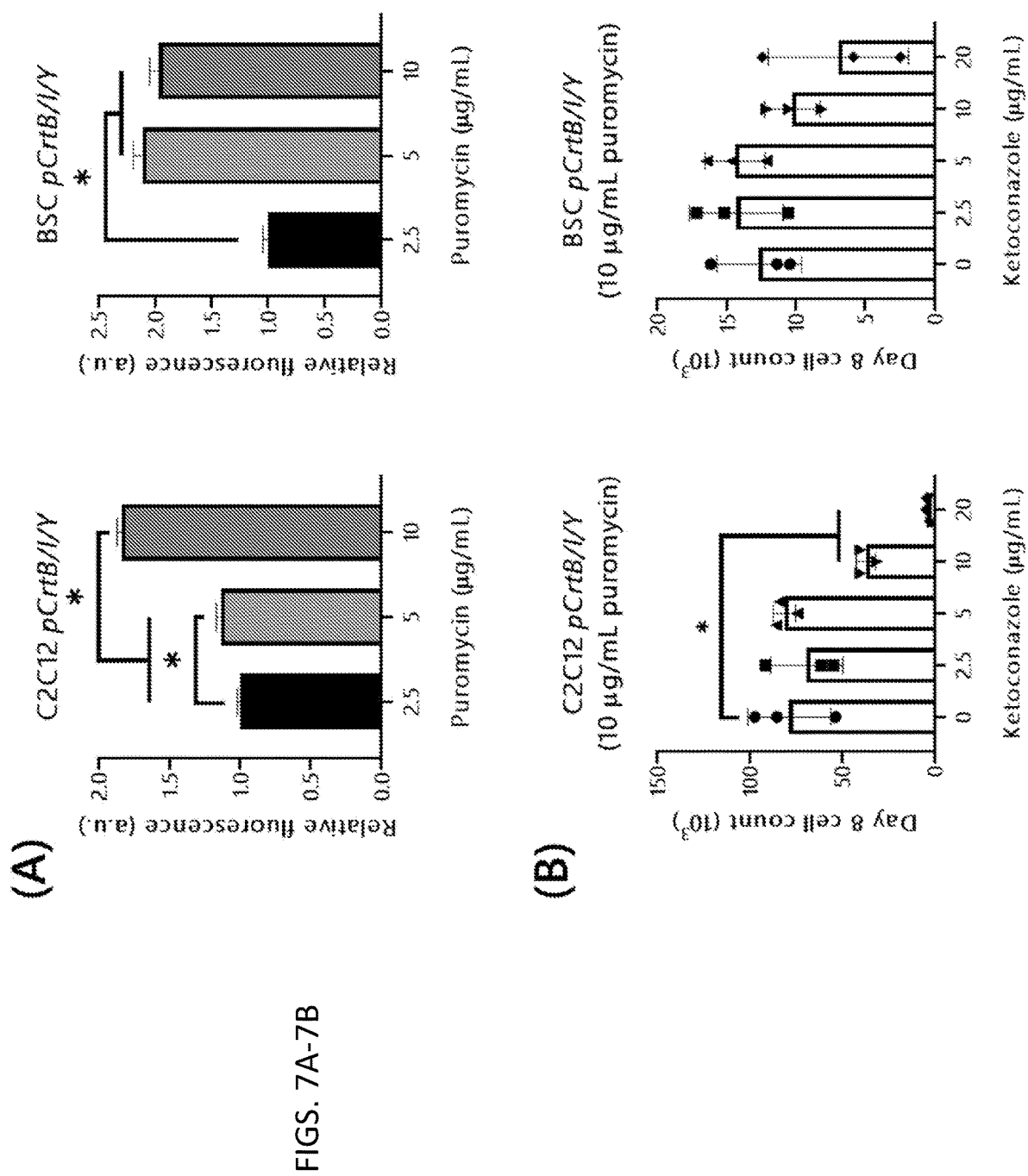
FIGS. 7A-7B show carotenoid optimization treatments.
Figures 9A, 9B:
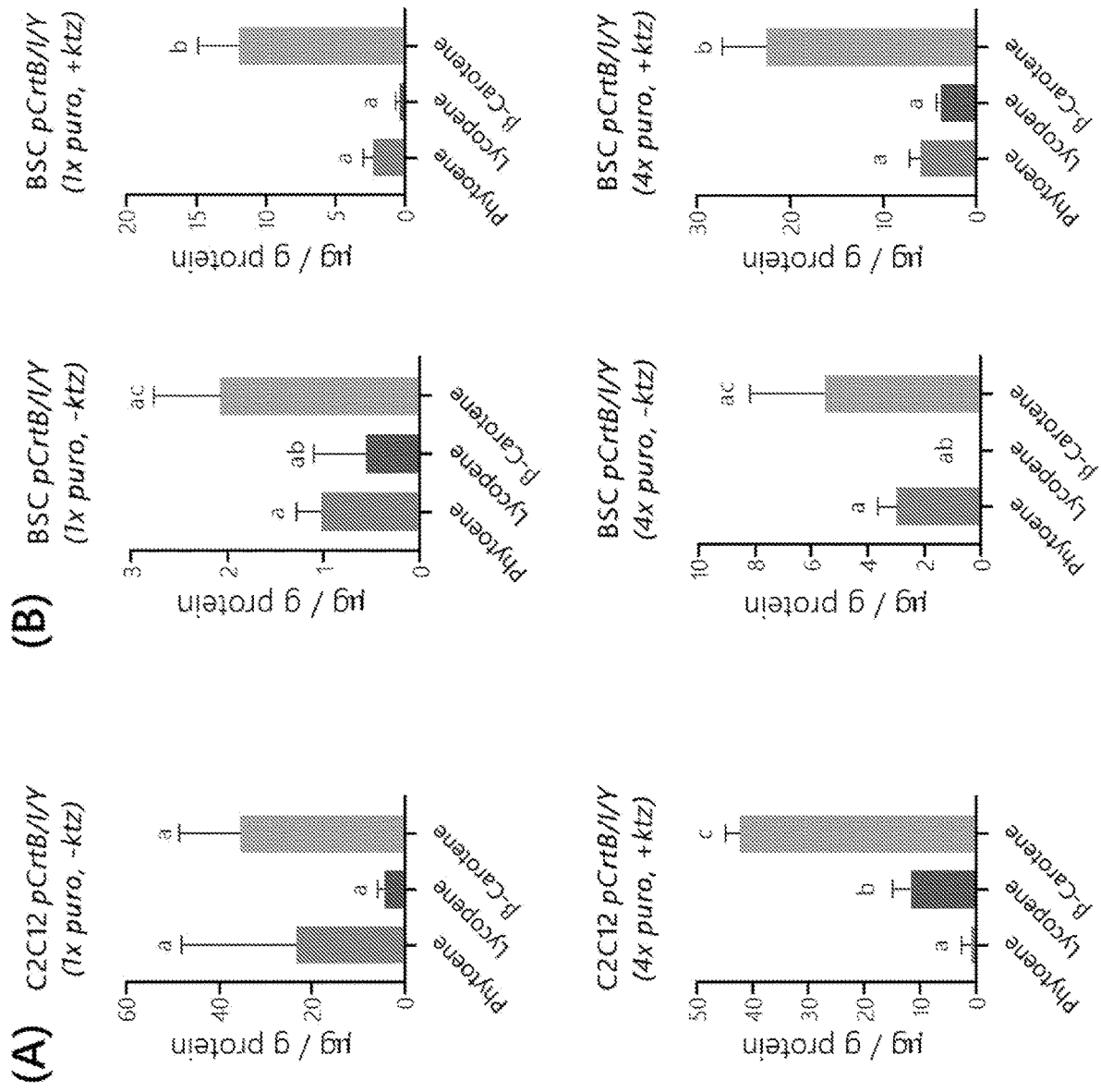
FIGS. 9A-9B show carotenoid profiles of optimized cells.

Optimization of carotenoid production—Due to the relatively low carotenoid production in BSCs compared to C2C12s and pCrtB/I/Y cells compared to pCrtB or pCrtB/I cells, we hypothesized that production in these cells could be significantly improved. We explored two methods to achieve this. In the first, enzyme expression was increased by increasing selective pressure for transgenes. Puromycin was shown to induce a significant increase in GFP expression at 4× concentration (10 µg/mL) for both C2C12s and BSCs (FIG. 7A, FIGS. 9A-9B), so this concentration was used for optimization. In the second method, carotenoid precursor accumulation was induced by inhibiting cholesterol synthesis—which competes for carotenoid precursors—using the small molecule ketoconazole (FIG. 5A) (Sun et al., 2007). A ketoconazole concentration of 5 µg/mL was found to not significantly effect growth in C2C12s and BSCs (FIG. 7B), so this concentration was used.

Figures 8A, 8B:
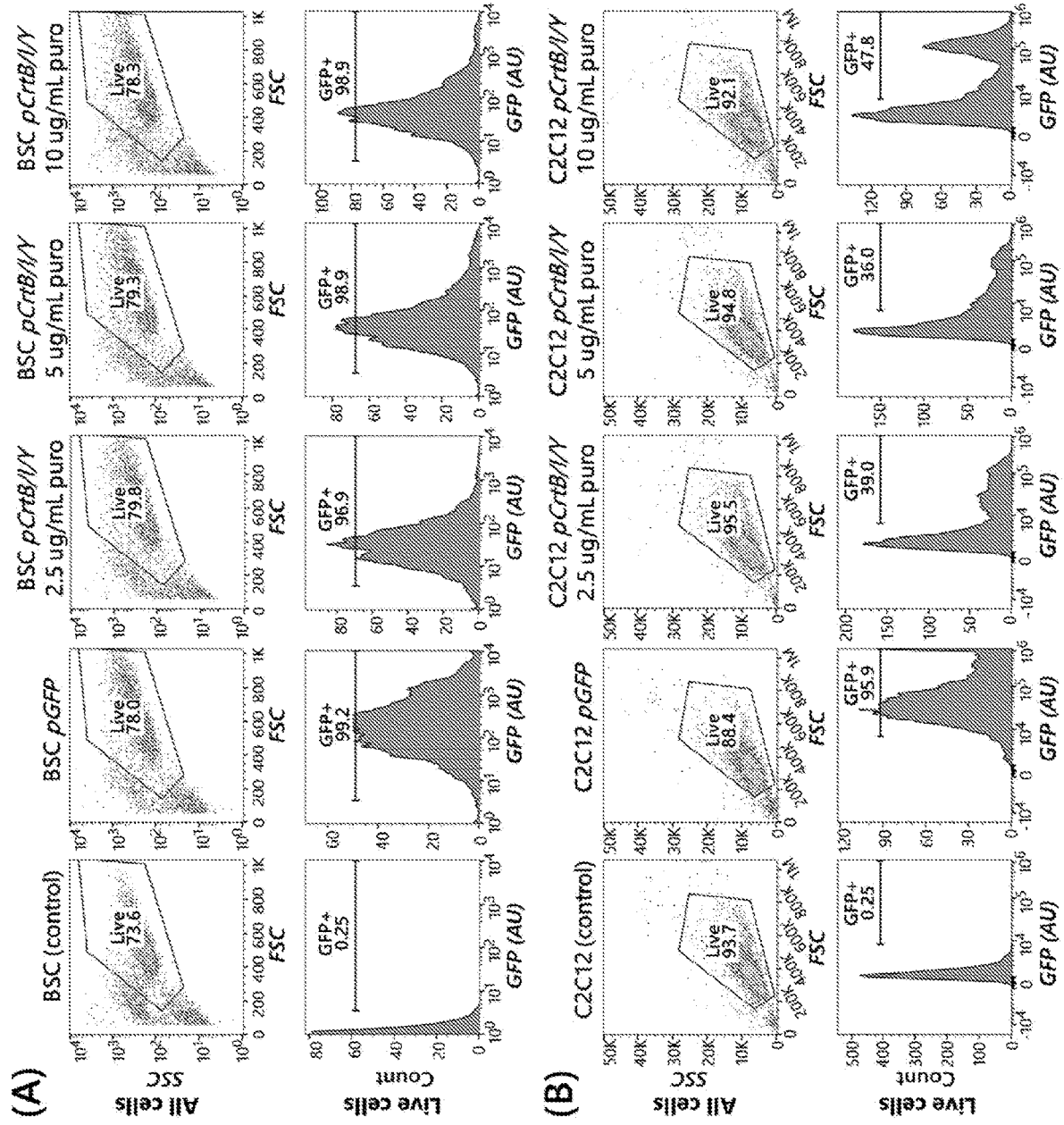
FIGS. 8A-8B show flow cytometry data.

To test how these treatments affected carotenoid production separately and in concert, pCrtB/I/Y BSCs were cultured with 1× puromycin+/−ketoconazole and 4× puromycin+/−ketoconazole. A clear increase in orange pigmentation was observed in cells cultured with 4× puromycin+ketoconazole (FIG. 5B), and quantitative HPLC showed a significant increase in β-carotene production for these cells (FIG. 5C). Specifically, optimized BSCs produced 10-times more β-carotene than un-optimized BSCs (22.6 vs. 2.08 µg/g protein, respectively). Notably, these levels are ~7 times greater than literature values for β-carotene (ug/g protein) in beef from pasture-raised cattle, and ~14 times greater than beef from feedlot-raised cattle (Simonne et al., 1996). The best-performing treatment (4× puromycin+ketoconazole) was then used to optimize pCrtB/I/Y C2C12s. The mean β-carotene concentration for un-optimized and optimized C2C12s was 35.44 and 42.43 µg/g protein, respectively, though this difference was not statistically significant. Analysis of the full carotenoid profiles of optimized cells revealed that the trend of accumulation in the terminal compound (β-carotene) held true in all cases (FIGS. 8A-8B).

The ability of both enzyme and precursor enhancement to increase carotenoids suggests that both enzyme and precursors are limiting in the system, which is likely due to the heterogenous nature of enzyme expression in cells. Specifically, in cells with high baseline enzyme levels, precursors are rate-limiting, and in cells with low baseline enzyme levels, enzyme capacity is rate-limiting. The efficacy of both optimization techniques suggests the utility of pursuing multiple avenues for optimization when engineering cultured meat. While the use of ketoconazole as a means of inducing precursor accumulation was useful for this proof-of-concept, a production-scheme for nutritionally enhanced cultured meat would likely rely on genetic strategies to achieve the same effect.

Figure 6:
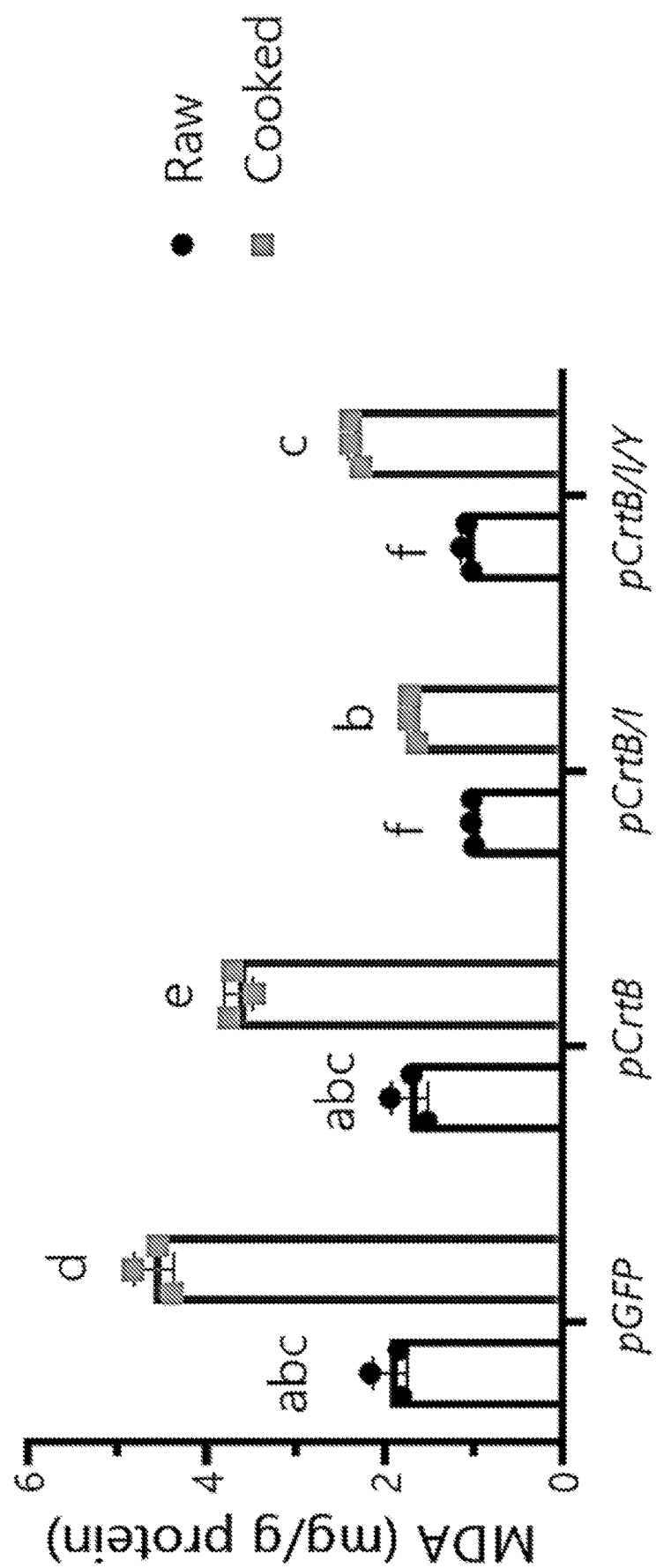
FIG. 6 shows thiobarbituric acid reactive substances (TBARS) assay for engineered BSCs with or without heating. All heated samples offer a significant increase in Malondialdehyde (MD(A) compared with raw samples, indicating significant oxidative challenge from this "cooking" process. In heated samples, pCrtB, pCrtB/I and pCrtB/I/Y cells offer significantly reduced malondialdehyde (MD(A) compared with controls. In unheated samples, pCrtB/I and pCrtB/I/Y samples offer a significant reduction in MDA, and pCrtB offers no significant change compared with control pGFP cells. n=3 distinct samples. Bars that do share a letter are statistically different (p<0.05).

Lipid oxidation and antioxidant functionality—Lipid oxidation is a key mechanistic link between red or processed meat consumption and colorectal cancer, as well as a major cause of non-microbial meat quality degradation during storage (Falowo et al., 2014; Wolk, 2017). We therefore analyzed cellular malondialdehyde (MDA) levels by thiobarbituric acid reactive substance (TBARS) assay in order to probe the ability of endogenous carotenoids to reduce lipid oxidation in vitro, both in "raw" unheated cells, and in "cooked" heated cells (FIG. 6). In pGFP BSCs, unheated and heated samples showed 1.9 and 4.6 mg MDA/g protein, respectively, indicating a significant effect of heating methods in promoting lipid oxidation. BSCs engineered with pCrtB showed a decrease in lipid oxidation for unheated and heated samples (1.7 and 3.6 mg/g protein, respectively), though this difference was not statistically significant in unheated samples. Cells engineered with pCrtB/I and pCrtB/I/Y showed significant reductions in lipid oxidation compared controls in both unheated and heated samples (1.0 and 1.1 mg/g protein for CrtB/I and CrtB/I/Y unheated samples, respectively, and 1.7 and 2.3 mg/g protein for heated samples, respectively).

It is notable that cells with lycopene and/or β-carotene offered more antioxidant capacity than cells with phytoene alone, despite total carotenoid levels being highest pCrtB cells. This could be due to the varying antioxidant capacity of these carotenoids, with phytoene offering the least (Martínez et al., 2014). Similarly, the fact that pCrtB/I/Y cells offered nearly comparable antioxidant activity to pCrtB/I cells—despite the latter offering ~ten-fold more total carotenoids—could be due to the synergistic effects that the carotenoids have been shown to offer when present together in systems (Kotiková et al., 2011). Finally, the measure of lipid oxidation alone could impact results, as cholesterol—the synthesis of which competes with carotenoid synthesis—can improve membrane antioxidant capacity (López-Revuelta et al., 2006). It would therefore be worthwhile to measure total oxidation (including protein). That said, the simplicity and ubiquity of TBARS assays for meat science applications make this technique highly relevant, and the ~2-fold reduction in lipid oxidation for both heated and unheated samples containing endogenously produced lycopene and/or β-carotene indicates that these nutrients would offer significant impact to nutrition and food-quality of engineered cultured meat products.

References:

Banerjee, P., Bhunia, A. K., 2009. Mammalian cell-based biosensors for pathogens and toxins. Trends Biotechnol. https://doi.org/10.1016/j.tibtech.2008.11.006

Botella-Pavia, P., Rodriguez-Concepcion, M., 2006. Carotenoid biotechnology in plants for nutritionally improved foods. Physiol. Plant. 126, 369-381. https://doi.org/10.1111/j.1399-3054.2006.00632.x Ceroni, F., Ellis, T., 2018. The challenges facing synthetic biology in eukaryotes. https://doi.org/10.1038/s41580-018-0013-2 Chitchumroonchokchai, C., Diretto, G., Parisi, B., Giuliano, G., Failla, M. L., 2017. Potential of golden potatoes to improve vitamin A and vitamin E status in developing countries. PLoS One 12, e0187102. https://doi.org/10.1371/journal.pone.0187102

Davy, A. M., Kildegaard, H. F., Andersen, M. R., 2017. Cell Factory Engineering. Cell Syst. https://doi.org/10.1016/j.cels.2017.02.010

Desmarchelier, C., Borel, P., 2017. Overview of carotenoid bioavailability determinants: From dietary factors to host genetic variations. Trends Food Sci. Technol. 69, 270-280. https://doi.org/10.1016/J.TIFS.2017.03.002

Ding, S., Swennen, G. N. M., Messmer, T., Gagliardi, M., Molin, D. G. M., Li, C., Zhou, G., Post, M. J., 2018. Maintaining bovine satellite cells stemness through p38 pathway. Sci. Rep. 8, 10808. https://doi.org/10.1038/s41598-018-28746-7

Falowo, A. B., Fayemi, P. O., Muchenje, V., 2014. Natural antioxidants against lipid-protein oxidative deterioration in meat and meat products: A review. Food Res. Int. 64, 171-181. https://doi.org/10.1016/J.FOODRES.2014.06.022

Geurts, A. M., Yang, Y., Clark, K. J., Liu, G., Cui, Z., Dupuy, A. J., Bell, J. B., Largaespada, D. A., Hackett, P. B., 2003. Gene transfer into genomes of human cells by the sleeping beauty transposon system. Mol. Ther. 8, 108-117. https://doi.org/10.1016/S1525-0016(03)00099-6

Giddings, G., 2001. Transgenic plants as protein factories. Curr. Opin. Biotechnol. https://doi.org/10.1016/S0958-1669(00)00244-5

Heider, S. A. E., Wendisch, V. F., 2015. Engineering microbial cell factories: Metabolic engineering of *Corynebacterium glutamicum* with a focus on non-natural products. Biotechnol. J. https://doi.org/10.1002/biot.201400590

Izsvák, Z., Ivies, Z., Plasterk, R. H., 2000. Sleeping Beauty, a wide host-range transposon vector for genetic transformation in vertebrates. J. Mol. Biol. 302, 93-102. https://doi.org/10.1006/JMBI.2000.4047

Keasling, J. D., 2010. Manufacturing molecules through metabolic engineering. Science (80-.). https://doi.org/10.1126/science.1193990

Kotíková, Z., Lachman, J., Hejtmánková, A., Hejtmánková, K., 2011. Determination of antioxidant activity and antioxidant content in tomato varieties and evaluation of mutual interactions between antioxidants. LWT—Food Sci. Technol. 44, 1703-1710. https://doi.org/10.1016/J.LWT.2011.03.015

Kowarz, E., Löscher, D., Marschalek, R., 2015. Optimized Sleeping Beauty transposons rapidly generate stable transgenic cell lines. Biotechnol. J. 10, 647-653. https://doi.org/10.1002/biot.201400821

Le Moal, E., Pialoux, V., Juban, G., Groussard, C., Zouhal, H., Chazaud, B., Mounier, R., 2017. Redox Control of Skeletal Muscle Regeneration. Antioxid. Redox Signal. 27, 276-310. https://doi.org/10.1089/ars.2016.6782

Lindqvist, A., He, Y. G., Andersson, S., 2005. Cell type-specific expression of β-carotene 9',10'-monooxygenase in human tissues. J. Histochem. Cytochem. 53, 1403-1412. https://doi.org/10.1369/jhc.5A6705.2005

López-Revuelta, A., Sánchez-Gallego, J. I., Hernández-Hernández, A., Sánchez-Yagüee, J., Llanillo, M., 2006. Membrane cholesterol contents influence the protective effects of quercetin and rutin in erythrocytes damaged by oxidative stress. Chem. Biol. Interact. 161, 79-91. https://doi.org/10.1016/j.cbi.2006.03.004

Martínez, A., Stinco, C. M., Meléndez-Martínez, A. J., 2014. Free radical scavenging properties of Phytofluene and Phytoene isomers as compared to Lycopene: A combined experimental and theoretical study. J. Phys. Chem. B 118, 9819-9825. https://doi.org/10.1021/jp503227j Mátés, L., Chuah, M. K. L., Belay, E., Jerchow, B., Manoj, N., Acosta-Sanchez, A., Grzela, D. P., Schmitt, A., Becker, K., Matrai, J., Ma, L., Samara-Kuko, E., Gysemans, C., Pryputniewicz, D., Miskey, C., Fletcher, B., VandenDriessche, T., Ivies, Z., Izsvák, Z., 2009. Molecular evolution of a novel hyperactive Sleeping Beauty transposase enables robust stable gene transfer in vertebrates. Nat. Genet. 41, 753-761. https://doi.org/10.1038/ng.343

Matsuda, T., Cepko, C. L., 2004. Electroporation and RNA interference in the rodent retina in vivo and in vitro. Proc. Natl. Acad. Sci. 101, 16-22. https://doi.org/10.1073/pnas.2235688100

Mattick, C. S., Landis, A. E., Allenby, B. R., Genovese, NJ, 2015. Anticipatory Life Cycle Analysis of In Vitro Biomass Cultivation for Cultured Meat Production in the United States. Environ. Sci. Technol. 49, 11941-11949. https://doi.org/10.1021/acs.est.5b01614

Melendez-Martinez, A. J., Stinco, C. M., Liu, C., Wang, X.-D., 2013. A simple HPLC method for the comprehensive analysis of cis/trans (Z/E) geometrical isomers of carotenoids for nutritional studies. Food Chem. 138, 1341-1350. https://doi.org/10.1016/J.FOODCHEM.2012.10.067

Mojica, F. J. M., Montoliu, L., 2016. On the Origin of CRISPR-Cas Technology: From Prokaryotes to Mammals. Trends Microbiol. https://doi.org/10.1016/j.tim.2016.06.005

Nielsen, J., 2015. Yeast cell factories on the horizon: Metabolic engineering in yeast gets increasingly more versatile. Science (80-.). https://doi.org/10.1126/science.aad2081

Post, M. J., 2012. Cultured meat from stem cells: Challenges and prospects. Meat Sci. 92, 297-301. https://doi.org/10.1016/J.MEATSCI.2012.04.008

Rubio, N. R., Fish, K. D., Trimmer, B. A., Kaplan, D. L., 2019. In Vitro Insect Muscle for Tissue Engineering Applications. ACS Biomater. Sci. Eng. 5, 1071-1082. https://doi.org/10.1021/acsbiomaterials.8b01261

Sack, M., Rademacher, T., Spiegel, H., Boes, A., Hellwig, S., Drossard, J., Stoger, E., Fischer, R., 2015. From gene to harvest: Insights into upstream process development for the GMP production of a monoclonal antibody in transgenic tobacco plants. Plant Biotechnol. J. https://doi.org/10.1111/pbi.12438

Satomi, Y., Yoshida, T., Aoki, K., MIsAwA, N., Masuda, M., Murakoshi, M., Takasuka, N., Sugimura, T., 1995. Production of Phytoene, an Oxidative Mammalian Cells by Introduction of Isolated from a Bacterium Stress Protective Carotenoid, in Phytoene Synthase Gene crtB *Erwinia uredovora*. Proc. Japan Acad 71.

Schukur, L., Fussenegger, M., 2016. Engineering of synthetic gene circuits for (re-)balancing physiological processes in chronic diseases. Wiley Interdiscip. Rev. Syst. Biol. Med. 8, 402-422. https://doi.org/10.1002/wsbm.1345

Simonne, A. H., Green, N. R., Bransby, D. I., 1996. Consumer Acceptability and p-Carotene Content of Beef as Related to Cattle Finishing Diets. J. Food Sci. 61, 1254-1257. https://doi.org/10.1111/j.1365-2621.1996.tb10973.x Simsa, R., Yuen, J., Stout, A., Rubio, N., Fogelstrand, P., Kaplan, D. L., 2019. Extracellular Heme Proteins Influence Bovine Myosatellite Cell Proliferation and the Color of Cell-Based Meat. Foods 2019, Vol. 8, Page 521 8, 521. https://doi.org/10.3390/FOODS8100521

Sun, Y., Yuan, Q.-P., Vriesekoop, F., 2007. Effect of two ergosterol biosynthesis inhibitors on lycopene production by *Blakeslea trispora*. Process Biochem. 42, 1460-1464. https://doi.org/10.1016/J.PROCBIO.2007.06.006

Szymczak, A. L., Workman, C. J., Wang, Y., Vignali, K. M., Dilioglou, S., Vanin, E. F., Vignali, D. A. A., 2004.

Correction of multi-gene deficiency in vivo using a single "self-cleaving" 2A peptide-based retroviral vector. Nat. Biotechnol. 22, 589-594. https://doi.org/10.1038/nbt957

Wang, Z., Li, H., Guo, R., Wang, Q., Zhang, D., 2016. Antioxidants inhibit advanced glycosylation end-product-induced apoptosis by downregulation of miR-223 in human adipose tissue-derived stem cells. Sci. Rep. 6. https://doi.org/10.1038/srep23021

Wolk, A., 2017. Potential health hazards of eating red meat. J. Intern. Med. 281, 106-122. https://doi.org/10.1111/joim.12543

Yaffe, D., Saxel, O., 1977. Serial passaging and differentiation of myogenic cells isolated from dystrophic mouse muscle. Nature 270, 725-727. https://doi.org/10.1038/270725a0

Ye, X., Al-Babili, S., Klöti, A., Zhang, J., Lucca, P., Beyer, P., Potrykus, I., 2000. Engineering the provitamin A (beta-carotene) biosynthetic pathway into (carotenoid-free) rice endosperm. Science 287, 303-5. https://doi.org/10.1126/SCIENCE.287.5451.303

Zhang, F., Wang, L. P., Boyden, E. S., Deisseroth, K., 2006. Channelrhodopsin-2 and optical control of excitable cells. Nat. Methods 3, 785-792. https://doi.org/10.1038/nmeth936

Zhang, L., Xia, H., Han, Q., Chen, B., 2014. Effects of antioxidant gene therapy on the development of diabetic retinopathy and the metabolic memory phenomenon. Graefe's Arch. Clin. Exp. Ophthalmol. 253, 249-259. https://doi.org/10.1007/s00417-014-2827-8

Example 2

Meat is a key source of nutrition for many populations due to its ability to provide valuable nutrients at high density. Meat offers substantial protein content (about 30% by weight when cooked), an amino acid profile that is well proportioned for human health, a range of essential fatty acids, A, B, D and E vitamins, and key minerals in highly bioavailable formats[5-9]. The bearing of these features on human health is magnified by meat's current and predicted prevalence in global diets. Indeed, in some western diets meat constitutes up to 40% of daily protein intake, and a recent report from Food and Agriculture Organization (FAO) of the United Nations suggests that global meat production will increase 76% from 2012-2050, up to 455 million tons[5,10].

However, despite this value, a growing body of work highlights the fact that meat's global impact both as a nutrient-source and as a mass-commodity extends beyond nutritional benefits. From a health standpoint, consumption of high amounts of red and processed meat is associated with increased risks for numerous pathologies, including type II diabetes, cardiovascular disease, and colorectal cancer[11-16]. While the epidemiological studies behind these associations are difficult to construct firm dietary suggestions from (and are thus often contested), enough meta-analytical evidence exists in the case of colorectal cancer to be substantially convincing to the majority of the nutrition scientists, and the World Health Organization's International Agency for Research on Cancer (IARC) has deemed red and processed meat to be 'probably carcinogenic' and 'carcinogenic,' respectively[17,18]. From a production standpoint, animal agriculture is responsible for substantial natural resource use, greenhouse gas emissions, and environmental degradation. Specifically, it is estimated that animal agriculture produces ~15% of all anthropogenic greenhouse gases ($CO_2$ equivalents), contributes ~29% of the global human water footprint, motivates ~71% of deforestation in some regions, and is a major source of eutrophication[10,19]. At the same time, concentrated animal agriculture raises concerns around animal welfare and antibiotic resistance[10]. With meat production projected to rise substantially by 2050 these issues are likely to intensify.

Recently, the possibility of producing meat with cell culture (termed "cultured meat") has been proposed to address the environmental and ethical concerns of animal agriculture[20]. Producing cultured meat involves expanding muscle and fat cells from relevant species in vitro and seeding them onto edible scaffolds to form 3D tissues[21]. By producing meat apart from the competing energy requirements present in whole animals, it is projected that cultured meat could drastically lower meat's land-use, water-use, and greenhouse-gas emissions[22]. It is also expected that cultured meat could mitigate the animal welfare and antibiotic resistance concerns of conventional meat.

However, despite these projected benefits, it is so far unclear exactly how cultured meat will recapitulate the nutritional features of meat, and what its nutritional advantages or disadvantages may be. On one hand, cultured meat may offer inferior protein profiles than conventional meat due to the frequent immaturity of skeletal myofibers cultured in vitro, and the importance of sarcomeric proteins to meat's nutrition value[23]. Further, the content of many nutrients such as minerals and some vitamins that are not endogenously synthesized by muscle tissue—including essential vitamins like $B_{12}$—will be entirely dependent on cellular uptake from media components, and so could be reduced or absent in a bioprocess that is tightly constrained by media cost[24]. On the other hand, some deleterious nutrients that are present but not endogenously synthesized in muscle tissue—such as trans-saturated fatty acids—will be easy to exclude from a cultured meat product[25].

Along with intrinsic differences, the cell-level control that is inherent to cultured meat offers the opportunity to tune composition towards various aims. This could be the modulation of native nutrients—such as amino acid or lipid profiles—or the addition of compounds not endogenously synthesized in meat tissues—such as vitamins or other phytochemicals. These modifications can be directed to address what might be cultured meat's nutritional deficits, augment its nutritional advantages, or add completely new nutritional functionality. Looking beyond nutrition, it is possible that composition could also be tuned towards organoleptic and food-functionality aims such as flavor, aroma, color or shelf-stability, or towards therapeutic activity, allowing the production of 'therapeutic foods' with favorable bioactivities upon consumption.

One promising technique for affecting cultured meat composition in this way is through metabolic engineering, or the genetic and regulatory control of cellular metabolism towards various goals. Metabolic engineering efforts in plants, yeast and bacteria have exploited numerous pathways from diverse taxa towards applications ranging from medicine and cosmetics to energy and agriculture[26-28]. That same breadth has not yet been realized in mammalian systems, where the majority of efforts have focused on biopharmaceuticals[29-31]. While these efforts are by no means inferior to those in other systems, the difference in scope is stark. To date, this discrepancy is likely due at least in part to the lack of a compelling case for engineering animal cells with metabolic pathways from other taxonomies; from a bioprocess standpoint, the production of recombinant proteins, small molecules and biofuels is cheaper in bacteria, yeast or plant systems, and only the need for species-specific post-translational modifications makes mammalian bioprocesses preferable[29,32]. The possibility of cultured meat offers a new framework in which the product is the cells themselves and so endogenously synthesizing additional compounds becomes a purely additive endeavor, at least insofar as those efforts are biologically possible and do not hinder the bioprocess or product value. Here, the fact that cultured meat is dependent only on cell growth rather than whole-animal viability—which is inherently limiting for animal transgenics—allows the consideration of an even wider range of metabolites which might be untenable in animals but harmless or even beneficial in cell culture. Compelling functionalities to explore include nutrition, bioactivity and food-functionality, flavor, or therapeutic activity.

Example 1 demonstrates mammalian cells engineered with a metabolic pathway for carotenoid synthesis, which is native to many plants and some prokaryotes, but not animals. Specifically, using non-viral Sleeping Beauty transgenesis we engineered the production of phytoene, lycopene, and β-carotene from native precursors in primary bovine and immortalized C2C12 mouse muscle cells. These nutrients were attractive targets for several reasons. First, each offers unique nutritional value; phytoene is suggested to act as a UV photo-protectant, lycopene has been shown to reduce hepatocellular carcinoma and fatty liver disease, and β-carotene is an essential vitamin A precursor in the human diet[33-35]. Second, all three compounds are antioxidants[36]. This is particularly relevant for red meat, since a key mechanistic link between red or processed meat consumption and colorectal cancer is lipid oxidation[17]. The antioxidant nature of these compounds also provides value in extending meat shelf-life, as lipid oxidation is a major cause of non-microbial degradation over time[37]. Finally, these compounds are red pigments, and so their synthesis could impact the color of a cultured meat product. We demonstrated successful synthesis of three all dietary carotenoids, the phenotypic integrity of cells following modification, and the ability to tune carotenoid yields through multiple strategies.

The possibility of one metabolite having diverse implications for a cultured meat product—such as antioxidants conferring auxiliary meat-quality benefits alongside nutritional ones—is a common feature for many potential targets. Along with aforementioned meat quality implications, antioxidants can affect cell expansion, where disregulated levels of reactive oxygen species induce cell cycle arrest and inhibit proliferation[38-40]. Indeed, carotenoid-synthesizing C2C12s with increased antioxidant capacity showed higher proliferation than controls in our previous study, though this was not seen in engineered primary cells. Other interesting cases of pro-proliferative effects from phytochemicals include those of vitamin C in teleost myoblasts, chrysanthemin (a polyphenol nutrient) in C2C12s, and D-limonene (a flavor and aroma compound found in citrus) in lymphocytes[41,42]. In contrast, phytonutrients such as the polyphenol resveratrol have been shown to have anti-proliferative but pro-differentiation effects in myoblasts, suggesting potential applicability during the differentiation phase of cultured meat production[43]. Similarly, evidence exists to suggest that cannabinoid receptor 1 (CB1) antagonists such as cannabidiol—a therapeutic phytochemical—could improve differentiation of both C2C12s and primary human myoblasts in vitro[44]. Some phytochemicals, such as the nutrient curcumin, can demonstrate both pro-proliferative and pro-differentiation effects on primary myoblasts, depending on dosing[45]. In light of these effects, it is useful to consider how engineering targets might be able to enhance a cultured meat product and process simultaneously.

This embodiments described in this Example demonstrate (1) baseline nutritional analyses of bovine skeletal muscle cells cultured in vitro (both proliferative and differentiated cells will be analyzed) in order to better understand the innate nutritional differences between cultured meat and conventional meat, (2) test various engineering targets for enhancing nutrition, food-quality or bioactivity in order to outline the scope of possibilities for compositional tuning of cultured meat, and (3) analyze the impacts of modifications on food-functionality such oxidation and nutrient bioavailability and on bioprocess parameters such as cell growth and differentiation. This work will help elucidate cultured meat's intrinsic nutritional features and establish a foundation for the broad use of metabolic engineering to tune composition and bioprocess parameters.

Cell isolation and culture—Bovine satellite cells (BSCs) are isolated from live-animal biopsies gathered at the Tufts University Cummings School of Veterinary Medicine using methods previously reported by our group[46]. Briefly, a small excision (~0.25 cm$^3$) is taken from the semitendinosus of a <30-day-old Simmental bull, minced and digested in DMEM Glutamax (Gibco) with 0.2% collagenase II (Worthington). The resulting cell suspension is diluted in growth media comprised of DMEM Glutamax with 20% fetal bovine serum (FBS), 1% primocin (Sigma), and 1 ng/mL FGF-2 (Thermo Fisher), filtered and plated onto tissue culture flasks. After 24 hours, unattached cells are moved to new tissue culture flasks that have been coated with 0.25 ug/cm2 of recombinant laminin-511 (Iwai) and left undisturbed for three days. This pre-plating isolates the slowly-adherent BSCs from quickly-adherent fibroblasts. After three days, BSCs are fed with growth media every 2-3 days and passaged at 70% confluency onto laminin-coated flasks. After two weeks, 1% antibiotic-antimycotic (Thermo Fisher) replace primocin in culture media. To differentiate BSCs, cells are cultured to confluence then cultured for one week without media change. To confirm BSC identity, immunocytochemistry is performed for the satellite cell marker Pax7 (during proliferation) and the myogenesis marker myosin heavy chain (MHC; following differentiation).

Protein analysis—Cells are harvested both before and after differentiation in normal media, media with 1×, 2×, and 4× levels of essential amino acids, and media formulated for an amino acid profile well suited to human nutritional requirements[1]. Bulk protein is quantified using a Pierce BCA protein Assay kit (Thermo Fisher) according to the manufacturer's instructions. Amino acid composition are quantified by HPLC as previously described[47,48]. Briefly, cells are homogenized via sonication, spiked with a known concentration of the internal standard norvaline, hydrolyzed with HCl, and quantified against amino acid standards (likewise spiked with norvaline) via HPLC following pre-column derivatization with 6-aminoquinolyl-N-hydroxysuccinimidyl-carbamate. Samples are separated with a Nova-Pak C18 (Waters) column and analyzed with fluorescence detection excited by 250 nm and emitting at 395 nm. Both bulk protein and amino acid composition are correlated to DNA content (CyQuant assay; Thermo Fisher) to compare undifferentiated and differentiated cells. Conventional meat samples are analyzed and compared with cultured cells.

Lipid analysis—Lipid analysis is performed using a liquid chromatograph-mass spectrometry (LC-MS) as previously described[49]. Briefly, undifferentiated and differentiated BSCs are homogenized via sonication, and lipid internal standards will be added to homogenates (comprised of a defined mixture of phosphatidylcholines (PC), phosphatidylethanolamines (PE), ceramides (Cer), phosphatidylserines (PS), phosphatidic acid (PA), and mono-, di-, and triacylglycerols (MG, DG, and TG). Cellular lipids are extracted with a solution of chloroform and methanol (2:1, v/v), centrifuged, and the lower phase will be collected and combined with external standards (comprised of isotopically labeled TGs and PCs). Samples are quantified against lipid standards via LC-MS with separation in a BEH C18 column (Waters) followed by quadrupole-time-of-flight detection. Fatty acid profiles are normalized using internal and external standards, and against DNA and protein quantification. Again, samples are analyzed at varying levels of differentiation, and compared with store-bought products.

Bulk protein in bovine cells is expected to be similar to that found in store-bought beef. Specifically, for bulk proteins in mammalian muscle cells, previous reports suggest expected values of ~20% protein by wet cell weight, which is similar to concentrations found in beef[9]. At the same time, reduced extracellular protein accumulation and myotube maturation may result in reduced protein levels. Amino acid profiles are expected to be a combination of the amino acid profile of cellular growth media (i.e. input profiles) and the amino acid profile of store-bought products (i.e. innate tissue profiles). In this, a significant, though non-stoichiometric, increase in cellular amino acids following media supplementation with essential amino acids is expected.

Lipids represent ~10% of dry mass for myoblasts in culture, or ~2-5% of wet mass (based on rough estimations of 70% water)[50]. This corresponds to 20-50 mg/g protein. As store-bought samples will contain both skeletal muscle cells, extracellular matrix, and intramuscular fat cells, it is difficult to predict how lipid content will compare. On one hand, higher protein content of store-bought samples could result in comparatively less lipid per protein; however, intramuscular fat cells could result in comparatively higher lipid per protein. That said, as store-bought meat offers ~4% lipid and ~20% protein by mass (wet), it is expected that cellular lipid content will be similar to conventional meat[9]. Specific lipid ratios are expected to represent a combination of endogenously produced fatty acids and lipids present in the culture media. As culture media lipids will be provided by fetal bovine serum, and the cells are bovine in nature, it is expected that these ratios will match closely with store-bought beef samples. Lipidomic analysis can also be performed on bovine adipocytes instead of or alongside BSCs.

Genetic modification—Genetic modification of cellular pathways will be achieved through two mechanism: transposon-mediated transgenesis or CRISPR-dCas9 gene activation. For constitutive expression, transposon-mediated gene insertions will be used, due to their non-viral nature, high efficiencies, and demonstrated utility in prior carotenoid work. Specifically, the Sleeping Beauty, PiggyBac or Tol2 transposon systems will be considered depending on insert size, requirements for multiple insertions, and ease of cloning[54-56]. For gene activation, CRISPR-dCas9 systems will be used due to their high specificity, efficiency, and ease-of-use[57]. In this, guide RNA targeting specific genes will be introduced to cells alongside plasmids encoding a deactivated Cas9 (dCas9) proteins that are linked to activation domains. These will trigger transcription, thereby activating native genes.

Molecular cloning will be carried out using standard techniques. For genetic insertions, transposable elements will contain both the genes of interest and the genes for resistance to selection antibiotics (e.g., puromycin) to enable the selection of successfully transfected cells. Cellular transfection will be performed using the Lipofectamine 3000 reagent (Thermo Fisher). Briefly, cells will be cultured to 85% confluence, washed with OptiMEM media, and incubated with transfection reagents containing purified plasmids. After 6 hours, growth media will be added to cells and following 42 hours a selection pressure will be added to the media (e.g., puromycin). Cells will be cultured for one week under selective pressure, after which expression will be verified through immunocytochemistry, the use of fluorescent tags, or polymerase chain reaction (PCR). When multicistronic expression is needed, genes will be linked by 2A peptide sequences to allow for the translation of multiple proteins from a single strand of RNA which codes for multiple genes[58]. In most cases, a 2A sequence will link green fluorescent protein (GFP) to the expression cassette, so that expression can be screened for through simple fluorescence microscopy. Throughout these studies, cell health and myogenic potential will be verified by observing proliferation and differentiation of cells.

Vitamin C: The genes for vitamin C synthesis are present but silent in bovine muscle cells. From readily available precursors (UDP-glucose) in BSCs, this pathway involves five enzymes (FIG. 1): UDP-glucose 6-dehydrogenase (UGDH), UDP glucuronosyltransferase 1 (UGT1A1), aldo-keto reductase family 1 (AKR1A1), regucalcin (RGN), and L-gulono-gamma-lactone oxidase (GULO)[59-61]. RNA-sequencing data from the muscle of beef steers show that UGT1A1 expression is the lowest of these by two orders of magnitude[62]. Therefore, UGT1A1 will be the first target addressed. The second least-expressed enzyme is GULO, followed by RGN, and so these enzymes will be addressed if UGT1A1 engineering proves ineffective. It should be noted that this transcriptomic approach to target selection has drawbacks, as RNA production does not necessarily correlate to protein production or enzymatic activity. This limitation will be kept in mind throughout process.

Two methods will be explored for engineering UGT1A1, RGN, and GULO expression in cells. In the first, CRISPR-dCas9 gene activation will be performed. Transposon-mediated insertion and constitutive expression of these genes can also be performed as was previously described for carotenoids. Genetic modification will be performed with Lipofectamine 3000, and vitamin C levels will be analyzed via enzymatic assay (Abcam) according to the manufacturer's instructions.

Alternative biosynthetic pathways are also of interest for Vitamin C production. For example, D-threo-aldose 1-dehydrogenase (CDS) and L-galactono-1,4-lactone dehydrogenase (GLDH), which are native to bacteria and synthesize vitamin C from L-galactose, can be expressed in mammalian cells to increase Vitamin C production.[59] The CDS and GLDH enzymes can be constitutively expressed in cells as an alternate path for producing endogenous Vitamin C.

Curcumin: From readily available precursors in mammalian cells (tyrosine), curcumin synthesis involves four enzymes (FIG. 10): tyrosine ammonia-lyase (PTAL), 4-coumarate-CoA ligase (4CL), phenylpropanoyl-diketide-CoA synthase (DCS) and curcumin synthase (CURS3)[63,64]. These genes will be codon optimized, synthesized, and cloned into a multi-cistronic tetracycline-responsive expression vector. This expression vector will be stably inserted into BSCs via Lipofectamine 3000 transfection as previously mentioned. Cells will be cultured and treated with tetracycline during proliferation or after the initiation of differentiation. Curcumin will be detected by HPLC based on previously reported methods[65-67]. Briefly, cells will be harvested and homogenized via sonication. Berberine will be added to homogenates as an internal standard, and solutions will be acidified with 6 N HCl. Curcumin and berberine will be extracted with ethyl acetate:propanol (9:1, v/v), centrifuged, and the top layer will be collected for HPLC analysis via Zorbax Eclipse XDB-C18 column (Agilent) separation and detection at 420 nm. A standard curve of pure curcumin and berberine will be used to accurately quantify sample curcumin levels, which will then be normalized against cellular protein. To increase cellular curcumin levels, cells can be cultured in media containing higher levels of tyrosine.

Alternate pathways for using caffeoyl-CoA and feruloyl-CoA as intermediates can be used for endogenous curcumin production in mammalian cells. Likewise, phenylalanine can be used as a precursor for p-coumaroyl-CoA instead of tyrosine.

Cannabidiol: From readily available precursors in mammalian cells (malonyl-CoA), cannabidiol synthesis involves four enzymes (FIG. 10): 3,5,7-trioxododecanoyl-CoA synthase (OLS), olivetolic acid cyclase (OAC), annabigerolic acid synthase (CPGAS), and cannabidiolic acid synthase (CBDAS)[68]. In some embodiments, CPGAS may be substituted with prenyltransferase NphB, which will have the same activity with improved expression. These genes are cloned into multi-cistronic expression vectors and inserted into BSCs as with other vectors. Cells will be cultured, harvested, and homogenized as with curcumin and vitamin C, and cannabidiol will be analyzed as with HPLC following previously described methods[69]. Briefly, homogenates will be spiked with a known concentration of the internal standard 4,4-dichlorodiphenyltrichloroethane (DDT), proteins will be precipitated with cold acetonitrile, and organic components will be separated with n-Hexane. Solutions will be centrifuged, the upper layer will be separated and dried under nitrogen and resuspended in acetonitrile. Cannabidiol and DDT will be separated in a C18-PFP HPLC column (ACE) and detected at 220 nm. As with other nutrients, readings will be normalized to a standard curve, internal standards, and cellular protein content.

Additional target of interest include D-limonene (a flavor compound that would require only enzyme and is shown to improve cell proliferation in some cell types), vitamin B12, flavor compounds (e.g., limonene or cinnamaldehyde), and other therapeutic compounds such as antibiotics.

Previous carotenoid data showed ~35 ug/g protein in BSCs. At least these levels of vitamin C (which is native to mammalian cells) are expected in vitro, and similar levels of curcumin or cannabidiol. Carotenoid production in immortalized mouse muscle cells C2C12 (work performed alongside BSCs) reached up to 500 ug/g protein, and so it expected that proper optimization could potentially increase nutrient levels by orders of magnitude Beef liver offers about 0.3 mg/100 g of vitamin C (and is ~20% protein by weight), so it is expected that levels of at least ~15 ug/g protein will not offer disadvantages in terms of cytotoxicity or negative cellular effects in BSCs[9]. While no data exists for predicting the potential cytotoxicity of curcumin or cannabidiol synthesis in BSCs, previous studies have shown that a curcumin range of ~0.005 to ~1 ug/mL in culture media did not have a negative effect on myoblasts in vitro[45]. Similarly, studies using a range of cell types have explored cannabidiol treatment ranging from 1-50 uM (0.313-15.65 ug/mL) without mention of excess cell death[70]. These correspond to significantly lower levels than was produced for carotenoids, and so it is possible that curcumin and cannabidiol synthesis will need to be controlled in vitro. However, these results are by no means a definitive indication of endogenous nutrients' cytotoxicities, and so higher levels could be achievable.

Growth and differentiation of engineered cells: To understand how metabolic engineering affects growth kinetics, cellular growth curves will be generated using dsDNA-based fluorometric assays (Molecular Probes) for engineered and control cells, as well as cells treated with pure compounds (i.e., vitamin C, curcumin, and cannabidiol). Additionally, cell cycle analysis will be performed on an NC-3000 image cytometer (ChemoMetec). To probe cellular senescence in engineered cells, quantitative PCR will be performed for Pax7—a marker of BSC stemness—throughout culture of engineered cells, control cells, and cells treated with compounds[73]. To understand the effect on cellular differentiation, cells (engineered, control, and cells treated with pure compounds) will be differentiated as before and stained for myosin heavy chain (MHC). For further analysis, quantitative PCR will be performed for middle and terminal myogenic markers myogenin and MHC.

Bioavailability: Nutrient bioavailability is dependent on the surrounding food matrix[4,74]. Bioavailability assays for both raw and cooked samples of all engineered cells (including carotenoid-producing cells) will therefore be performed via in vitro digestion followed by intestinal cell uptake assays[4,75]. Briefly, nutrient-producing cells will be cultured, harvested, and cell pellets will be kept "raw" or "cooked" by heating cell pellets to 100° C. for ten minutes. Samples will be added to a saline solution containing 140 mM NaCl, 5 mM KCl, and 150 uM butylated hydroxytoluene. To simulate gastric digestion, HCl will be added to a final pH of 2.0, samples will be mixed 36:1 with a solution of 4% w/v of pepsin in 0.1 M HCl, and samples will be incubated in a shaking water bath at 37° C. for one hour. The pH of the digesta will be raised to 6.9 with $NaHCO_3$, and further intestinal digestion will be performed by mixing samples 7.4:1 with a pancreatin-bile solution (1.2% w/v of bile extract and 0.2% of pancreatin in 0.1 M $NaHCO_3$) and incubating samples in a shaking water bath at 37° C. for two hours.

Caco-2 intestinal cells (ATCC) will be maintained in growth media of DMEM Glutamax, 5% FBS and 1% Antibiotic-Antimycotic, passaging cells at 70% confluency. To analyze bioavailability of nutrients in digesta, Caco-2 cells will be cultured to confluency in well-plates. Digestion solutions will be centrifuged, supernatants will be diluted 1:4 in Williams' Medium E (Gibco), and the resulting solution will be added to Caco-2 cell cultures following a PBS rinse. Cells will be incubated at 37° C. for 12 hours, after which cells will be washed 3× with PBS, and nutrient analysis will be performed on Caco-2 cells as before and as appropriate for the nutrient in question. Similar bioavailability assays will be performed for control cells and pure compounds added to Williams' Medium E in DMSO.

Lipid oxidation: Vitamin C, curcumin and cannabidiol are all reported to offer antioxidant activity[76-78]. As lipid peroxidation is a significant contributor to meat quality degradation during storage, an additive's antioxidant capacity could hold particular relevance to the food quality of cultured meat[79]. Therefore, lipid peroxidation assays will be performed using a thiobarbituric acid reactive substance (TBARS) assay (Cayman Chemical) according to the manufacturer's instructions before and after one week of storage at 4° C. and before and after "cooking" as with bioavailability assays.

Previous studies have shown that bioavailability of many phytochemicals is higher from non-plant sources because compounds are not trapped in cellulose networks[80]. High bioavailability is therefore expected for endogenously expressed nutrients including carotenoids, vitamin C, curcumin, and cannabidiol. Vitamin C producing cells are expected to increase iron bioavailability[81]. A reduction in lipid oxidation is expected with all samples of cells producing vitamin C, curcumin and cannabidiol[76-78].

References:
1. Elango, R., Ball, R. O. & Pencharz, P. B. Recent advances in determining protein and amino acid requirements in humans. *British Journal of Nutrition* 108, S22-S30 (2012).
2. Matsui, T. Vitamin C nutrition in cattle. *Asian Australasian journal of animal sciences* 25, 597-605 (2012).
3. Chang-Shu Liu, †, Raymond P. Glahn, § and & Rui Hai Liu*, †,#. Assessment of Carotenoid Bioavailability of Whole Foods Using a Caco-2 Cell Culture Model Coupled with an in Vitro Digestion. (2004). doi:10.1021/JF040028K
4. Yun, S., Habicht, J.-P., Miller, D. D. & Glahn, R. P. An In Vitro Digestion/Caco-2 Cell Culture System Accurately Predicts the Effects of Ascorbic Acid and Polyphenolic Compounds on Iron Bioavailability in Humans. *The Journal of Nutrition* 134, 2717-2721 (2004).
5. Wyness, L., Weichselbaum, E., O'Connor, A., Williams, E. B., Benelam, B., Riley, H. & Stanner, S. Red meat in the diet: an update. *Nutrition Bulletin* 36, 34-77 (2011).
6. Purchas, R. W., Wilkinson, B. H. P., Carruthers, F. & Jackson, F. A comparison of the nutrient content of uncooked and cooked lean from New Zealand beef and lamb. *Journal of Food Composition and Analysis* 35, 75-82 (2014).
7. Srednicka-Tober, D., Barański, M., Seal, C., Sanderson, R., Benbrook, C., Steinshamn, H., Gromadzka-Ostrowska, J., Rembiałkowska, E., Skwarło-Sońta, K., Eyre, M., Cozzi, G., Krogh Larsen, M., Jordon, T., Niggli, U., Sakowski, T., Calder, P. C., Burdge, G. C., Sotiraki, S., Stefanakis, A., et al. Composition differences between organic and conventional meat: a systematic literature review and meta-analysis. *British Journal of Nutrition* 115, 994-1011 (2016).
8. Rizzo, G., Lagana., Rapisarda, A., La Ferrera, G., Buscema, M., Rossetti, P., Nigro, A., Muscia, V., Valenti, G., Sapia, F., Sarpietro, G., Zigarelli, M., Vitale, S., Rizzo, G., Laganà. S., Rapisarda, A. M. C., La Ferrera, G. M. G., Buscema, M., Rossetti, P., et al. Vitamin B12 among Vegetarians: Status, Assessment and Supplementation. *Nutrients* 8, 767 (2016).
9. Wood, J. D. Meat Composition and Nutritional Value. *Lawrie's Meat Science* 635-659 (2017). doi:10.1016/B978-0-08-100694-8.00020-0
10. Godfray, H. C. J., Aveyard, P., Garnett, T., Hall, J. W., Key, T. J., Lorimer, J., Pierrehumbert, R. T., Scarborough, P., Springmann, M. & Jebb, S. A. Meat consumption, health, and the environment. *Science (New York, N.Y.)* 361, eaam5324 (2018).
11. Feskens, E. J. M., Sluik, D. & van Woudenbergh, G. J. Meat Consumption, Diabetes, and Its Complications. *Current Diabetes Reports* 13, 298-306 (2013).
12. Schwingshackl, L., Hoffmann, G., Lampousi, A.-M., Knüppel, S., Iqbal, K., Schwedhelm, C., Bechthold, A., Schlesinger, S. & Boeing, H. Food groups and risk of type 2 diabetes mellitus: a systematic review and meta-analysis of prospective studies. *European Journal of Epidemiology* 32, 363-375 (2017).
13. Alshahrani, S., Fraser, G., Sabatè, J., Knutsen, R., Shavlik, D., Mashchak, A., Lloren, J., Orlich, M., Alshahrani, S. M., Fraser, G. E., Sabate, J., Knutsen, R., Shavlik, D., Mashchak, A., Lloren, J. I. & Orlich, M. J. Red and Processed Meat and Mortality in a Low Meat Intake Population. *Nutrients* 11, 622 (2019).
14. Abete, I., Romaguera, D., Vieira, A. R., Lopez de Munain, A. & Norat, T. Association between total, processed, red and white meat consumption and all-cause, CVD and IHD mortality: a meta-analysis of cohort studies. *British Journal of Nutrition* 112, 762-775 (2014).
15. Chan, D. S. M., Lau, R., Aune, D., Vieira, R., Greenwood, D. C., Kampman, E. & Norat, T. Red and Processed Meat and Colorectal Cancer Incidence: Meta-Analysis of Prospective Studies. *PLoS ONE* 6, e20456 (2011).
16. Wang, X., Lin, X., Ouyang, Y. Y., Liu, J., Zhao, G., Pan, A. & Hu, F. B. Red and processed meat consumption and mortality: dose-response meta-analysis of prospective cohort studies. *Public Health Nutrition* 19, 893-905 (2016).
17. Wolk, A. Potential health hazards of eating red meat. *Journal of Internal Medicine* 281, 106-122 (2017).
18. Klurfeld, D. M. Research gaps in evaluating the relationship of meat and health. *Meat Science* 109, 86-95 (2015).
19. Hoekstra, A. Y. & Mekonnen, M. M. The water footprint of humanity. *Proceedings of the National Academy of Sciences of the United States of America* 109, 3232-7 (2012).
20. Datar, I. & Betti, M. Possibilities for an in vitro meat production system. *Innovative Food Science & Emerging Technologies* 11, 13-22 (2010).
21. Post, M. J. Cultured meat from stem cells: Challenges and prospects. *Meat Science* 92, 297-301 (2012).
22. Mattick, C. S., Landis, A. E., Allenby, B. R. & Genovese, N. J. Anticipatory Life Cycle Analysis of In Vitro Biomass Cultivation for Cultured Meat Production in the United States. *Environmental Science & Technology* 49, 11941-11949 (2015).
23. Thorrez, L. & Vandenburgh, H. Challenges in the quest for 'clean meat'. *Nature Biotechnology* 37, 215-216 (2019).
24. Kon, S. K. & Porter, J. W. G. The Intestinal Synthesis of Vitamins in the Ruminant. *Vitamins and Hormones* 12, 53-68 (1954).
25. Mosley, E. E., Powell, G. L., Riley, M. B. & Jenkins, T. C. Microbial biohydrogenation of oleic acid to trans isomers in vitro. *Journal of Lipid Research* 43, 290-296 (2002).
26. Nielsen, J. Yeast cell factories on the horizon: Metabolic engineering in yeast gets increasingly more versatile. *Science* 349, 1050-1051 (2015).
27. Heider, S. A. E. & Wendisch, V. F. Engineering microbial cell factories: Metabolic engineering of *Corynebacterium glutamicum* with a focus on non-natural products. *Biotechnology Journal* 10, 1170-1184 (2015).
28. Sack, M., Rademacher, T., Spiegel, H., Boes, A., Hellwig, S., Drossard, J., Stoger, E. & Fischer, R. From gene to harvest: Insights into upstream process development for the GMP production of a monoclonal antibody in transgenic tobacco plants. *Plant Biotechnology Journal* 13, 1094-1105 (2015).
29. Davy, A. M., Kildegaard, H. F. & Andersen, M. R. Cell Factory Engineering. *Cell Systems* 4, 262-275 (2017).

30. Ceroni, F. & Ellis, T. The challenges facing synthetic biology in eukaryotes. (2018). doi:10.1038/s41580-018-0013-2
31. Walsh, G. *Biopharmaceutical benchmarks* 2018. *Nature Publishing Group* 36, (2018).
32. Giddings, G. Transgenic plants as protein factories. *Current Opinion in Biotechnology* 12, 450-454 (2001).
33. Stice, C. P., Xia, H. & Wang, X.-D. Tomato lycopene prevention of alcoholic fatty liver disease and hepatocellular carcinoma development. *Chronic Diseases and Translational Medicine* 4, 211-224 (2018).
34. Meléndez-Martínez, A. J., Mapelli-Brahm, P. & Stinco, C. M. The colourless carotenoids phytoene and phytofluene: From dietary sources to their usefulness for the functional foods and nutricosmetics industries. *Journal of Food Composition and Analysis* 67, 91-103 (2018).
35. Kim, S.-W., Kim, J.-B., Jung, W.-H., Kim, J.-H. & Jung, J.-K. Over-production of β-carotene from metabolically engineered *Escherichia coli*. *Biotechnology Letters* 28, 897-904 (2006).
36. Fiedor, J. & Burda, K. Potential role of carotenoids as antioxidants in human health and disease. *Nutrients* 6, 466-88 (2014).
37. Falowo, A. B., Fayemi, P. O. & Muchenje, V. Natural antioxidants against lipid-protein oxidative deterioration in meat and meat products: A review. *Food Research International* 64, 171-181 (2014).
38. Sart, S., Song, L. & Li, Y. Controlling redox status for stem cell survival, expansion, and differentiation. *Oxidative Medicine and Cellular Longevity* 2015, (2015).
39. Intlekofer, A. M. & Finley, L. W. S. Metabolic signatures of cancer cells and stem cells. *Nature Metabolism* 1, 177-188 (2019).
40. Kornienko, J. S., Smirnova, I. S., Pugovkina, N. A., Ivanova, J. S., Shilina, M. A., Grinchuk, T. M., Shatrova, A. N., Aksenov, N. D., Zenin, V. V., Nikolsky, N. N. & Lyublinskaya, O. G. High doses of synthetic antioxidants induce premature senescence in cultivated mesenchymal stem cells. *Scientific Reports* 9, (2019).
41. Duran, B. AO. S., Góes, G. A., Zanella, B. T. T., Freire, P. P., Valente, J. S., Salomão, R. A. S., Fernandes, A., Mareco, E. A., Carvalho, R. F. & Dal-Pai-Silva, M. Ascorbic acid stimulates the in vitro myoblast proliferation and migration of pacu (*Piaractus mesopotamicus*). *Scientific Reports* 9, (2019).
42. Roberto, D., Micucci, P., Sebastian, T., Graciela, F. & Anesini, C. Antioxidant Activity of Limonene on Normal Murine Lymphocytes: Relation to $H_2O_2$ Modulation and Cell Proliferation. *Basic & Clinical Pharmacology & Toxicology* (2009). doi:10.1111/j.1742-7843.2009.00467.x
43. Kaminski, J., Lancon, A., Aires, V., Limagne, E., Tili, E., Michaille, J. J. & Latruffe, N. Resveratrol initiates differentiation of mouse skeletal muscle-derived C2C12 myoblasts. *Biochemical Pharmacology* 84, 1251-1259 (2012).
44. Iannotti, F. A., Silvestri, C., Mazzarella, E., Martella, A., Calvigioni, D., Piscitelli, F., Ambrosino, P., Petrosino, S., Czifra, G., Bíró, T., Harkany, T., Taglialatela, M. & Di Marzo, V. The endocannabinoid 2-AG controls skeletal muscle cell differentiation via CB1 receptor-dependent inhibition of Kv7 channels. *Proceedings of the National Academy of Sciences of the United States of America* 111, (2014).
45. Thaloor, D., Miller, K. J., Gephart, J., Mitchell, P. O. & Pavlath, G. K. Systemic administration of the NF-κB inhibitor curcumin stimulates muscle regeneration after traumatic injury. *American Journal of Physiology—Cell Physiology* 277, (1999).
46. Simsa, R., Yuen, J., Stout, A., Rubio, N., Fogelstrand, P. & Kaplan, D. L. Extracellular Heme Proteins Influence Bovine Myosatellite Cell Proliferation and the Color of Cell-Based Meat. *Foods* 2019, Vol. 8, Page 521 8, 521 (2019).
47. Sengupta, S., Park, S.-H., Patel, A., Cam, J., Lee, K. & Kaplan, D. L. Hypoxia and Amino Acid Supplementation Synergistically Promote the Osteogenesis of Human Mesenchymal Stem Cells on Silk Protein Scaffolds. *Tissue Engineering Part A* 16, 3623-3634 (2010).
48. Cohen, S. A. Amino Acid Analysis Using Precolumn Derivatization with 6-Aminoquinolyl-NHydroxysuccinimidyl Carbamate. in *Amino Acid Analysis Protocols* 039-047 (Humana Press). doi:10.1385/1-59259-047-0:039
49. Nygren, H., Seppanen-Laakso, T., Castillo, S., Hyötyläinen, T. & Orešič, M. Liquid Chromatography-Mass Spectrometry (LC-MS)-Based Lipidomics for Studies of Body Fluids and Tissues. in 247-257 (Humana Press, 2011). doi:10.1007/978-1-61737-985-7_15
50. Blondelle, J., de Barros, J. P. P., Pilot-Storck, F. & Tiret, L. Targeted lipidomic analysis of myoblasts by GC-MS and LC-MS/MS. in *Methods in Molecular Biology* 1668, 39-60 (Humana Press Inc., 2017).
51. Krumpochova, P., Bruyneel, B., Molenaar, D., Koukou, A., Wuhrer, M., Niessen, W. M. A. & Giera, M. Amino acid analysis using chromatography-mass spectrometry: An inter platform comparison study. *Journal of Pharmaceutical and Biomedical Analysis* 114, 398-407 (2015).
52. Holčapek, M., Liebisch, G. & Ekroos, K. Lipidomic Analysis. *Analytical Chemistry* 90, 4249-4257 (2018).
53. Abraham, A., Dillwith, J. W., Mafi, G. G., VanOverbeke, D. L. & Ramanathan, R. Metabolite Profile Differences between Beef Longissimus and Psoas Muscles during Display. *Meat and Muscle Biology* 1, 18 (2017).
54. Kowarz, E., Loscher, D. & Marschalek, R. Optimized Sleeping Beauty transposons rapidly generate stable transgenic cell lines. *Biotechnology Journal* 10, 647-653 (2015).
55. Alessio, A. P., Fili, A. E., Garrels, W., Forcato, D. O., Olmos Nicotra, M. F., Liaudat, A. C., Bevacqua, R. J., Savy, V., Hiriart, M. I., Talluri, T. R., Owens, J. B., Ivies, Z., Salamone, D. F., Moisyadi, S., Kues, W. A. & Bosch, P. Establishment of cell-based transposon-mediated transgenesis in cattle. *Theriogenology* 85, 1297-1311.e2 (2016).
56. Kawakami, K. Tol2: a versatile gene transfer vector in vertebrates. *Genome Biology* 8, S7 (2007).
57. Sander, J. D. & Joung, J. K. CRISPR-Cas systems for editing, regulating and targeting genomes. *Nature Biotechnology* 32, 347-355 (2014).
58. Szymczak, A. L. & Vignali, D. A. Development of 2A peptide-based strategies in the design of multicistronic vectors. *Expert Opinion on Biological Therapy* 5, 627-638 (2005).
59. Kanehisa, M. & Goto, S. KEGG: Kyoto Encyclopedia of Genes and Genomes. *Nucleic Acids Research* 28, 27-30 (2000).
60. Reynolds, T. H., Pak, Y., Harris, T. E., Manchester, J., Barrett, E. J. & Lawrence, J. C. Effects of Insulin and Transgenic Overexpression of UDP-glucose Pyrophosphorylase on UDP-glucose and Glycogen Accumulation in Skeletal Muscle Fibers. *Journal of Biological Chemistry* 280, 5510-5515 (2005).

61. Oikari, S., Venäläinen, T. & Tammi, M. Borate-aided anion exchange high-performance liquid chromatography of uridine diphosphate-sugars in brain, heart, adipose and liver tissues. *Journal of Chromatography A* 1323, 82-86 (2014).
62. Lee, H.-J., Jang, M., Kim, H., Kwak, W., Park, W., Hwang, J. Y., Lee, C.-K., Jang, G. W., Park, M. N., Kim, H.-C., Jeong, J. Y., Seo, K. S., Kim, H., Cho, S. & Lee, B.-Y. Comparative Transcriptome Analysis of Adipose Tissues Reveals that ECM-Receptor Interaction Is Involved in the Depot-Specific Adipogenesis in Cattle. *PLoS ONE* 8, e66267 (2013).
63. Oyarce, P., De Meester, B., Fonseca, F., de Vries, L., Goeminne, G., Pallidis, A., De Rycke, R., Tsuji, Y., Li, Y., Van den Bosch, S., Sels, B., Ralph, J., Vanholme, R. & Boerjan, W. Introducing curcumin biosynthesis in *Arabidopsis* enhances lignocellulosic biomass processing. *Nature Plants* 5, 225-237 (2019).
64. Katsuyama, Y., Kita, T. & Horinouchi, S. Identification and characterization of multiple curcumin synthases from the herb *Curcuma longa*. *FEBS Letters* 583, 2799-2803 (2009).
65. Ireson, C., Orr, S., Jones, D. J. L., Verschoyle, R., Lim, C. K., Luo, J. L., Howells, L., Plummer, S., Jukes, R., Williams, M., Steward, W. P. & Gescher, A. Characterization of metabolites of the chemopreventive agent curcumin in human and rat hepatocytes and in the rat in vivo, and evaluation of their ability to inhibit phorbol ester-induced prostaglandin E2 production. *Cancer Research* 61, 1058-1064 (2001).
66. Gugulothu, D., Desai, P. & Patravale, V. A versatile liquid chromatographic technique for pharmacokinetic estimation of curcumin in human plasma. *Journal of Chromatographic Science* 52, 872-879 (2014).
67. Pan, M.-H., Huang, T.-M. & Lin, J.-K. Biotransformation of Curcumin Through Reduction and Glucuronidation in Mice. *Drug Metabolism and Disposition* 27, (1999).
68. Carvalho, A., Hansen, E. H., Kayser, O., Carlsen, S. & Stehle, F. Designing microorganisms for heterologous biosynthesis of cannabinoids. *FEMS Yeast Research* 17, (2017).
69. Zgair, A., Wong, J. C. M., Sabri, A., Fischer, P. M., Barrett, D. A., Constantinescu, C. S. & Gershkovich, P. Development of a simple and sensitive HPLC-UV method for the simultaneous determination of cannabidiol and δ9-tetrahydrocannabinol in rat plasma. *Journal of Pharmaceutical and Biomedical Analysis* 114, 145-151 (2015).
70. Burstein, S. Cannabidiol (CBD) and its analogs: a review of their effects on inflammation. *Bioorganic & Medicinal Chemistry* 23, 1377-1385 (2015).
71. Carvalho, Â., Hansen, E. H., Kayser, O., Carlsen, S. & Stehle, F. Designing microorganisms for heterologous biosynthesis of cannabinoids. *FEMS yeast research* 17, (2017).
72. Ko, Y., Ashok, S., Ainala, S. K., Sankaranarayanan, M., Chun, A. Y., Jung, G. Y. & Park, S. Coenzyme $B_{12}$ can be produced by engineered *Escherichia coli* under both anaerobic and aerobic conditions. *Biotechnology Journal* 9, 1526-1535 (2014).
73. Ding, S., Swennen, G. N. M., Messmer, T., Gagliardi, M., Molin, D. G. M., Li, C., Zhou, G. & Post, M. J. Maintaining bovine satellite cells stemness through p38 pathway. *Scientific Reports* 8, 10808 (2018).
74. Etcheverry, P., Grusak, M. A. & Fleige, L. E. Application of in vitro bioaccessibility and bioavailability methods for calcium, carotenoids, folate, iron, magnesium, polyphenols, zinc, and vitamins B6, B12, D, and E. *Frontiers in Physiology* 3, 317 (2012).
75. Liu, C.-S., Glahn, R. P., Rui, A. & Liu, H. Assessment of Carotenoid Bioavailability of Whole Foods Using a Caco-2 Cell Culture Model Coupled with an in Vitro Digestion. (2004). doi:10.1021/jf040028k
76. Jayaprakasha, G. K., Jaganmohan Rao, L. & Sakariah, K. K. Antioxidant activities of curcumin, demethoxycurcumin and bisdemethoxycurcumin. *Food Chemistry* 98, 720-724 (2006).
77. Padayatty, S. J., Katz, A., Wang, Y., Eck, P., Kwon, O., Lee, J.-H., Chen, S., Corpe, C., Dutta, A., Dutta, S. K. & Levine, M. Vitamin C as an Antioxidant: Evaluation of Its Role in Disease Prevention. *Journal of the American College of Nutrition* 22, 18-35 (2003).
78. Borges, R., Batista, J., Viana, R., Baetas, A., Orestes, E., Andrade, M., Honório, K. & da Silva, A. Understanding the Molecular Aspects of Tetrahydrocannabinol and Cannabidiol as Antioxidants. *Molecules* 18, 12663-12674 (2013).
79. Jiang, J. & Xiong, Y. L. Natural antioxidants as food and feed additives to promote health benefits and quality of meat products: A review. *Meat Science* 120, 107-117 (2016).
80. Desmarchelier, C. & Borel, P. Overview of carotenoid bioavailability determinants: From dietary factors to host genetic variations. *Trends in Food Science & Technology* 69, 270-280 (2017).
81. Lynch, S. R. & Cook, J. D. Interaction of Vitamin C and Iron. *Annals of the New York Academy of Sciences* 355, 32-44 (1980).
82. Huri, P. Y., Wang, A., Spector, A. A. & Grayson, W. L. Multistage Adipose-Derived Stem Cell Myogenesis: An Experimental and Modeling Study. *Cellular and Molecular Bioengineering* 7, 497-509 (2014).
83. Devasagayam, T. P. A., Boloor, K. K. & Ramasarma, T. *Minireview Methods for estimating lipid peroxidation: An analysis of merits and demerits. Indian Journal of Biochemistry & Biophysics* 40, (2003).
84. DeCicco RePass, M. A., Chen, Y., Lin, Y., Zhou, W., Kaplan, D. L. & Ward, H. D. Novel Bioengineered Three-Dimensional Human Intestinal Model for Long-Term Infection of *Cryptosporidium parvum*. *Infection and immunity* 85, e00731-16 (2017).
85. Ma, J., Huang, H., Xie, Y., Liu, Z., Zhao, J., Zhang, C., Jia, Y., Zhang, Y., Zhang, H., Zhang, T. & Ju, J. Biosynthesis of ilamycins featuring unusual building blocks and engineered production of enhanced anti-tuberculosis agents. *Nature Communications* 8, (2017).
86. Wang, Z., Li, H., Guo, R., Wang, Q. & Zhang, D. Antioxidants inhibit advanced glycosylation end-product-induced apoptosis by downregulation of miR-223 in human adipose tissue-derived stem cells. *Scientific Reports* 6, (2016).
87. Zhang, L., Xia, H., Han, Q. & Chen, B. Effects of antioxidant gene therapy on the development of diabetic retinopathy and the metabolic memory phenomenon. *Graefe's Archive for Clinical and Experimental Ophthalmology* 253, 249-259 (2014).
88. Quan, M., Cai, C., Valencia, G., Aranda, J. & Beharry, K. MnTBAP or Catalase Is More Protective against Oxidative Stress in Human Retinal Endothelial Cells Exposed to Intermittent Hypoxia than Their Co-Administration (EUK-134). *Reactive Oxygen Species* (2017). doi:10.20455/ros.2017.801

Example 3

Oral administration is an ideal form of drug delivery due to its convenience, non-invasiveness, and safety. However, significant challenges to oral delivery—particularly for protein therapeutics—exist in terms of drug stability, release kinetics, and permeability[1]. To address these challenges, highly engineered, complex drug formulations have been designed, but these carry high developmental and manufacturing costs, with lingering issues of efficacy. To address these issues, the embodiments described in the present example demonstrate an approach based on mammalian cell engineering and on recent advances in using in vitro tissue engineered muscle and fat to produce food for human consumption (termed "cultured meat"). Specifically, the cell-level control that is available in cultured meat production offers the potential to tune food composition towards diverse outcomes, ranging from personalized nutrition and improved public health, to personalized medicine and drug delivery. We have recently demonstrated this possibility by engineering the endogenous synthesis of antioxidant phytonutrients (carotenoids) in bovine muscle stem cells to impart novel micro-nutritional and functional value to the cell-cultured foods[2]. See Example 1. This example describes engineering animal muscle cells for the synthesis of therapeutics in disease-responsive, edible formulations. These "therapeutic foods" would offer a novel form of oral (food-based) drug delivery which could offer improved drug absorption, patient compliance, drug activity, and cost-savings. Therapeutic foods can provide significant benefit in terms of patient compliance, lower drug costs, and improved pharmacokinetic/pharmacodynamic outcomes.

Cell Engineering. (a) Drug production in mammalian cells: We will engineer bovine muscle cells grown in a defined, serum-free medium to synthesize three drug types to demonstrate a broad approach. These will be: 1) the physiochemically stable anti-TNFα nanobody V565, which targets IBD, and 2) the proteolytically-stable antimicrobial peptide (AMP), here termed AMP16, which is effective against *Salmonella* infection[3,4]. Cells will be engineered using approaches described herein and molecular biology techniques known in the art. Production, stability and activity/bioavailability of the cell-encapsulated drugs with or without thermal treatment (e.g., cooking) will be analyzed. The outcomes will be the production of therapeutic compounds in mammalian cells. (b) Optimize cell-encapsulated therapeutics: Drug yield will be tuned through metabolic engineering. To optimize delivery, cells will be engineered to produce adjuvants for increasing stability of protein drugs. Specifically, the production of serpin pepsin inhibitors will be engineered into drug-producing cells using recombinase-mediated cassette exchange (RMCE) to mitigate drug breakdown in the gastric environment[22]. The outcomes will be control of drug synthesis levels and improved pharmacokinetic profiles.

Engineering disease-responsive drug formulations: Drug activity will be made disease-responsive by leveraging the elevated levels of specific digestive enzymes that are present during disease[5,6]. Specifically, for V565, a previously reported "antibody-masking" technique will be exploited in which V565 will be linked to its epitope by a flexible peptide linker rich in the trypsin-cleavage sites lysine and arginine[7]. Upon exposure to a trypsin-rich intestine (a feature of IBD), the linker will be cleaved and V565 will be activated; however, in a non-inflamed intestine, drug activity will be reduced. Unmasking efficacy will be analyzed by in vitro digestion in trypsin-rich conditions nanobody binding affinity analysis[7]. For AMP16, a similar approach will express peptides in a long chain comprised of AMP16 repeats linked by the elastase-cleavable domain NPV[8]. Upon exposure to increased levels of elastase (a feature of *Salmonella enterica* infection), increased linker cleavage will release more AMP16, thus increasing activity. Cleavability and antibiotic effects of linked AMP16 peptides will be analyzed by in vitro digestion in elastase-rich conditions and application to *S. enterica* cultures. To explore the possibility of a single therapeutic food product acting towards multiple pathologies in a disease-responsive manner, cells will be engineered to produce both disease-responsive drugs. In vitro digestion in enzyme-rich environments will be performed, and activity of both drugs will be tested to determine the specificity of the engineered disease-response systems. The outcomes will be a multi-drug disease-responsive formulation that is capable of responding to multiple pathologies, and which demonstrates the flexibility of these systems.

Assessing drug bioactivity in vitro: Drug bioactivity will be analyzed using a 3D intestinal tissue model previously described, which has been engineered to model inflammatory diseases (i.e., IBD), and to allow the incorporation of gut-colonizing bacteria (i.e., *S. enterica*), and immune cells (i.e., macrophages, which are the proposed target of V565)[9-12]. As such, the effect of anti-inflammatory and antibiotic drugs will be assessable with this system. Trypsin and elastase levels will be modulated to model the protease profile of IBD and *S. enterica* gastroenteritis, respectively, and drug activity will be analyzed compared with standard oral formulations as controls, both in inflamed tissue models and in models that have been inoculated with *S. enterica*. Relative effects of individual or combined engineering strategies will be assessed.

Oral therapeutics offer significant advantages over alternatives (e.g., parenteral delivery) in terms of patient compliance, comfort, safety, and convenience. They are therefore the preferred method of drug delivery, and indeed represent over half of recent new drugs approved by the FDA[13]. However, significant challenges facing oral drug delivery of biologic (e.g., protein or peptide) therapeutics mean that fewer than 5% of FDA-approved peptide therapeutics are deliverable via the oral route, despite growing interest in their potential[14,15]. These challenges include a harsh gastrointestinal environment and limited intestinal absorption which result in limited bioavailability (<1%)[13]. To reconcile the promise of therapeutic biologics with the challenges of their oral delivery, novel drug formulations are necessary. Beyond drug stability, the bioavailability of both biologics and small-molecule therapeutics can be significantly impacted by the food that is consumed contemporaneously, which can complicate clinical prescriptions[16]. As such, drug formulations that are incorporated into a defined food matrix could offer improved pharmacological consistency and predictability, thus improving patient outcomes. Finally, disease-responsive "smart" drug delivery systems that could act selectively towards active diseases are promising possibilities that have gained interest in recent years[17,18]. These drugs would become active only when needed (i.e., when presented to a diseased environment), and could therefore improve pharmacological outcomes by reducing off-target effects, avoiding excessive drug exposure, and modulating release to steady-state levels. The edible therapeutic systems described herein would explore the potential of therapeutic cell-based foods to address all three of these pharmaceutical targets, with improved bioavailability and disease-specificity for both biologic and small-molecule therapeutics.

Scientific Premise—The bioavailability of many oral drugs is significantly affected by the food that is consumed in parallel[19-21]. This leads to substantial pharmacokinetic uncertainty[22]. The possibility of delivering drugs as part of a defined food matrix offers tight control over food-drug interactions and thus drug delivery. Second, the capabilities of mammalian cells to synthesize a myriad of proteins and metabolites allows for complex formulations to address the barriers associated with oral delivery, while also eliminating the costly purification steps used to extract, stabilize and formulate oral therapeutics[23]. For instance, through metabolic engineering, food-based delivery systems can leverage the simultaneous synthesis of stable drug formulations within the mammalian cells, digestive enzyme inhibitors (to improve gut stability of the ingested drug), and permeation enhancers to improve absorption[3]. At the same time, the "natural liposome" of cell lipid bilayers provides further control of stability and delivery[24]. Finally, when engineered as environmentally responsive systems, these therapeutic foods could offer high specificity towards diseases[5]. For instance, numerous pathologies result in changes in the gut enzymatic profile, and so protease-triggered drug activity could enhance the release/bioavailability of drugs to enable disease-responsive activity towards a range of pathologies[5,6].

Therapeutic foods—Along with the aforementioned benefits, an edible, cultured-meat-based therapeutic formulation would offer an entirely novel kind of drug delivery system that could hold significant implications for patients and clinicians alike. For instance, the most common form of medication noncompliance in the elderly is underuse, with dominant reasons being forgetfulness and polypharmacy[25,26]. It is possible that directly combining medicine and meals—inextricably tying medication to a much more ingrained and pleasurable daily ritual—would help mitigate these issues. Additionally, the potential to formulate foods with complex combinations of disease-responsive medications could mitigate the issues presented by polypharmacy. Finally, trouble swallowing solid oral medications is seen across age groups, and ad-hoc oral drug modification (i.e., crushing, cutting, dispersing in liquid, etc.) can increase variability and pose risks to patients[27]. An edible formulation would help to alleviate these issues by making drug consumption simply a matter of chewing one's food. Cultured meat is a promising emerging technology with the potential to reduce the environmental, ethical, and public-health concerns associated with meat production. Specifically, speculative life cycle analyses estimate that cultured meat could emit 78-96% less greenhouse gases, use 99% less land, use 82-96% less water, and use 7-45% less energy compared to a range of livestock species[28].

Recently, drug production in plants has been proposed as a means of generating edible therapeutics, including antibodies or vaccines[23,32]. For instance, vaccines against hepatitis B, Norwalk virus, rabies and HIV have been expressed in tobacco plants, potatoes, lettuce, tomatoes and maize, and human clinical trials have validated efficacy of edible vaccines in transgenic potatoes[33,34]. The proposed benefits of these products largely centered around reducing costs by eliminating purification steps and harnessing the immense scale of agricultural production. However, despite the promise of early results for multiple drug types, variability of drug concentration and differences in plant versus human glycosylation patterns have contributed to limiting further development[32]. Mammalian cell-based edible therapeutics offer a potential means of overcoming these obstacles. Specifically, the high degree of control that would be present in cultured meat production could circumvent this variability, as cells would be grown in contained culture environments without the variables that affect crops (e.g., weather patterns). More, the use of animal cells would easily facilitate correct glycosylation. Finally, the encapsulation and delivery of therapeutics in whole animal cells is an as-yet unexplored idea, with expansive white-space to explore and innovate on targets and applications.

The cell-level control that is inherent to cultured meat (at the gene, transcript, protein, and metabolic level) offers the opportunity to tune composition towards various aims, enabling the production of entirely novel foods with tuned meat quality and added functionality. To demonstrate this, we recently engineered mammalian cells with the metabolic pathway for the synthesis of three different carotenoids, which are essential micronutrients that are native to many plants and some prokaryotes, but not animals[2]. Ultimately, novel food functionality in cultured meat products could be applied to nutrition (general and personalized), food quality (i.e., flavor, texture, and other sensorial properties), diet-related disease (e.g., diabetes or colorectal cancer), therapeutics (as explored in this proposal), edible vaccines, or other enhancements not considered here.

Figures 13A, 13B, 13C, 13D, 13E:
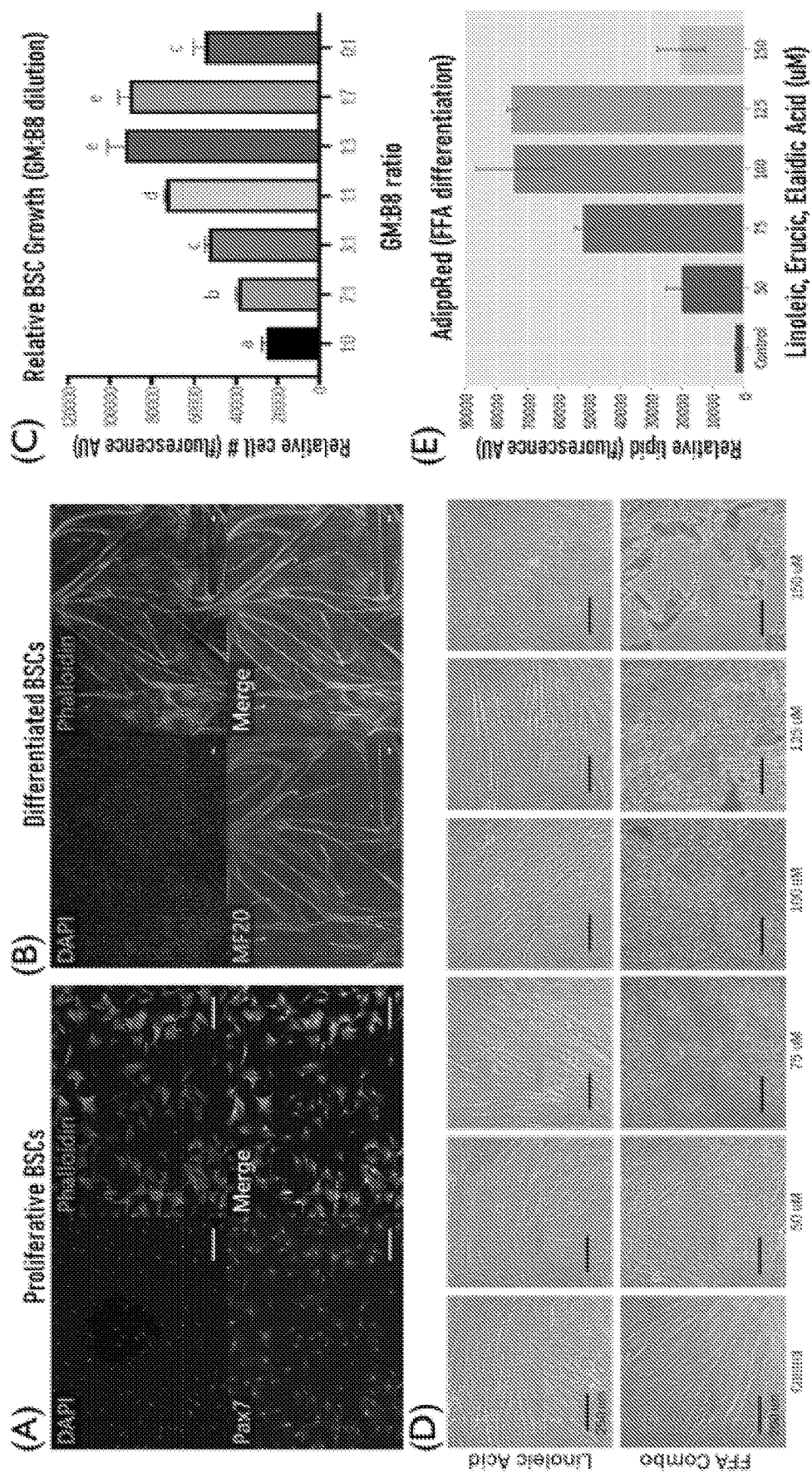
FIGS. 13A-13E show bovine satellite cell (BSC) culture results.

Bovine muscle and fat cell culture—To date, our group has explored several topics with direct relevance to this proposal. From a culture system standpoint, we have established protocols for generating populations of primary bovine satellite cells (BSCs) that are pure (ubiquitous expression of the satellite cell marker Paired-box seven (Pax7) in imaged cells) (FIG. 13A) and myogenic, capable of generating long multinucleated myotubes which express myosin heavy chain (MHC) and which form actin/myosin contractile apparatuses (FIG. 13B)[42,43]. Further, we have validated a serum-free, growth-factor based media formulation (B8) for BSC culture based on previously reported formulations[44], and observed superior BSC growth in B8 medium compared to serum-containing growth medium (GM) (FIG. 13C). We have also established an adipogenic transdifferentiation method to convert myogenic BSCs into lipid-accumulating fat cells by treating cells with a free fatty acid (FFA) mixture (FIG. 13D). We have shown robust and tunable lipid accumulation using this method (FIG. 13E), indicating that a single cell population (i.e., bovine satellite cells) could be used to generate both muscle and fat for cultured meat, which could significantly simplify an industrial production process[45]. This work demonstrates broad experience with relevant bovine muscle precursor cell cultures.

Bovine satellite cell metabolic engineering—From a synthetic biology and metabolic engineering standpoint, we engineered BSCs to endogenously synthesize the carotenoids phytoene, lycopene, and β-carotene[2]. These nutrients were attractive targets for several reasons. First, each offers unique nutritional value; phytoene is suggested to act as a UV photo-protectant, lycopene has been shown to reduce hepatocellular carcinoma and fatty liver disease, and β-carotene is an essential vitamin A precursor in the human diet[46-48]. Second, all three compounds are antioxidants[49]. This is particularly relevant for red meat, since a key mechanistic link between red or processed meat consumption and colorectal cancer is lipid oxidation[50]. The antioxidant nature of these compounds also provides value in extending meat shelf-life, as lipid oxidation is a major cause of non-microbial degradation over time[51].

Figures 14A, 14B, 14C, 14D:
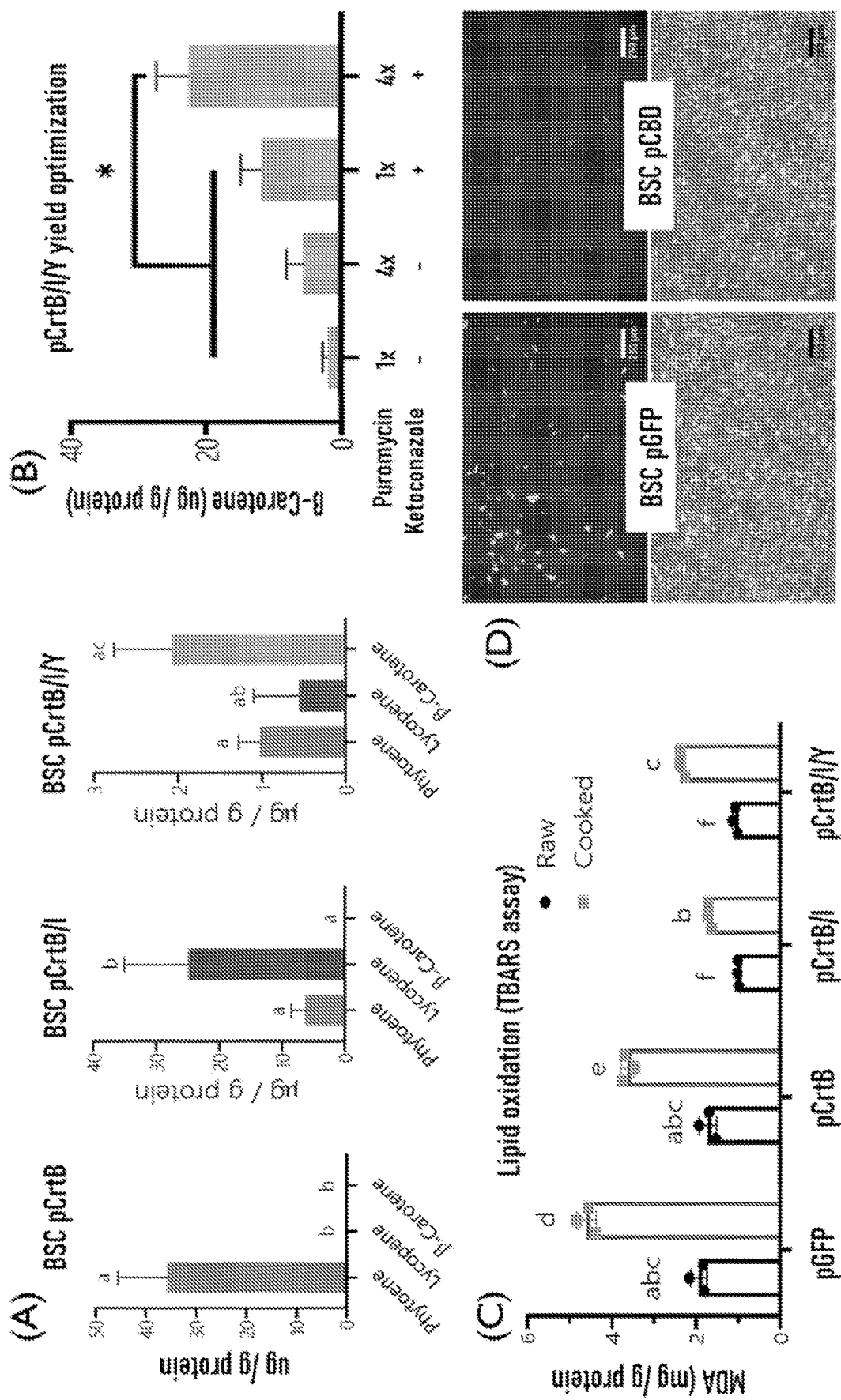
FIGS. 14A-14D show BSC compositional engineering.

Cells were engineered via Sleeping Beauty transposon-mediated transgenesis to express green fluorescent protein (GFP) alone (pGFP) which did not produce any carotenoids, CrtB and GFP (pCrtB) which could produce phytoene, CrtB, CrtI and GFP (pCrtB/I) which could produce phytoene and lycopene, or CrtB, CrtI, CrtY and GFP (pCrtB/I/Y) which could produce phytoene, lycopene and β-carotene. The multi-cistronic nature of these vectors allowed the use of GFP expression as a marker of vector integration and gene expression. All cells also expressed a puromycin resistance gene to allow for the selection of engineered cells. We first demonstrated successful synthesis of three all carotenoids in cells (FIG. 14A). Next, we showed that carotenoid levels could be tuned by increasing puromycin concentrations (i.e., increasing pressure to select for cells whose transgenes were positioned in more transcriptionally-active loci) or adding ketoconazole to the culture medium (a small molecule that inhibits cholesterol synthesis, a metabolic pathway which competes with carotenoids for a shared precursor) (FIG. 14B). We showed food functionality in reducing lipid oxidation in vitro (FIG. 14C). Along with prior carotenoid work, we have engineered cells to express enzymes involved in the synthesis of cannabidiol, a small molecule anti-inflammatory and pain-mediating therapeutic[52,53]. BSCs were engineered by Sleeping Beauty transgenesis to express 3,5,7-trioxododecanoyl-CoA synthase (OLS), olivetolic acid cyclase (OAC), annabigerolic acid synthase (CPGAS), cannabidiolic acid synthase (CBDAS), and GFP (plasmid name pCBD) to convert Malonyl-CoA to CBD[54]. Cells showed successful gene expression (FIG. 14D).

Figures 15A, 15B, 15C, 15D, 15E, 15F, 15G, 15H:
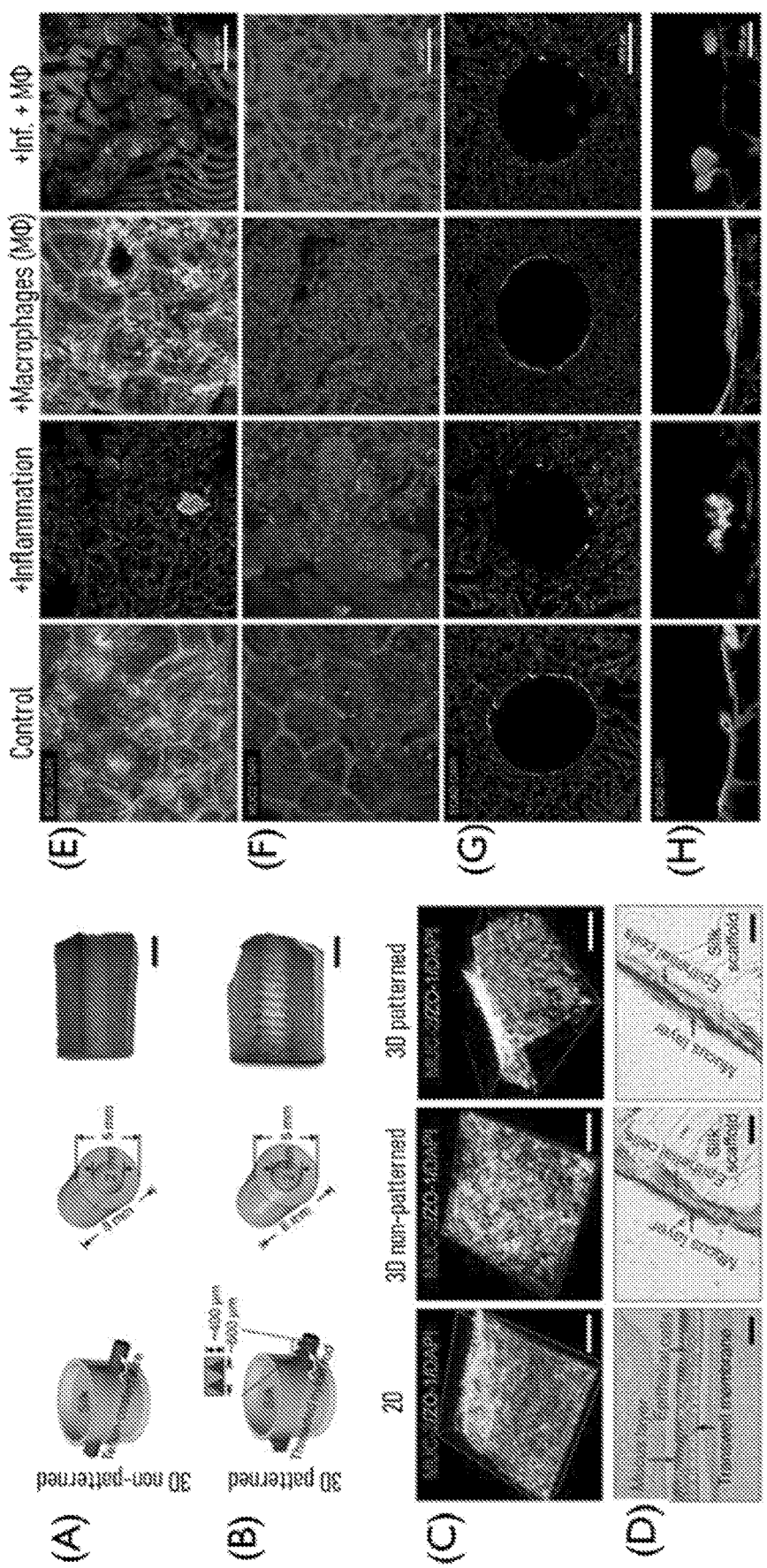
FIGS. 15A-15H show a 3D intestine model.
Figures 15I, 15J, 15K, 15L:
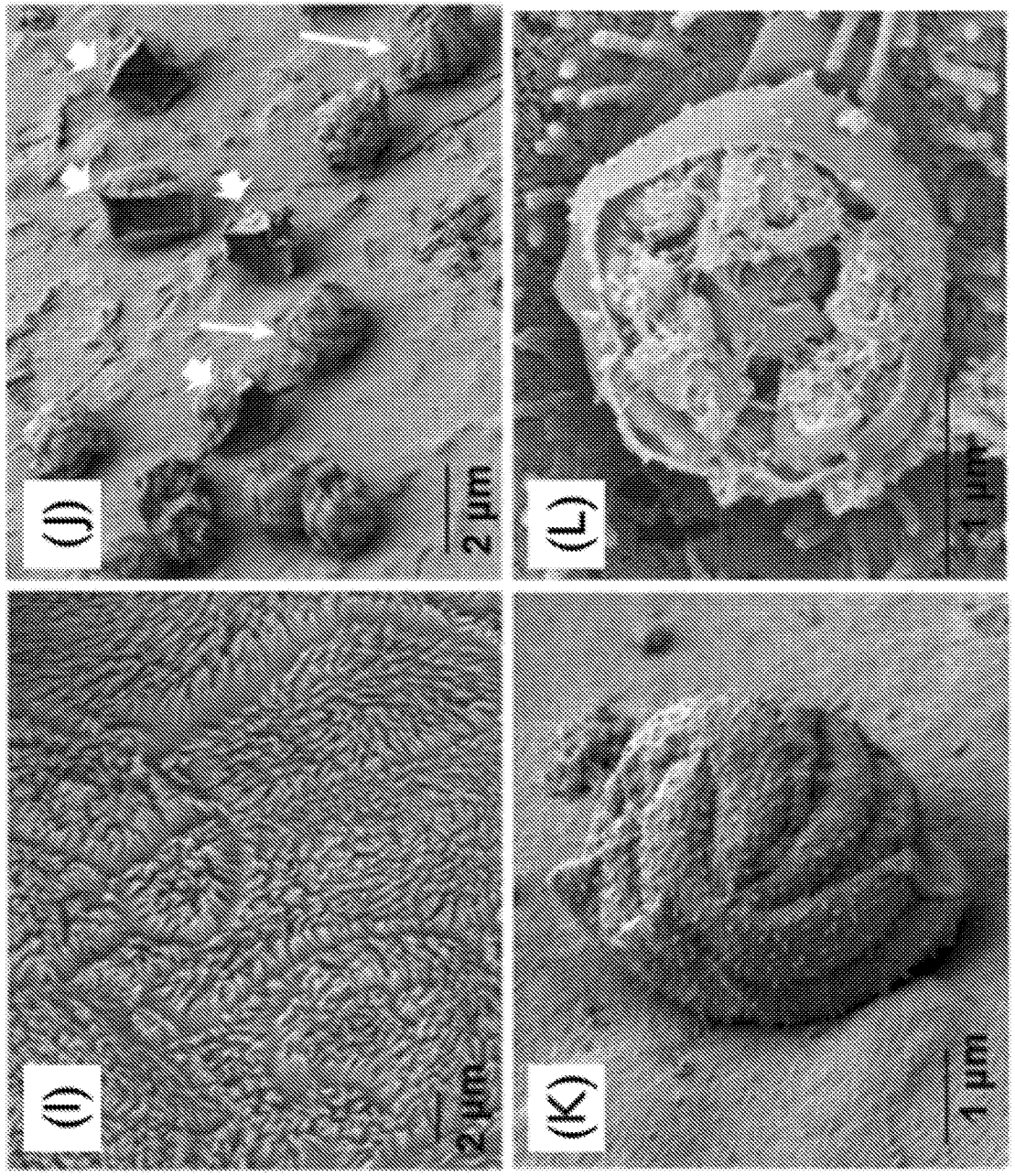
FIGS. 15I-15L show a 3D intestine model of infection with *Cryptosporidium parvum*[56].

3D intestinal disease model—This model is formed by casting silk fibroin protein in a polydimethylsiloxane (PDMS) mold around a central wire that serves to generate a geometrically engineered hollow lumen, and subsequently and inducing β-sheet formation (FIGS. 15A-15B). We have shown that these scaffolds, when seeded with human intestinal cells (e.g., organoids), show robust cell development, including the generation of microvilli, expression of intestinal cell markers, and production of mucous layers (FIGS. 15C, 15D, & 15I). When additionally seeded with macrophages and treated with E. coli O111:B4 lipopolysaccharide (LPS) and interferon γ (IFNγ), cultures are capable of modeling intestinal inflammation, showing increased secretion of pro-inflammatory cytokines that are associated with IBD (i.e., CXCL10, IL-1β, IL-6, MCP-2, and MIP-1β)[55]. When inoculated with oocytes of Cryptosporidium parvum, an apicomplexan parasite that infects the intestine, 3D models showed the ability to support infection for over two weeks. Further, parasites showed physiological development, progression, and pathological effects in vitro, demonstrating the ability of this system to accurately recapitulated intestinal infection[56]. Ultimately, our preliminary data supports the use of this model to test a range of drug activities in vitro, towards both inflammatory and infectious diseases. In this, the use of human cells makes the model particularly relevant for this proof-of-principle look at edible therapeutics.

Drug production and optimization in mammalian cells—Because the bioavailability of drugs can vary significantly with the composition of the surrounding food matrix, and because there are substantial compositional changes to muscle cells during differentiation, drug delivery with both undifferentiated and differentiated muscle tissue will be explored[58]. Specifically, we explore drug production in undifferentiated bovine satellite cells (BSCs) and BSCs that have been differentiated into multinucleated myotubes (FIG. 13A). A non-viral transposon-mediated gene editing technique will be used due to its non-viral nature, high efficiencies, and demonstrated utility in prior work[59,60]

Drug Production in Mammalian Cells

Bovine satellite cell isolation and culture—Bovine satellite cells (BSCs) will be isolated from the Tufts Cummings School of Veterinary medicine using protocols approved by the Tufts University Institutional Animal Care and Use Committee (IACUC Protocol #G2018-36), and reported by our lab[43]. Briefly, a ~0.5 cm³ muscle excision will be taken from the semitendinosus of a <60-day-old Simmental bull and transported to a tissue culture lab in DMEM+Glutamax with 1× penicillin/streptomycin. Tissue will be minced and digested in an 0.2% collagenase II solution for one hour with regular trituration. Digestion will be halted with growth media comprised of DMEM Glutamax supplemented with 20% fetal bovine serum (FBS), 1% primocin, and 1 ng/mL human FGF-2, and cells will be filtered and plated at a density of 100,000 cells/cm² onto uncoated tissue-culture flasks. After 24 hours of incubation at 37° C. with 5% $CO_2$, unattached cells (which comprise the slowly-adherent satellite cells) will be moved to new tissue culture flasks that have been coated with 0.375 ug/cm² of recombinant laminin-511. Satellite cells will be left undisturbed for three days, after which cells will be fed with growth media every 2-3 days and passaged at 70% confluency. Media will be supplemented with primocin only for the first two weeks of culture. Due to the importance of using serum-free media in cultured meat production, experiments will take place in serum-free growth medium using a previously reported medium (B8) comprised of DMEM:F12 (1:1) supplemented with L-ascorbic acid 2-phosphate (200 ug/mL), insulin (20 ug/mL), transferrin (20 ug/mL), sodium selenite (20 ng/mL), FGF-2 (10 ng/mL), neuregulin 1 (NRG-1; 0.1 ng/mL), and TGFβ-3 (0.1 ng/uL) (FIGS. 13A-13E)[44]. To verify cell identity, immunocytochemistry will be performed for satellite cell markers. Cells will be fixed using 4% paraformaldehyde, permeabilized using a Triton-X solution, blocked, and stained for paired-box 7 (Pax7). Positive staining for these markers will be considered determinative of BSC phenotype as previously reported, and as visible in FIG. 2.

Myogenic differentiation—To differentiate satellite cells into myotubes (under serum-free conditions), cells will be cultured to confluency in B8, and media will be changed to a previously reported differentiation media comprised of a Neurobasal/L15 (1:1) basal media supplemented with epidermal growth factor (EGF; 0.5 ng/mL), insulin-like growth factor 1 (IGF-1; 0.05 ng/mL), and 1% Antibiotic-Antimycotic[61]. Cells will be differentiated for 1-2 weeks, fixed as before and stained for Myosin Heavy Chain (MHC) as previously demonstrated (FIG. 2)[43].

Genetic modification techniques—Molecular cloning will be carried out using standard techniques. For genetic insertions, transposable elements will contain both the genes of interest (controlled by a CMV promoter) and the genes for resistance to selection antibiotics (puromycin) to enable the selection of successfully transfected cells. Additionally, to simplify future engineering efforts, the puromycin resistance cassette will be engineered to be preceded by a flip-recombinase target (FRT) sequence to allow for future gene insertion through recombinase-mediated cassette exchange (RMCE)[62,63]. Cellular transfection will be performed using the Lipofectamine 3000 reagent (Thermo Fisher). Briefly, cells will be cultured to 85% confluence, washed with OptiMEM media, and incubated with transfection reagents containing purified plasmids. After 6 hours, growth media will be added to cells and following 42 hours a selection pressure will be added to the media (e.g., puromycin). Cells will be cultured for one week under selective pressure, after which expression will be verified through immunocytochemistry, the use of fluorescent tags, or polymerase chain reaction (PCR). When multi-cistronic expression is needed, genes will be linked by 2A peptide sequences to allow for the translation of multiple proteins from a single strand of RNA which codes for multiple genes[64]. In most cases, a 2A sequence will link green fluorescent protein (GFP) to the expression cassette, so that expression can be screened for through simple fluorescence microscopy. Throughout these studies, cell health and myogenic potential will be verified by observing proliferation and differentiation of cells.

V565 production and activity—The V565 amino acid sequence (DVQLVESGGGLVQPGGSLKLS-CAASGFDFSSHWMYWVRQAPGKELEWL-SEINTNGLIT HYGDSVKGRFTVSRNNAANKMYLEL-TRLEPEDTALYYCARNQHGLNKGQGTQVTVSS; SEQ ID NO:7)[3,65] will be codon optimized for bovine expression, modified with a 6×His-tag sequence for quantification, and cloned into a multi-cistronic expression vector for V565 and GFP as described above. Cells will be transfected, selected, and gene expression will be verified by fluorescence imaging. Cells will be cultured, harvested (10 million cells, as proliferative BSCs or differentiated myotubes), and V565 production will be quantified with a competitive His-tag ELISA on cell lysates. As an orthogonal measure of gene expression, GFP will be quantified from cell lysates with a GFP quantification kit (abcam #ab235672). That 2A sequences allow for stoichiometric expression of multiple proteins should allow for GFP quantification to act as an accurate proxy for V565 levels[66]. Readings will be normalized to a standard curve, cell count, and cellular protein content (determined by Bradford assay).

To analyze V565 in an edible format, cells will be harvested (10 million cells) and either kept "raw" or "cooked" by heating cell pellets to 100° C. for 1-10 minutes. Samples will be lysed using a standard cell lysis buffer, or through in vitro digestion based on previously reported methods[67,68]. Briefly, samples will be added to a saline solution containing 140 mM NaCl, 5 mM KCl, and 150 uM butylated hydroxytoluene. To simulate gastric digestion, HCl will be added to a final pH of 2.0, samples will be mixed 36:1 with a solution of 4% w/v of pepsin in 0.1 M HCl, and samples will be incubated in a shaking water bath at 37° C. for one hour. The pH of the digesta will be raised to 6.9 with NaHCO$_3$, and further intestinal digestion will be performed by mixing samples 7.4:1 with a pancreatin-bile solution (1.2% w/v of bile extract and 0.2% of pancreatin with 550 U/mL trypsin and 3.3 U/mL chymotrypsin in 0.1 M NaHCO$_3$) and incubating samples in a shaking water bath at 37° C. for two hours. Following in vitro digestion, samples will be analyzed by His-tag quantification and by competitive ELISA to determine binding activity as previously described[69]. Briefly, plates will be coated with TNFα, washed, blocked, and treated with digesta. An Anti-His secondary antibody and horseradish peroxidase (HRP) conjugated tertiary antibody will be added, followed by treatment with 3,3',5,5' tetramethyl benzidine (TMB). Absorbance at 450 nm will be used to quantify binding. Results will be compared between cooked, uncooked, digested and undigested samples.

AMP16 production and activity—the AMP16 peptide amino acid sequence (IRPI IRPI IRPI IRPI IRPI IRPI IRPI; SEQ ID NO:8)[4] will be codon optimized for bovine expression and cloned into two multi-cistronic expression vectors for AMP16 and GFP and either with or without a 6×His-tag included. Cells will be transfected, selected, and gene expression will be verified by fluorescence imaging. As with V565, cells will be cultured, differentiated into muscle and fat, harvested (10 million cells), and both His-tag quantification and GFP quantification will be used to analyze expression levels. The use of both methods will allow for quantification of non-tagged peptides, as the 6×His-tag could ultimately confound peptide activity. As with other drugs, readings will be normalized to a standard curve, cell count, and cellular protein content.

To analyze AMP16 antimicrobial activity in an edible format, cells will be harvested (10 million cells), treated, and "digested" as with V565 cells. Following in vitro digestion, paper discs will be soaked in digesta and placed on agar plates previously inoculated with S. enterica and cultured at 37° C. After 1-24 hours of incubation, zones-of-inhibition will be measured and compared between samples.

It has been previously shown that while V565 is largely stable in the gastric environment, it is sensitive to pepsin[3]. Similarly, degradation of small peptide therapeutics in gastric fluid has been shown to be largely pepsin-dependent[70]. As such, both V565 and AMP16 delivery could be dramatically improved by inhibition of pepsin activity during digestion.

Enhancing drug yields—Drug yields in cells will be enhanced by increasing gene expression and increasing drug precursor levels in culture. To increase gene expression, cells will be cultured in increasing levels of the selection antibiotic puromycin in order to select for cells whose transgenes have inserted in more transcriptionally active loci. Our previous work with carotenoids has shown that this can increase gene expression (as shown by GFP expression) ~two-fold, and subsequent carotenoid levels ~3-fold (FIG. 14B). To increase drug precursor levels for V565 and AMP16, culture media will be supplemented with the most prevalent amino acids in these two drugs, as amino acid depletion is a potential bottleneck in therapeutic protein production[71]. Specifically, glycine, leucine, and serine are the three most common amino acids in V565 (representing over 30% of the total sequence), and so media will be supplemented with additional G, L, and S (100-200% of standard media levels). For AMP16, isoleucine arginine, and proline together represent 100% of the total sequence, and so media will be supplemented with these amino acids (100-200% of standard media levels). Drug yields will be analyzed as before.

Reducing gastric degradation—Pepsin inhibition will be engineered into cells via the production of serpins as previously described and engineered using the Flp-In system (ThermoFisher)[72]. Briefly, the serpin Tsp03044 sequence (Genbank accession #XM_003379333) will be codon optimized and cloned into the pcDNA5/FRT plasmid (ThermoFisher). This plasmid and the pOG44 plasmid (ThermoFisher) coding the Flp recombinase will be doubly transfected into engineered cells expressing V565 or AMP16. Flp-mediated RMCE will facilitate the insertion of Tsp03044 and a hygromycin resistance gene (from the pcDNA5/FRT plasmid) into V565 and AMP16-producing cells, and so treatment of cells with puromycin and hygromycin will ensure the production of V565 or AMP16 as well as Tsp03044. Tsp03044 expression will be verified by RT-PCR. Serpin efficacy in maintaining drug activity will be analyzed by in vitro digestion and activity analyses as described previously. Results will be compared to undigested cell lysates and cell lysates treated with pepsin only.

Alternative IBD-targeting drugs could also be expressed in mammalian cells, including the peptide PTG-200[73] or the Microbial Anti-inflammatory Molecule (MAM) or it's constitutive peptides, which have been shown to offer anti-inflammatory activity in a murine colitis model[74]. Alternate antibiotics could include other small-peptide antibiotics or small-molecule antibiotics such as penicillin[75]. Additionally, small molecule therapeutics could be explored, including cannabidiol or anti-inflammatory compounds such as curcumin or the immunosuppressant FK506[53,76,77]. If puromycin conditioning proves ineffective in increasing drug yields, protein copy-number can be increased by engineering plasmids to contain multiple copies drug sequences, either in a multi-cistronic format that is separated by 2A sequences, or with distinct promoters for each copy. If protein stability is insufficient following serpin synthesis, cells can be encapsulated in alginate or chitosan scaffolds—a promising scaffold for cultured meat production—to slow enzymatic degradation[13,78]. Lastly, alternate cell types can be considered, such as transdifferentiated bovine fat cells, immortalized bovine muscle cells, or immortalized mouse muscle cells (C2C12s).

Engineering disease-responsive drug formulations—Numerous pathologies result in changes in the gut enzymatic profile. Specifically, fecal profiling has shown a >5-fold increase in trypsin-like proteases in patients with IBD compared with healthy patients, and *S. enterica* infection has been shown to raise elastase levels ~2-fold[5,6]. In light of this, protease-triggered drug release/activity could tailor drugs to enable disease-responsive activity in edible therapeutics. Disease-responsiveness will be engineered into V565 and AMP16 systems for IBD and *S. enterica* infection, respectively.

Engineering IBD-response for V565—Disease response to IBD will leverage a previously reported epitope-masking strategy[7]. Specifically, V565 will be synthesized linked to fragments of its target antigen—TNFα—in order to mask V565's ability to TNFα in tissue. The linker used will be susceptible to trypsin cleavage, so when this construct is exposed to a trypsin-rich intestinal environment (as is seen in IBD), the antigen will be released and V565 will be free to bind to tissue TNFα. To engineer these systems, the human TNFα sequence will be codon optimized for bovine expression and appended to the V565 sequence along with a flexible linker (GGG SGG GSG GGS GGK GGK GGK GGK GGG SGG GSG AQG; SEQ ID NO:9) with numerous lysine residues to facilitate trypsin cleavage. Cloned sequences will be engineered into cells as before (including RMCE-mediated serpin integration). To analyze drug response to trypsin, cells will be cultured, harvested (10 million cells, pre- or post-differentiation), heated or left unheated, lysed, and treated with a range of trypsin concentrations. Drug activity will be analyzed via competitive ELISA as before. At the same time, cells will undergo harvesting, cooking, and in vitro digestion in varying levels of trypsin, and activity will be assessed.

Engineering *Salmonella*-response for AMP16—Response to *S. enterica* infection will likewise leverage variable enzyme levels in disease. Specifically, *S. enterica* infection has been shown to be associated with increases in intestinal elastase. As such, the elastase-cleavage linker NPV will be engineered into AMP16 peptide sequences[8]. Specifically, a 10× repeat of AMP16 with NPV sequences between each 28-mer peptide will be assembled and cloned into plasmids. Cells will be transfected, modified via RMCE to include Tsp03044, cultured, harvested (10 million cells, pre- or post-differentiation), heated or left unheated, and lysed as before. Cell lysates will be treated with varying levels of elastase, and drug activity will be analyzed by zone-of-inhibition analysis as before. At the same time, cells will undergo harvesting, cooking, and in vitro digestion in varying levels of elastase, and drug activity will be assessed.

Combining drugs into one disease-responsive system—To engineer a truly "smart" system that is capable of addressing numerous pathologies in a disease-responsive manner, we will combine the above components into a single cell line. Specifically, V565-epitope, 10×AMP16, and GFP will be linked by 2A sequences to form a single multi-cistronic fragment. This fragment will be cloned into a Sleeping Beauty transposon vector as before and transfected into cells. Cells will undergo transfection and RMCE to generate a single cell line containing all of the previously described disease-responsive drug components. Cells will be cultured, harvested (10 million cells, pre- or post-differentiation), heated or left unheated, and treated via in vitro digestion under a range of trypsin and/or elastase concentrations in order to represent patients with IBD, *S. enterica* infection, both, and neither. V565 and AMP16 drug activity will be analyzed as before.

Alternatively, copies of V565 together with trypsin-cleavable linkers can be explored as a means of masking the binding domain of these nanobodies. Alternately, if linking of AMP16 peptides proves ineffective in imparting disease-responsiveness during *S. enterica* infection, the use of antimicrobial nanobodies with activity towards *E. coli* infection can be explored, with enzyme-cleavable epitope masking similar to what is being explored for V565[79]. Additionally, alternate enzyme-cleavable linkers or environmental cues (such as changes in pH) can be leveraged to engineer disease-response[3,80-83]. If synthesis of both drug systems in a single cell proves challenging, then two populations of single-drug-system cells can be developed and later combined into a multi-drug food.

Assessing drug bioactivity in vitro—Functional in vitro 3D human intestinal models are a promising option for early validation of edible drug formulations due to their use of human cells and ability to recapitulate relevant tissue features and geometries[84]. To this end, a 3D intestinal tissue model was previously developed by our group (FIGS. 15A-15L). This model will be applied to assess the efficacy of engineered therapeutic foods in vitro.

Cells—Human colonoids previously isolated and cultured by our group will be cultured in matrigel droplets and appropriate medium as previously described[55]. Human monocytes previously isolated and cultured by our group will be cultured in appropriate medium as previously described[55]. Monocytes will be differentiated into macrophages by treatment with 50 ng/mL macrophage colony-stimulating factor; for M1 polarization, macrophages will subsequently be cultured in media supplemented with lipopolysaccharides (LPS) and interferon interferon γ (IFNγ).

3D model IBD—The intestinal models will be fabricated and seeded with human cells as previously described[55]. Briefly, a solution of silk fibroin extracted from *Bombyx mori* silkworm cocoons will be poured into a cylindrical mold of PDMS containing a 2 mm diameter Teflon-coated steel wire that has been inserted through the cross section of the mold to form a channel. The solution will be frozen, lyophilized, and autoclaved to induce β-sheet formation. Scaffolds will be soaked in water and cut into 8 mm sections. Biopsy punches will be used to cut out "inner scaffolds" (length 8 mm, outer diameter 6 mm, inner lumen 2 mm) and "outer scaffolds" (length 8 mm, outer diameter 10 mm, inner diameter 6 mm). To seed scaffolds, human colonoids will first be seeded into the 2 mm lumen following previously reported methods[55]. Briefly, silk scaffolds will be coated with collagen gel, human colonoids will be dissociated in trypsin-EDTA, and cell suspensions will be pipetted to equally coat the inner lumen of the inner scaffolds. These scaffolds will be cultured for one week in appropriate media as previously reported. Next, monocytes will be suspended in collagen gel and seeded throughout the bulk of the outer scaffold. Monocytes will be differentiated to uncommitted macrophages by six days of appropriate medium as previously reported[55]. Outer scaffolds will then be cultured in macrophage media with LPS and IFNγ to induce polarization. Cell-seeded outer scaffolds will be combined with cell-seeded inner scaffolds to form complete IBD models. Models will be verified through immunofluorescence, cytokine analysis, and mucus thickness measurements as previously described before use in testing therapeutic food efficacy[55].

3D model of *Salmonella* infection—Scaffolds will be prepared and seeded as before, though without LPS or IFNγ treatment. Models will be validated through immunofluorescence to ensure accurate intestinal recapitulation, and to obtain an understanding of the number of cells on the inner lumen. With this information, inner lumens of scaffolds will be infected by inoculating with *S. enterica* at a multiplicity of infection of 10-100, and dosing will be adjusted pending epithelial cell responses in culture for up to one week[85].

Drug delivery to disease models—Drug delivery in all formats will be explored in 3D models, including pure compounds, cell-encapsulated therapeutics without disease-responsiveness and with or without excipients, and cell-encapsulated therapeutics with disease responsiveness and excipients (either separately or in cells engineered with all drug components). Cells will be cultured, harvested (10 million cells, pre- or post-differentiation), and heated or not heated as before. Samples will be lysed or undergo in vitro digestion with a range of trypsin and/or elastase concentrations. Culture media will be removed from scaffolds and replaced with digesta for 2, 3, or 4 hours to capture a range of feasible intestinal residence times, after which digesta will be removed and replaced with cell culture media. One hour, two-hours, six-hours, and 24-hours after treatment, scaffolds will be analyzed for drug efficacy.

Analyzing drug effect—The effect of drugs on IBD will be analyzed by profiling inflammatory cytokines in treated and untreated scaffolds. Specifically, interleukins 1β and 6 (IL-1β & IL-6), monocyte chemoattractant proteins 1 and 2 (MCP-1 & MCP-2), and macrophage inflammatory protein 1β (MIP-1(3/CCL4) will be measured by commercial chemiluminescence arrays. Additionally, epithelial integrity will be analyzed by immunohistochemistry towards mucin-2, CD68, and ZO-1. The effect of drugs on *S. enterica* infection will be analyzed by homogenizing scaffolds in lysis solution containing Triton-X, serially diluting homogenates, and determining colony-forming units of *S. enterica* by plating onto LB Agar culture plates[86]. Results will be compared between all drug types, samples, and conditions.

If 3D disease models prove inappropriate for use in this study, 2D studies can be performed with Caco-2 intestinal cells and Transwell systems. If single dosing proves ineffective for generating a response, dosing with larger cell harvests, or repeat dosing with edible therapeutics can be performed (i.e., two to three times per day at "meal times" for one week). Finally, if in vitro models prove ineffective, ex vivo analysis can be performed using biopsies obtained during routine endoscopies of consenting IBD patients. Specifically, biopsies can be cultured ex vivo, treated with in vitro digests of therapeutic food samples, and analyzed for markers of inflammation and drug activity as previously reported[3,87]. Lastly, in vivo animal models can be considered.

References:
1. Renukuntla, J., Vadlapudi, A. D., Patel, A., Boddu, S. H. S. & Mitra, A. K. Approaches for enhancing oral bioavailability of peptides and proteins. *International Journal of Pharmaceutics* 447, 75-93 (2013).
2. Stout, A. J., Mirliani, A. B., Soule-Albridge, E. L., Cohen, J. M. & Kaplan, D. L. Engineering carotenoid production in mammalian cells for nutritionally enhanced cell-cultured foods. In Review
3. Scott Crowe, J., Roberts, K. J., Carlton, T. M., Maggiore, L., Cubitt, M. F., Clare, S., Harcourt, K., Reckless, J., MacDonald, T. T., Ray, K. P., Vossenkamper, A. & West, M. R. Preclinical Development of a Novel, Orally-Administered Anti-Tumour Necrosis Factor Domain Antibody for the Treatment of Inflammatory Bowel Disease. *Scientific Reports* 8, 1-13 (2018).
4. Wang, J., Song, J., Yang, Z., He, S., Yang, Y., Feng, X., Dou, X. & Shan, A. Antimicrobial Peptides with High Proteolytic Resistance for Combating Gram-Negative Bacteria. (2019). doi:10.1021/acs.jmedchem.8b01348
5. Jablaoui, A., Kriaa, A., Mkaouar, H., Akermi, N., Soussou, S., Wysocka, M., Woloszyn, D., Amouri, A., Gargouri, A., Maguin, E., Lesner, A. & Rhimi, M. Fecal Serine Protease Profiling in Inflammatory Bowel Diseases. *Frontiers in Cellular and Infection Microbiology* 10, 21 (2020).
6. Nilsson, A., Tervahartiala, T., Lennebratt, D., Lannergård, A., Sorsa, T. & Rautelin, H. Enhanced Systemic Response of Matrix Metalloproteinases and Their Regulators in *Campylobacter* and *Salmonella* Patients. Diagnostics 8, 82 (2018).
7. Donaldson, J. M., Kari, C., Fragoso, R. C., Rodeck, U. & Williams, J. C. Design and development of masked therapeutic antibodies to limit off-target effects: Application to anti-EGFR antibodies. *Cancer Biology and Therapy* 8, 2147-2152 (2009).
8. Raposo Moreira Dias, A., Pina, A., Dean, A., Lerchen, H.-G., Caruso, M., Gasparri, F., Fraietta, I., Troiani, S., Arosio, D., Belvisi, L., Pignataro, L., Dal Corso, A. & Gennari, C. Neutrophil Elastase Promotes Linker Cleavage and Paclitaxel Release from an Integrin-Targeted Conjugate. *Chemistry—A European Journal* 25, 1696-1700 (2019).
9. DeCicco RePass, M. A., Chen, Y., Lin, Y., Zhou, W., Kaplan, D. L. & Ward, H. D. Novel Bioengineered Three-Dimensional Human Intestinal Model for Long-Term Infection of *Cryptosporidium parvum*. *Infection and immunity* 85, e00731-16 (2017).
10. Roh, T. T., Chen, Y., Paul, H. T., Guo, C. & Kaplan, D. L. 3D bioengineered tissue model of the large intestine to study inflammatory bowel disease. *Biomaterials* 225, (2019).
11. Manousiouthakis, E., Chen, Y., Cairns, D. M., Pollard, R., Gerlovin, K., Dente, M. J., Razavi, Y. & Kaplan, D. L. Bioengineered in vitro enteric nervous system. *Journal of Tissue Engineering and Regenerative Medicine* 13, 1712-1723 (2019).
12. Chen, Y., Lin, Y., Davis, K. M., Wang, Q., Rnjak-Kovacina, J., Li, C., Isberg, R. R., Kumamoto, C. A., Mecsas, J. & Kaplan, D. L. Robust bioengineered 3D functional human intestinal epithelium. *Scientific Reports* 5, (2015).
13. Brown, T. D., Whitehead, K. A. & Mitragotri, S. Materials for oral delivery of proteins and peptides. *Nature Reviews Materials* 5, 127-148 (2020).
14. Usmani, S. S., Bedi, G., Samuel, J. S., Singh, S., Kalra, S., Kumar, P., Ahuja, A. A., Sharma, M., Gautam, A. &

Raghava, G. P. S. THPdb: Database of FDA-approved peptide and protein therapeutics. *PLOS ONE* 12, e0181748 (2017).
15. Drucker, D. J. Advances in oral peptide therapeutics. *Nature Reviews Drug Discovery* 19, 277-289 (2019).
16. Charman, W. N., Porter, C. J. H., Mithani, S. & Dressman, J. B. Physicochemical and physiological mechanisms for the effects of food on drug absorption: The role of lipids and pH. *Journal of Pharmaceutical Sciences* 86, 269-282 (1997).
17. Wanakule, P. & Roy, K. Disease-Responsive Drug Delivery: The Next Generation of Smart Delivery Devices. *Current Drug Metabolism* 13, 42-49 (2012).
18. Kotla, N. G., Rana, S., Sivaraman, G., Sunnapu, O., Vemula, P. K., Pandit, A. & Rochev, Y. Bioresponsive drug delivery systems in intestinal inflammation: State-of-the-art and future perspectives. *Advanced Drug Delivery Reviews* 146, 248-266 (2019).
19. Kagayama, A., Tanimoto, S., Fujisaki, J., Kaibara, A., Ohara, K., Iwasaki, K., Hirano, Y. & Hata, T. Oral Absorption of FK506 in Rats. *Pharmaceutical Research: An Official Journal of the American Association of Pharmaceutical Scientists* 10, 1446-1450 (1993).
20. Zimmerman, J. J., Ferron, G. M., Lim, H. K. & Parker, V. The effect of a high-fat meal on the oral bioavailability of the immunosuppressant sirolimus (rapamycin). *Journal of clinical pharmacology* 39, 1155-61 (1999).
21. Zgair, A., Wong, J. C. M., Lee, J. B., Mistry, J., Sivak, O., Wasan, K. M., Hennig, I. M., Barrett, D. A., Constantinescu, C. S., Fischer, P. M. & Gershkovich, P. Dietary fats and pharmaceutical lipid excipients increase systemic exposure to orally administered cannabis and cannabis-based medicines. *American Journal of Translational Research* 8, 3448-3459 (2016).
22. Varum, F. J. O., Hatton, G. B. & Basit, A. W. Food, physiology and drug delivery. *International Journal of Pharmaceutics* 457, 446-460 (2013).
23. Juarez, P., Virdi, V., Depicker, A. & Orzaez, D. Biomanufacturing of protective antibodies and other therapeutics in edible plant tissues for oral applications. *Plant Biotechnology Journal* 14, 1791-1799 (2016).
24. Kalepu, S., Manthina, M. & Padavala, V. Oral lipid-based drug delivery systems—an overview. *Acta Pharmaceutica Sinica B* 3, 361-372 (2013).
25. Salzman, C., Kupfer, D. J. & Frank, E. Medication compliance in the elderly. in *Journal of Clinical Psychiatry* 56, 18-23 (1995).
26. Shruthi, R., Jyothi, R., Pundarikaksha, H. P., Nagesh, G. N. & Tushar, T. J. A Study of Medication Compliance in Geriatric Patients with Chronic Illnesses at a Tertiary Care Hospital. *JOURNAL OF CLINICAL AND DIAGNOSTIC RESEARCH* 10, FC40 (2016).
27. Lau, E. T. L., Steadman, K. J., Cichero, J. A. Y. & Nissen, L. M. Dosage form modification and oral drug delivery in older people. *Advanced Drug Delivery Reviews* 135, 75-84 (2018).
28. Stephens, N., Di Silvio, L., Dunsford, I., Ellis, M., Glencross, A. & Sexton, A. Bringing cultured meat to market: Technical, socio-political, and regulatory challenges in cellular agriculture. *Trends in Food Science and Technology* 78, 155-166 (2018).
29. Thorrez, L. & Vandenburgh, H. Challenges in the quest for 'clean meat'. *Nature Biotechnology* 37, 215-216 (2019).
30. Bhat, Z. F., Kumar, S. & Fayaz, H. In vitro meat production: Challenges and benefits over conventional meat production. *Journal of Integrative Agriculture* 14, 241-248 (2015).
31. National Cattlemen's Beef Association. *Industry Statistics*. (2019).
32. Fischer, R. & Buyel, J. F. Molecular farming—The slope of enlightenment. *Biotechnology Advances* 40, 107519 (2020).
33. Mishra, N., Gupta, N., Khatri, K., Goyal, A. K. & Vyas, S. P. Edible vaccines: A new approach to oral immunization. *Indian Journal of Biotechnology* 7, (2008).
34. Tacket, C. O., Mason, H. S., Losonsky, G., Estes, M. K., Levine, M. M. & Arntzen, C. J. Human Immune Responses to a Novel Norwalk Virus Vaccine Delivered in Transgenic Potatoes. *The Journal of Infectious Diseases* 182, 302-305 (2000).
35. Nielsen, J. Yeast cell factories on the horizon: Metabolic engineering in yeast gets increasingly more versatile. *Science* 349, 1050-1051 (2015).
36. Heider, S. A. E. & Wendisch, V. F. Engineering microbial cell factories: Metabolic engineering of *Corynebacterium glutamicum* with a focus on non-natural products. *Biotechnology Journal* 10, 1170-1184 (2015).
37. Sack, M., Rademacher, T., Spiegel, H., Boes, A., Hellwig, S., Drossard, J., Stoger, E. & Fischer, R. From gene to harvest: Insights into upstream process development for the GMP production of a monoclonal antibody in transgenic tobacco plants. *Plant Biotechnology Journal* 13, 1094-1105 (2015).
38. Davy, A. M., Kildegaard, H. F. & Andersen, M. R. Cell Factory Engineering. *Cell Systems* 4, 262-275 (2017).
39. Ceroni, F. & Ellis, T. The challenges facing synthetic biology in eukaryotes. (2018). doi:10.1038/s41580-018-0013-2
40. Walsh, G. Biopharmaceutical benchmarks 2018. *Nature Publishing Group* 36, (2018).
41. Giddings, G. Transgenic plants as protein factories. *Current Opinion in Biotechnology* 12, 450-454 (2001).
42. Rubio, N. R., Fish, K. D., Trimmer, B. A. & Kaplan, D. L. In Vitro Insect Muscle for Tissue Engineering Applications. *ACS Biomaterials Science & Engineering* 5, 1071-1082 (2019).
43. Simsa, R., Yuen, J., Stout, A., Rubio, N., Fogelstrand, P. & Kaplan, D. L. Extracellular Heme Proteins Influence Bovine Myosatellite Cell Proliferation and the Color of Cell-Based Meat. *Foods* 8, 521 (2019).
44. Kuo, H. H., Gao, X., DeKeyser, J. M., Fetterman, K. A., Pinheiro, E. A., Weddle, C. J., Fonoudi, H., Orman, M. V., Romero-Tejeda, M., Jouni, M., Blancard, M., Magdy, T., Epting, C. L., George, A. L. & Burridge, P. W. Negligible-Cost and Weekend-Free Chemically Defined Human iPSC Culture. *Stem Cell Reports* 14, 256-270 (2020).
45. Fish, K. D., Rubio, N. R., Stout, A. J., Yuen, J. S. K. & Kaplan, D. L. Prospects and challenges for cell-cultured fat as a novel food ingredient. *Trends in Food Science and Technology* 98, 53-67 (2020).
46. Stice, C. P., Xia, H. & Wang, X.-D. Tomato lycopene prevention of alcoholic fatty liver disease and hepatocellular carcinoma development. *Chronic Diseases and Translational Medicine* 4, 211-224 (2018).
47. Meléndez-Martínez, A. J., Mapelli-Brahm, P. & Stinco, C. M. The colourless carotenoids phytoene and phytofluene: From dietary sources to their usefulness for the functional foods and nutricosmetics industries. *Journal of Food Composition and Analysis* 67, 91-103 (2018).

48. Kim, S.-W., Kim, J.-B., Jung, W.-H., Kim, J.-H. & Jung, J.-K. Over-production of β-carotene from metabolically engineered *Escherichia coli*. *Biotechnology Letters* 28, 897-904 (2006).
49. Fiedor, J. & Burda, K. Potential role of carotenoids as antioxidants in human health and disease. *Nutrients* 6, 466-88 (2014).
50. Wolk, A. Potential health hazards of eating red meat. *Journal of Internal Medicine* 281, 106-122 (2017).
51. Falowo, A. B., Fayemi, P. O. & Muchenje, V. Natural antioxidants against lipid-protein oxidative deterioration in meat and meat products: A review. *Food Research International* 64, 171-181 (2014).
52. Devinsky, O., Cilio, M. R., Cross, H., Fernandez-Ruiz, J., French, J., Hill, C., Katz, R., Di Marzo, V., Jutras-Aswad, D., Notcutt, W. G., Martinez-Orgado, J., Robson, P. J., Rohrback, B. G., Thiele, E., Whalley, B. & Friedman, D. Cannabidiol: pharmacology and potential therapeutic role in epilepsy and other neuropsychiatric disorders. *Epilepsia* 55, 791-802 (2014).
53. Burstein, S. Cannabidiol (CBD) and its analogs: A review of their effects on inflammation. *Bioorganic and Medicinal Chemistry* 23, 1377-1385 (2015).
54. Carvalho, Â., Hansen, E. H., Kayser, O., Carlsen, S. & Stehle, F. Designing microorganisms for heterologous biosynthesis of cannabinoids. *FEMS Yeast Research* 17, (2017).
55. Roh, T. T., Chen, Y., Paul, H. T., Guo, C. & Kaplan, D. L. 3D bioengineered tissue model of the large intestine to study inflammatory bowel disease. *Biomaterials* 225, 119517 (2019).
56. Repass, M. A. D., Chen, Y., Lin, Y., Zhou, W., Kaplan, D. L. & Ward, H. D. Novel Bioengineered Three-Dimensional Human Intestinal Model for Long-Term Infection of *Cryptosporidium parvum*. (2017). doi:10.1128/IAI.00731-16
57. Chen, Y., Lin, Y., Davis, K. M., Wang, Q., Rnjak-Kovacina, J., Li, C., Isberg, R. R., Kumamoto, C. A., Mecsas, J. & Kaplan, D. L. Robust bioengineered 3D functional human intestinal epithelium. *Scientific Reports* 5, 1-11 (2015).
58. Winstanley, P. & Orme, M. The effects of food on drug bioavailability. *British Journal of Clinical Pharmacology* 28, 621-628 (1989).
59. Zayed, H., Izsvák, Z., Walisko, O. & Ivics, Z. Development of Hyperactive Sleeping Beauty Transposon Vectors by Mutational Analysis. *Molecular Therapy* 9, 292-304 (2004).
60. Izsvák, Z., Ivics, Z. & Plasterk, R. H. Sleeping Beauty, a wide host-range transposon vector for genetic transformation in vertebrates. *Journal of Molecular Biology* 302, 93-102 (2000).
61. Mcaleer, C. W., Rumsey, J. W., Stancescu, M. & Hickman, J. J. Functional myotube formation from adult rat satellite cells in a defined serum-free system. *Biotechnology Progress* 31, 997-1003 (2015).
62. Gaidukov, L., Wroblewska, L., Teague, B., Nelson, T., Zhang, X., Liu, Y., Jagtap, K., Mamo, S., Tseng, W. A., Lowe, A., Das, J., Bandara, K., Baijuraj, S., Summers, N. M., Lu, T. K., Zhang, L. & Weiss, R. A multi-landing pad DNA integration platform for mammalian cell engineering. *Nucleic Acids Research* 46, 4072-4086 (2018).
63. Phan, Q. V., Contzen, J., Seemann, P. & Gossen, M. Site-specific chromosomal gene insertion: Flp recombinase versus Cas9 nuclease. *Scientific Reports* 7, 17771 (2017).
64. Szymczak, A. L. & Vignali, D. A. Development of 2A peptide-based strategies in the design of multicistronic vectors. *Expert Opinion on Biological Therapy* 5, 627-638 (2005).
65. Crowe, S., West, M., Roberts, K., Carlton, T., Maggiore, L., Cubitt, M. & Ray, K. Polypeptides (US20170002069A1). (2017). doi:US20170002069A1
66. Szymczak, A. L., Workman, C. J., Wang, Y., Vignali, K. M., Dilioglou, S., Vanin, E. F. & Vignali, D. A. A. Correction of multi-gene deficiency in vivo using a single 'self-cleaving' 2A peptide-based retroviral vector. *Nature Biotechnology* 22, 589-594 (2004).
67. Chang-Shu Liu, †, Raymond P. Glahn, § and & Rui Hai Liu*, †,#. Assessment of Carotenoid Bioavailability of Whole Foods Using a Caco-2 Cell Culture Model Coupled with an in Vitro Digestion. (2004). doi:10.1021/JF040028K
68. Wang, S., Li, P., Zhang, T., Wang, S. & Copeland, L. Trypsin and chymotrypsin are necessary for in vitro enzymatic digestion of rice starch. *RSC Advances* 7, 3660-3666 (2017).
69. Ji, X., Peng, Z., Li, X., Yan, Z., Yang, Y., Qiao, Z. & Liu, Y. Neutralization of TNFα in tumor with a novel nanobody potentiates paclitaxel-therapy and inhibits metastasis in breast cancer. *Cancer Letters* 386, 24-34 (2017).
70. Wang, J., Yadav, V., Smart, A. L., Tajiri, S. & Basit, A. W. Toward oral delivery of biopharmaceuticals: An assessment of the gastrointestinal stability of 17 peptide drugs. *Molecular Pharmaceutics* 12, 966-973 (2015).
71. Carrillo-Cocom, L. M., Genel-Rey, T., Araíz-Hernández, D., López-Pacheco, F., López-Meza, J., Rocha-Pizaña, M. R., Ramirez-Medrano, A. & Alvarez, M. M. Amino acid consumption in naïve and recombinant CHO cell cultures: producers of a monoclonal antibody. *Cytotechnology* 67, 809-820 (2015).
72. Zhang, Z., Mao, Y., Li, D., Zhang, Y., Li, W., Jia, H., Zheng, J., Li, L. & Lu, Y. High-level expression and characterization of two serine protease inhibitors from *Trichinella spiralis*. *Veterinary Parasitology* 219, 34-39 (2016).
73. Cheng, X., Lee, T.-Y., Ledet, G., Zemade, G., Tovera, J., Campbell, R., Purro, N., Annamalai, T., Masjedizadeh, M., Liu, D., Nawabi, R. & Kanwar, B. Safety, Tolerability, and Pharmacokinetics of PTG-200, an Oral GI-Restricted Peptide Antagonist of IL-23 Receptor, in Normal Healthy Volunteers. *American Journal of Gastroenterology* 114, S439-S440 (2019).
74. Breyner, N. M., Michon, C., de Sousa, C. S., Vilas Boas, P. B., Chain, F., Azevedo, V. A., Langella, P. & Chatel, J. M. Microbial Anti-Inflammatory Molecule (MAM) from *Faecalibacterium prausnitzii* Shows a Protective Effect on DNBS and DSS-Induced Colitis Model in Mice through Inhibition of NF-κB Pathway. *Frontiers in Microbiology* 8, 114 (2017).
75. Cherkasov, A., Hilpert, K., Jenssen, H., Fjell, C. D., Waldbrook, M., Mullaly, S. C., Volkmer, R. & Hancock, R. E. W. Use of artificial intelligence in the design of small peptide antibiotics effective against a broad spectrum of highly antibiotic-resistant superbugs. *ACS Chemical Biology* 4, 65-74 (2009).
76. Pham, J. V., Yilma, M. A., Feliz, A., Majid, M. T., Maffetone, N., Walker, J. R., Kim, E., Cho, H. J., Reynolds, J. M., Song, M. C., Park, S. R. & Yoon, Y. J. A review of the microbial production of bioactive natural products and biologics. *Frontiers in Microbiology* 10, (2019).

77. Burge, K., Gunasekaran, A., Eckert, J. & Chaaban, H. Curcumin and intestinal inflammatory diseases: Molecular mechanisms of protection. *International Journal of Molecular Sciences* 20, (2019).
78. Ng, K. K. S., Petersen, J. F. W., Cherney, M. M., Garen, C., Zalatoris, J. J., Rao-Naik, C., Dunn, B. M., Martzen, M. R., Peanasky, R. J. & James, M. N. G. Structural basis for the inhibition of porcine pepsin by Ascaris pepsin inhibitor-3. *Nature Structural Biology* 7, 653-657 (2000).
79. Harmsen, M. M., Van Solt, C. B., Van Zijderveld-Van Bemmel, A. M., Niewold, T. A. & Van Zijderveld, F. G. Selection and optimization of proteolytically stable llama single-domain antibody fragments for oral immunotherapy. *Applied Microbiology and Biotechnology* 72, 544-551 (2006).
80. Whitney, M., Crisp, J. L., Olson, E. S., Aguilera, T. A., Gross, L. A., Ellies, L. G. & Tsien, R. Y. Parallel in vivo and in vitro selection using phage display identifies protease-dependent tumor-targeting peptides. *Journal of Biological Chemistry* 285, 22532-22541 (2010).
81. Sánchez-Navarro, M., Garcia, J., Giralt, E. & Teixidó, M. Using peptides to increase transport across the intestinal barrier. *Advanced Drug Delivery Reviews* 106, 355-366 (2016).
82. Nugent, S. G., Kumar, D., Rampton, D. S. & Evans, D. F. Intestinal luminal pH in inflammatory bowel disease: Possible determinants and implications for therapy with aminosalicylates and other drugs. *Gut* 48, 571-577 (2001).
83. Turk, B. E., Huang, L. L., Piro, E. T. & Cantley, L. C. Determination of protease cleavage site motifs using mixture-based oriented peptide libraries. *Nature Biotechnology* 19, 661-667 (2001).
84. Chen, Y., Zhou, W., Roh, T., Estes, M. K. & Kaplan, D. L. In vitro enteroid-derived three-dimensional tissue model of human small intestinal epithelium with innate immune responses. *PLoS ONE* 12, (2017).
85. Mickael, C. S., Lam, P. K. S., Berberov, E. M., Allan, B., Potter, A. A. & Köster, W. Salmonella enterica serovar enteritidis tatB and tatC mutants are impaired in Caco-2 cell invasion in vitro and show reduced systemic spread in chickens. *Infection and Immunity* 78, 3493-3505 (2010).
86. Aabo, S., Christensen, J. P., Chadfield, M. S., Carstensen, B., Olsen, J. E. & Bisgaard, M. Quantitative comparison of intestinal invasion of zoonotic serotypes of Salmonella enterica in poultry. *Avian Pathology* 31, 41-47 (2002).
87. de Filippis, D., Esposito, G., Cirillo, C., Cipriano, M., de Winter, B. Y., Scuderi, C., Sarnelli, G., Cuomo, R., Steardo, L., de Man, J. G. & Iuvone, T. Cannabidiol reduces intestinal inflammation through the control of neuroimmune axis. *PLoS ONE* 6, (2011).
88. Ruiz de Huidobro, F., Miguel, E., Onega, E. & Blázquez, B. Changes in meat quality characteristics of bovine meat during the first 6 days post mortem. *Meat Science* 65, 1439-1446 (2003).
89. Seideman, S. C. & Crouse, J. D. The effects of sex condition, genotype and diet on bovine muscle fiber characteristics. *Meat Science* 17, 55-72 (1986).

Example 4

The embodiments described herein demonstrate

Figures 16A, 16B:
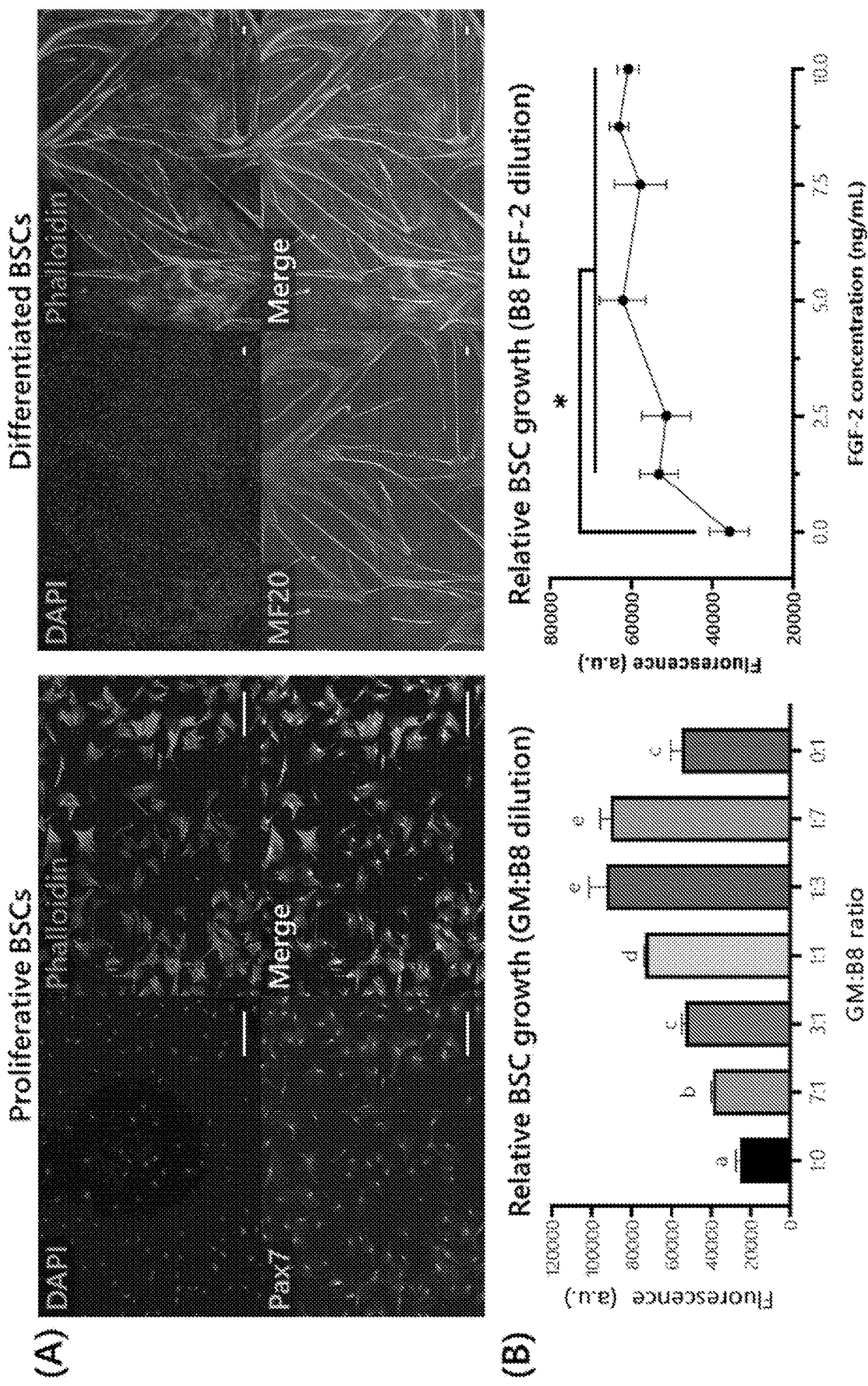
FIGS. 16A-16B show bovine satellite cell (BSC) culture results.

Preliminary Data—To date, our group has explored several topics with direct relevance to this proposal. From a culture system standpoint, we have adapted invertebrate muscle cells to serum-free growth for use in cultured meat, and established protocols for generating populations of primary bovine satellite cells (BSCs) that are highly myogenic (FIG. 16A-16B)[22,23]. We have further validated a serum-free, growth-factor based media formulation (B8) for BSC culture based on previously reported formulations (FIG. 16A)[24]. With this formulation, we have observed superior BSC growth compared to serum-containing media and shown that growth is dependent on fibroblast growth-factor 2 (FGF-2) in a concentration-dependent manner (FIG. 16B).

Figures 17A, 17B:
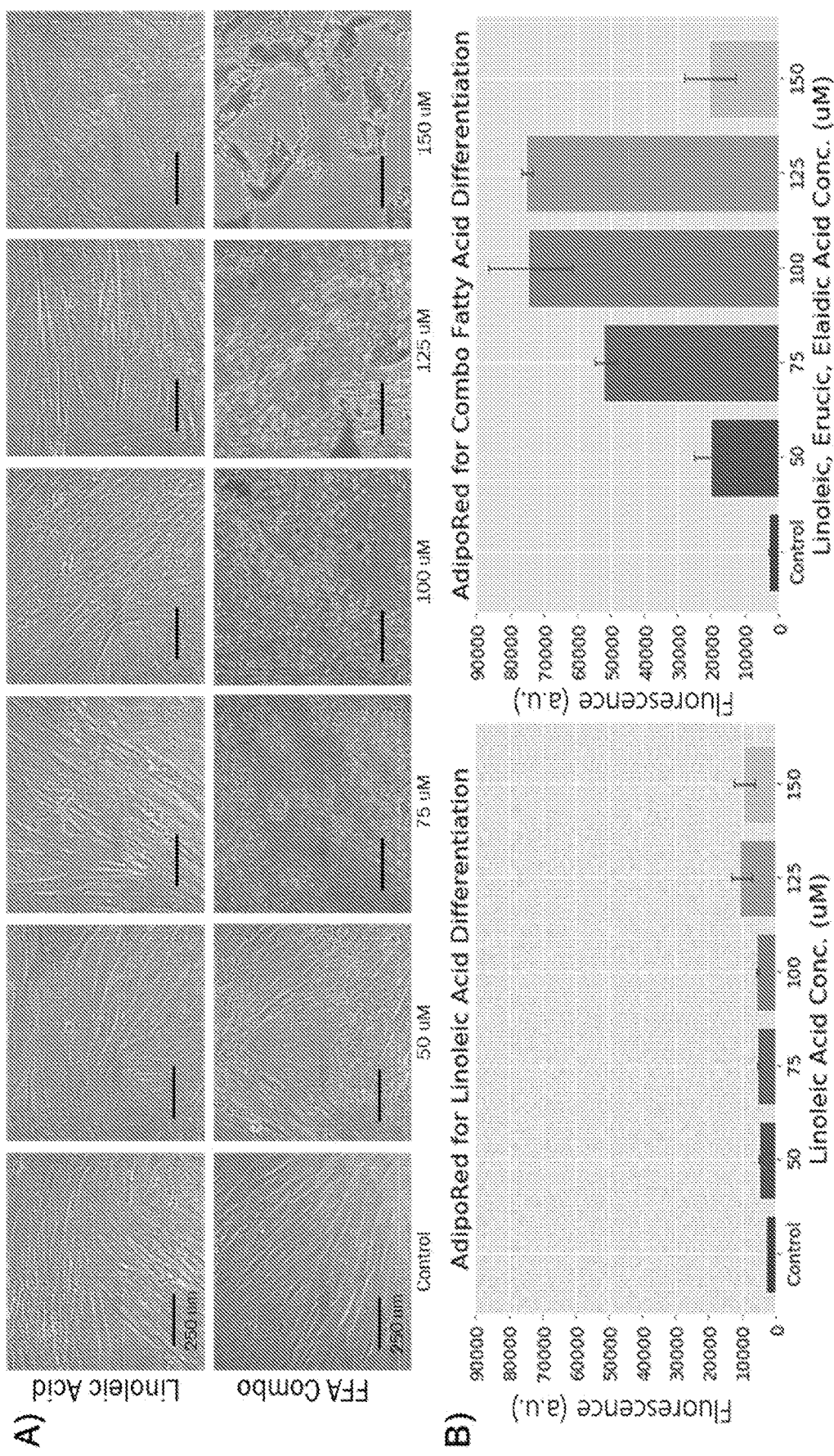
FIGS. 17A-17B show adipogenic transdifferentiation of bovine satellite cells (BSCs) with free fatty acids (FFAs).
Figure 18:
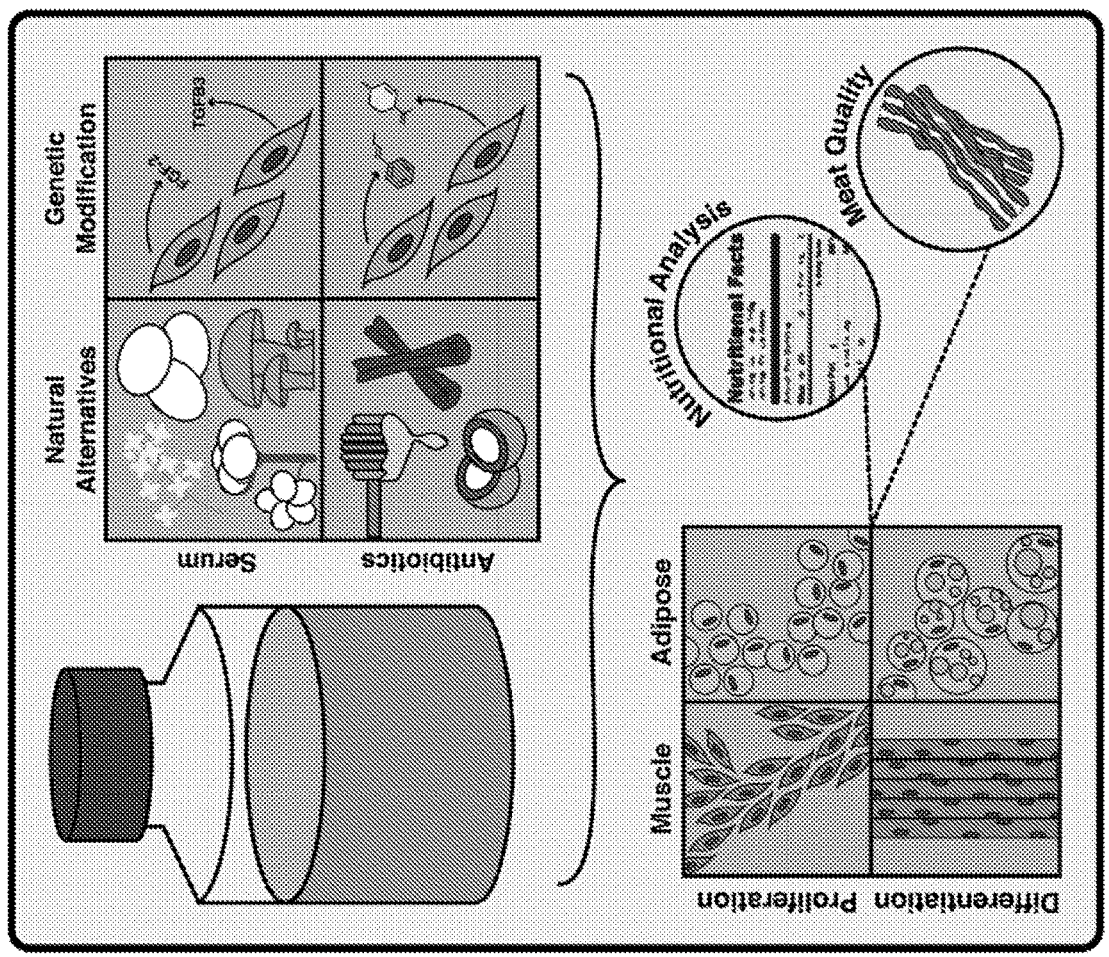
FIG. 18 shows an overview of Example 4. Media will be formulated to explore various diverse approaches to serum- and antibiotic-free culture of bovine muscle and adipose tissue. Cell proliferation and differentiation will be analyzed, as will nutrition and meat quality features.

Additionally, we have established an adipogenic transdifferentiation method to convert myogenic BSCs into lipid-accumulating fat cells by treating cells with a free fatty acid (FFA) mixture (FIG. 17A). We have shown robust lipid accumulation using this method, indicating that a single cell population (i.e., satellite cells) could be used to generate both muscle and fat for cultured meat, which could significantly simplify an industrial production process (FIG. 17B)[25].

From a nutrition standpoint, we have genetically engineered BSCs to endogenously synthesize the carotenoids phytoene, lycopene, and β-carotene, and shown resulting reductions in lipid oxidation (a key mechanistic driver linking red meat consumption and colorectal cancer; FIG. 3)[19,26].

Finally, from a quality standpoint, we have shown that exogenous heme proteins in culture media can improve the color similarity of cultured meat compared to conventional beef (Table 2)[23].

TABLE 2

Color analysis of 3D BSC tissue cultures cultured with or without the addition of 3 mg/mL hemoglobin (Hb) or myoglobin (Mb). Data for L* (lightness), a* (red/green spectra) and b* (blue/yellow spectra) are used to generate a ΔE, a measure of color similarity to fresh or cooked beef. Low ΔE indicates more similarity.

| | Beef | | BSC | | BSC + Hb | | BSC + Mb | |
|---|---|---|---|---|---|---|---|---|
| | Fresh | Cooked | Day 1 | Day 9 | Day 1 | Day 9 | Day 1 | Day 9 |
| L* | 45.9 ± 3.2 | 44.5 ± 0.9 | 76.4 ± 1.5 | 66.3 ± 3.7 | 60.9 ± 1.1 | 47.5 ± 1.7 | 64.5 ± 1.5 | 42.8 ± 4.1 |
| a* | 37.2 ± 0.6 | 12.9 ± 0.9 | 3.5 ± 0.9 | 20.8 ± 3.3 | 11.4 ± 1.0 | 20.9 ± 0.9 | 8.1 ± 0.7 | 15.6 ± 1.0 |
| b* | 37.7 ± 0.8 | 33.7 ± 0.7 | 32.7 ± 0.9 | 26.8 ± 0.7 | 42.3 ± 0.6 | 36.1 ± 0.4 | 43.1 ± 1.3 | 31.7 ± 1.4 |
| ΔE (fresh)[3] | | | 45.7 ± 1.5 | 28.4 ± 4.2 | 30.1 ± 1.1 | 16.4 ± 0.9 | 34.9 ± 1.1 | 23.0 ± 1.3 |
| ΔE (cooked) | | | 33.3 ± 1.6 | 24.5 ± 2.4 | 18.6 ± 0.8 | 9.0 ± 0.9 | 22.6 ± 1.2 | 5.4 ± 2.1 |

Methods

Cell Culture

Bovine satellite cells—Bovine satellite cells (BSCs) will be isolated from the Tufts Cummings School of Veterinary medicine using protocols approved by the Tufts University Institutional Animal Care and Use Committee (IACUC Protocol #G2018-36), and reported by our lab[23]. Briefly, a ~0.5 cm$^3$ muscle excision will be taken from the semitendinosus of a <60-day-old Simmental bull and transported to a tissue culture lab in DMEM+Glutamax with 1× penicillin/streptomycin. Tissue will be minced and digested in an 0.2% collagenase II solution for one hour with regular trituration. Digestion will be halted with growth media comprised of DMEM Glutamax supplemented with 20% fetal bovine serum (FBS), 1% primocin, and 1 ng/mL human FGF-2, and cells will be filtered and plated at a density of 100,000 cells/cm$^2$ onto uncoated tissue-culture flasks. After 24 hours of incubation at 37° C. with 5% $CO_2$, unattached cells (which comprise the slowly-adherent satellite cells) will be moved to new tissue culture flasks that have been coated with 0.375 ug/cm$^2$ of recombinant laminin-511. Satellite cells will be left undisturbed for three days, after which cells will be fed with growth media every 2-3 days and passaged at 70% confluency. Media will be supplemented with primocin only for the first two weeks of culture.

To verify cell identity, immunocytochemistry will be performed for satellite cell markers. Cells will be fixed using 4% paraformaldehyde, permeabilized using a Triton-X solution, blocked, and stained for paired-box 7 (Pax7). Positive staining for these markers will be considered determinative of BSC phenotype as previously reported, and as visible in FIG. 1.

Myogenic differentiation—To differentiate satellite cells into mature myotubes (under serum-containing conditions), cells will be cultured to confluency, and media will be changed to differentiation media comprised of DMEM Glutamax supplemented with 2% FBS and 1% Antibiotic-Antimycotic. To differentiate satellite cells under serum-free conditions, a previously reported differentiation media comprised of a Neurobasal/L15 (1:1) basal media supplemented with epidermal growth factor (EGF; 0.5 ng/mL), insulin-like growth factor 1 (IGF-1; 0.05 ng/mL), and 1% Antibiotic-Antimycotic[54]. Cells will be differentiated for 1-2 weeks, fixed as before and stained for Myosin Heavy Chain (MHC) as previously reported, and as visible in FIGS. 16A-16B[23].

Adipogenic transdifferentiation—While satellite cells are preferentially myogenic, we have successfully induced lipid accumulation using a differentiation media containing a combination of free fatty acids (FFAs) (FIGS. 17A-17B). Specifically, a 3-FFA cocktail of linoleic acid, erucic acid, and elaidic acid at equal concentrations of 125 uM induced robust accumulation of intracellular lipids over six days. This adipogenic transdifferentiation protocol will be further optimized through a fractional factorial experimental design, testing various concentrations oleic, myristoleic, linoleic, erucic, and elaidic acid. Lipid accumulation will be verified qualitatively with Oil Red O staining and quantified with the AdipoRed plate reader assay (Lonza). Transdifferentiation of satellite cells into mature adipocytes will enable muscle and fat components of cultured meat to be generated from a single cell source throughout this proposal, thus increasing project efficiency and impact.

Serum Free Media

Media formulation for serum replacement—Growth factor-dependent serum-free media (B8) will be generated based on previously reported formulations and as successfully demonstrated for by our group (preliminary data; FIGS. 16A-16B)[24]. Briefly, B8 media will be comprised of DMEM:F12 (1:1) supplemented with L-ascorbic acid 2-phosphate (200 ug/mL), insulin (20 ug/mL), transferrin (20 ug/mL), sodium selenite (20 ng/mL), FGF-2 (10 ng/mL), neuregulin 1 (NRG-1; 0.1 ng/mL), TGFβ-3 (0.1 ng/uL), and insulin-like growth factor 1 (IGF-1; 10 ng/mL). Formulations absent one or more growth factors will simultaneously generated, as will formulations lacking all growth factors but containing previously reported serum-replacements made from rapeseed peptide fractions, maitake mushroom extract, and silk-derived sericin proteins.

Media containing rapeseed peptide fractions will be generated as previously described[41]. Briefly, rapeseed protein concentrates will be hydrolyzed with Alcalase 2.4 L (Novozymes) for five hours at 60° C. and a pH of 9.0. Fractions will be precipitated at a pH of 4.0 and centrifuged. The supernatant will undergo ultrafiltration through 3 kDa membrane and nanofiltration through a 0.5 kDa membrane. The nanofiltration retentate will again undergo ultrafiltration (1 kDa) and the retentate of this final filtration step will be added to growth-factor free basal media at a concentration of 10 mg/mL. Media containing maitake mushroom extracts will be generated as previously described[55]. Briefly, dried Maitake mushrooms will be blended in growth-factor free basal media at a concentration of 0.2% w/v and sterilized through an 0.2 μm filter. Finally, media containing sericin will be generated by diluting purified sericin—which can be obtained either from silk (i.e., as a byproduct of the textile industry) or through recombinant production—in growth-factor free basal media at a concentration of 30 ug/mL.

Formulations of varying concentrations and combinations of growth factors and serum-replacements will be generated by combining media. BSCs will be cultured as previously described in these media formulations.

Bioprocess kinetics—To understand how media formulations affect bioprocess growth kinetics, cellular growth curves will be generated using dsDNA-based fluorometric assays of engineered and primary BSCs cultured in serum control media and media with serum and antibiotic alternatives. To understand the effect of these culture systems on mitotic activity, cell cycle analysis will simultaneously be performed on an NC-3000 image cytometer (ChemoMetec). To probe cellular senescence in engineered cells, quantitative PCR will be performed for Pax7—a marker of BSC stemness—throughout culture of control cells, and cells treated with serum and antibiotic alternatives[59]. Based on preliminary data with B8, we expect to achieve cell growth that is similar to or better than with serum-containing media.

In combination with the mentioned cellular analyses, bioprocess kinetics will be tested throughout culture by analyzing media for nutrient uptake and byproduct accumulation. Specifically, glucose consumption, glutamine consumption, lactate production and ammonia production will be analyzed throughout culture using enzymatic assay kits for all media formulations and all cell types[60].

Cell differentiation analysis—To understand the effects of media composition on cellular differentiation, cells cultured in all media formulations will be differentiated as before (both myogenic and adipogenic) and analyzed for relevant markers. For myogenic differentiation, myogenin and myosin heavy chain (MHC) expression will be assessed with immunostaining and quantitative PCR (qPCR), and myotube formation will be analyzed by determining fusion index, or the percentage of nuclei within fused myotubes[63]. For adipogenic differentiation, peroxisome proliferator-activated receptor gamma (PPARγ) expression will be analyzed via immunostaining and qPCR, and lipid accumulation will be analyzed with Oil-O red staining, extraction and quantification[64]. We expect comparable differentiation capacity for cells cultured in serum-containing or serum-free media formulations.

Genetic modifications for serum replacement—To explore cost-effective serum-free media development that is orthogonal to the aforementioned serum alternatives, BSCs will be engineered to endogenously produce growth factors and growth factor receptors. These "self-signaling" cells would require media with fewer inputs, and so could lower the cost of culture further. Targets will correspond to B8. Specifically, cells will be engineered to produce the growth factors FGF-2, TGFβ-3, NRG-1 and IGF-1, as well as the signaling and transport proteins insulin and transferrin.

Constitutive gene expression will be achieved via Sleeping Beauty transposon-mediated gene insertion due to this systems non-viral nature, high efficiencies, and demonstrated utility in our preliminary work[56,57]. Molecular cloning will be carried out using standard techniques. For genetic insertions, transposable elements will contain both the genes of interest (e.g., FGF-2) and the genes for resistance to selection antibiotics (i.e., puromycin) to enable the selection of successfully transfected cells. Cellular transfection will be performed using the Lipofectamine 3000 reagent (Thermo Fisher, #L3000008). Briefly, cells will be cultured to 85% confluence, washed with OptiMEM media, and incubated with transfection reagents and purified plasmids. Following 4-6 hours, growth media will be added to cells, and following 48 hours a selection pressure will be added to the media (i.e., puromycin). Cells will be cultured for one week under selective pressure, after which expression will be verified through immunocytochemistry, the use of fluorescent tags, or polymerase chain reaction (PCR). When multicistronic expression is needed (i.e., for the simultaneous expression of all growth factors), genes will be linked by 2A peptide sequences, to allow for the translation of multiple proteins from a single strand of RNA which codes for multiple genes[58]. In most cases, a 2A sequence will link green fluorescent protein (GFP) to the expression cassette, so that expression can be screened for through simple fluorescence microscopy. Finally, transgenes will be inserted under the control inducible promoters that can be "turned off" for cellular differentiation to halt the expression of pro-proliferative factors. Successfully engineered cells will be cultured in various growth-factor-lacking media formulations described herein.

Antibiotic Free Media

Media formulation for antibiotic replacement—Cinnamon, monolaurin (a derivative of coconut lauric acid), and honey are natural compounds that have demonstrated potential utility as food-safe antimicrobials[46,65,66]. Each of these substances will be explored alone and in combination as media additives to protect against microbial contamination. They will first be added to B8 serum-free media with growth factors and used to culture BSCs. Dose response curves (DRCs) will be generated to determine the effects of each additive on cell health and identify the maximum concentrations that can be used without impeding growth, viability and differentiation. Following assessment of antimicrobial activity, successful candidates will be incorporated into the serum- and growth factor-free media described herein and again assessed for impacts on culture performance.

Analysis of antimicrobial effects in cell culture—Antimicrobial activity of media supplemented with cinnamon, monolaurin, and honey will be tested with agar well diffusion tests. Bacterial and yeast extracts will be spread over the entire surface of agar plates and a biopsy punch will be used to remove a 6 mm diameter cylinder of agar. 100 uL of media containing various concentrations of the antimicrobials will then be added into the well and the zone of inhibition will be measured after an 18 to 24-hour incubation period[69]. Efficacy of the alternative antimicrobials with be compared with the common cell-culture antimicrobials Penicillin-Streptomycin (Pen-Strep) and Antibiotic-Antimycotic (Anti-Anti).

Analysis of antimicrobial effects in cooked products—To further assess the efficacy of alternative antimicrobials and their utility in commercial production of cultured meat, we will test the ability of the target antimicrobials to inactivate and/or enhance thermal destruction of *Escherichia coli* in cell-based and conventional meat samples. Antimicrobials used as media additives (cinnamon, fatty acids, honey) will be tested. Additionally, cell-based samples comprised of engineered cells will be tested without the addition of exogenous compounds. All samples will be inoculated with a mixture of *E. coli* strains isolated from meat and dairy, treated with various concentrations of each antimicrobial where appropriate, then stored for 5 days at 4° C. *E. coli* O157:H7 content will be quantified by surface plating of homogenized samples and colony counting before and after cooking at multiple timepoints.

Analysis of cell growth and differentiation—The effects of each alternative antimicrobial on cell proliferation will be assessed (i.e., growth curve analysis with dsDNA-based fluorometric assays and nutrient/waste uptake/production analysis with enzymatic assays). Effects on myogenic and adipogenic differentiation will be assessed through immunostaining for myosin heavy chain (MHC) or Oil-O red staining, as well as qPCR for MHC and PPARγ. These analyses will be used to determine the concentrations of cinnamon, honey, and monolaurin that can be added to media without detrimental effects on performance.

Genetic modifications for antibiotic replacement—As a secondary strategy to the media additives described herein, metabolic engineering of the BSCs will be used to achieve constitutive endogenous production of food-safe compounds with antimicrobial activity. Specifically, the metabolic pathways for synthesis of cinnamaldehyde and limonene from common precursor molecules will be engineered into the BSCs using Sleeping Beauty transposon-mediated gene insertions as utilized in our prior work. Synthesis of cinnamaldehyde from the precursor phenylalanine will be achieved through insertion of a three-enzyme pathway: phenylalanine ammonia-lyase, 4-coumarate-CoA ligase, and cinnamoyl-CoA reductase. Synthesis of (+)-limonene from the precursor geranyl pyrophosphate will be accomplished through insertion of a single enzyme: (R)-limonene synthase. The concentrations of cinnamaldehyde and limonene secreted into the media will be assessed with high-performance liquid chromatography (HPLC) and gas chromatography-mass spectrometry (GM-MS), respectively[67,68]. Cell health and development will be analyzed as previously described.

Food-Quality Analysis

Protein and amino acids—Engineered and primary cells will be harvested following culture in all media formulations, and both before and after myogenic and adipogenic differentiation. Bulk protein will be quantified using a Pierce BCA protein assay. Amino acid composition will be quantified by HPLC as previously described[70,71]. Briefly, cells will be homogenized via sonication, spiked with a known concentration of the internal standard norvaline, hydrolyzed with HCl, and quantified against amino acid standards (likewise spiked with norvaline) via HPLC following precolumn derivatization with 6-aminoquinolyl-N-hydroxysuccinimidyl-carbamate. Samples will be separated with a Nova-Pak C18 (Waters) column and analyzed with fluorescence detection excited by 250 nm and emitting at 395 nm. Both bulk protein and amino acid composition will be correlated to DNA content (CyQuant assay; Thermo Fisher) to compare undifferentiated and differentiated cells. Conventional meat samples will be analyzed and compared with cultured cells.

We expect bulk protein in bovine cells to be similar to that found in store-bought beef, though reduced extracellular protein accumulation may result in reduced protein levels. We expect amino acid profiles that are a combination of the amino acid profile of cellular growth media and the amino acid profile of store-bought products.

Fats and fatty acids—Lipid analysis will be performed using a liquid chromatograph-mass spectrometry (LC-MS) as previously describer. Briefly, undifferentiated and differentiated (myogenic and adipogenic) BSCs from all culture conditions will be homogenized via sonication, and lipid internal standards will be added to homogenates (comprised of phosphatidylcholines (PC), phosphatidylethanolamines (PE), ceramides (Cer), phosphatidylserines (PS), phosphatidic acid (PA), and mono-, di-, and triacylglycerols (MG, DG, and TG). Cellular lipids will be extracted with a solution of chloroform and methanol (2:1, v/v), centrifuged, and the lower phase will be collected and combined with external standards (comprised of isotopically labeled TGs and PCs). Samples will be quantified against lipid standards via LC-MS with separation in a BEH C18 column (Waters) followed by quadrupole-time-of-flight detection. Fatty acid profiles will be normalized using internal and external standards, and against DNA and protein quantification. Again, samples will be analyzed at varying levels of differentiation, and compared with store-bought products. Based on previous data comparing murine adipose tissue and murine adipose progenitor cells pre- and post-differentiation, we expect bovine lipid profiles to differ significantly from store-bought beef pre-differentiation, but converge post-differentiation[73].

Cholesterol will be analyzed by fluorometric assay (Abcam, #ab65390) and compared with total lipid measured by fluorometric assay (Abcam, #ab242307). Samples will be analyzed at varying levels of differentiation, and again compared with store-bought products before and after cooking. Based on published data, we expect cholesterol to represent ~1 mg/g of lipid for bovine fat cells[73].

Micronutrients—Water- and fat-soluble vitamins (vitamin A, $B_1$, $B_2$, $B_3$, $B_5$, $B_6$, $B_9$, $B_{12}$, E, K, D, E, C) will be analyzed using core services provided by the Nutrition Evaluation Laboratory (NEL) at the Jean Mayer USDA Human Nutrition Research Center on Aging (HNRCA) at Tufts university. Techniques will include HPLC, spectrophotometric measures of enzymatic activity, radioassays, or colorimetric assays, as appropriate and previously described and performed by the NEL[75,76]. Iron and zinc will be quantified by an Iron Assay Kit (Abcam, #ab83366) and Zinc Assay Kit (Abcam, #ab102507), respectively. Again, micronutrient results will be compared with results obtained from store-bought beef products.

While the bovine genome contains synthesis pathways for vitamins $B_3$, D, and C, these functions primarily performed in the liver or skin, respectively, and tissue concentrations of niacin are typically hepatically controlled.[77,78] We therefore expect vitamin compositions that are predominately defined by culture media. Likewise, as minerals are only obtainable exogenously, we expect zinc and iron to be similarly defined by culture media. This may not be true in the case of media supplementation by some plant extracts (such as bulk maitake mushroom extracts), as it is likely that these will contain some micronutrient components that will be incorporated by cells.

Myoglobin content—Myoglobin content will be analyzed using a modified Warriss method[82]. Pre- and post-differentiated BSCs and store-bought beef will be mechanically homogenized in PBS, centrifuged at 5,000×g for 30 minutes and filtered (Whatman No. 1 filter paper) to obtain extract. The extract will be oxidized with 60 mM $K_3F(III)(CN)_6$ and subsequently treated with 80 mM NaCN to induce a color change from yellow to red. The absorbance will be measured at 540 nm and the cyanmetmyoglobin molar extinction coefficient (11300) will be used to determine myoglobin concentration.

We expect myoglobin content to be significantly lower in BSCs than in store-bought beef[23]. We expect myoglobin content to be higher post-differentiation[83]. The average myoglobin content in beef is 8 mg/g which correlates to a "cherry red" color. Values for lamb and pork are 6 mg/g (light red) and 2 mg/g (pink) respectively[84]. Strategies for regulating in vitro myoglobin content include induced hypoxia, lipid supplementation and direct exogenous myoglobin supplementation, and can be explored in the case of insufficient myoglobin content[23,85].

Gelling properties—Thermal gelation properties will be assessed using actomyosin extraction followed by gel strength and dynamic rheological measurements. Actomyosin (the actin/myosin complex) will be extracted from pre- and post-differentiated bovine satellite cells and store-bought beef by modifying the Ogawa method[86]. Samples will be mechanically homogenized in cold isolation buffer (50 mM KCl, 20 mM $K_2HPO_4/KH_2PO_4$) and filtered (0.9 mm mesh). The suspension will be centrifuged at 10,000×g for 5 minutes and the pellet will be homogenized in 0.6 M KCl buffer. After another round of centrifugation and filtration, the supernatant will be mixed with 20 mM potassium phosphate buffer and precipitate will be collected by centrifugation and re-suspension in isolation buffer. A final centrifugation step will deliver the actomyosin fragment; the concentration of which will be determined by the Biuret reaction. Gel strength will be determined by texture analysis. Actomyosin concentrations will be standardized and samples will be sealed in a beaker heated to 80° C. for 20 minutes before cooling and overnight refrigeration (4° C.). Gels will be acclimated to ambient temperature and evaluated with a penetration test (1 mm/s) on a Texture Analyzer. Actomyosin gels will also be evaluated by dynamic rheological analysis during heating from ambient temperature to 80° C. (1° C./min.)[87].

Food-quality optimization—Depending on the results of nutritional and meat-quality analyses, culture systems will be adapted to address insufficiencies. For instance, in the case of nutritional deficiencies (e.g. inadequate essential amino acids), media will be supplemented with relevant nutrients in order to increase cellular concentrations. Additionally, metabolic engineering techniques—such as those used in our preliminary carotenoid work—can be utilized to increase nutrient levels through endogenous production (e.g., the incorporation of essential amino acid biosynthesis pathways). In cases where meat science metrics are insufficient in cultured samples compared with conventional meats, several techniques are possible for tuning cultured meat features. For instance, as previously mentioned, myoglobin content can be tuned through exogenous media supplementation or culturing cells under hypoxic conditions[44,85]. In cases where metabolite profiles differ significantly, key metabolic processes can be regulated through metabolic pathway engineering (as demonstrated by our group for nutritional engineering of BSCs) or by treatment with small-molecules[19,88,89]. Finally, in cases where gelling properties differ significantly from conventional meats, various mechanical cues (e.g., through 3D tissue constructs) can be employed to increase myofiber formation and myosin expression[90].

REFERENCES

1. Wyness, L. et al. Red meat in the diet: an update. *Nutr. Bull.* 36, 34-77 (2011).
2. Purchas, R. W., Wilkinson, B. H. P., Carruthers, F. & Jackson, F. A comparison of the nutrient content of uncooked and cooked lean from New Zealand beef and lamb. *J. Food Compos. Anal.* 35, 75-82 (2014).
3. Srednicka-Tober, D. et al. Composition differences between organic and conventional meat: a systematic literature review and meta-analysis. *Br. J. Nutr.* 115, 994-1011 (2016).
4. Rizzo, G. et al. Vitamin B12 among Vegetarians: Status, Assessment and Supplementation. *Nutrients* 8, 767 (2016).
5. Wood, J. D. Meat Composition and Nutritional Value. *Lawrie's Meat Sci.* 635-659 (2017). doi:10.1016/B978-0-08-100694-8.00020-0
6. Godfray, H. C. J. et al. Meat consumption, health, and the environment. *Science* 361, eaam5324 (2018).
7. Hoekstra, A. Y. & Mekonnen, M. M. The water footprint of humanity. *Proc. Natl. Acad. Sci. U.S.A* 109, 3232-7 (2012).
8. Feskens, E. J. M., Sluik, D. & van Woudenbergh, G. J. Meat Consumption, Diabetes, and Its Complications. *Curr. Diab. Rep.* 13, 298-306 (2013).
9. Schwingshackl, L. et al. Food groups and risk of type 2 diabetes mellitus: a systematic review and meta-analysis of prospective studies. *Eur. J. Epidemiol.* 32, 363-375 (2017).
10. Alshahrani, S. et al. Red and Processed Meat and Mortality in a Low Meat Intake Population. *Nutrients* 11, 622 (2019).
11. Abete, I., Romaguera, D., Vieira, A. R., Lopez de Munain, A. & Norat, T. Association between total, processed, red and white meat consumption and all-cause, CVD and IHD mortality: a meta-analysis of cohort studies. *Br. J. Nutr.* 112, 762-775 (2014).
12. Chan, D. S. M. et al. Red and Processed Meat and Colorectal Cancer Incidence: Meta-Analysis of Prospective Studies. *PLoS One* 6, e20456 (2011).
13. Wang, X. et al. Red and processed meat consumption and mortality: dose-response meta-analysis of prospective cohort studies. *Public Health Nutr.* 19, 893-905 (2016).
14. Wolk, A. Potential health hazards of eating red meat. *J. Intern. Med.* 281, 106-122 (2017).
15. Klurfeld, D. M. Research gaps in evaluating the relationship of meat and health. *Meat Sci.* 109, 86-95 (2015).
16. Datar, I. & Betti, M. Possibilities for an in vitro meat production system. *Innov. Food Sci. Emerg. Technol.* 11, 13-22 (2010).
17. Post, M. J. Cultured meat from stem cells: Challenges and prospects. *Meat Sci.* 92, 297-301 (2012).
18. Mattick, C. S., Landis, A. E., Allenby, B. R. & Genovese, N. J. Anticipatory Life Cycle Analysis of In Vitro Biomass Cultivation for Cultured Meat Production in the United States. *Environ. Sci. Technol.* 49, 11941-11949 (2015).
19. Stout, A. J., Mirliani, A. B., Soule-Albridge, E. L., Cohen, J. M. & Kaplan, D. L. Engineering carotenoid production in mammalian cells for nutritionally enhanced cell-cultured foods. *Rev.*
20. Bhat, Z. F., Kumar, S. & Fayaz, H. In vitro meat production: Challenges and benefits over conventional meat production. *J. Integr. Agric.* 14, 241-248 (2015).
21. National Cattlemen's Beef Association. *Industry Statistics.* (2019).
22. Rubio, N. R., Fish, K. D., Trimmer, B. A. & Kaplan, D. L. In Vitro Insect Muscle for Tissue Engineering Applications. *ACS Biomater. Sci. Eng.* 5, 1071-1082 (2019).
23. Simsa, R. et al. Extracellular Heme Proteins Influence Bovine Myosatellite Cell Proliferation and the Color of Cell-Based Meat. *Foods* 8, 521 (2019).
24. Kuo, H. H. et al. Negligible-Cost and Weekend-Free Chemically Defined Human iPSC Culture. *Stem Cell Reports* 14, 256-270 (2020).
25. Fish, K. D., Rubio, N. R., Stout, A. J., Yuen, J. S. K. & Kaplan, D. L. Prospects and challenges for cell-cultured fat as a novel food ingredient. *Trends in Food Science and Technology* 98, 53-67 (2020).
26. Wolk, A. Potential health hazards of eating red meat. *J. Intern. Med.* 281, 106-122 (2017).
27. Mohorčich, J. & Reese, J. Cell-cultured meat: Lessons from GMO adoption and resistance. *Appetite* 143, 104408 (2019).
28. Tuomisto, H. L. & Teixeira de Mattos, M. J. Environmental Impacts of Cultured Meat Production. *Environ. Sci. Technol.* 45, 6117-6123 (2011).
29. Mattick, C. S., Landis, A. E., Allenby, B. R. & Genovese, N. J. Anticipatory Life Cycle Analysis of In Vitro Biomass Cultivation for Cultured Meat Production in the United States. *Environ. Sci. Technol.* 49, 11941-11949 (2015).
30. Bekker, G. A., Fischer, A. R. H., Tobi, H. & van Trijp, H. C. M. Explicit and implicit attitude toward an emerging food technology: The case of cultured meat. *Appetite* 108, 245-254 (2017).
31. Stephens, N. et al. Bringing cultured meat to market: Technical, socio-political, and regulatory challenges in cellular agriculture. *Trends in Food Science and Technology* 78, 155-166 (2018).
32. Chriki, S. & Hocquette, J.-F. The Myth of Cultured Meat: A Review. *Front. Nutr.* 7,7 (2020).
33. Specht, L. Creating a healthy, humane, and sustainable food supply. An analysis of culture medium costs and production volumes for cell-based meat. 7-10 (2019).
34. Ben-Arye, T. & Levenberg, S. Tissue Engineering for Clean Meat Production. *Frontiers in Sustainable Food Systems* 3, 46 (2019).
35. Bryant, C. & Barnett, J. Consumer acceptance of cultured meat: A systematic review. *Meat Science* 143, 8-17 (2018).
36. Zhang, G. et al. Challenges and possibilities for bio-manufacturing cultured meat. *Trends in Food Science and Technology* 97, 443-450 (2020).
37. O'Donoghue, E., Hansen, J. & Stallings, D. *USDA Agricultural Projections to* 2028. (2019).
38. Babcock, J. F. & Antosh, A. Partial Replacement of Chemically Defined CHO Media with Plant-Derived Protein Hydrolysates. in *Proceedings of the 21st Annual Meeting of the European Society for Animal Cell Technology (ESACT)*, Dublin, Ireland, Jun. 7-10, 2009 295-298 (Springer Netherlands, 2012). doi:10.1007/978-94-007-0884-6_44

39. Benjaminson, M., Gilchriest, J. & Lorenz, M. In vitro edible muscle protein production system (mpps): stage 1, fish. *Acta Astronaut.* 51, 879-889 (2002).
40. Terada, S., Sasaki, M., Yanagihara, K. & Yamada, H. Preparation of silk protein sericin as mitogenic factor for better mammalian cell culture. *J. Biosci. Bioeng.* 100, 667-671 (2005).
41. Farges-Haddani, B. et al. Peptide fractions of rapeseed hydrolysates as an alternative to animal proteins in CHO cell culture media. *Process Biochem.* 41, 2297-2304 (2006).
42. Zhang, M., Cao, T.-T., Wei, Z.-G. & Zhang, Y.-Q. Silk Sericin Hydrolysate is a Potential Candidate as a Serum-Substitute in the Culture of Chinese Hamster Ovary and Henrietta Lacks Cells. *J. Insect Sci.* 19, (2019).
43. Pietrzkowski, Z. et al. Constitutive expression of insulin-like growth factor 1 and insulin-like growth factor 1 receptor abrogates all requirements for exogenous growth factors. *Cell Growth Differ.* 3, 199-205 (1992).
44. Simsa, R. et al. Extracellular Heme Proteins Influence Bovine Myosatellite Cell Proliferation and the Color of Cell-Based Meat. *Foods* 2019, Vol. 8, Page 521 8, 521 (2019).
45. Chu, L. & Robinson, D. K. Industrial choices for protein production by large-scale cell culture. *Curr. Opin. Biotechnol.* 12, 180-187 (2001).
46. Nabavi, S. et al. Antibacterial Effects of Cinnamon: From Farm to Food, Cosmetic and Pharmaceutical Industries. *Nutrients* 7, 7729-7748 (2015).
47. Carpo, B. G., Verallo-Rowell, V. M. & Kabara, J. Novel antibacterial activity of monolaurin compared with conventional antibiotics against organisms from skin infections: an in vitro study. *J. Drugs Dermatol.* 6, 991-8 (2007).
48. Mandal, M. D. & Mandal, S. Honey: its medicinal property and antibacterial activity. *Asian Pac. J Trop. Biomed.* 1, 154-60 (2011).
49. Guzman, J. D. Natural cinnamic acids, synthetic derivatives and hybrids with antimicrobial activity. *Molecules* 19, 19292-19349 (2014).
50. Espina, L., Gelaw, T. K., de Lamo-Castellví, S., Pagán, R. & García-Gonzalo, D. Mechanism of Bacterial Inactivation by (+)-Limonene and Its Potential Use in Food Preservation Combined Processes. *PLoS One* 8, (2013).
51. Amalaradjou, M. A. R. et al. Enhancing the thermal destruction of *Escherichia coli* O157: H7 in ground beef patties by trans-cinnamaldehyde. *Food Microbiol.* 27, 841-844 (2010).
52. Sharma, S., Thind, S. S. & Kaur, A. In vitro meat production system: why and how? *J. Food Sci. Technol.* 52, 7599-7607 (2015).
53. Post, M. J. Proteins in cultured beef. *Proteins Food Process.* 289-298 (2018). doi:10.1016/B978-0-08-100722-8.00012-7
54. Mcaleer, C. W., Rumsey, J. W., Stancescu, M. & Hickman, J. J. Functional myotube formation from adult rat satellite cells in a defined serum-free system. *Biotechnol. Prog.* 31, 997-1003 (2015).
55. Benjaminson, M. A., Gilchriest, J. A. & Lorenz, M. In vitro edible muscle protein production system (MPPS): Stage 1, fish. *Acta Astronaut.* 51, 879-889 (2002).
56. Ding, S. et al. Maintaining bovine satellite cells stemness through p38 pathway. *Sci. Rep.* 8, 10808 (2018).
57. Gambhir, A. et al. Analysis of cellular metabolism of hybridoma cells at distinct physiological states. *J. Biosci. Bioeng.* 95, 317-327 (2003).
58. Pala, F. et al. Distinct metabolic states govern skeletal muscle stem cell fates during prenatal and postnatal myogenesis. *J. Cell Sci.* 131, (2018).
59. Fortini, P. et al. The fine tuning of metabolism, autophagy and differentiation during in vitro myogenesis. *Cell Death Dis.* 7, e2168-e2168 (2016).
60. Rubio, N. R., Fish, K. D., Trimmer, B. A. & Kaplan, D. L. In Vitro Insect Muscle for Tissue Engineering Applications. *ACS Biomater. Sci. Eng.* 5, 1071-1082 (2019).
61. Nierobisz, L. S., McFarland, D. C. & Mozdziak, P. E. MitoQ10 induces adipogenesis and oxidative metabolism in myotube cultures. *Comp. Biochem. Physiol.—B Biochem. Mol. Biol.* 158, 125-131 (2011).
62. Mátés, L. et al. Molecular evolution of a novel hyperactive Sleeping Beauty transposase enables robust stable gene transfer in vertebrates. *Nat. Genet.* 41, 753-761 (2009).
63. Geurts, A. M. et al. Gene transfer into genomes of human cells by the sleeping beauty transposon system. *Mol. Ther.* 8, 108-117 (2003).
64. Szymczak, A. L. & Vignali, D. A. Development of 2A peptide-based strategies in the design of multicistronic vectors. *Expert Opin. Biol. Ther.* 5, 627-638 (2005).
65. Balouiri, M., Sadiki, M. & Ibnsouda, S. K. Methods for in vitro evaluating antimicrobial activity: A review. *Journal of Pharmaceutical Analysis* 6, 71-79 (2016).
66. Miller, J. A., Hakim, I. A., Thomson, C., Thompson, P. & Sherry Chow, H. H. Determination of d-limonene in adipose tissue by gas chromatography-mass spectrometry. *J. Chromatogr. B Anal. Technol. Biomed. Life Sci.* 870, 68-73 (2008).
67. Gursale, A., Dighe, V. & Parekh, G. Simultaneous quantitative determination of cinnamaldehyde and methyl eugenol from stem bark of *Cinnamomum zeylanicum* Blume using RP-HPLC. *J. Chromatogr. Sci.* 48, 59-62 (2010).
68. Sengupta, S. et al. Hypoxia and Amino Acid Supplementation Synergistically Promote the Osteogenesis of Human Mesenchymal Stem Cells on Silk Protein Scaffolds. *Tissue Eng. Part A* 16, 3623-3634 (2010).
69. Cohen, S. A. Amino Acid Analysis Using Precolumn Derivatization with 6-Aminoquinolyl-NHydroxysuccinimidyl Carbamate. in *Amino Acid Analysis Protocols* 039-047 (Humana Press). doi:10.1385/1-59259-047-0:039
70. Nygren, H., Seppanen-Laakso, T., Castillo, S., Hyötyläinen, T. & Orešič, M. Liquid Chromatography-Mass Spectrometry (LC-MS)-Based Lipidomics for Studies of Body Fluids and Tissues. in 247-257 (Humana Press, 2011). doi:10.1007/978-1-61737-985-7_15
71. Liaw, L. et al. Lipid Profiling of In Vitro Cell Models of Adipogenic Differentiation: Relationships With Mouse Adipose Tissues. *J. Cell. Biochem.* 117, 2182-93 (2016).
72. Schreibman, P. H. & Dell, R. B. Human adipocyte cholesterol. Concentration, localization, synthesis, and turnover. *J. Clin. Invest.* 55, 986-93 (1975).
73. Rojas, A. I. & Phillips, T. J. Patients with Chronic Leg Ulcers Show Diminished Levels of Vitamins A and E, Carotenes, and Zinc. *Dermatologic Surg.* 25, 601-604 (1999).
74. Bernstein, M. A. et al. Higher dietary variety is associated with better nutritional status in frail elderly people. *J. Am. Diet. Assoc.* 102, 1096-1104 (2002).
75. Combs, G. F. & McClung, J. P. *The vitamins: fundamental aspects in nutrition and health.*

76. *Dietary Reference Intakes for Thiamin, Riboflavin, Niacin, Vitamin B6, Folate, Vitamin B12, Pantothenic Acid, Biotin, and Choline*. (National Academies Press, 1998). doi:10.17226/6015
77. Abraham, A., Dillwith, J. W., Mafi, G. G., VanOverbeke, D. L. & Ramanathan, R. Metabolite Profile Differences between Beef Longissimus and Psoas Muscles during Display. *Meat Muscle Biol.* 1, 18 (2017).
78. Cassim, S., Raymond, V.-A., Lapierre, P. & Bilodeau, M. From in vivo to in vitro: Major metabolic alterations take place in hepatocytes during and following isolation. *PLoS One* 12, e0190366 (2017).
79. Lin, X. et al. Metabolic effects of basic fibroblast growth factor in streptozotocin-induced diabetic rats: A 1H NMR-based metabolomics investigation. *Sci. Rep.* 6, 1-9 (2016).
80. Kim, G. D. et al. The relationship between meat color (CIE L* and a*), myoglobin content, and their influence on muscle fiber characteristics and pork quality. *Korean J. Food Sci. Anim. Resour.* 30, 626-633 (2010).
81. Kanatous, S. B. & Mammen, P. P. A. Regulation of myoglobin expression. *Journal of Experimental Biology* 213, 2741-2747 (2010).
82. Aberle, E. & Forrest, J. *Principles of Meat Science*. (Kendall Hunt Pub Co, 2001).
83. Peters, E. L. et al. IGF-1 attenuates hypoxia-induced atrophy but inhibits myoglobin expression in C2C12 skeletal muscle myotubes. *Int. J. Mol. Sci.* 18, 1889 (2017).
84. Li, K., Liu, J. Y., Fu, L., Zhao, Y. Y. & Bai, Y. H. Comparative study of thermal gelation properties and molecular forces of actomyosin extracted from normal and pale, soft and exudative-like chicken breast meat. *Asian-Australasian J. Anim. Sci.* 32, 721-733 (2019).
85. Li, K. et al. A comparative study of chemical composition, color, and thermal gelling properties of normal and PSE-like chicken breast meat. *CYTA—J. Food* 13, 213-219 (2015).
86. Buchsteiner, M., Quek, L.-E., Gray, P. & Nielsen, L. K. Improving culture performance and antibody production in CHO cell culture processes by reducing the Warburg effect. *Biotechnol. Bioeng.* 115, 2315-2327 (2018).
87. Kim, J. et al. Targeting aldehyde dehydrogenase activity in head and neck squamous cell carcinoma with a novel small molecule inhibitor. *Oncotarget* 8, 52345 (2017).
88. Somers, S. M. et al. Myoblast maturity on aligned microfiber bundles at the onset of strain application impacts myogenic outcomes. *Acta Biomater.* 94, 232-242 (2019).
89. Clark, K. J. et al. Enzymatic engineering of the porcine genome with transposons and recombinases. *BMC Biotechnol.* 7, 42 (2007).
90. Ramirez, R. D. et al. Immortalization of Human Bronchial Epithelial Cells in the Absence of Viral Oncoproteins. *Cancer Res.* 64, 9027-9034 (2004).
91. Lobo-Alfonso, J., Price, P. & Jayme, D. Benefits and limitations of protein hydrolysates as components of serum-free media for animal cell culture applications protein hydrolysates in serum free media. in *Protein Hydrolysates in Biotechnology* 55-78 (Springer Netherlands, 2010). doi:10.1007/978-1-4020-6674-0_4
92. Radošević, K., Dukić, B., Andlar, M., Slivac, I. & Gaurina Srček, V. Adaptation and cultivation of permanent fish cell line CCO in serum-free medium and influence of protein hydrolysates on growth performance. *Cytotechnology* 68, 115-121 (2016).
93. Reardon, W. et al. Mutations in the fibroblast growth factor receptor 2 gene cause Crouzon syndrome. *Nat. Genet.* 8, 98-103 (1994).
94. Ding, S. et al. Maintaining bovine satellite cells stemness through p38 pathway. *Sci. Rep.* 8, 10808 (2018).
95. Morgani, S. M. et al. A Sprouty4 reporter to monitor FGF/ERK signaling activity in ESCs and mice. *Dev. Biol.* 441, 104-126 (2018).
96. Setzer, M. S., Sharifi-Rad, J. & Setzer, W. N. The search for herbal antibiotics: An in-silico investigation of antibacterial phytochemicals. *Antibiotics* 5, 30 (2016).
97. Ohene-Agyei, T., Mowla, R., Rahman, T. & Venter, H. Phytochemicals increase the antibacterial activity of antibiotics by acting on a drug efflux pump. *Microbiologyopen* 3, 885-896 (2014).
98. Krumpochova, P. et al. Amino acid analysis using chromatography-mass spectrometry: An inter platform comparison study. *J. Pharm. Biomed. Anal.* 114, 398-407 (2015).
99. Holčapek, M., Liebisch, G. & Ekroos, K. Lipidomic Analysis. *Anal. Chem.* 90, 4249-4257 (2018).
100. Mancini, R. A. & Ramanathan, R. Effects of postmortem storage time on color and mitochondria in beef. *Meat Sci.* 98, 65-70 (2014).
101. Jiang, S. et al. Thermal gelling properties and structural properties of myofibrillar protein including thermo-reversible and thermo-irreversible curdlan gels. *Food Chem.* 311, 126018 (2020).
102. Alden, N. et al. Biologically Consistent Annotation of Metabolomics Data. *Anal. Chem.* 89, 13097-13104 (2017).
103. Ravishankar, S. et al. Carvacrol and cinnamaldehyde inactivate antibiotic-resistant *salmonella entérica* in buffer and on celery and oysters. *J. Food Prot.* 73, 234-240 (2010).
104. Nystoriak, M. A. et al. Comparative effects of parent and heated cinnamaldehyde on the function of human iPSC-derived cardiac myocytes. *Toxicol. Vitr.* 61, 104648 (2019).
105. Roberto, D., Micucci, P., Sebastian, T., Graciela, F. & Anesini, C. Antioxidant Activity of Limonene on Normal Murine Lymphocytes: Relation to $H_2O_2$ Modulation and Cell Proliferation. *Basic Clin. Pharmacol. Toxicol.* (2009). doi:10.1111/j.1742-7843.2009.00467.x
106. Lodish, H. F. *Molecular cell biology*. (W.H. Freeman, 2000).
107. Manner, W., Maxwell, R. J. & Williams, J. E. Effects of Dietary Regimen and Tissue Site on Bovine Fatty Acid Profiles. *J. Anim. Sci.* 59, 109-121 (1984).
108. Ackermann, T. & Tardito, S. Cell Culture Medium Formulation and Its Implications in Cancer Metabolism. *Trends in cancer* 5, 329-332 (2019).
109. Dale, J. C., Burritt, M. F. & Zinsmeister, A. R. Diurnal Variation of Serum Iron, Iron-Binding Capacity, Transferrin Saturation, and Ferritin Levels. *Am. J. Clin. Pathol.* 117, 802-808 (2002).
110. Rükgauer, M., Klein, J. & Kruse-Jarres, J. D. Reference Values for the Trace Elements Copper, Manganese, Selenium, and Zinc in the Serum/Plasma of Children, Adolescents, and Adults. *J. Trace Elem. Med. Biol.* 11, 92-98 (1997).
111. Cho, Y.-E. et al. Cellular Zn depletion by metal ion chelators (TPEN, DTPA and chelex resin) and its application to osteoblastic MC3T3-E1 cells. *Nutr. Res. Pract.* 1, 29-35 (2007).

112. Thorrez, L. & Vandenburgh, H. Challenges in the quest for 'clean meat'. *Nat. Biotechnol.* 37, 215-216 (2019).
113. Allan, S. J., De Bank, P. A. & Ellis, M. J. Bioprocess Design Considerations for Cultured Meat Production With a Focus on the Expansion Bioreactor. *Front. Sustain. Food Syst.* 3, 44 (2019).
114. Lynch, J. & Pierrehumbert, R. Climate Impacts of Cultured Meat and Beef Cattle. *Front. Sustain. Food Syst.* 3, 5 (2019).
115. Quek, L. E., Dietmair, S., Krömer, J. O. & Nielsen, L. K. Metabolic flux analysis in mammalian cell culture. *Metab. Eng.* 12, 161-171 (2010).

The present invention has been described in terms of one or more preferred embodiments, and it should be appreciated that many equivalents, alternatives, variations, and modifications, aside from those expressly stated, are possible and within the scope of the invention.

We claim:

1. An engineered cell that endogenously synthesizes one or more antioxidants, wherein the cell is a mammalian cell, wherein the one or more antioxidants comprise phytoene and the cell comprises a heterologous polynucleotide encoding phytoene synthase, wherein the phytoene synthase has a sequence at least 90% identical to SEQ ID NO:1 or SEQ ID NO: 10.

2. The engineered cell of claim 1, wherein the cell endogenously synthesizes lycopene and comprises a heterologous polynucleotide encoding phytoene desaturase.

3. The engineered cell of claim 2, wherein the phytoene desaturase has a sequence at least 95% identical to SEQ ID NO:3.

4. The engineered cell of claim 2, wherein the cell endogenously synthesizes β-carotene and comprises a heterologous polynucleotide encoding lycopene cyclase.

5. The engineered cell of claim 4, wherein the lycopene cyclase has a sequence at least 95% identical to SEQ ID NO:5 or SEQ ID NO: 11.

6. The engineered cell of claim 1, wherein cell is a Pax7+ mammalian muscle precursor cell.

7. The engineered cell of claim 1, wherein the cell is an Actin+ myosin heavy chain (MHC)+ mammalian multinucleated myotube.

8. The cell of claim 4, wherein total carotenoid production in the engineered cell is at least 5 times greater than total carotenoid production in said cell without the heterologous polynucleotides encoding phytoene synthase, phytoene desaturase, and lycopene cyclase.

9. A method of making the cell of claim 1, comprising introducing in a cell that natively synthesizes geranylgeranyl pyrophosphate (i) a heterologous polynucleotide encoding phytoene synthase; (ii) a heterologous polynucleotide encoding phytoene desaturase; (iii) a heterologous polynucleotide encoding lycopene cyclase; or (iv) a combination thereof.

10. The method of claim 9, wherein the cell is a Pax7+ mammalian muscle precursor cell.

11. A cultured meat product comprising a confluent serum-free culture comprising the cell of claim 1 seeded on a food safe substrate.

12. The cultured meat product of claim 11, wherein the substrate is a film, a sponge, or a three-dimensional matrix.

13. The cultured meat product of claim 11, wherein the substrate is a chitosan substrate.

14. The cultured meat product of claim 11, wherein the cell culture comprises multinucleated myotubes derived from Pax7+ mammalian satellite cells, wherein the multinucleated myotubes optionally express myosin heavy chain (MHC) and actin.

15. The engineered cell of claim 1, wherein the cell further comprises phytoene desaturase having a sequence at least 95% identical to SEQ ID NO:3 and lycopene cyclase having a sequence at least 95% identical to SEQ ID NO:5 or SEQ ID NO: 11.

* * * * *